(12) United States Patent
Smedley et al.

(10) Patent No.: US 6,545,887 B2
(45) Date of Patent: Apr. 8, 2003

(54) UNIFIED CONSTANT-FREQUENCY INTEGRATION CONTROL OF THREE-PHASE POWER FACTOR CORRECTED RECTIFIERS, ACTIVE POWER FILTERS AND GRID-CONNECTED INVERTERS

(75) Inventors: Keyue M. Smedley, Irvine, CA (US); Chongming Qiao, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/928,005

(22) Filed: Aug. 10, 2001

(65) Prior Publication Data

US 2002/0149953 A1 Oct. 17, 2002

Related U.S. Application Data

(63) Continuation-in-part of application No. 09/632,772, filed on Aug. 4, 2000, now Pat. No. 6,297,980.
(60) Provisional application No. 60/157,321, filed on Oct. 1, 1999, and provisional application No. 60/147,623, filed on Aug. 6, 1999.

(51) Int. Cl.[7] .......................... H02M 1/12; H02M 7/68; H02M 7/04
(52) U.S. Cl. .............................. 363/89; 363/44; 363/84; 363/47
(58) Field of Search ...................... 363/89, 44, 47, 363/39, 84, 90

(56) References Cited

U.S. PATENT DOCUMENTS

| | | | | |
|---|---|---|---|---|
| 5,436,550 A | * | 7/1995 | Arakawa | 323/222 |
| 5,561,595 A | * | 10/1996 | Smith | 363/132 |
| 6,011,707 A | * | 1/2000 | Mine | 363/60 |
| 6,014,001 A | * | 1/2000 | Guinet | 318/254 |
| 6,049,179 A | * | 4/2000 | Kisaichi et al. | 315/224 |
| 6,177,739 B1 | * | 1/2001 | Matsudaira et al. | 307/125 |

* cited by examiner

*Primary Examiner*—Bao Q. Vu
(74) *Attorney, Agent, or Firm*—Daniel L. Dawes; Myers, Dawes & Andras LLP

(57) ABSTRACT

An unified constant-frequency integration (UCI) control method based on one-cycle control employs an integrator with reset as its core component along with a few logic and linear components to control the pulse width of a three-phase recitifier, active power filter, or grid-connected inverter so that the all three phase current draw from or the current output to the utility line is sinusoidal. No multipliers and reference calculation circuitry are needed for controlling active power filters. The UCI control employs constant switching frequency and operates in continuous conduction mode (CCM). If in some cases a DSP is desired for some other purposes, the Unified Constant-frequency Control function can be realized by a low cost DSP with a high reliability, because no high speed calcutation, high speed A/D converter, and mutipliers are required.

69 Claims, 73 Drawing Sheets

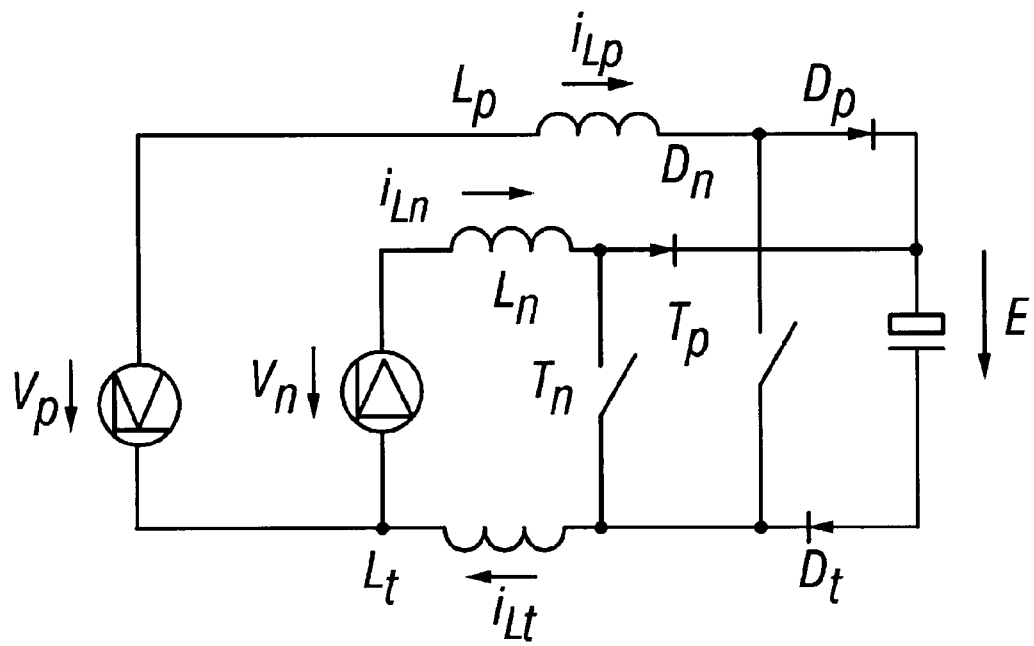
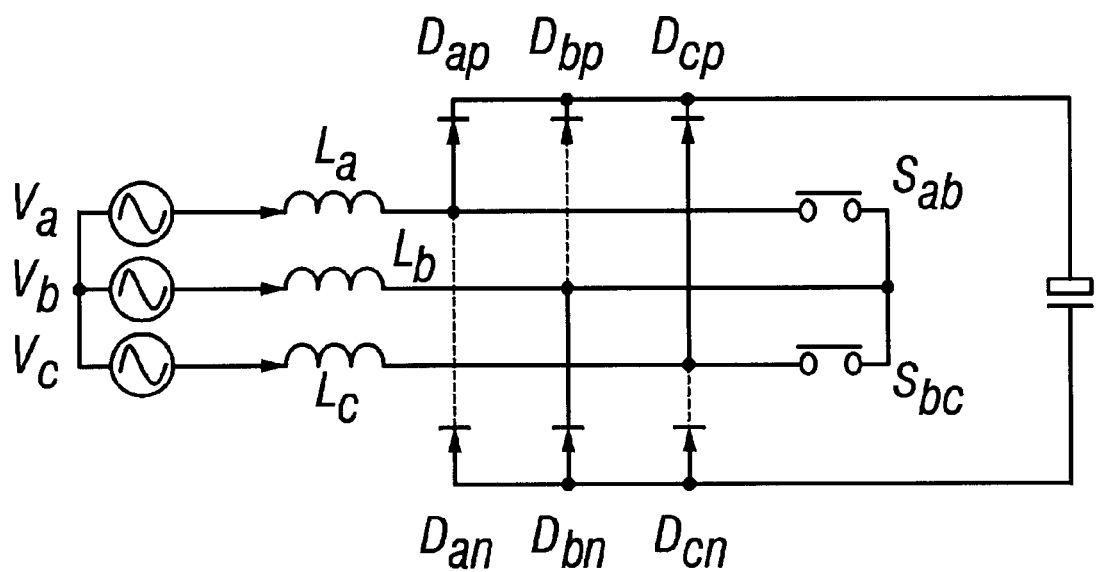
FIG. 13A

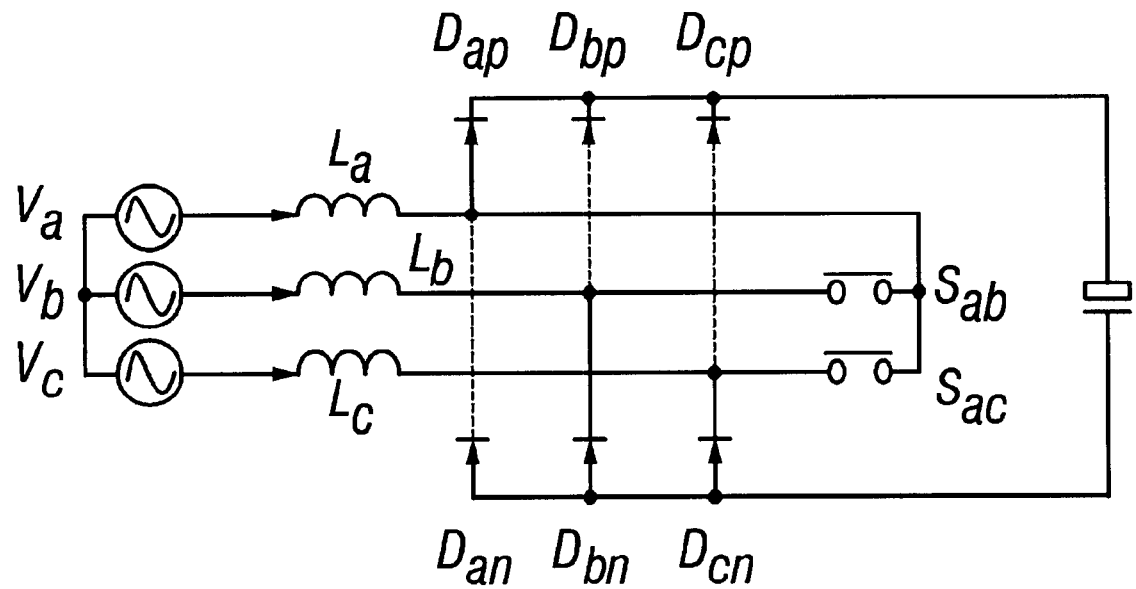
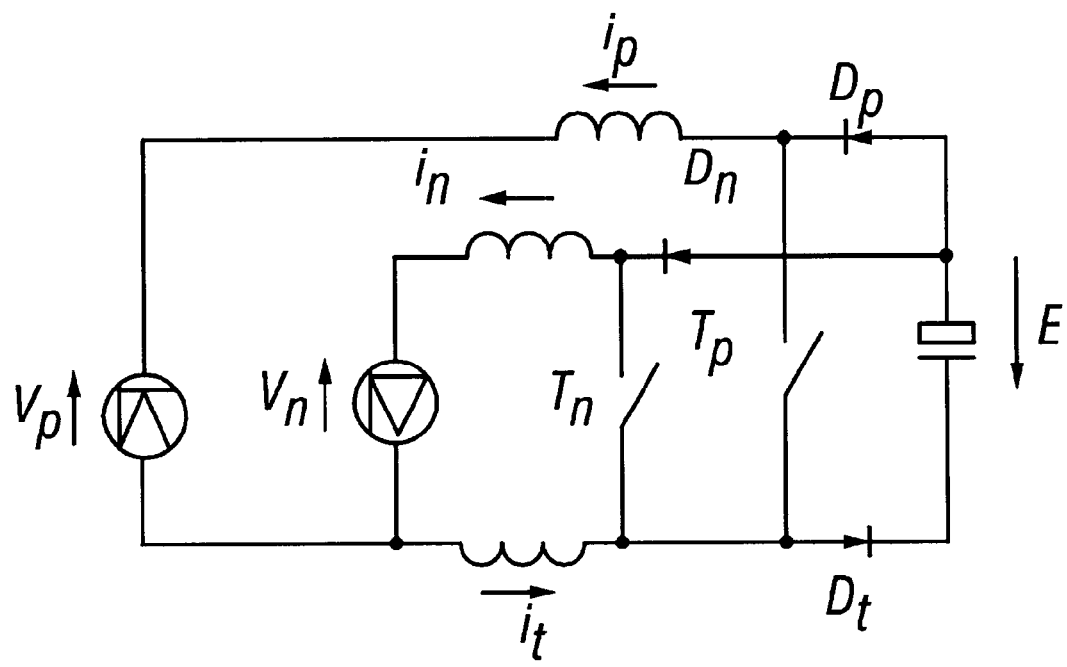
FIG. 13B

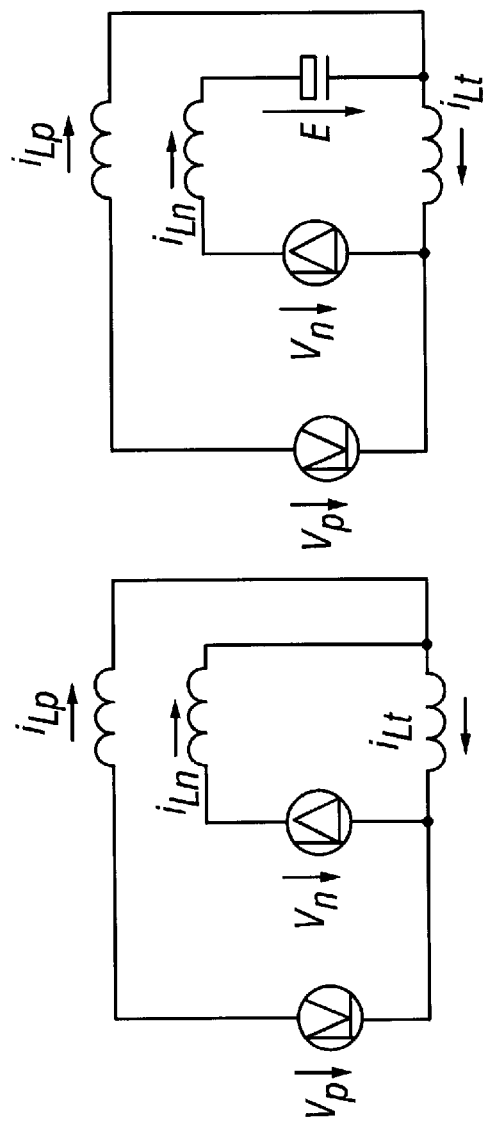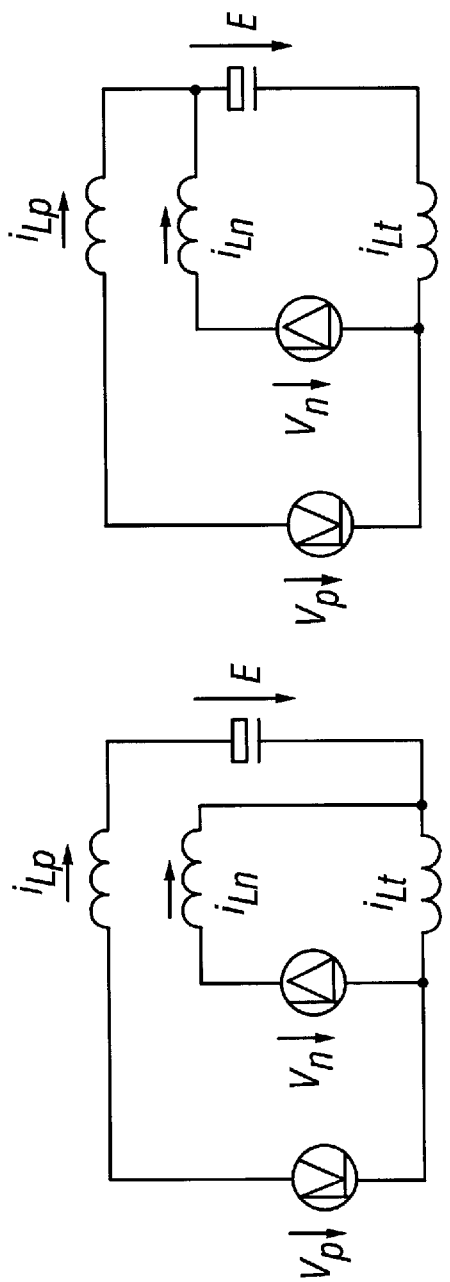
*FIG. 14A*   *FIG. 14B*   *FIG. 14C*   *FIG. 14D*

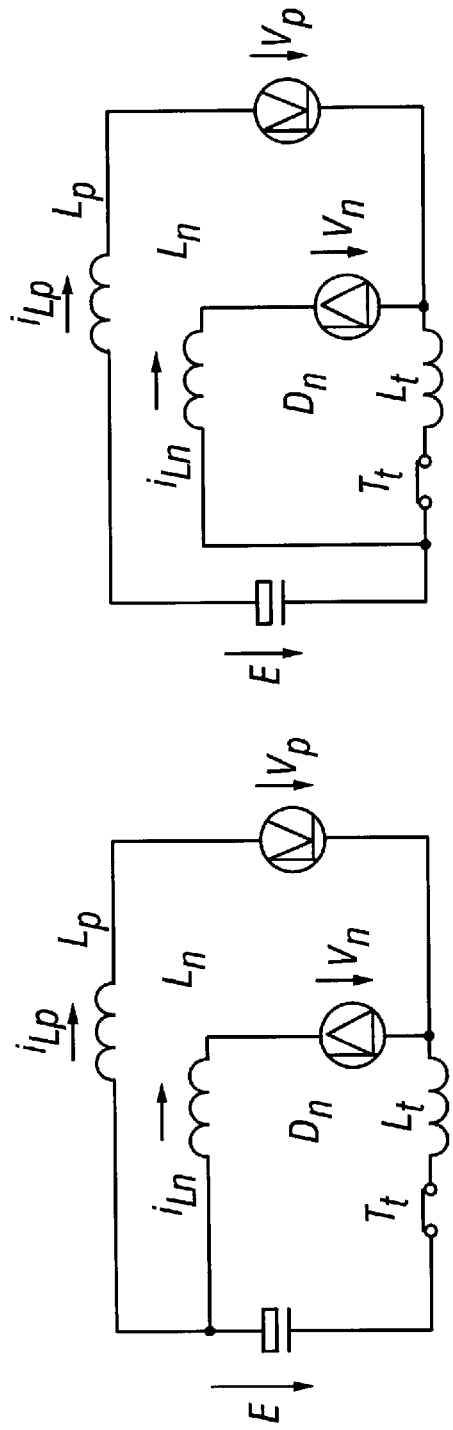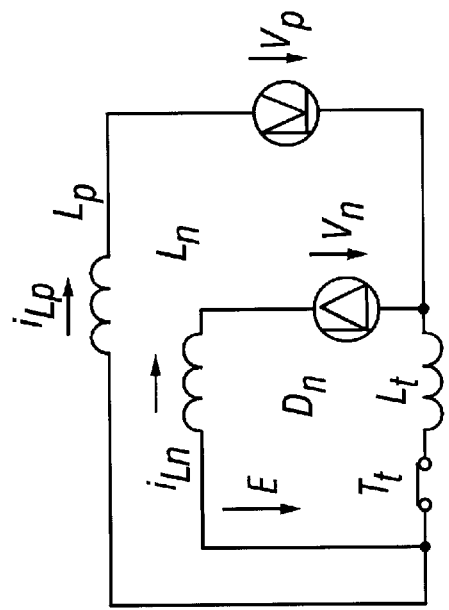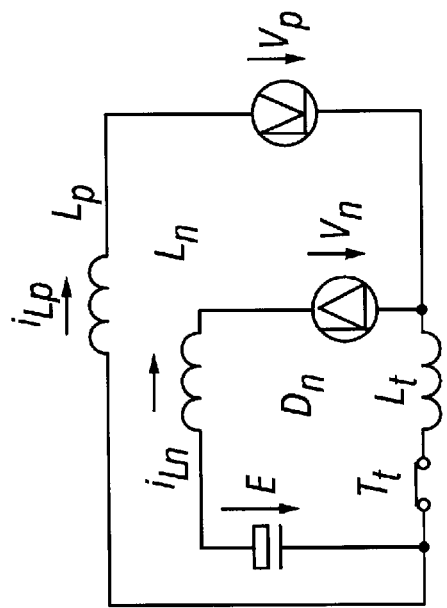
FIG. 75A  FIG. 75B  FIG. 75C  FIG. 75D

UNIFIED CONSTANT-FREQUENCY INTEGRATION CONTROL OF THREE-PHASE POWER FACTOR CORRECTED RECTIFIERS, ACTIVE POWER FILTERS AND GRID-CONNECTED INVERTERS

RELATED APPLICATIONS

The present application is a continuation-in-part application of U.S. patent application Ser. No. 09/632,772, filed on Aug. 4, 2000, issued as U.S. Pat. No. 6,297,980, which in turn was related to U.S. Provisional Patent Application No. 60/147,623 filed on Aug. 6, 1999 and U.S. Provisional Patent Application No. 60/157,321 filed on Oct. 1, 1999.

BACKGROUND OF THE INVENTION

1. Field of the Invention

The invention relates to the field of 3-phase power factor corrected rectifiers, active power filters, and grid-connected inverters and in particular to control methods based on one-cycle control.

2. Description of the Prior Art

The invention in this document covers vast applications spanning from power factor corrected rectifiers in front of and active power filters in parallel to electronic equipement such as computers, communication, motion control, aviation, space electronics, etc. to the grid-connected inverters for distributed power generation.

Power factor corrected rectifiers

In recent years, the usage of modern electronics equipment has been widely proliferating. The electronics equipment usually have a rectifier of single-phase or three-phases in the front end. Three-phases are more desirable for high power applications. A three-phase rectifier is a device that converts three-phase sinusoidal ac power into dc power. Traditional rectifiers draw pulsed currrent from the ac main as shown in FIG. 1, which causes significant harmonic pollution, low power factor, reduced transmission efficiency, harmful electromagnetic interference to neighborhood appliances, as well as overheating of transformers.

In order to solve these problems, many international agencies have proposed harmonic restrictions to electronic equipment. As a result, a vast number of power factor corrected (PFC) rectifers have been proposed to comply with these regulations.

A three-phase power factor corrected rectifeir is a device that converts three-phase sinusoidal ac power into dc power while the input currents are sinusoidal and unity power factor, as shown in FIG. 2. Many three-phase topologies are suitable for implementing PFC function for rectification. Usually, high frequency active switches are used in the rectifiers to realize the PFC function.

The control methods that modulate the pulse width of the switches are an important issue in the power electronics research. A third harmonic injection method was reported for a dual-boost converter with center-tapped dc-link and split output capacitors. This method achieves low current distortion. However, it is not convenient to generate the third harmonic signal tuned to the right frequency and right amplitude.

Hysteresis control and d-q transformation control were frequently used control approaches. Hysteresis control results in variable switching frequency that is difficult for EMI filter design. The d-q approach is based on digital implementation that leads to complicated systems. An analog control method with constant switching frequency modulation was reported for a particular rectifier, where several multipliers are necessary to implement the three phase current references. Due to the disadvantages of variable frequency or complexity of implementation, three-phase PFC rectifiers are not commercially practical.

Active power filters:

One alternative for dealing with the current harmonics generated by treaditional rectifiers is to use active power filters (APF). Considering electronic equipment with traditional rectifier as nonlinear loads to the ac main, a three-phase APF is a device that is connected in parallel to and cancels the reactive and harmonic currents from one or a group of nonlinear loads 110 so that the resulting total current drawn from the ac main is sinusoidal as shown in FIG. 3. In contrast to PFC, where a PFC unit is usually inserted in the energy pass, which processes all the power and corrects the current to unity power factor, APF provides only the harmonic and reactive power to cancel the one generated by the nonlinear loads. In this case, only a small portion of the energy is processed, which may result in overall higher energy efficiency and higher power processing capability.

Most APF control methods proposed previously need to sense the three-phase line voltages and the three-phase nonlinear load currents, and then manipulate the information from these sensors to generate three-phase current references for the APF. Since the reference currents have to reflect the load power of the nonlinear load, several multipliers are needed to scale the magnitude of the current references. A control loop is necessary to control the inverter to generate the reactive and harmonic current required by the nonlinear load. These functions are generally realized by a digital signal processing (DSP) chip with fast analog-to-digital (A/D) converters and high-speed calculations. The complex circuitry results in high cost and unreliable systems, preventing this technique from being used in practical applications.

Some approaches that sense the main line current were reported for single-phase APF and for three-phase APF. The overall circuitry is reduced. However, multipliers, input voltage sensors are still necessary. High speed DSPs are still used in three-phase systems due to the complexity of the systems.

Grid-connected inverters:

Distributed power generation is the trend in the future in order to promote new power generation technologies and reduce transmition costs. An effective use of natural resources and renewable resources as alternatives to fossil and nuclear energy for generation of electricity has the effect of protecting the environment. In order for the alternative energy sources to impact the energy supply in the future, they need to be connected to the utility grid. Therefore, grid-connected inverters are the key elements for the distributed power generation systems. A grid-connected inverter is a device that converts dc power to ac power of single phase or three-phase power that is injected to the utility grid. In order for an alternative energy source to be qualified as a supplier, sinusoidal current injection is required as shown in FIG. 4.

Again, control methods are crucial. In the past, d-q transformer modulation based on digital implementation was often employed for a standard six-switched bridge inverter topology. The complexity results in low reliability and high cost. In addition, short-through hazard exists in this inverter.

What is needed is a design for 3-phase power factor corrected rectifiers, active power filters, and grid-connected inverters which overcomes each of the foregoing limitations of the prior art.

BRIEF SUMMARY OF THE INVENTION

The method of the invention is an unified constant-frequency integration (UCI) control method based on one-cycle control. It employs an integrator with reset as its core component along with logic and linear components to control the pulse width of a three-phase recitifier, active power filter, or grid-connected inverter so that the all three phase current draw from or the current output to the utility line is sinusoidal. No multipliers are required, as used in many control approaches to scale the current references according to the load level. Furthermore, no reference calculation circuitry is needed for controlling active power filters.

The UCI control employs constant switching frequency and operates in continuous conduction mode (CCM) that is desirable for industry applications. This control approach is simple, general, and flexible and is applicable to many topologies with slight modification of the logic circuits, while the control core remains unchanged. Although, a DSP is not required to implement the UCI control; if in some cases a DSP is desired for other purposes, the unified constant-frequency control function may be realized by a low cost DSP with a high reliability, because no high speed calcutation, high speed A/D converter, or mutipliers are required.

The implementation of UCI control can be roughly classified into two categories: (1) vector control mode and (2) bipolar control mode. A three-phase system in the vector control mode has only two switches operating at a switching frequency at a given time, while a three-phase system in bipolar control mode has three switches operating at a switching frequency.

Power factor corrected rectifiers:

The power train of a three-phase rectifier is usually a boost-derived three-phase converter. The UCI controller for PFC applications can control the power train in either the vector and bipolar control mode.

In vector control mode, the boost-derived three-phase rectifiers are categorized into two groups. One group of them can be decoupled into a series-connected dual-boost topology that features central-tapped or split dc output capacitors. The other group can be decoupled into a parallel-connected dual-boost topology that features a single dc output capacitor. The dual-boost sub-topologies rotate their connection every 60° of the line cycle depending on the line voltage states: In each 60° of ac line cycle, only two switches are switched at high frequency. Therefore, the switching loss is significantly reduced. The switches operate at a current lower than the phase current, which results in reduced current ratings and conduction losses.

In bipolar control mode the input phase voltage, output dc voltage, and duty ratios of switches for some boost rectifiers are related by a general equation. Based on the one-cycle control and solutions of this general equation, which is singular and has infinite solutions, several UCI control solutions are derived below for topologies such as the standard six-switch rectifier, VIENNA rectifier and similar circuits.

The UCI control method for PFC rectifiers has demonstrated excellent performance, great simplicity, namely an order of magnitude fewer components than prior art, and unparalleled reliability.

Active Power Filters:

The UCI control approach is based on an one-cycle control and senses main currents. No multipliers nor reference calculation circuitry are required. Thus, the implementaion ciruicltry is an order of magnitue simpler than previously proposed control methods. The UCI control for active power filters has serveral solutions. One solution uses a vector control mode and the need to sense the three-phase line voltage. The switching losses for vector control are reduced. The other version uses bipolar control mode that eliminates three-phase line voltage sensors.

Inverters for Alternative Energy Sources

Grid-connected inverters with sinusoidal current output are proposed. A three-phase standard bridge inverter can be decoupled in a parallel-connected dual-buck subtopology during each 60° of line cycle. Therefore, only two switches are controlled at switching frequency in order to realize sinusoidal output with unity-power-factor. By the proposed control method, the grid-connected inverter features an unity-power-factor, low current distortion, as well as low switching losses. In addition, short-through hazard is eliminated because only one of switches in each bridge arm is controlled during each 60° of line cycle.

While the method has been described for the sake of grammatical fluidity as steps, it is to be expressly understood that the claims are not to be construed as limited in any way by the construction of "means" or "steps" limitations under 35 USC 112, but to be accorded the full scope of the meaning and equivalents of the definition provided by the claims. The invention can be better visualized by turning now to the following drawings wherein like elements are referenced by like numerals.

BRIEF DESCRIPTION OF THE DRAWINGS

FIG. 13a is a schematic of the equivalent circuit of 3-phase boost rectifier with delta-connected switches and its corresponding parallel-connected dual-boost topology in the portion of the cycle from 0~60°.

FIG. 13b is a schematic of the equivalent circuit of 3-phase boost rectifier with delta-connected switches and its corresponding parallel-connected dual-boost topology in the portion of the cycle from 60°~120°.

FIGS. 14a–14d are schematics of the equivalent circuits for the parallel-connected dual-boost topology in all four switching states of the circuit of FIG. 13a.

FIG. 17b is a graph showing the operation waveforms of the circuit of FIG. 17a.

FIG. 23b is a schematic of the equivalent circuit for interval 0~60° for the parallel-connected dual-boost topology of FIG. 13a.

FIG. 27a is a schematic for the equivalent circuit for a VIENNA rectifier during the (−30°~30°) interval when $s_a$ is on.

FIG. 27b is a schematic for a series-connected dual-boost topology corresponding to FIG. 27a.

FIG. 41b is a graph of the operation waveforms of the circuit of FIG. 41a.

FIG. 42 is the output of a simulated three-phase inductor current waveforms with controller shown in FIG. 41a.

FIG. 45(a) is a graph of the simulated three-phase inductor currents. FIG. 45(b) is a graph of the operation waveforms of the control block in FIG. 4.

FIG. 46(a) is a schematic of a 6-switch boost bridge rectifier with dc-diode. FIG. 46(b) is a schematic of a three-level rectifier.

FIG. 58a is a graph of the operation waveforms of the controller. FIG. 58b is a graph of the simulated inductor current waveforms.

FIG. 60a shows the operation of control block. FIG. 60b shows the simulated inductor current.

FIG. 61a is a general diagram of the UCI controlled 3-phase PFC. FIG. 61b is a general diagram of the UCI controlled 3-phase APF.

FIGS. 75a–75d are equivalent circuit for parallel-connected dual buck sub-topology.

FIG. 78a shows the line-line voltage and voltage $V_P$ and $V_n$. FIG. 78b shows the average inductor currents $i_a = \langle i_{La} \rangle$, $i_b = \langle i_{Lb} \rangle$, $i_c = \langle i_{Lc} \rangle$ and equivalent inductor currents $\langle i_{Lp} \rangle$ $\langle i_{Ln} \rangle$.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The disclosure is organized into three parts according to the function of the circuits. In each part, various embodiments will be given for the vector control mode and the bipolar operation mode.

PFC Rectifiers:

In its simplest terms the control method of the invention is based on one cycle control to realize a three-phase PFC function given by:

$$\begin{bmatrix} i_a \\ i_b \\ i_c \end{bmatrix} = \frac{1}{R_e} \cdot \begin{bmatrix} v_a \\ v_b \\ v_c \end{bmatrix} \text{ or } I_s = \frac{1}{R_e} \cdot V_s$$

where $i_a$, $i_b$, $i_c$ is are the three-phase source currents, $v_a$, $v_b$ and $v_c$ are the three-phase source voltages and $R_e$ is the equivalent resistance by which the source is loaded; $I_s$, $V_s$ are matrix vectors representing the input source current and voltage.

Every converter can be described by:

$$V_s = V_o \cdot M(D)$$

where M(D) is a function of the duty cycle D, and is called the conversion matrix. Vo is the dc output voltage. This matrix is singular; thus many solutions are available. According to the invention the two equations above are combined so that the circuit realizes the function described by:

$$I_s = \frac{V_o}{R_e} \cdot M(D)$$

If an equivalent current sensing resistor, $R_s$ is used to measure the source currents $i_a$, $i_b$, $i_c$ then the circuit performance can also be described by a control key equation:

$$R_s \cdot I_s = \frac{R_s \cdot V_o}{R_e} \cdot M(D).$$

Where $$\frac{R_s \cdot V_o}{R_e}$$

can be expressed as $V_m$. Compared to the switching frequency, $V_m$ varies at much lower frequency, therefore it may be approximated by the output of a feedback compensator which is automatically adjusted whenever $$\frac{R_s \cdot V_o}{R_e}$$

has a discrepancy compared to a reference value. The control key equation can be used with any boost-derived converter. For each solution of the control key equation, a control implementation is available based on one-cycle control. Those implementations can be roughly classified into two categories: (1) vector control mode as shown in FIG. 5 and bipolar control mode FIG. 6.

Figure 1:
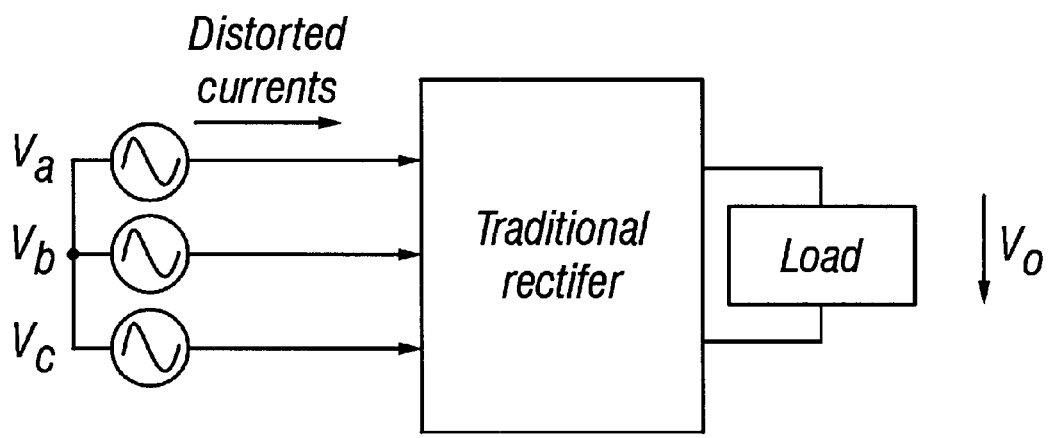
FIG. 1 is a schematic diagram of a prior art three-phase rectifier
Figure 2:
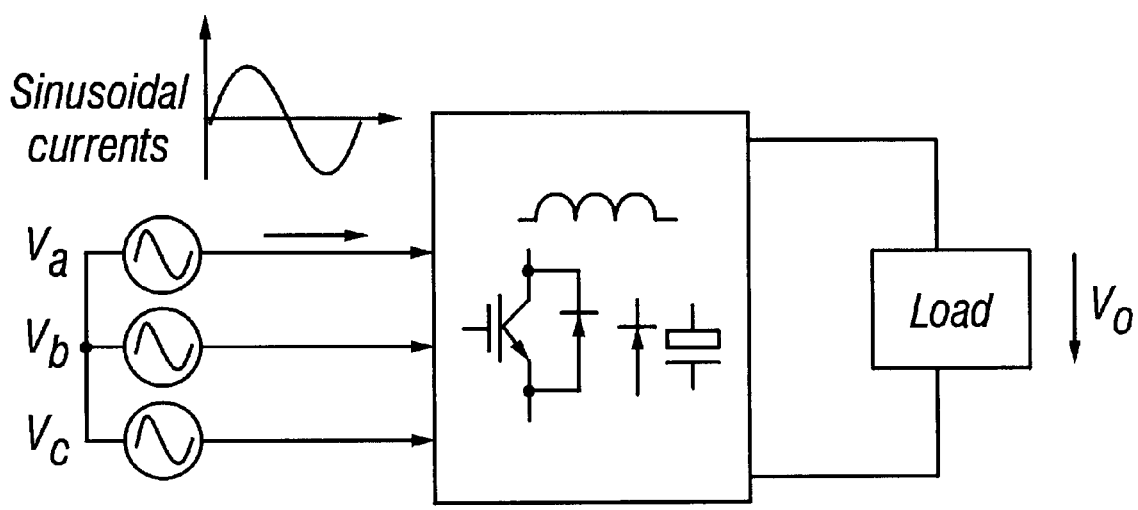
FIG. 2 is a schematic diagram of a prior art power factor corrected three-phase rectifier.
Figure 3:
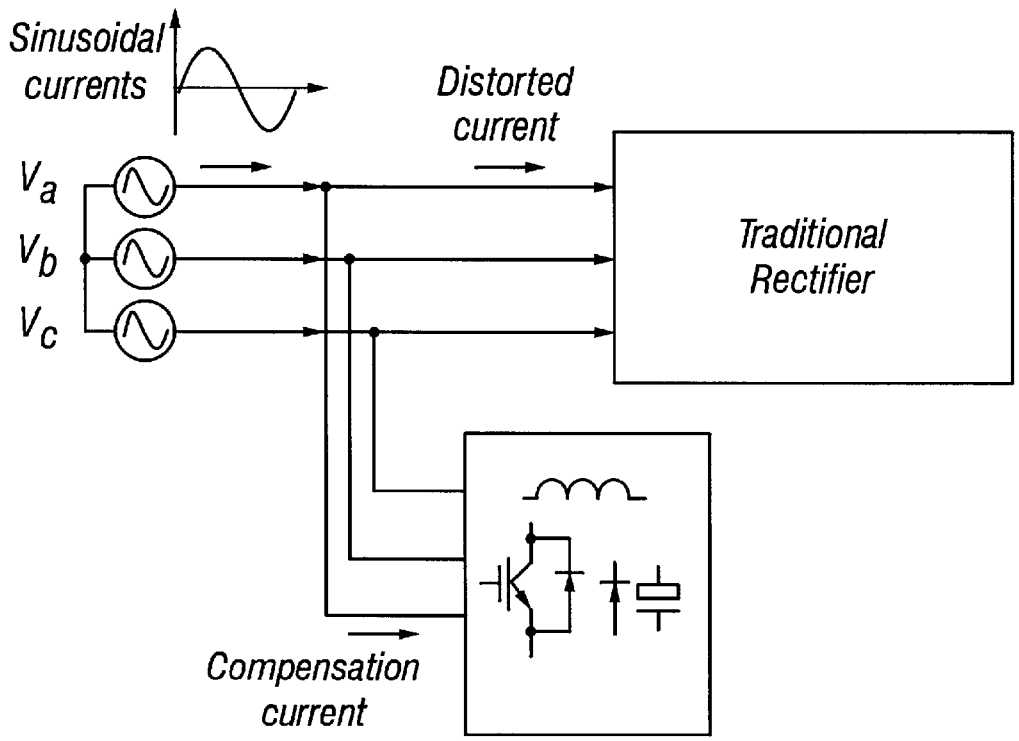
FIG. 3 is a schematic diagram of a prior art active power filter.
Figure 4:
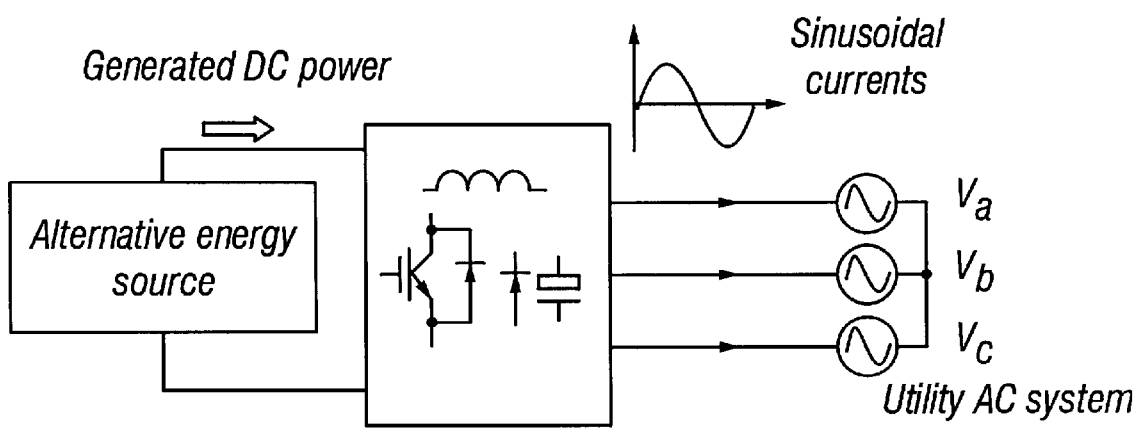
FIG. 4 is a schematic diagram of a prior art grid-connected inverter.
Figure 5:
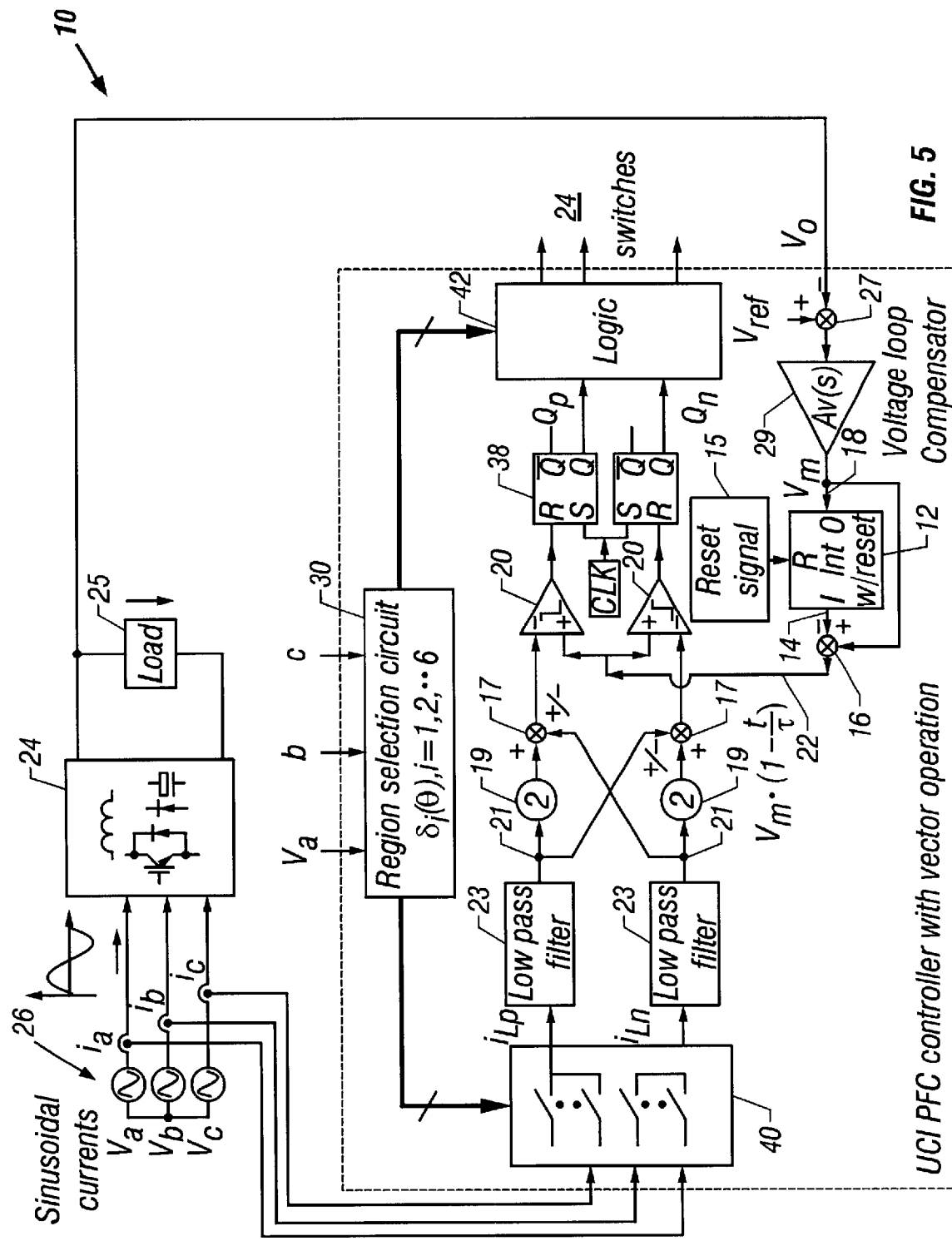
FIG. 5 is a schematic diagram of a power factor correction circuit (PFC) with UCI control in vector mode according to the invention.

The control circuit, generally denoted by reference numeral 10 in FIG. 5, for the vector mode is comprised of an integrator 12 having an input with a timed reset circuit 15 and an output 14 coupled to the input of an adder 16. The adder 16 has another input coupled to the input 18 of the integrator 12. The output 22 of the adder 16 is coupled to two comparators 20. The other input to comparators 20 are derived from adders 17. Adders 17 in turn have an input from doublers or fixed multipliers 19 and are cross-connected to the inputs to fixed multipliers 19. Nodes 21 coupled to the outputs of low pass filters 23 are the inputs to fixed multipliers 19 and the cross-connection to adders 17. Low pass filters 23 are in turn coupled to the outputs of multiplexer 40. The inputs to multiplexer 40 are taken from the three phase inductor currents or switching currents $i_a$, $i_b$ and $i_c$. The outputs of comparators 20 are coupled to clocked flip-flops 38, whose outputs are coupled to a logic circuit 42. Logic circuit 42 and multiplexer 40 are coupled to and controlled by region selection circuit 30, whose operation will be made clear below. The output of logic circuit 42 are coupled back to rectifiers 24 to switch them again in a manner described in detail below in various embodiments. The output, $V_O$, from load 25 or rectifiers 24 is fed back to an subtractor 27 to generate the difference between a reference voltage, $V_{ref}$, and $V_O$. This difference, v(s), is coupled to a voltage loop compensator 29 and provided as the input to integrator 12.

Figure 6:
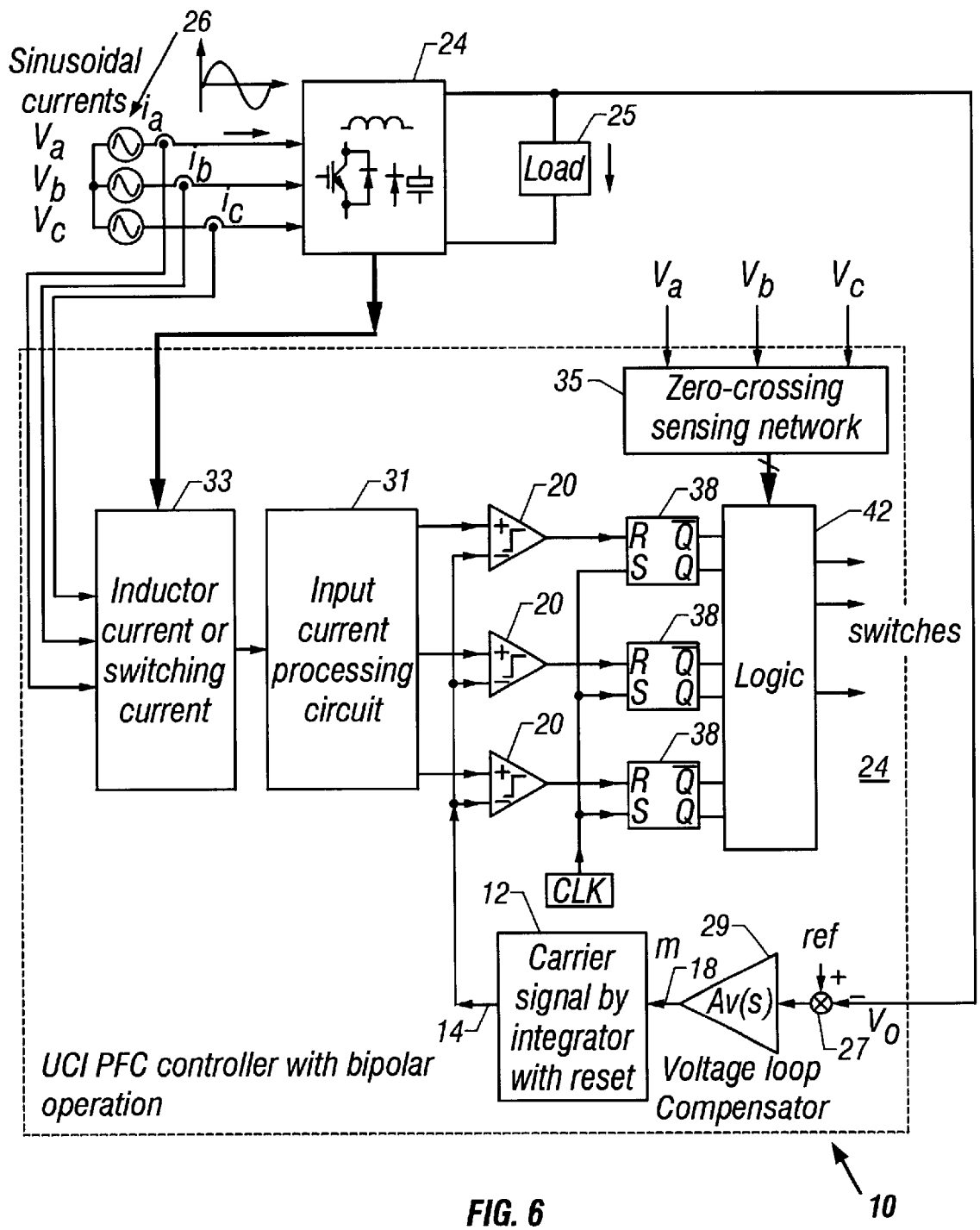
FIG. 6 is a schematic diagram of a power factor correction circuit (PFC) with UCI control in bipolar mode according to the invention.

The control circuit 10 for bipolar mode shown in FIG. 6 is comprised of an integrator 12 having an input 18 including a reset circuit. The output 14 of integrator 12 is coupled to three comparators 20. The other input to comparators 20 is provided from an input current processing circuit 31 described below. The input in turn to input current processing circuit 31 is derived from an inductor current or switching circuit 33. The outputs of comparators 20 are coupled to clocked flip-flops 38, whose outputs in turn are coupled to a logic circuit 42, again described below in various embodiments. Logic circuit 42 is coupled to and controlled by zero-crossing sensing network 35, which takes as its inputs the three phase voltage signals, $V_a$, $V_b$ and $V_c$. The remaining elements of FIG. 6 are similar to those in FIG. 5.

For vector control in FIG. 5, the control variable rotates in each 60° of line cycle. Therefore, the input voltages are sensed that are used to decouple the sensed current signals and direct the trigger signals to the correct switches. Again the detailed nature of the trigger signals and correct switches is described below for various embodiments. For bipolar control in FIG. 6, the control variables do not rotate, therefore no decoupling circuitry is required. In this case, voltage sensing may or may not be necessary.

A unified constant-frequency integration (UCI) control of the power factor corrected rectifiers 24 is thus described above based on one-cycle control. This control method employs an integrator 12 with reset as the core component to control the duty ratio of a PFC rectifier 24 to realize sinusoidal current draw from the AC source 26. Compared to previously proposed control methods, the UCI controller features a constant switching frequency, simpler circuitry, and no need for multipliers. Since the input three-phase currents, $i_a$, $i_b$, and $i_c$, are controlled cycle by cycle, they match the input three-phase voltages closely, thus a unity power factor and low total harmonic distortion (THD) are achieved. Experimental and simulation results show that the PFC has excellent input current waveform demonstrated using many rectifier topologies. PFC rectifiers 24 with an UCI controller provide a cost-effective, highly reliable, and flexible solution for power quality control. Due to the simplicity and generality of the circuitry, it is very suitable for industrial production.

A digital implementation of UCI control method can be realized by programming the control key equation and the supporting logic and linear functions into a digital signal processing (DSP) chip. The details of digital implementation of the various embodiments will not be further described, but it will be immediately evident according to the teachings of the invention what digital operations must be designed or programmed into the DSP's for each embodiment based on the equations and tables given for each embodiment below. Since control key equation and the supporting logic and linear functions are very simple, a low cost DSP can be employed.

The general approach of the invention to three-phase power factor corrected rectifiers with UCI control having been introduced above, turn now to a more detailed description of an unified constant-frequency integration (UCI) controller 10 for power-factor-correction (PFC) for three-phase rectifiers. As stated the UCI controller 10 can be used for vector or bipolar operation. Vector operated UCI controller 10 is derived from parallel or series connected dual boost subtopologies. Most types of the boost-derived three-phase rectifiers 24 can be decoupled into these topologies. For rectifiers based on a parallel-connected dual boost topology, all switches are switched at low current, which results in reduced current ratings. Vector operated UCI controller 10 usually features lower switching losses because only two-high frequency switches are switched during each 60° of the line cycle. In bipolar operation, all switches are switched at high frequency independently from the line voltage states, therefore, no region selection circuit and rotation circuits are necessary, so that the cost is reduced. However, the switching losses are higher compared to that of vector operation. UCI control can be realized by sensing the inductor currents or by sensing the switching currents. A bipolar operated UCI controller 10 can be applied to several topologies such as the standard six-switch boost bridge rectifier as well as the VIENNA rectifier.

Figure 11A:
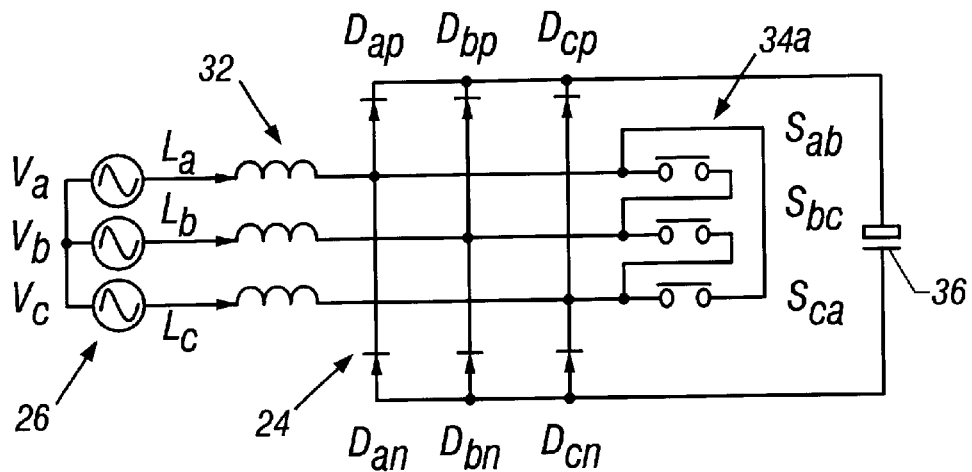
FIG. 11a is a schematic of a conventional 3-phase boost rectifier with delta-connected 3 φ switches.
Figure 11B:
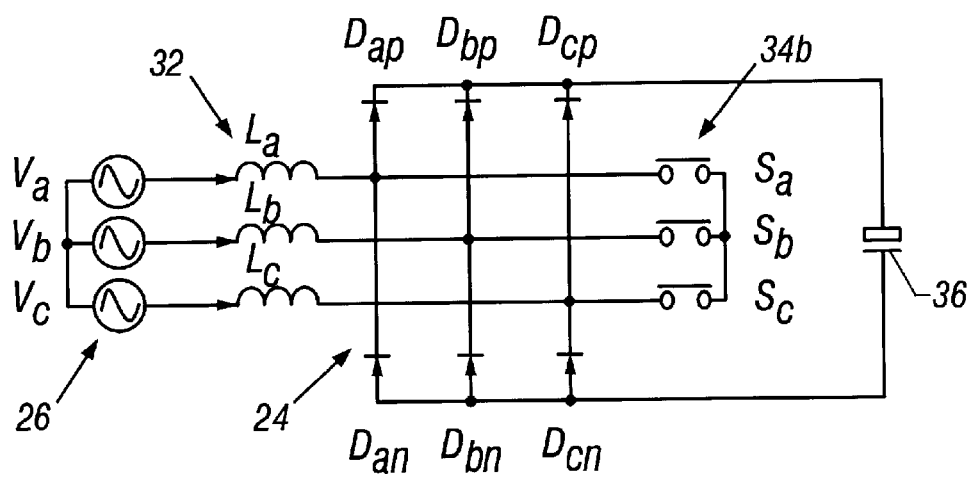
FIG. 11b is a schematic of a conventional 3-phase boost rectifier with star-connected 3 φ switches.
Figure 11C:
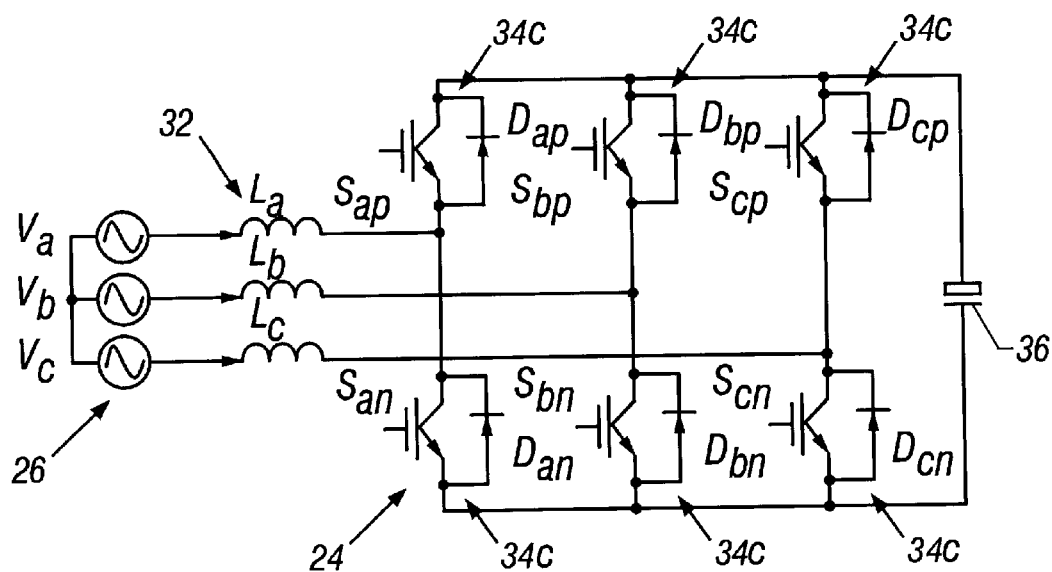
FIG. 11c is a schematic of a conventional 3-phase standard bridge boost rectifier.
Figure 11D:
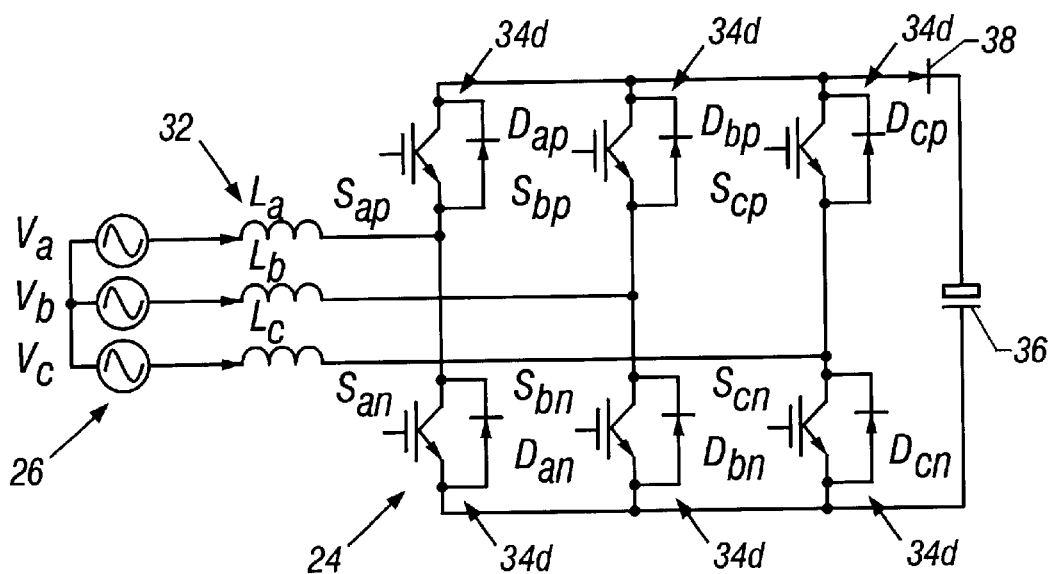
FIG. 11d is a schematic of a conventional 3-phase standard bridge boost rectifier with a diode.
Figure 11E:
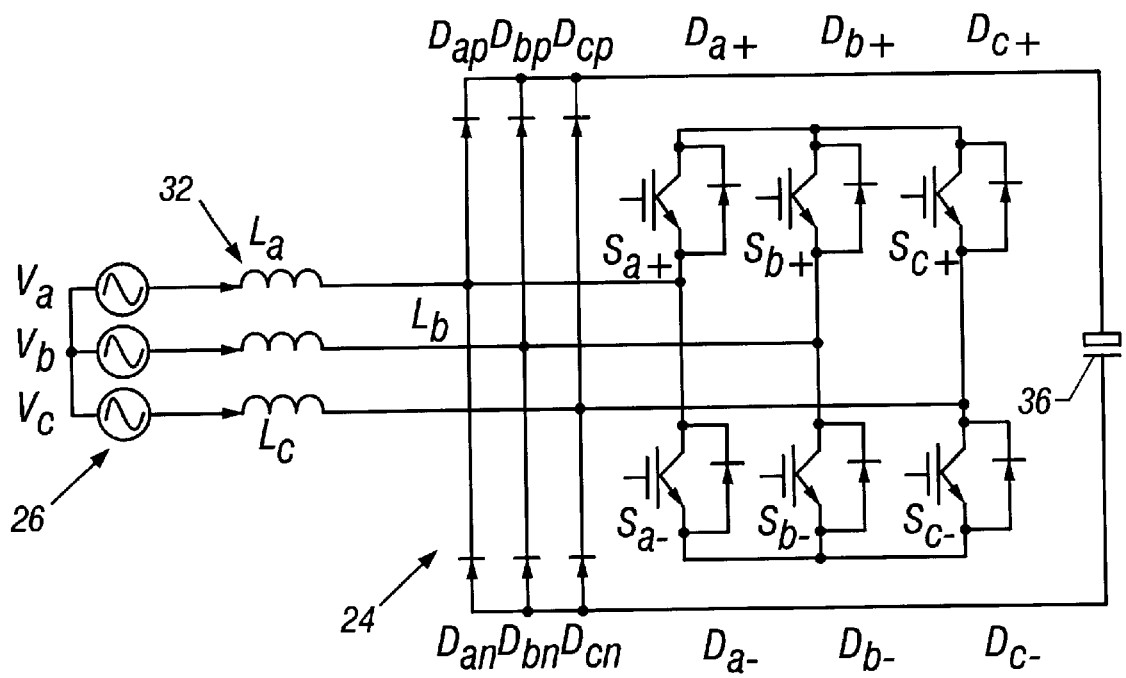
FIG. 11e is a schematic of a conventional 3-phase boost rectifier with an inverter network.

Consider now the vector operated UCI controller 10 for a three-phase rectifier 24 based on parallel-connected dual boost topology. FIGS. 11a–11e depict a family of rectifiers 24 with a parallel-connected dual-boost topology using three AC inductors & a single dc-rail. FIG. 11a shows a conventional three-phase AC source 26 coupled through line inductance 32 into rectifier circuit 24 coupled to a tuned load 36, which rectifier circuit 24 is controlled by three-phase delta connected switches 34a. FIG. 11b shows a conventional three-phase AC source 26 coupled through line inductance 32 into rectifier circuit 24 coupled to a tuned load 36, which rectifier circuit 24 is controlled by three-phase star connected switches 34b. The three-phase H-bridge boost rectifier 24 in FIGS. 11c and 11d are similar except for an additional diode 38 in FIG. 11d. FIG. 11e is a 3-phase boost rectifier configured by switches 34e as an inverter network.

Figure 12:
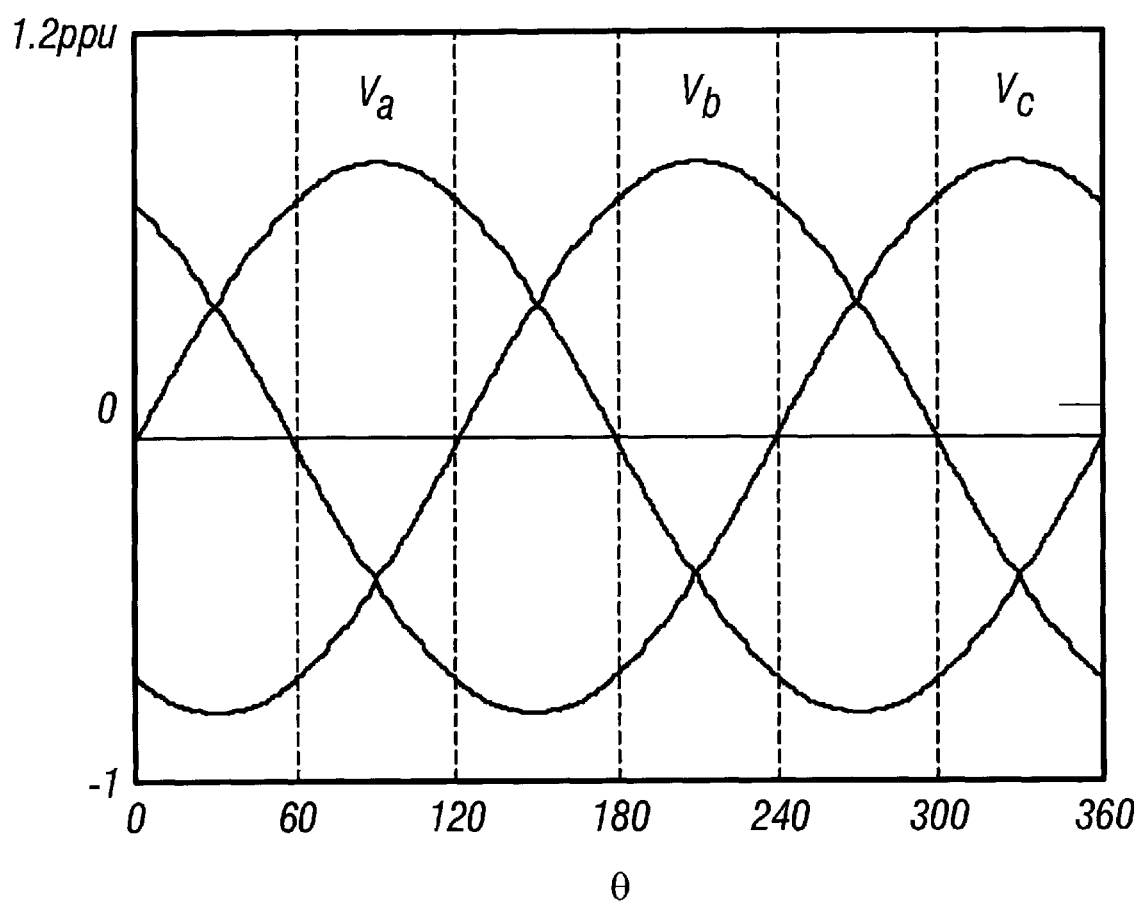
FIG. 12 is a graph of the normalized three-phase voltage waveforms of the circuits of FIGS. 11a–11e.

The normalized three-phase input voltage waveforms are shown in FIG. 12. During each 60° of the AC line cycle as shown in FIG. 12, all the rectifiers given in FIGS. 1a–11e can be decoupled into a parallel-connected dual-boost topology. Consider for example rectifier 24 with delta-connected 3 φ switched shown in FIG. 11a. During the 60 degree region (0~60°) of FIG. 12, switch $S_{ca}$ is off, while the other two switches $S_{ab}$ and $S_{bc}$ are controlled so that the input inductor currents $i_{La}$ and $i_{Lc}$ follow the phase voltages $V_a$ and $V_c$ respectively. The equivalent circuit can be viewed as a parallel connected dual-boost topology as shown in FIG. 13a. In the next 60° (60°~120°), switch $S_{bc}$ is off, while switches $S_{ab}$ and $S_{ca}$ are controlled. The equivalent circuit along with its dual-boost topology is shown in FIG. 13b. These dual-boost topologies are equivalent for each 60° interval, while the circuit parameters of the dual-boost topology are different in each 60° interval as listed in Table I. Note there are two possibilities for the parameter combination, i.e. voltage $V_p$ can be either $V_a-V_b$ or $V_c-V_b$ during interval (0~60°), and so on. The first possibility is considered here, since the second one is similar.

TABLE I

The cross-reference of the circuit parameters between the three-phase boost rectifier shown in FIG. 11a and parallel-connected dual-boost topology.

| | $V_p$ | $V_n$ | $L_p$ | $L_n$ | $L_t$ | $T_p$ | $T_n$ | $D_p$ | $D_n$ | $D_t$ |
|---|---|---|---|---|---|---|---|---|---|---|
| 0~60 | $V_{ab}$ | $V_{cb}$ | $L_a$ | $L_c$ | $L_b$ | $S_{ab}$ | $S_{bc}$ | $D_{ap}$ | $D_{cp}$ | $D_{bn}$ |
| 60~120 | $V_{ab}$ | $V_{ac}$ | $L_b$ | $L_c$ | $L_a$ | $S_{ab}$ | $S_{ca}$ | $D_{bn}$ | $D_{cn}$ | $D_{ap}$ |
| 120~180 | $V_{bc}$ | $V_{ac}$ | $L_b$ | $L_a$ | $L_c$ | $S_{bc}$ | $S_{ca}$ | $D_{bp}$ | $D_{ap}$ | $D_{cn}$ |
| 180~240 | $V_{bc}$ | $V_{ba}$ | $L_c$ | $L_a$ | $L_b$ | $S_{bc}$ | $S_{ab}$ | $D_{cn}$ | $D_{an}$ | $D_{bp}$ |
| 240~300 | $V_{ca}$ | $V_{ba}$ | $L_c$ | $L_b$ | $L_a$ | $S_{ca}$ | $S_{ab}$ | $D_{cp}$ | $D_{bp}$ | $D_{an}$ |
| 300~360 | $V_{ca}$ | $V_{cb}$ | $L_a$ | $L_b$ | $L_c$ | $S_{ca}$ | $S_{bc}$ | $D_{an}$ | $D_{bn}$ | $D_{cp}$ |

For the dual-boost topology shown in FIG. 13a, four switching states are available for the two switches $T_p$ and $T_n$. The switching states and inductor voltages are shown in Table II. The equivalent circuits of the dual-boost topology in all switching states are shown in FIG. 14.

TABLE II

Switching states and inductor voltages for the parallel-connected dual-boost topology.

| State | $T_p$ | $T_n$ | $V_{Lp}$ | $V_{Ln}$ | $V_{Lt}$ |
|---|---|---|---|---|---|
| I | ON | ON | $V_p^*$ | $V_n^*$ | $V_t^*$ |
| II | ON | OFF | $V_p^* + \frac{1}{3} \cdot E$ | $V_n^* - \frac{2}{3} \cdot E$ | $V_t^* - \frac{1}{3} \cdot E$ |
| III | OFF | ON | $V_p^* - \frac{2}{3} \cdot E$ | $V_n^* + \frac{1}{3} \cdot E$ | $V_t^* - \frac{1}{3} \cdot E$ |
| IV | OFF | OFF | $V_p^* - \frac{1}{3} \cdot E$ | $V_n^* - \frac{1}{3} \cdot E$ | $V_t^* - \frac{2}{3} \cdot E$ | where $$\begin{bmatrix} V_p^* \\ V_n^* \\ V_t^* \end{bmatrix} = \begin{bmatrix} \frac{2}{3} & -\frac{1}{3} \\ -\frac{1}{3} & \frac{2}{3} \\ \frac{1}{3} & \frac{1}{3} \end{bmatrix} \cdot \begin{bmatrix} V_p \\ V_n \end{bmatrix}$$

and voltage 'E' equals the output voltage $V_0$.

Figure 15:
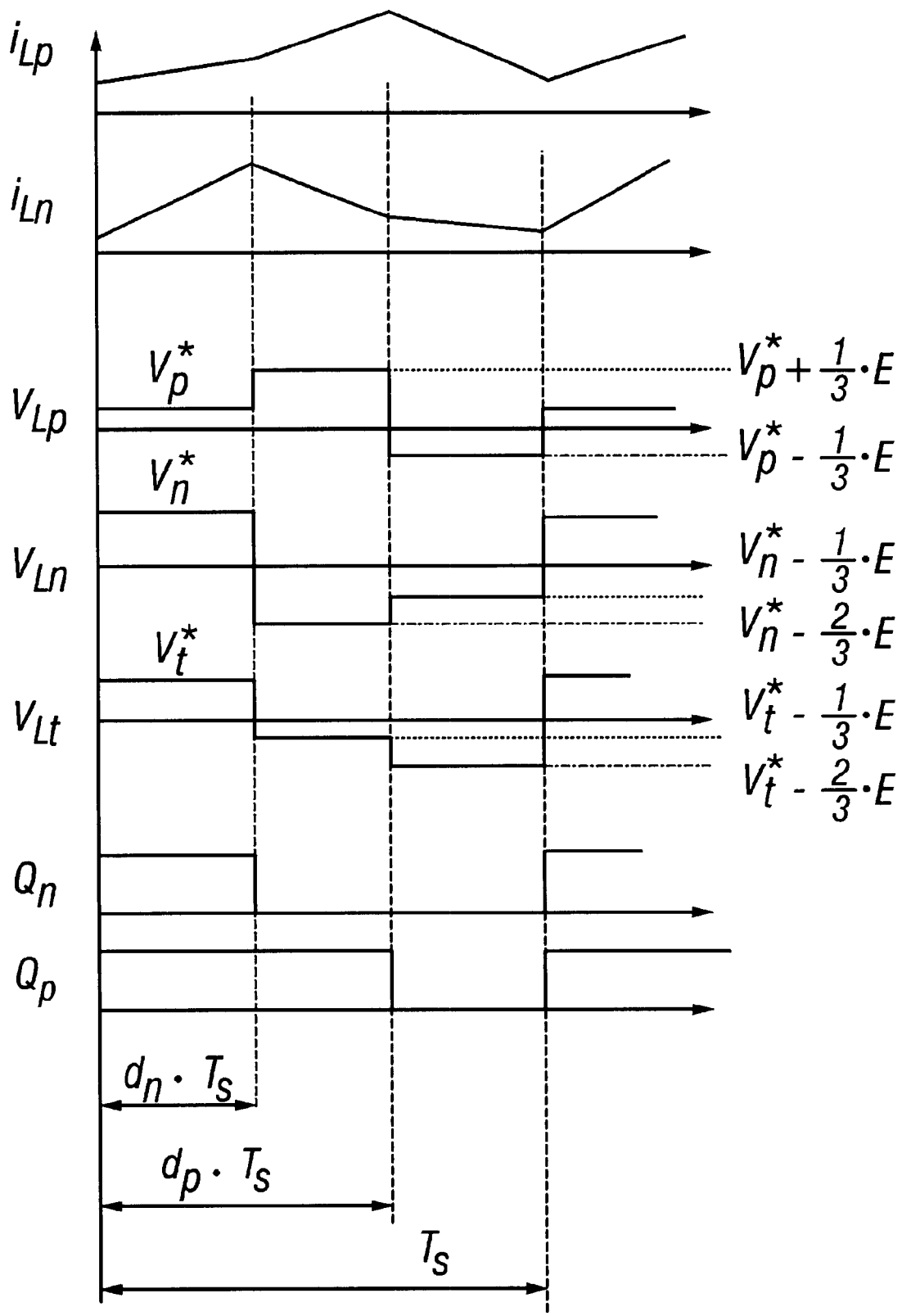
FIG. 15 is a graph of the inductor voltage and current waveforms for the topology shown in FIG. 13a under the condition $d_p > d_n$.

For a three-phase PFC with a constant switching frequency, only two switching sequences are possible, i.e. states I, II, IV (condition $d_p > d_n$) or states I, III, IV (condition $d_p < d_n$) during each switching cycle, if trailing-edge modulation is performed. The voltage and current waveforms of the inductors are shown in FIG. 15 for the first switching sequence ($d_p > d_n$).

Based on the assumption that switching frequency is much higher than the line frequency, the inductor voltage-second balance is used, which yields $$\begin{cases} V_p^* \cdot d_n + \left(V_p^* + \frac{1}{3} \cdot E\right) \cdot (d_p - d_n) + \left(V_p^* - \frac{1}{3} \cdot E\right) \cdot (1 - d_p) = 0 \\ V_n^* \cdot d_n + \left(V_n^* - \frac{2}{3} \cdot E\right) \cdot (d_p - d_n) + \left(V_n^* - \frac{1}{3} \cdot E\right) \cdot (1 - d_p) = 0 \\ V_t^* \cdot d_n + \left(V_t^* - \frac{1}{3} \cdot E\right) \cdot (d_p - d_n) + \left(V_t^* - \frac{2}{3} \cdot E\right) \cdot (1 - d_p) = 0 \end{cases} \quad (1)$$

The following equation is true for a symmetrical three-phase system:

$$V_p^* + V_n^* - V_t^* = 0 \quad (2)$$

Combination of the equation (1), (2) and further simplification yield $$\begin{bmatrix} 1 - d_p \\ 1 - d_n \end{bmatrix} = \begin{bmatrix} 2 & 1 \\ 1 & 2 \end{bmatrix} \cdot \begin{bmatrix} \frac{V_p^*}{E} \\ \frac{V_n^*}{E} \end{bmatrix} \quad (3)$$

It can be verified that this equation is valid for the other switching states I, III, and IV ($d_p < d_n$) as well. In the steady sate, equation $$\frac{E}{V_{in}} = \frac{1}{1 - D}$$

is valid for a dc—dc boost converter operated in continuous conduction mode (CCM), where voltages $V_{in}$, E are the input and output voltages for the dc—dc boost converter respectively. Similarly Equation (3) gives an inherent relationships between the duty cycle and the input, output voltage for the parallel-connected dual-boost topology. This relationship is independent of the control scheme as long as the dual-boost topology operates in CCM.

A Three-Phase UCI PFC Controller

For the unity power factor three-phase PFC, the control goal is to force the switching-cycle average of the inductor currents in each phase to follow the sinusoidal phase voltages.

$$V_a = R_e \cdot i_a; \quad V_b = R_e \cdot i_b; \quad V_c = R_e \cdot i_c \tag{4}$$

where $R_e$ is the emulated resistance that reflects the load current.

This control goal can be realized by controlling the inductor currents $i_{Lp}$ and $i_{Ln}$ to follow the voltages $V_p^*$ and $V_n^*$ respectively. For example, during the interval (0–60°), assuming that $V_p = V_a - V_b$ and $V_n = V_c - V_b$, following equations are resulted:

$$\begin{cases} V_p^* = \frac{2}{3} \cdot V_p - \frac{1}{3} \cdot V_n = \frac{2}{3} \cdot (V_a - V_b) - \frac{1}{3} \cdot (V_c - V_b) = V_a \\ \langle i_{Lp} \rangle = \langle i_{La} \rangle = i_a \\ V_n^* = \frac{2}{3} \cdot V_n - \frac{1}{3} \cdot V_p = \frac{2}{3} \cdot (V_c - V_b) - \frac{1}{3} \cdot (V_a - V_b) = V_c \\ \langle i_{Ln} \rangle = \langle i_{Lc} \rangle = i_c \end{cases} \tag{5}$$

Therefore, the control goal of three-phase PFC can be rewritten as $$\begin{cases} V_p^* = R_e \cdot \langle i_{Lp} \rangle \\ V_n^* = R_e \cdot \langle i_{Ln} \rangle \end{cases} \tag{6}$$

Substituting equation (6) into (3) yields $$\begin{bmatrix} 1 - d_p \\ 1 - d_n \end{bmatrix} = \frac{R_e}{E \cdot R_s} \cdot R_s \cdot \begin{bmatrix} 2 & 1 \\ 1 & 2 \end{bmatrix} \cdot \begin{bmatrix} \langle i_{Lp} \rangle \\ \langle i_{Ln} \rangle \end{bmatrix} \tag{7}$$

where $R_s$ is the equivalent current sensing resistance (assuming all the current sensing resistances are equal to $R_s$).

Let $$V_m = \frac{E \cdot R_s}{R_e} \tag{8}$$

where $V_m$ is the output of the voltage loop compensator, equation (7) can be rewritten as $$V_m \cdot \begin{bmatrix} 1 - d_p \\ 1 - d_n \end{bmatrix} = R_s \cdot \begin{bmatrix} 2 & 1 \\ 1 & 2 \end{bmatrix} \cdot \begin{bmatrix} \langle i_{Lp} \rangle \\ \langle i_{Ln} \rangle \end{bmatrix} \tag{9}$$

Figure 16:
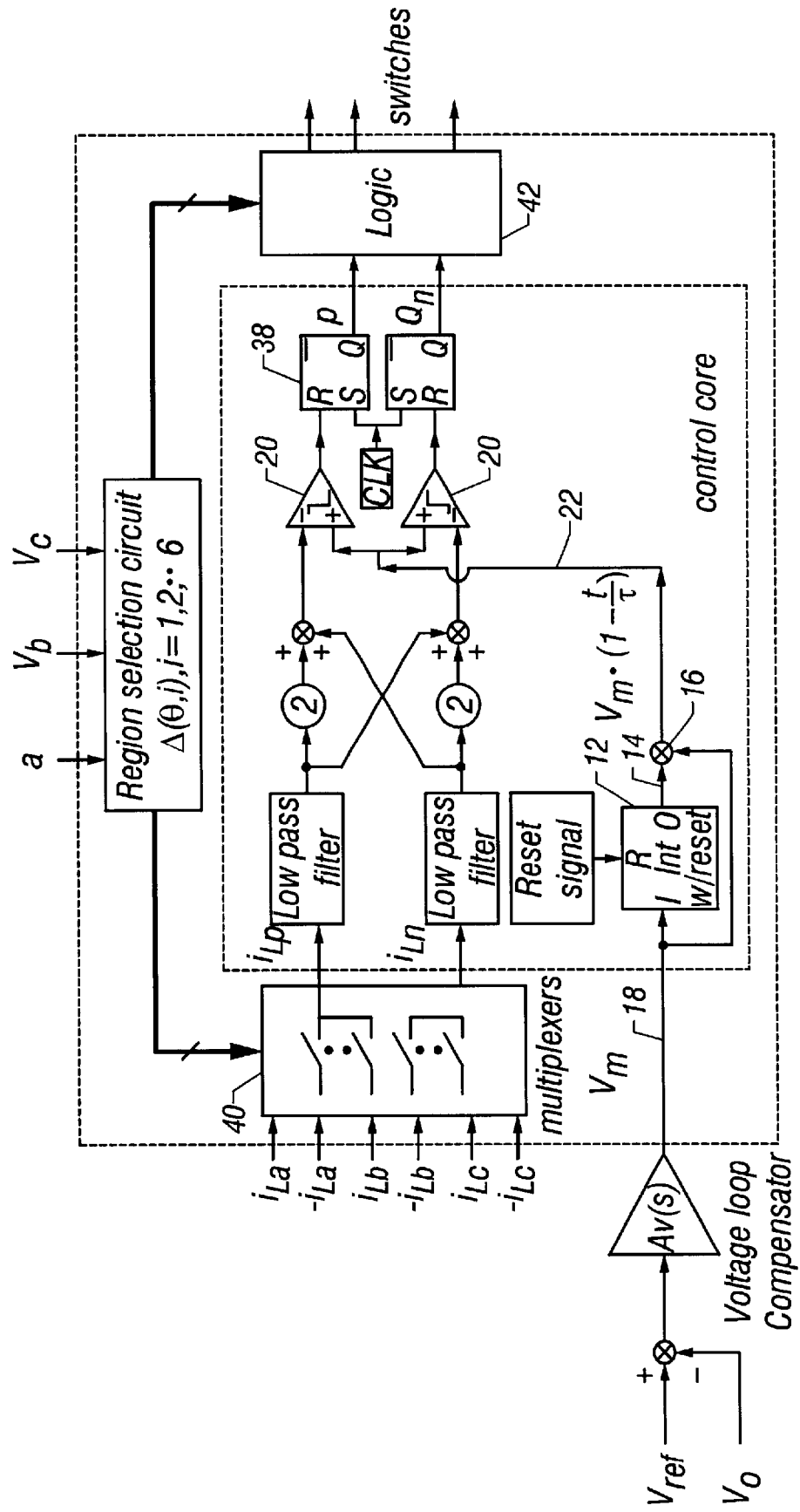
FIG. 16 is a schematic of the core control block of the UCI three-phase PFC controller of the invention.

It shows that three-phase PFC can be realized by controlling the duty ratio of switches $T_p$ and $T_n$ such that the linear combination of inductor currents $\langle i_{Lp} \rangle$ and $\langle i_{Ln} \rangle$ satisfy equation (9). These equations can be realized through an integrator 16 with reset and a linear network such as a clock (not shown), a comparator 20, a flip/flop 38 and adders 16. The control core circuitry needed to realize the equation (9) is shown in FIG. 16. Since the parallel-connected dual-boost topologies change their parameters such as $i_{Lp}$, $i_{Ln}$ during each 60° of line cycle, an input multiplexer circuit 40 and an output logic circuit 42 are required. Overall, the control block to realize the three-phase PFC function is shown in FIG. 16.

This control block includes four functional circuits:

(1). The region selection circuit 30 functions to determine the operational region as well as the corresponding equivalent circuit at a given time. The region selection function $\Delta(\theta,i)$ is defined as:

$$\Delta(\theta,i) = u(\theta - (i-1) \cdot 60) - u(\theta - i \cdot 60) \tag{10}.$$

Figure 17A:
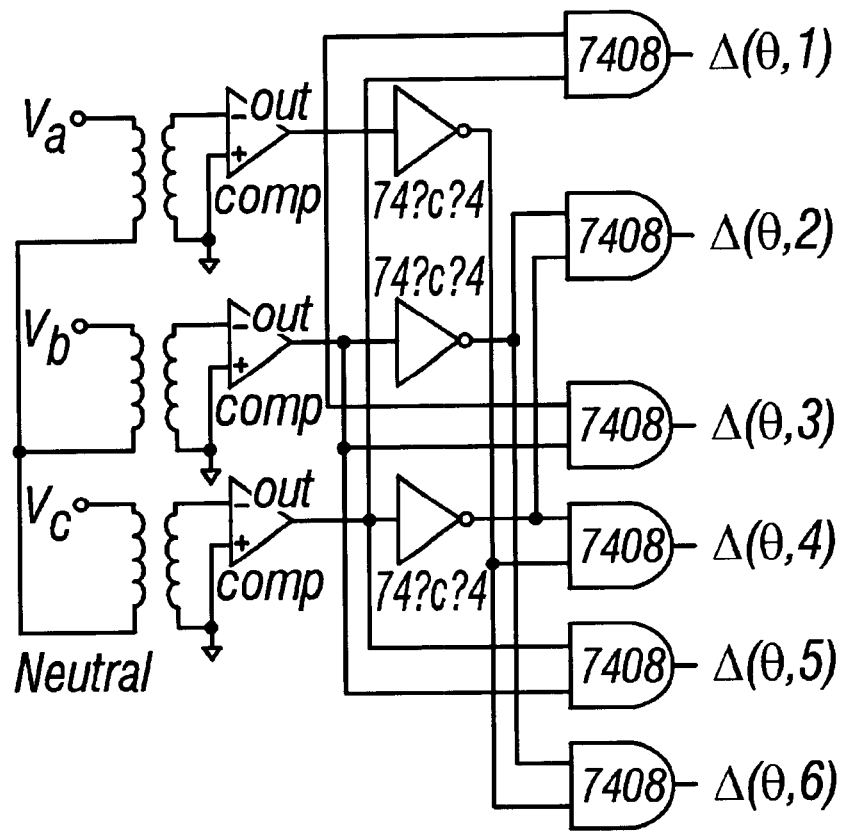
FIG. 17a is a schematic implementation of the selection function $\Delta(i,\theta)$ i=1, 2, ... 6.
Figure 17B:
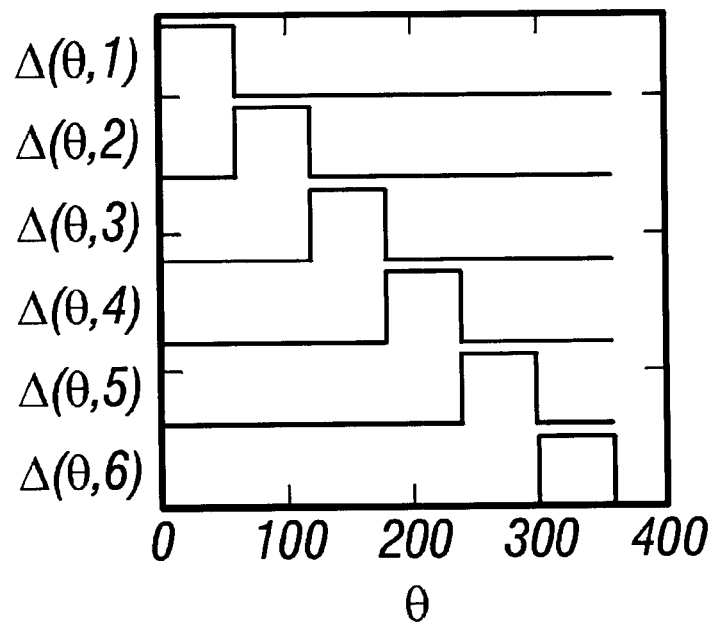

It can be implemented by sensing the input voltage as shown in FIG. 17a. The waveforms of selection function are shown in FIG. 17b.

(2). The input multiplexer circuit 40 functions to select the input inductor current in order to configure the $\langle i_{Lp} \rangle$ and $\langle i_{Ln} \rangle$. For example, the equivalent current $i_{Lp}$ can be expressed as $$i_{Lp} = |i_{La}| \cdot (\Delta(1,\theta) + \Delta(6,\theta)) + |i_{Lb}| \cdot (\Delta(2,\theta) + \Delta(3,\theta)) + + |i_{Lc}| \cdot (\Delta(4,\theta) + \Delta(5,\theta)).$$

Figure 18:
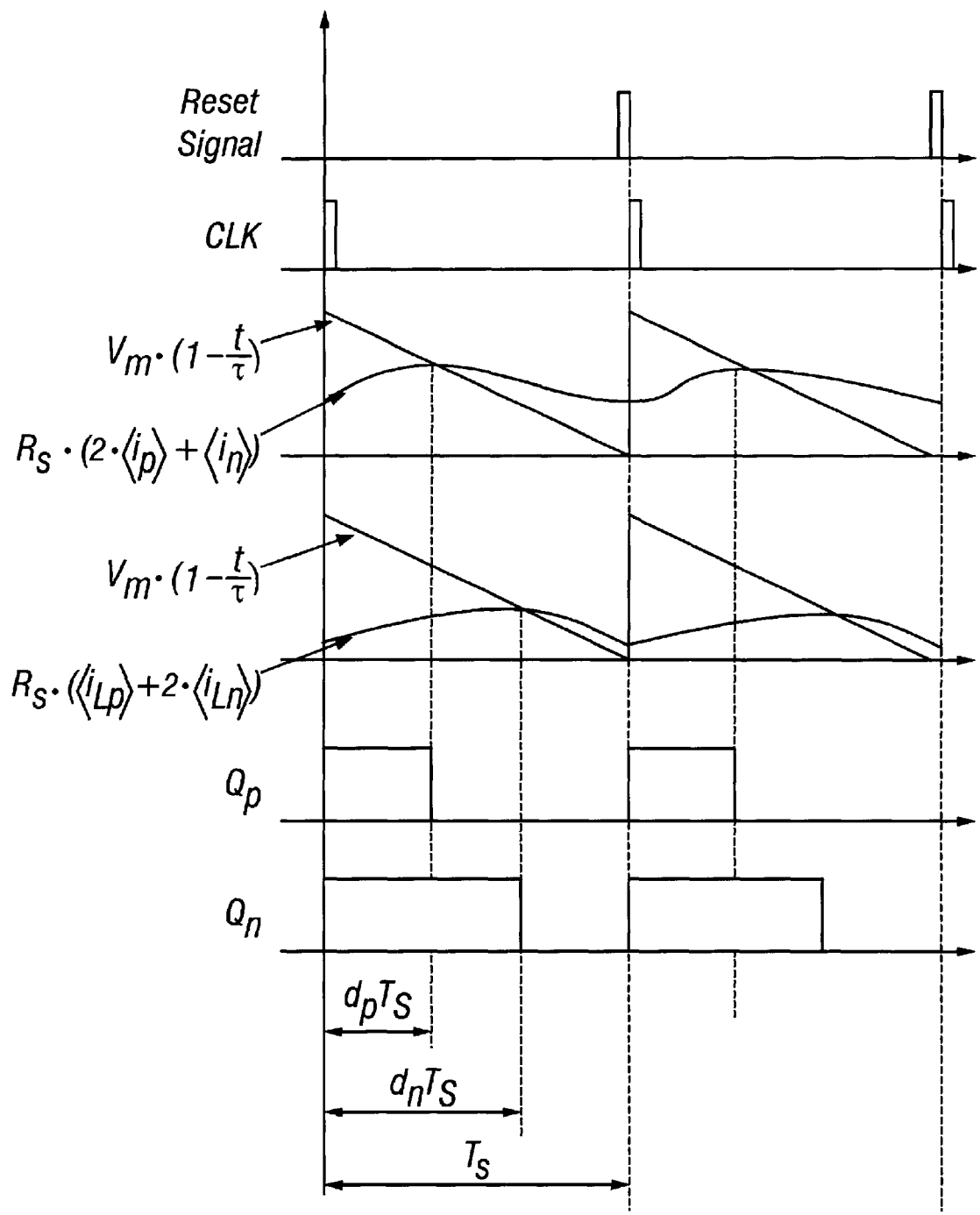
FIG. 18 is a graph of the waveforms of the control core in FIG. 16.

(3). The core circuit also includes an adder 16, comparators 20, and an integrator 16 with reset to realize the equation (9). The time constant of integrator 16 is set to equal the switching period. The operation waveforms are shown in FIG. 18.

Figure 19:
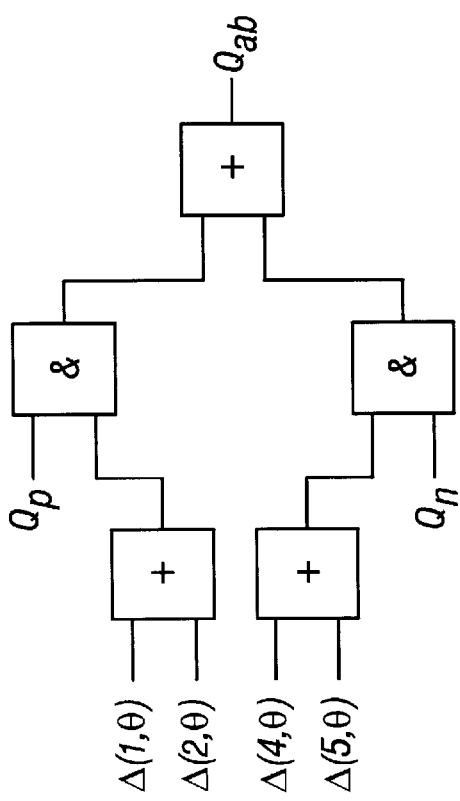
FIG. 19 is a block diagram for the realization of control signal for switch $s_{ab}$.

(4). The output logic circuit 42 applies the equivalent switching control signal $Q_p$ and $Q_n$ to switches 34a–34e in the rectifier 24. The logic function varies from one type of rectifier 24 to another. The control signals for output switches 34a–34e are also functions of selection function $\Delta(i,\theta)$ and control signal for switches $T_p$ and $T_n$. For example, the control signal of switches $S_{ab}$ is given by: $Q_{ab} = Q_p \cdot (\Delta(1,\theta) + \Delta(2,\theta)) + Q_n \cdot (\Delta(4,\theta) + \Delta(5,\theta))$; where $Q_{ab}$, $Q_p$ and $Q_n$ are control signals for switches $S_{ab}$, $T_p$ and $T_n$ respectively. The implementation circuit is shown in FIG. 19.

The control algorithm for the boost PFC shown in FIG. 11a is listed in Table III. From the table, two conclusions can be drawn:

The current $i_{Lp}$ and $i_{Ln}$ are smaller than the phase current. Therefore, the switches $S_{ab}$, $S_{bc}$, and $S_{ca}$ have lower current rating and lower conduction losses.

During each 60° region, only two switches $T_p$ and $T_n$ are operating at high frequency. Therefore, switching losses are expected to be lower.

TABLE III

The control algorithm for the 3-phase boost rectifier 24 with delta-connected switches in FIG. 11a.

| Region | $V_p$ | $V_n$ | $i_{L,p}$ | $i_{L,n}$ | $i_{L,t}$ | $Q_{ab}$ | $Q_{bc}$ | $Q_{ca}$ |
|---|---|---|---|---|---|---|---|---|
| 0~60 | $V_{ab}$ | $V_{cb}$ | $i_{L,a}$ | $i_{L,c}$ | $-i_{L,b}$ | $Q_p$ | $Q_n$ | |
| 60~120 | $V_{ab}$ | $V_{ac}$ | $-i_{L,b}$ | $-i_{L,c}$ | $i_{L,a}$ | $Q_p$ | 0 | $Q_n$ |
| 120~180 | $V_{bc}$ | $V_{ac}$ | $i_{L,b}$ | $i_{L,a}$ | $-i_{L,c}$ | 0 | $Q_p$ | $Q_n$ |
| 180~240 | $V_{bc}$ | $V_{ba}$ | $-i_{L,c}$ | $-i_{L,a}$ | $i_{L,b}$ | $Q_n$ | $Q_p$ | |
| 240~300 | $V_{ca}$ | $V_{ba}$ | $i_{L,c}$ | $i_{L,b}$ | $-i_{L,a}$ | $Q_n$ | 0 | $Q_p$ |
| 300~360 | $V_{ca}$ | $V_{cb}$ | $-i_{L,a}$ | $-i_{L,b}$ | $i_{L,c}$ | 0 | $Q_n$ | $Q_n$ |

Experimental verification

Figure 20:
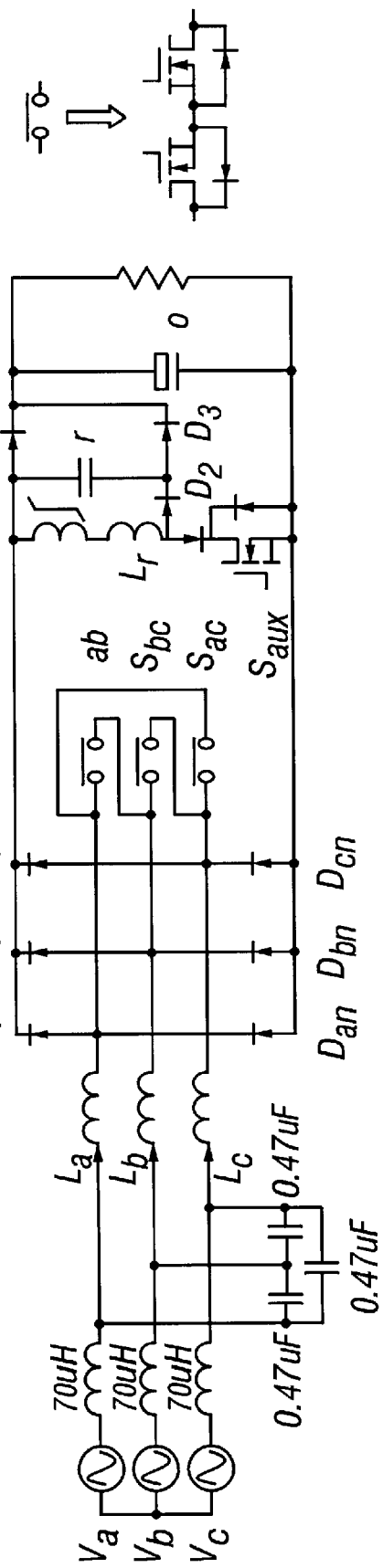
FIG. 20 is a schematic of a prototype three-phase boost PFC with active soft switching.
Figure 21:
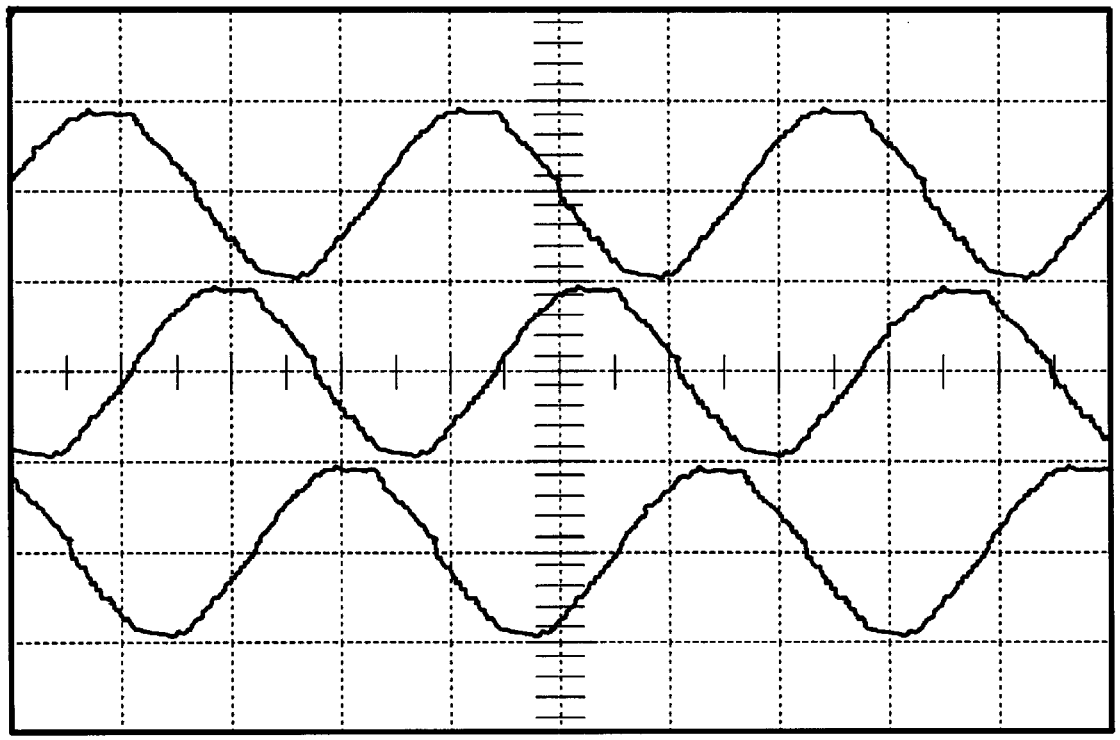
FIG. 21 is a graph of the three phase inductor current waveforms at full load with a horizontal scale at 5 ms/div; and vertical scale at 5 A/div.
Figure 22:
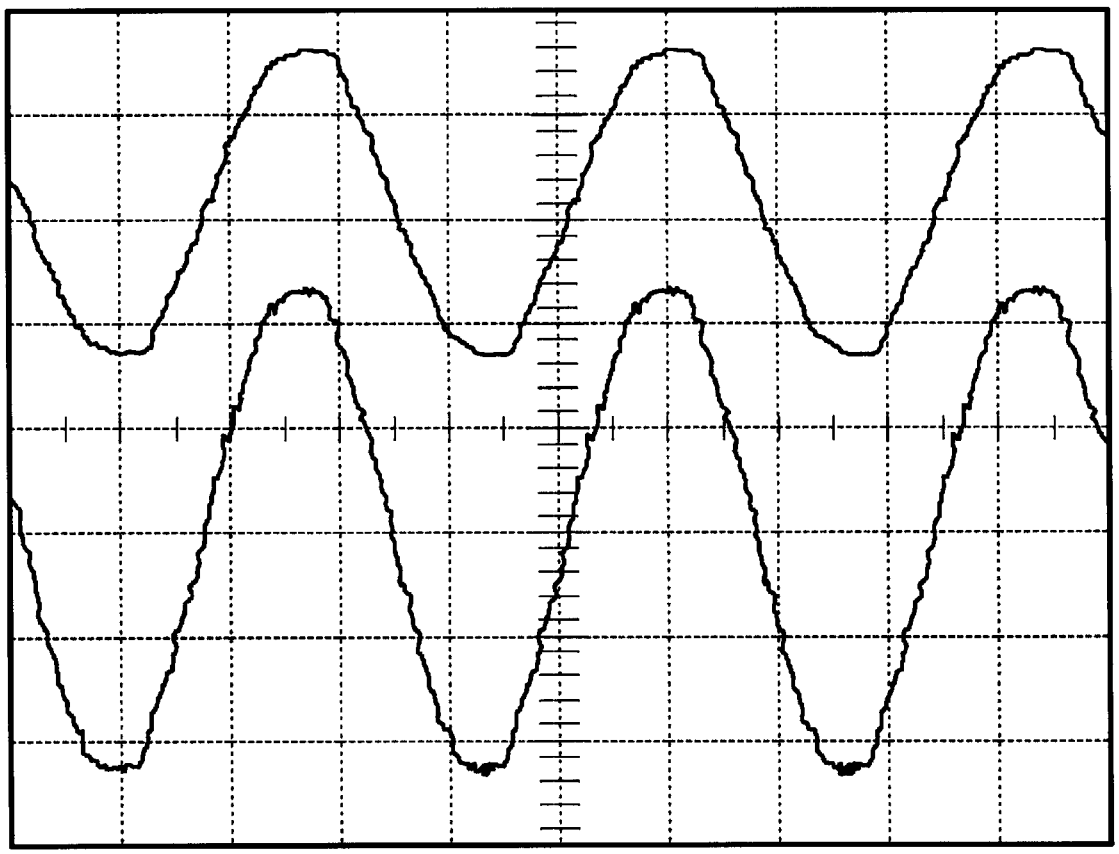
FIG. 22 is a graph of the waveforms of phase voltage and current at full load with a Horizontal scale at 5 ms/div. The top curve on the graph shows the input phase voltage at 100 V/div and the bottom curve on the graph shows the input phase A current, 2 A/div.

A 1.5 kW prototype of the three-phase rectifier with delta-connected 3 φ switches shown in FIG. 11a was built. In order to improve the efficiency and reduce switching noise, an active zero-voltage soft-switching circuit was employed. The experimental schematic is shown in FIG. 20. The parameters of the components are listed as follows: the inductors $L_a = L_b = L_c = 560$ uH; the output capacitor $C_o = 470$ uF; the main switches use MTY25N60E; and the main diodes $d_{ap}$, $d_{an}$, ... $d_{cn}$ and $d_f$ are MUR3080; the auxiliary switch is MTY8N60E; the soft-switching inductor and capacitor are $L_r = 10$ uH and $C_r = 3$ nF; diodes $d_2$, $d_3$ are MUR860. The experimental conditions are as follows: the input phase voltage is 120 Vrms; the output voltage is 475 VDC; switching frequency: 55 kHz; load resistance is 160 Ω; output power is 1.41 KW. The measured three-phase current waveforms are shown in FIG. 21. The phase A voltage and current are shown in FIG. 22. All the waveforms are measured by Tektronix oscilloscope TDS 520. The measured THD at full load and 120 Vrms input is 6.1%, while the phase voltages have a THD of 3.9% themselves.

Figure 23A:
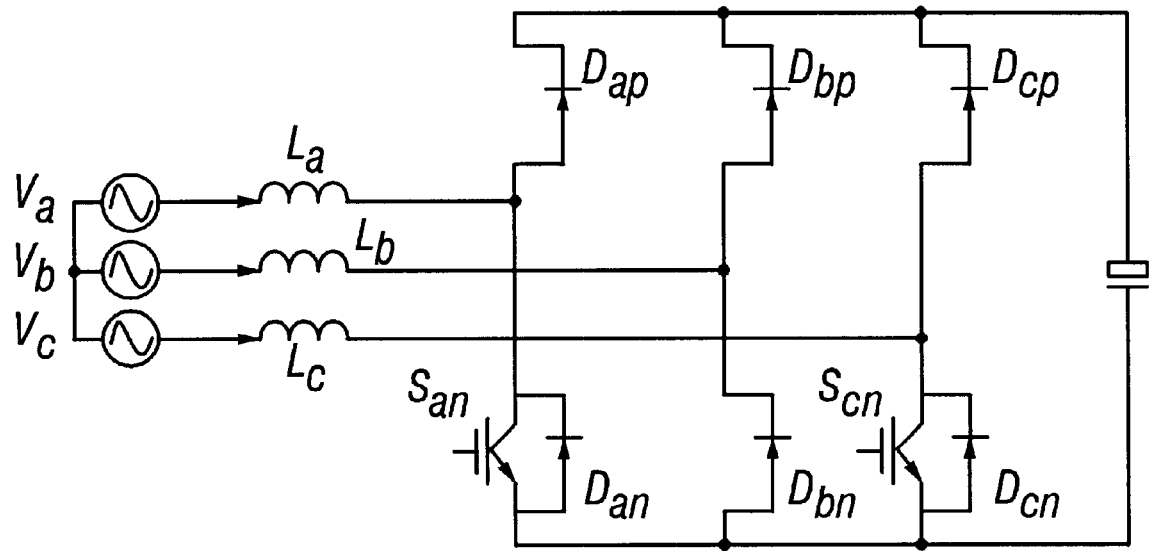
FIG. 23a is a schematic of the equivalent circuit for interval 0~60° for the three-phase standard bridge boost rectifier of FIG. 11c.
Figure 23B:
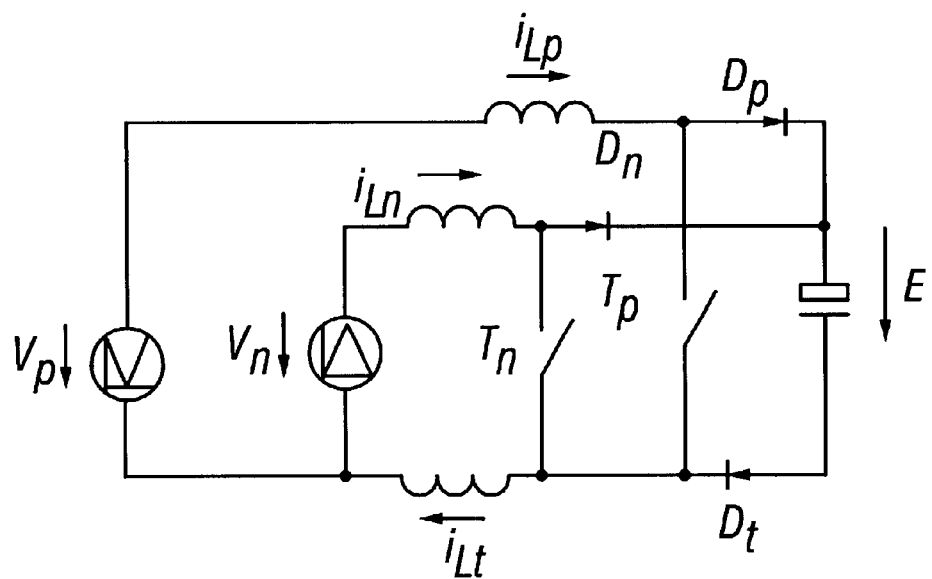
Figure 24:
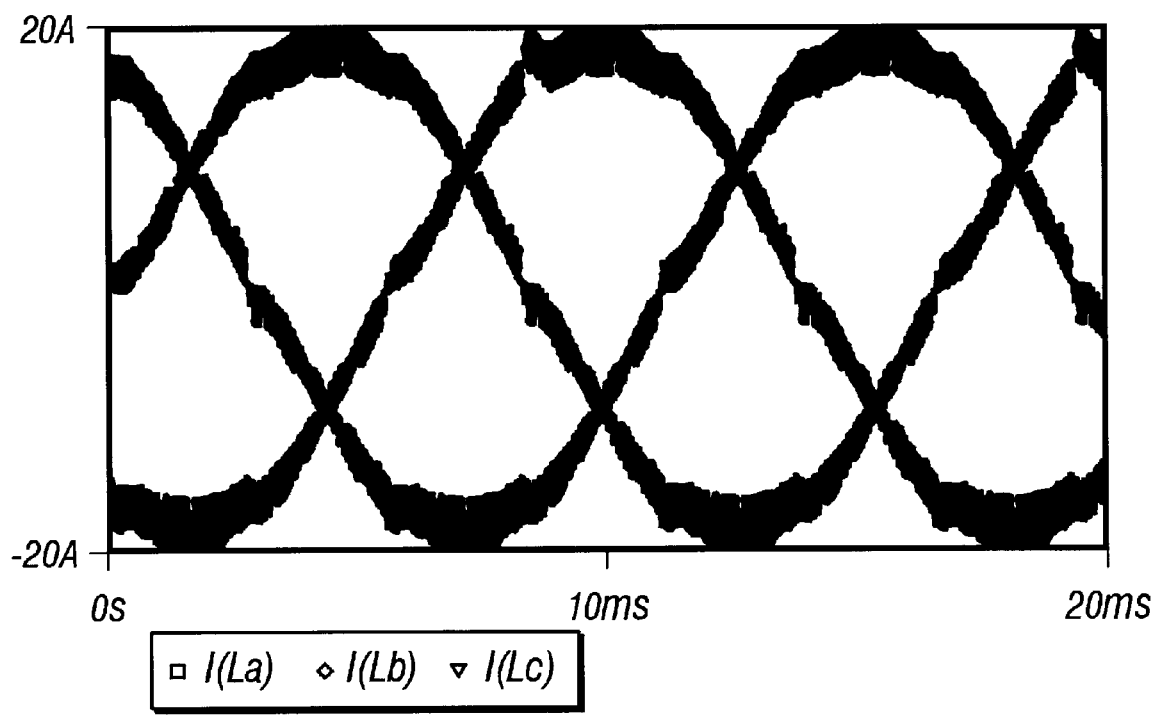
FIG. 24 is a graph of the simulated current waveforms for three-phase standard bridge boost rectifiers shown in FIGS. 11c and 11d with the UCI three-phase PFC controller of the invention.

Analysis And Simulation Of The Proposed Controller For The H-Bridge Boost Rectifier As Well As The Rest Of The Family All the members in the parallel connected dual-boost family of FIGS. 11a–11e can be controlled in a similar way. The H-bridge boost rectifier 24 shown in FIG. 11c is decoupled into the parallel-connected dual-boost topology as shown in FIGS. 13a and 13b. For example, during the 0~60° interval, switches $S_{an}$ and $S_{cn}$ are controlled so that the inductor currents $i_{La}$, $i_{Lc}$ follow the phase voltages $V_a$, $V_c$ respectively. The equivalent circuit for this interval and the parallel-connected dual boost topology are shown in FIG. 23. As a result, the H-bridge rectifier 24 can also be controlled by proposed controller shown in FIG. 16 with slight modification of the output logic circuit 42. The corresponding parameters are listed in the Table IV. Control algorithm is shown in Table V. The simulated current waveforms for the H-bridge rectifier are shown in FIG. 24. The simulated THD is 2.86% when the input voltage is purely sinusoidal.

The operation, the corresponding parameters, and control algorithm for rectifier shown in FIG. 11d are the same as that of the H-bridge rectifier shown in FIG. 11c in CCM operation. However, the operations are different when they get into DCM mode. The rectifier in FIG. 11c can be designed to operate always in CCM by slightly modifying output logic circuits.

The rest of the family members, the boost rectifier with star-connected switches shown in FIG. 11b and boost rectifier with inverter network shown in FIG. 11e, can also be decoupled into dual-boost topologies in each 60°. The parameter cross-references for these two rectifiers are listed in Table VI. The control algorithm can be derived in a similar way. The simulated waveforms for circuit in FIGS. 11b and 11e are not listed here, since they are similar to the simulated waveforms shown in FIG. 24.

TABLE IV

The cross-reference between the H-bridge boost rectifier and the parallel-connected dual-boost topology.

| Region | $V_p$ | $V_n$ | $L_p$ | $L_n$ | $L_t$ | $T_p$ | $T_n$ | $D_p$ | $D_n$ | $D_t$ |
|---|---|---|---|---|---|---|---|---|---|---|
| 0~60 | $V_{ab}$ | $V_{cb}$ | $L_a$ | $L_c$ | $L_b$ | $S_{an}$ | $S_{cn}$ | $D_{ap}$ | $D_{cp}$ | $D_{bn}$ |
| 60~120 | $V_{ab}$ | $V_{ac}$ | $L_b$ | $L_c$ | $L_a$ | $S_{bp}$ | $S_{cp}$ | $D_{bn}$ | $D_{cn}$ | $D_{ap}$ |
| 120~180 | $V_{bc}$ | $V_{ac}$ | $L_b$ | $L_a$ | $L_c$ | $S_{bn}$ | $S_{an}$ | $D_{bp}$ | $D_{ap}$ | $D_{cn}$ |
| 180~240 | $V_{bc}$ | $V_{ba}$ | $L_c$ | $L_a$ | $L_b$ | $S_{cp}$ | $S_{ap}$ | $D_{cn}$ | $D_{an}$ | $D_{bp}$ |
| 240~300 | $V_{ca}$ | $V_{ba}$ | $L_c$ | $L_b$ | $L_a$ | $S_{cn}$ | $S_{bn}$ | $D_{cp}$ | $D_{bp}$ | $D_{an}$ |
| 300~360 | $V_{ca}$ | $V_{cb}$ | $L_a$ | $L_b$ | $L_c$ | $S_{ap}$ | $S_{bp}$ | $D_{an}$ | $D_{bn}$ | $D_{cp}$ |

TABLE V

The control algorithm for the topologies shown in FIGS. 11c and 11d.

| Region | $i_{L,p}$ | $i_{L,n}$ | $i_{L,t}$ | $Q_{ap}$ | $Q_{an}$ | $Q_{bp}$ | $Q_{bn}$ | $Q_{cp}$ | $Q_{cn}$ |
|---|---|---|---|---|---|---|---|---|---|
| 0~60 | $i_{L,a}$ | $i_{L,c}$ | $-i_{L,b}$ | $Q_p$ | | | | 0 | $Q_n$ |
| 60~120 | $-i_{L,b}$ | $-i_{L,c}$ | $i_{L,a}$ | | | $Q_p$ | | $Q_n$ | 0 |

TABLE V-continued

The control algorithm for the topologies shown in FIGS. 11c and 11d.

| Region | $i_{L,p}$ | $i_{L,n}$ | $i_{L,t}$ | $Q_{ap}$ | $Q_{an}$ | $Q_{bp}$ | $Q_{bn}$ | $Q_{cp}$ | $Q_{cn}$ |
|---|---|---|---|---|---|---|---|---|---|
| 120~180 | $i_{L,b}$ | $i_{L,a}$ | $-i_{L,c}$ | | $Q_n$ | | $Q_p$ | 0 | 0 |
| 180~240 | $-i_{L,c}$ | $-i_{L,a}$ | $i_{L,b}$ | $Q_n$ | | | | $Q_p$ | 0 |
| 240~300 | $i_{L,c}$ | $i_{L,b}$ | $-i_{L,a}$ | | | | $Q_n$ | 0 | $Q_p$ |
| 300~360 | $-i_{L,a}$ | $-i_{L,b}$ | $i_{L,c}$ | $Q_p$ | | $Q_n$ | | 0 | 0 |

TABLE VI

The cross-references between the boost rectifier in FIGS. 1b, 11e and the parallel-connected dual-boost topology.

| | opology parameters for rectifier in FIG. 11b | | | | | Topology parameters for rectifier in FIG. 11e | | | | |
|---|---|---|---|---|---|---|---|---|---|---|
| Region | $T_p$ | $T_n$ | $D_p$ | $D_n$ | $D_t$ | $T_p$ | $T_n$ | $D_p$ | $D_n$ | $D_t$ |
| 0~60 | $S_a$ | $S_c$ | $D_{ap}$ | $D_{cp}$ | $D_{bn}$ | $S_{a-}$ | $S_{c-}$ | $D_{ap}$ | $D_{cp}$ | $D_{bn},D_{b-}$ |
| 60~120 | $S_b$ | $S_c$ | $D_{bn}$ | $D_{cn}$ | $D_{ap}$ | $S_{b+}$ | $S_{c+}$ | $D_{bn}$ | $D_{cn}$ | $D_{ap},D_{a+}$ |
| 120~180 | $S_b$ | $S_a$ | $D_{bp}$ | $D_{ap}$ | $D_{cn}$ | $S_{b-}$ | $S_{a-}$ | $D_{bp}$ | $D_{ap}$ | $D_{cn},D_{c-}$ |
| 180~240 | $S_c$ | $S_a$ | $D_{cn}$ | $D_{an}$ | $D_{bp}$ | $S_{c+}$ | $S_{a+}$ | $D_{cn}$ | $D_{an}$ | $D_{bp},D_{b+}$ |
| 240~300 | $S_c$ | $S_b$ | $D_{cp}$ | $D_{bp}$ | $D_{an}$ | $S_{c-}$ | $S_{b-}$ | $D_{cp}$ | $D_{bp}$ | $D_{an},D_{a-}$ |
| 300~360 | $S_a$ | $S_b$ | $D_{an}$ | $D_{bn}$ | $D_{cp}$ | $S_{a+}$ | $S_{b+}$ | $D_{an}$ | $D_{bn}$ | $D_{cp},D_{c+}$ |

The Vector operated UCI controller for three-phase rectifier based on series-connected dual boost topology.

Figure 26:
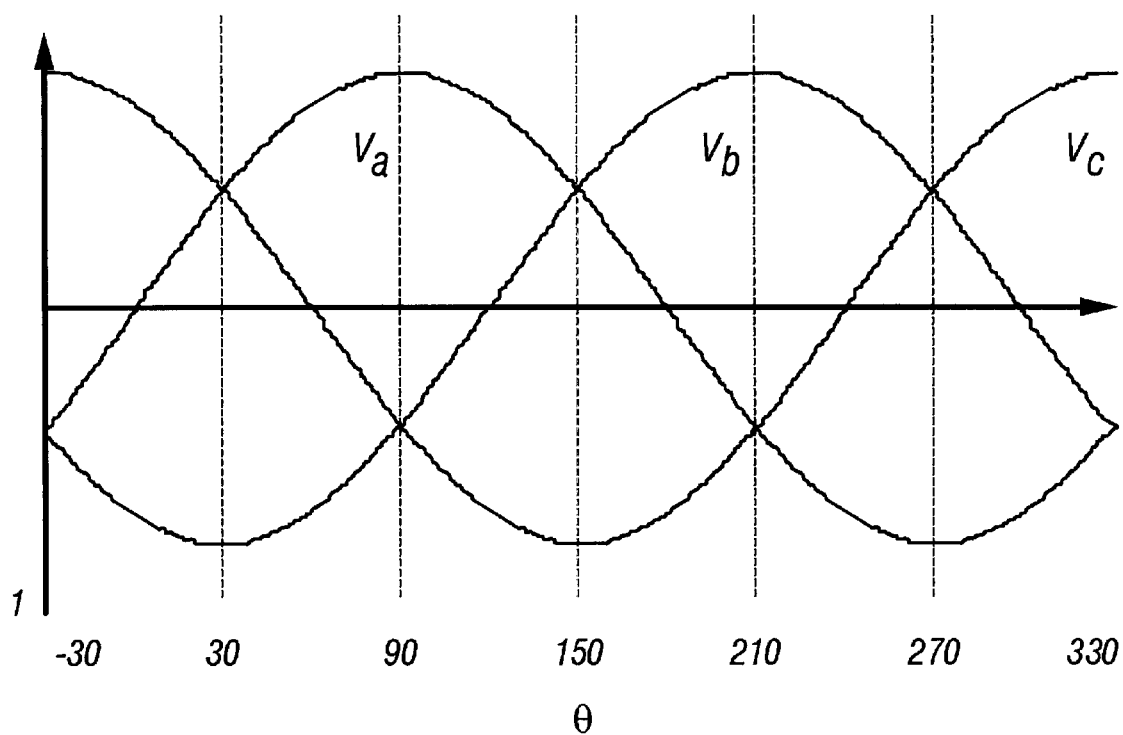
FIG. 26 is a graph of the normalized three-phase voltage waveforms for the rectifiers of FIGS. 25a–25e.
Figure 27A:
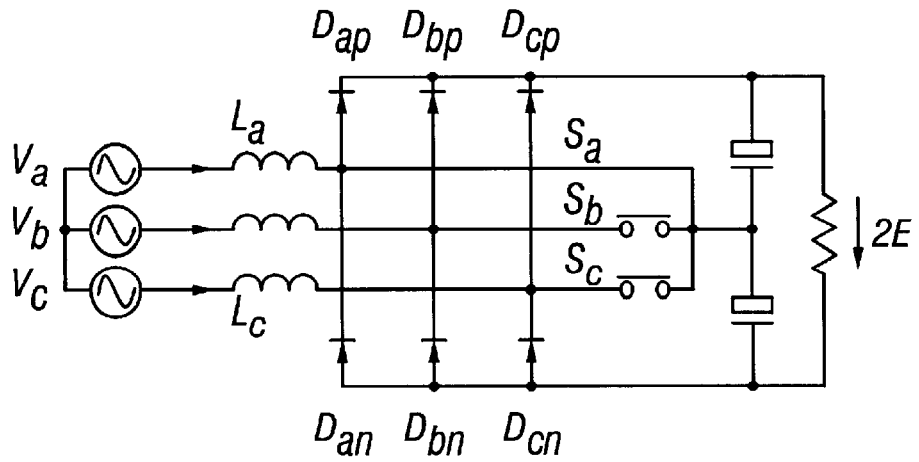

Consider now a family of three-phase rectifier with a series-connected dual-boost topology. A family of three-phase boost rectifiers with a split dc-rail is shown in FIG. 25. Normalized three-phase voltage waveforms are shown in FIG. 26. All of the rectifiers 24 depicted in FIGS. 25a–25e can be de-coupled to series-connected dual-boost topologies during each 60° of line cycle. Take the VIENNA rectifier in FIG. 25a as an example. During (−30°~30°) from FIG. 26, the bidirection switch $S_a$ is turned on and the other two switches $S_b$ and $S_c$ are controlled at high frequency so that the average inductor currents $i_{Lb}$, $i_{Lc}$ follow the phase voltages $V_b$ and $V_c$. The equivalent circuit as well as its series-connected dual-boost topology is shown in FIGS. 27a and b.

Figure 28:
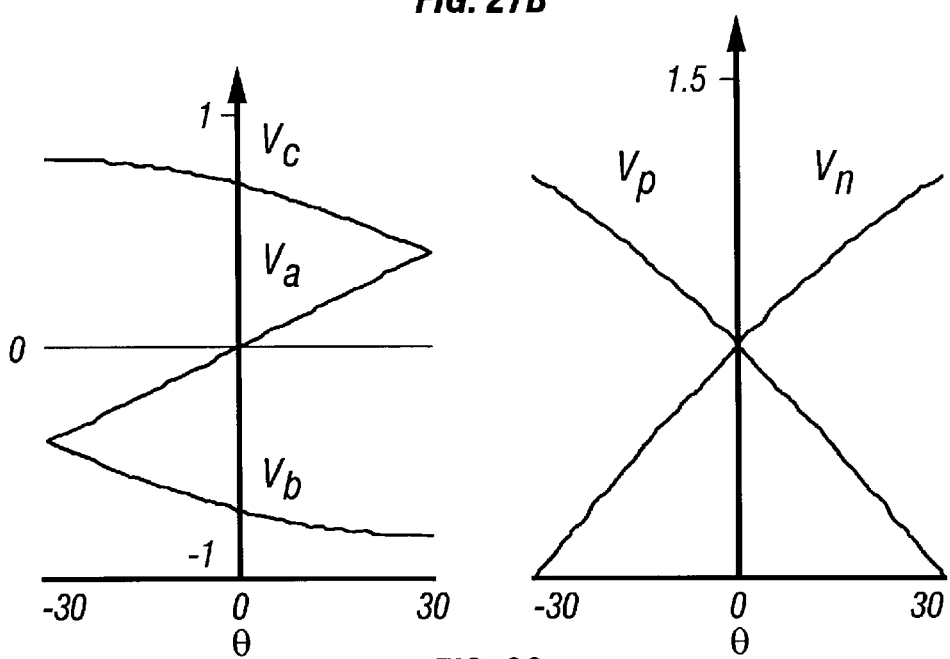
FIG. 28 is a graph of the normalized dual-boost topology input voltage $V_P$ and $V_n$ for interval −30°~30° of the circuitry of FIGS. 27a and 27b.
Figure 29A:
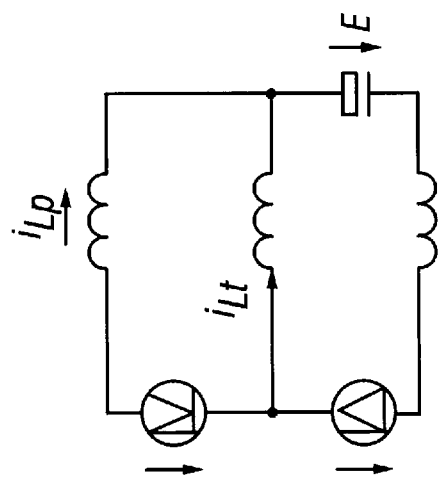
FIGS. 29a–29d are the equivalent circuit of the topology of FIG. 27b in four switching states.
Figure 29B:
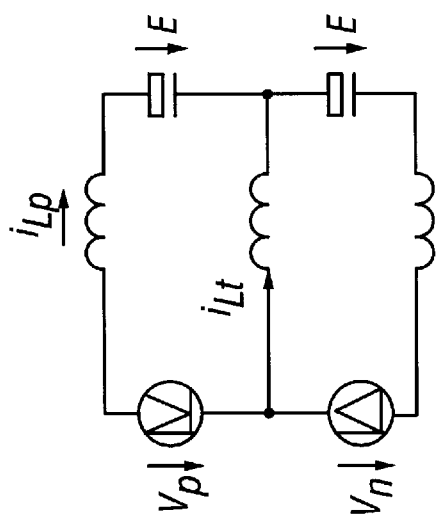
Figure 29C:
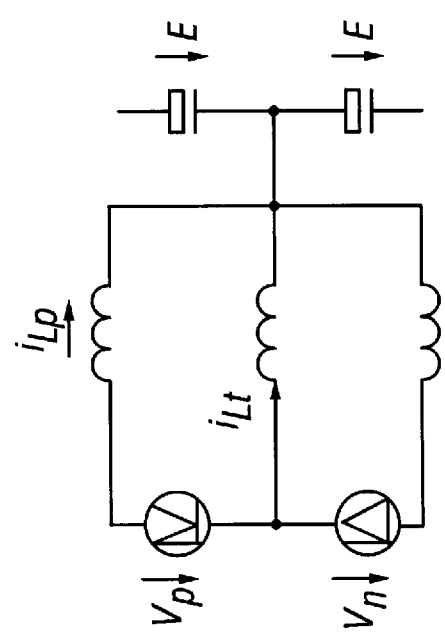
Figure 29D:
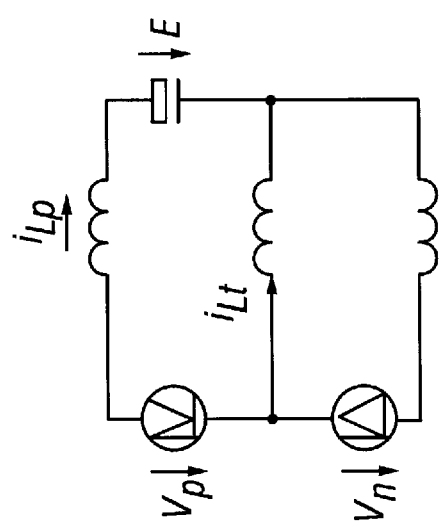

The waveforms of normalized voltage $V_p$ and $V_n$ during −30°~30° are shown in FIG. 28. The cross-reference of topology parameters for (−30°~330°) are listed in Table VII.

TABLE VII

The cross reference of circuit parameters between VIENNA rectifier and series-connected dual-boost topology

| Region | p | $V_n$ | $L_p$ | $L_n$ | $L_t$ | $T_p$ | $T_n$ | $D_p$ | $D_n$ |
|---|---|---|---|---|---|---|---|---|---|
| −30~30 | ca | $V_{ab}$ | $L_c$ | $L_b$ | $L_a$ | $S_c$ | $S_b$ | $D_{cp}$ | $D_{bn}$ |
| 30~90 | ac | $V_{cb}$ | $L_a$ | $L_b$ | $L_c$ | $S_a$ | $S_b$ | $D_{ap}$ | $D_{bn}$ |
| 90~150 | ab | $V_{bc}$ | $L_a$ | $L_c$ | $L_b$ | $S_a$ | $S_c$ | $D_{ap}$ | $D_{cn}$ |
| 150~210 | ba | $V_{ac}$ | $L_b$ | $L_c$ | $L_a$ | $S_b$ | $S_c$ | $D_{bp}$ | $D_{cn}$ |
| 210~270 | bc | $V_{ca}$ | $L_b$ | $L_a$ | $L_c$ | $S_b$ | $S_a$ | $D_{bp}$ | $D_{an}$ |
| 270~330 | cb | $V_{ba}$ | $L_c$ | $L_a$ | $L_b$ | $S_c$ | $S_a$ | $D_{cp}$ | $D_{an}$ |

Figure 27B:
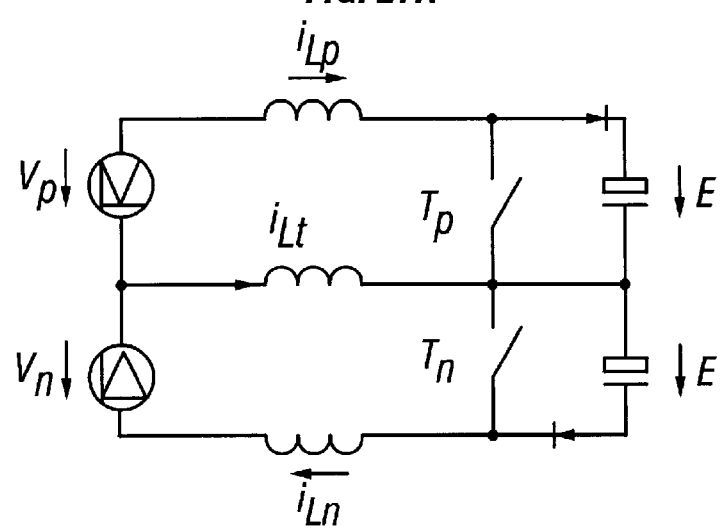

For series-connected dual-boost topology in FIG. 27b, switching states of $T_p$ and $T_n$ have four possible combinations. The switching states and voltages across the inductors are listed in Table VIII. The equivalent circuits are shown in FIG. 29.

TABLE VIII

Switching state and the inductor voltage for series-connected dual-boost topology

| State | $T_p$ | $T_n$ | $V_{Lp}$ | $V_{Ln}$ | $V_{Lt}$ |
|---|---|---|---|---|---|
| I | ON | ON | $V_p^*$ | $V_n^*$ | $V_t^*$ |
| II | ON | OFF | $V_p^* - \frac{1}{3} \cdot E$ | $V_n^* - \frac{2}{3} \cdot E$ | $V_t^* - \frac{1}{3} \cdot E$ |
| III | OFF | ON | $V_p^* - \frac{2}{3} \cdot E$ | $V_n^* - \frac{1}{3} \cdot E$ | $V_t^* + \frac{1}{3} \cdot E$ |
| IV | OFF | OFF | $V_p^* - E$ | $V_n^* - E$ | $V_t^*$ |

Where $$V_p^* = \frac{2}{3} \cdot V_p + \frac{1}{3} \cdot V_n;$$

$$V_n^* = \frac{1}{3} \cdot V_p + \frac{2}{3} \cdot V_n;$$

$$V_t^* = \frac{1}{3} \cdot (V_n - V_p).$$

Figure 30:
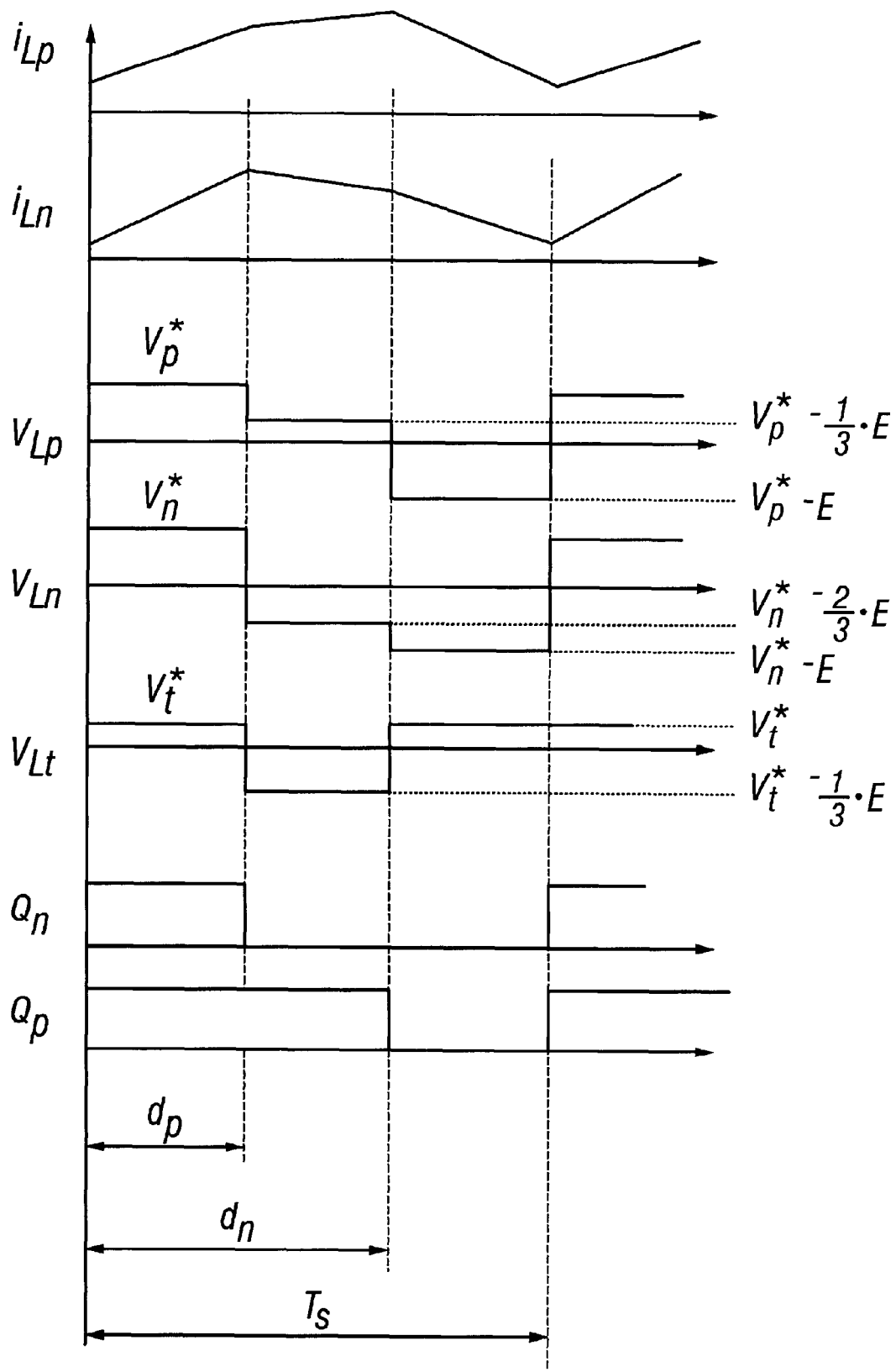
FIG. 30 is a graph of the waveforms of the inductor voltages and currents for series-connected dual-boost topology (under condition $d_p < d_n$).

For constant switching frequency control, two switching sequences are possible during each switching cycle, i.e. state I, II, IV ($d_p < d_n$) or I, III, IV ($d_p > d_n$), where $d_p$, $d_n$ are duty-ratios of switches $T_p$, $T_n$ respectively. These state sequence will last a certain period of time according to the status of the input voltage and the load. For example, the switching sequence I, II, IV is kept for a certain time. The inductor waveforms for this period are shown in FIG. 30.

Assuming that the switching frequency is much higher than the line frequency, the series-connected dual-boost topology can be viewed as a dc—dc converter. Therefore, the inductor voltage-second balance method can be applied to the inductor voltage waveforms shown in FIG. 30, which yields $$\begin{cases} V_p^* \cdot d_n + \left(V_p^* - \frac{1}{3} \cdot E\right) \cdot (d_p - d_n) + (V_p^* - E) \cdot (1 - d_p) = 0 \\ V_n^* \cdot d_n + \left(V_n^* - \frac{2}{3} \cdot E\right) \cdot (d_p - d_n) + (V_n^* - E) \cdot (1 - d_p) = 0 \\ V_t^* \cdot d_n + \left(V_t^* - \frac{1}{3} \cdot E\right) \cdot (d_p - d_n) + V_t^* \cdot (1 - d_p) = 0 \end{cases} \quad (11)$$

Simplifying equation (11) gives $$\begin{cases} 2 \cdot d_p + d_n = 3 \cdot \left(1 - \frac{V_p^*}{E}\right) \\ d_p + 2 \cdot d_n = 3 \cdot \left(1 - \frac{V_n^*}{E}\right) \\ d_p - d_n = 3 \cdot \frac{V_t^*}{E} \end{cases} \quad (12)$$

For a symmetrical three-phase system, the following equation is true:

$$V_p^* - V_n^* + V_t^* = 0 \quad (13)$$

Therefore, the equation (11) can be further simplified as $$\begin{bmatrix} 1 - d_p \\ 1 - d_n \end{bmatrix} = \frac{1}{E} \cdot \begin{bmatrix} 2 & -1 \\ -1 & 2 \end{bmatrix} \cdot \begin{bmatrix} V_p^* \\ V_n^* \end{bmatrix} \quad (14)$$

It can be verified that this equation is also valid for the other sequence I, III and IV ($d_p > d_n$). Equation (14) gives the inherent relationship between duty cycles $d_p$, $d_n$ and input, output of the series-connected dual-boost topologies when it operates in Continuous Conduction Mode (CCM).

UCI three-phase PFC controller for rectifier based on series-connected dual boost topology For a unity power factor three-phase PFC, the control goal is to force the average inductor current in each phase to follow the sinusoidal phase voltage.

$$V_a = R_e \cdot i_a; \quad V_b = R_e \cdot i_b; \quad R_e \cdot i_c$$

where $R_e$ is the emulated resistance. This control goal can be realized by controlling the inductor currents $i_{Lp}$ and $i_{Ln}$ to follow the voltage $V_p^*$ and $V_n^*$ respectively. For example, during region $-30° \sim 30°$, following equations hold $$\begin{cases} V_p^* = \frac{2}{3} \cdot V_p + \frac{1}{3} \cdot V_n = \frac{2}{3} \cdot (V_c - V_a) + \frac{1}{3} \cdot (V_a - V_b) = V_c \\ \langle i_{Lp} \rangle = \langle i_{Lc} \rangle = i_c \\ V_n^* = \frac{1}{3} \cdot V_p + \frac{2}{3} \cdot V_n = \frac{1}{3} \cdot (V_c - V_a) + \frac{2}{3} \cdot (V_a - V_b) = -V_b \\ \langle i_{Ln} \rangle = -\langle i_{Lb} \rangle = -i_b \end{cases} \quad (15)$$

With the assumption that the system is symmetrical, the current $\langle i_t \rangle$ will automatically follow the voltage $V_t^*$ according to equation (3). The control goal of three-phase PFC can be rewritten as $$\begin{cases} V_p^* = R_e \cdot \langle i_{Lp} \rangle \\ V_n^* = R_e \cdot \langle i_{Ln} \rangle \end{cases} \quad (16)$$

Substituting equation (16) into (14) yields $$\begin{bmatrix} 1 - d_p \\ 1 - d_n \end{bmatrix} = \frac{R_e}{E \cdot R_s} \cdot R_s \cdot \begin{bmatrix} 2 & -1 \\ -1 & 2 \end{bmatrix} \cdot \begin{bmatrix} \langle i_{Lp} \rangle \\ \langle i_{Ln} \rangle \end{bmatrix} \quad (17)$$

where $R_s$ is the equivalent current sensing resistance.
Set $$V_m = \frac{E \cdot R_s}{R_e} \quad (18)$$

where $V_m$ is the output of the voltage loop compensator. Equation (17) can be rewritten as $$V_m \cdot \begin{bmatrix} 1 - d_p \\ 1 - d_n \end{bmatrix} = R_s \cdot \begin{bmatrix} 2 & -1 \\ -1 & 2 \end{bmatrix} \cdot \begin{bmatrix} \langle i_{Lp} \rangle \\ \langle i_{Ln} \rangle \end{bmatrix} \quad (19)$$

Figure 31:
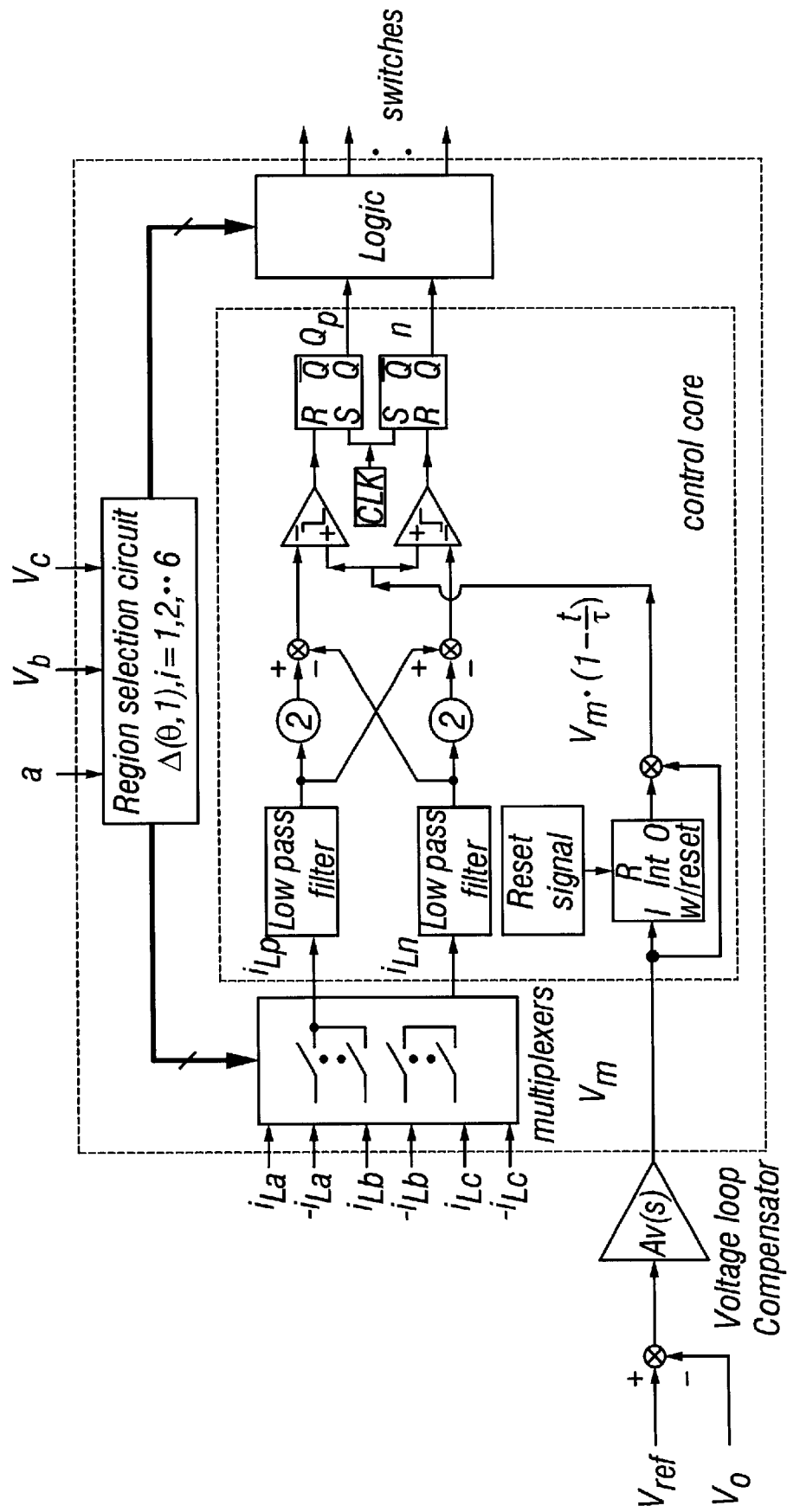
FIG. 31 is a schematic of the control block of proposed PFC controller for three-phase boost rectifier with a split dc-rail.
Figure 32A:
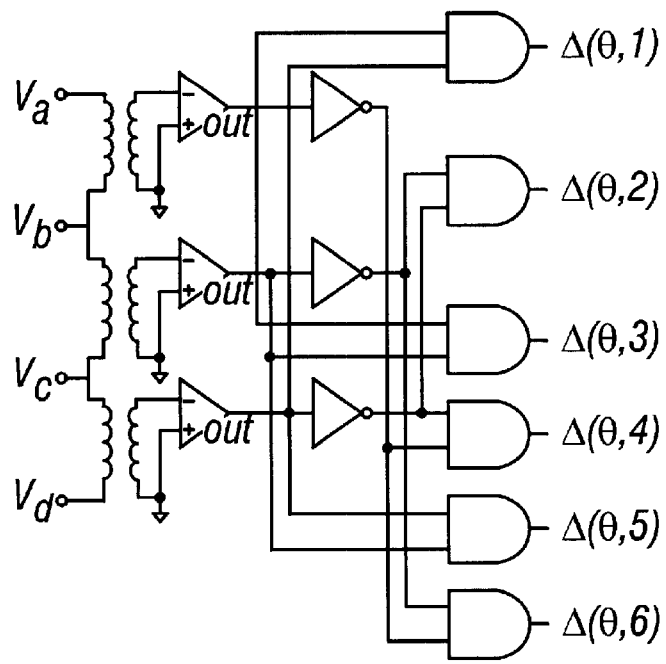
FIGS. 32a and 32b are graphs of the Implementation of input-selection-function $\Delta(\theta,i)$ and its waveforms.
Figure 32B:
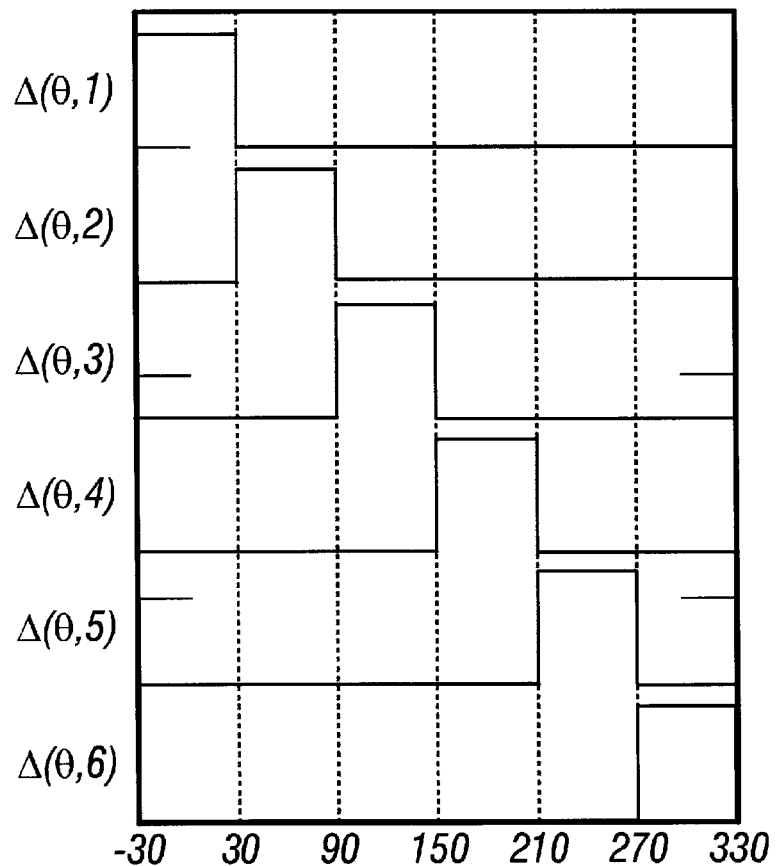

This shows that the control of three-phase PFC can be realized by controlling the duty ratio of switches $T_p$ and $T_n$ so that the equation (19) is satisfied. This control core function can be realized by one integrator with reset along with a few logic components as shown in the control core block of FIG. 31. To achieve power factor correction in each line cycle, an input multiplexer and output logic circuits are needed to rotate the control core function corresponding to the input voltage $V_p$, $V_n$ as shown in Table VII. Overall, the proposed control core is shown in FIG. 31, where $\Delta(\theta,i)$ is the region selection function: $\Delta(\theta,i)=u(\theta-(i-1)\cdot 60+30)-u(\theta-i\cdot 60+30)$, i=1, 2, . . . 6. This function can be realized by sensing input line-line voltage. The schematic of implementation as well as the waveforms for $\Delta(\theta,i)$ are shown in FIGS. 32a and 32b.

Figure 33:
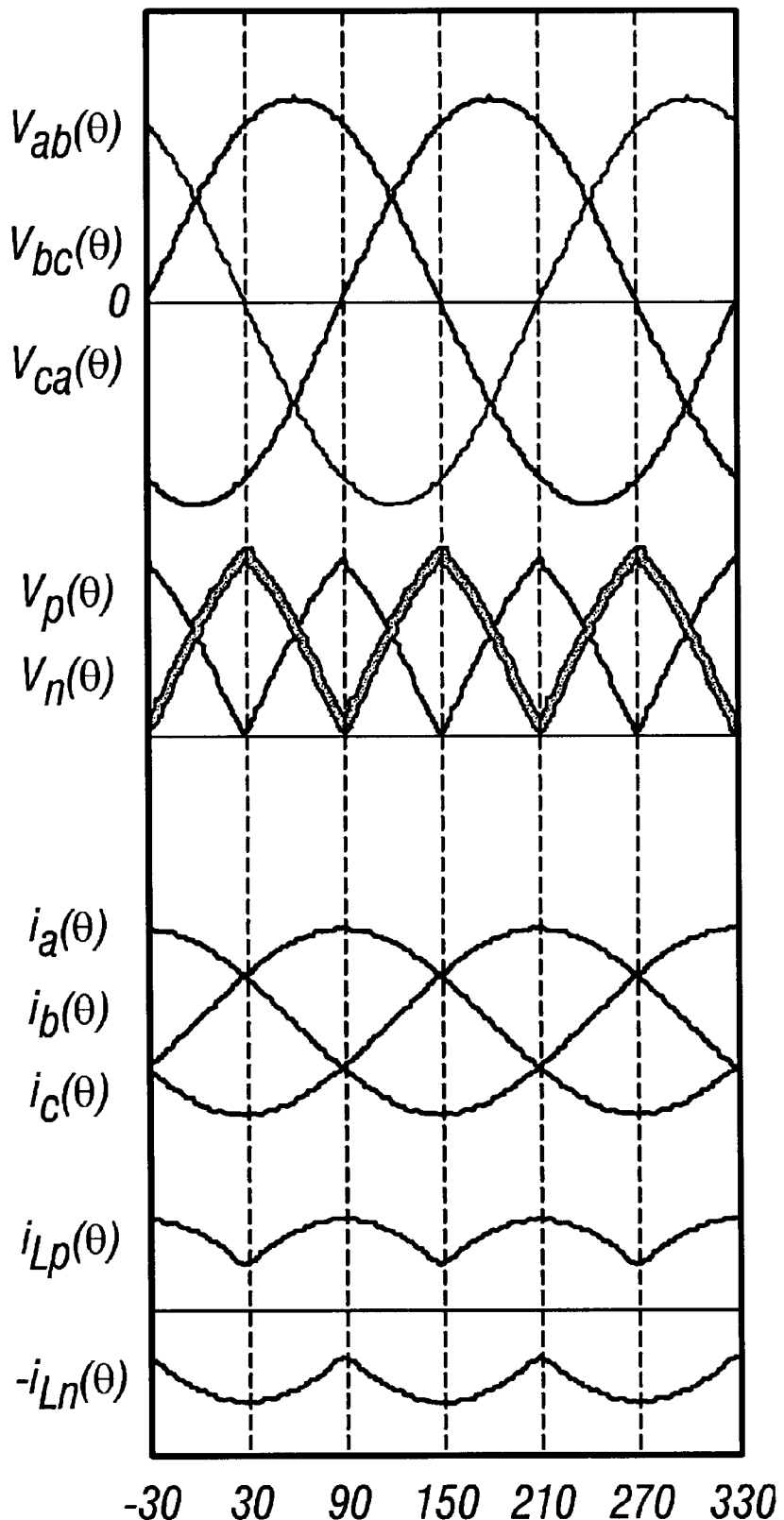
FIG. 33 is a graph of the normalized waveform for voltages $v_p, v_n$ and inductor currents $i_{Lp}, i_{Ln}$ during line cycle.

The control algorithm for VIENNA rectifier is listed in Table IX. The predicted voltage waveforms $V_p$, $V_n$ and inductor waveform for series-connected dual-boost topology during each line cycle are shown in FIG. 33.

TABLE IX

The control algorithm for VIENNA rectifier with proposed control approach.

| Region | $i_{L,p}$ | $i_{L,n}$ | $i_{L,t}$ | $Q_a$ | $Q_b$ | $Q_c$ |
|---|---|---|---|---|---|---|
| −30~30 | $i_{L,c}$ | $-i_{L,b}$ | $i_{L,a}$ | ON | $Q_n$ | $Q_p$ |
| 30~90 | $i_{L,a}$ | $-i_{L,b}$ | $i_{L,c}$ | $Q_p$ | $Q_n$ | ON |
| 90~150 | $i_{L,a}$ | $-i_{L,c}$ | $i_{L,b}$ | $Q_p$ | ON | $Q_n$ |
| 150~210 | $i_{L,b}$ | $-i_{L,c}$ | $i_{L,a}$ | ON | $Q_p$ | $Q_n$ |
| 210~270 | $i_{L,b}$ | $-i_{L,a}$ | $i_{L,c}$ | $Q_n$ | $Q_p$ | ON |
| 270~330 | $i_{L,c}$ | $-i_{L,a}$ | $i_{L,b}$ | $Q_n$ | ON | $Q_p$ |

Figure 34:
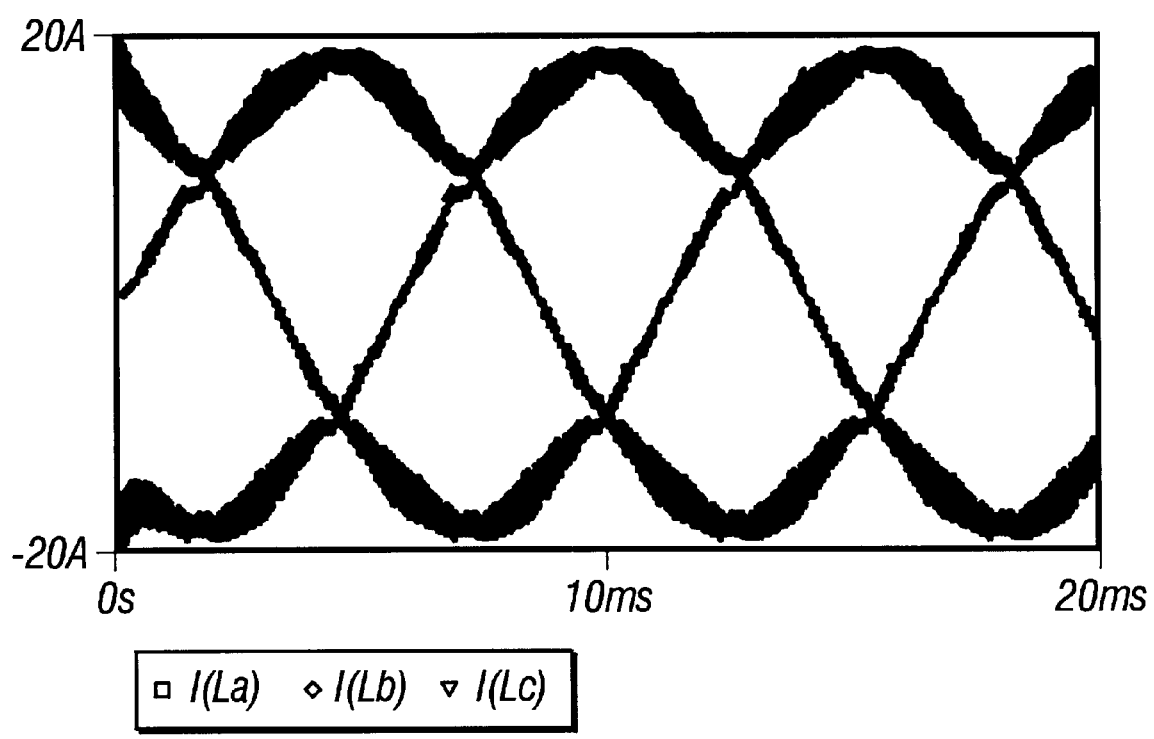
FIG. 34 is a graph of a simulated three-phase input current waveforms for VIENNA rectifier with proposed controller.

The simulated current waveforms for VIENNA rectifier with the proposed controller are shown in FIG. 34. Simulation condition is as follows: the input voltage $V_g$ (rms)= 120 V; the output voltage $V_o$=600 V; the output power is 5 KW, the input inductor L=2 mH, and the switching frequency is 10 KHz. The simulated THD is 4.7%.

Experimental verification

Figure 25A:
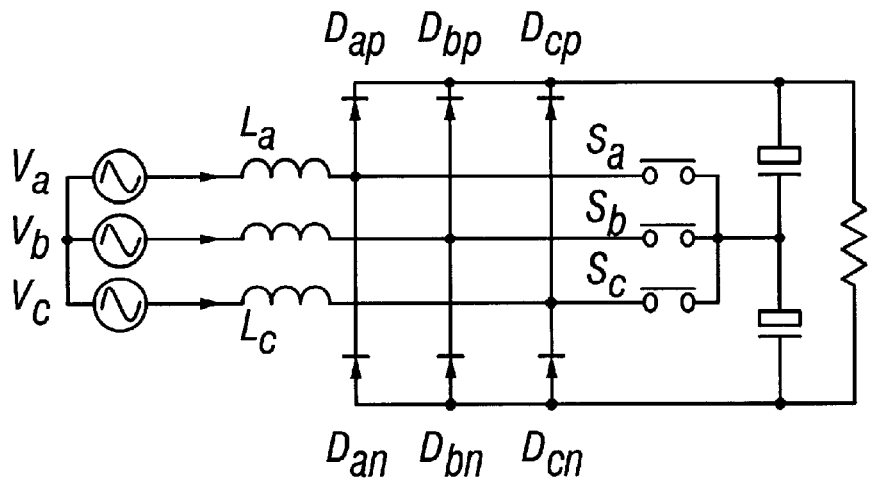
FIG. 25a is a schematic of a 3-phase 3-switch 3-level boost rectifier (VIENNA rectifier).
Figure 35:
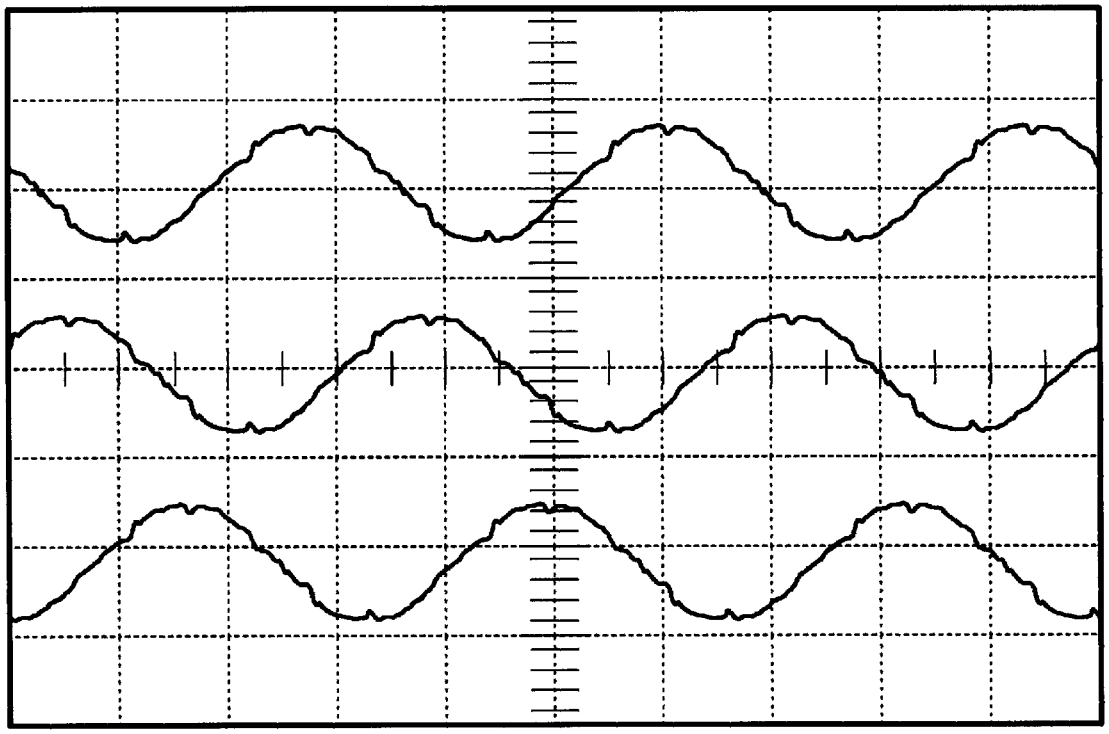
FIG. 35 is a graph of measured three-phase inductor current waveforms. The vertical scale is 5 A/div and horizontal scale is 5 ms/div.
Figure 36:
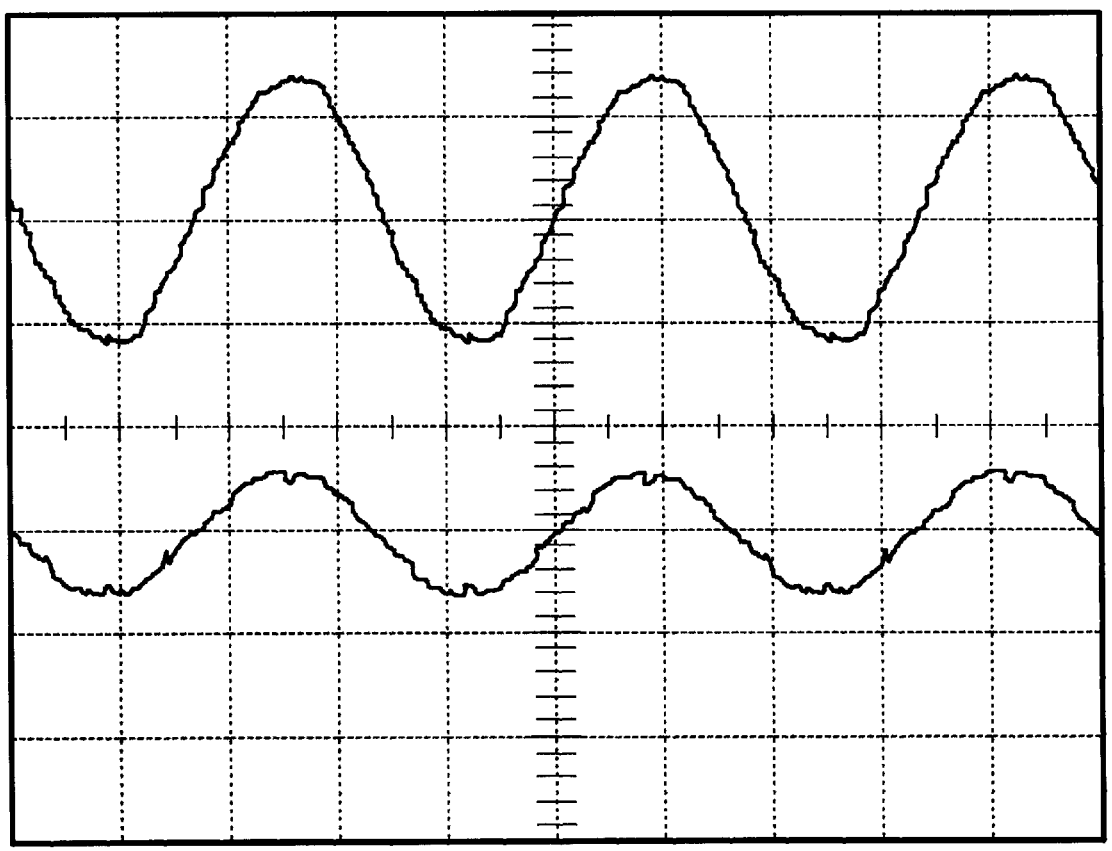
FIG. 36 is a graph of the measured phase A voltage and current waveforms. The top curve is the phase A voltage shown at 50 V/div, and the bottom curve is the phase A current, show at 5 A/div with a horizontal scale of 5 ms/div.

A 400 watts experimental-circuit of the three-phase VIENNA rectifier shown in FIG. 25a was built to prove the concept. The experimental conditions is as follows: the input voltage is 54 Vrms; the output voltage is 400 V; the output power is 400 watts; the switching frequency is 55 KHz; and the input AC inductance is 560 µH. Three-phase inductor current waveforms and phase A voltage and current waveforms are shown in FIG. 35 and FIG. 36 respectively. All the waveforms were measured by Tektronics scope TDS520. Experimental results indicate that dynamic transient exists when rectifier rotates its connection from one 60° to another, which causes additional distortion. The measured THD was 8.4%, while the phase voltages have a THD of 3.9% themselves. Further studies were followed by simulation and it shows that the THD can be reduced by damping the transient with increased inductance. It was observed that the voltages across two output capacitors can be automatically balanced by the proposed controller. For the series-connected dual-boost topology shown in FIG. 37, the average inductor currents $i_{Lp}$ and $i_{Ln}$ are inversely proportional to the voltage across the capacitors, which is one of important features of this control approach. Therefore, the current can be automatically adjusted so that the output voltage is evenly distributed in the two output capacitors.

Extension of the PFC controller to other rectifier topologies with a split dc rail The proposed controller in FIG. 31 can be extended to other topologies in the family shown in FIG. 25 with slight modification of the output logic, while the control core, the input multiplexer circuit, the region selection functions will remain unchanged. The output logic functions for the rectifiers shown in FIGS. 25b and 25c are listed in Table X. The switches $S_a$, $S_b$ and $S_c$ in these two rectifiers are low frequency switches (operated at twice of the line frequency) and conduct a small portion of the phase current. Switches $T_p$ and $T_n$ are switching frequency switches. The control signal for these two switches are $Q_p$ and $Q_n$. For the asymmetrical rectifier in FIG. 25c with proposed control approach, the control algorithm will be exactly same except that the time constant of integrator equals one half of the switching period, i.e. $\tau=T_s/2$.

TABLE X

Figure 25B:
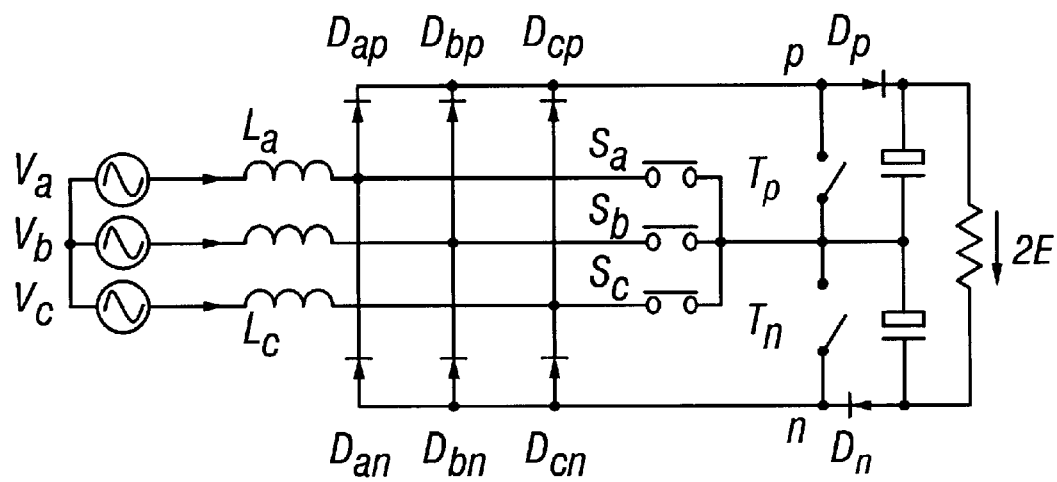
FIG. 25b is a schematic of a 3 phase boost rectifier with ac inductors and a split dc rail.
Figure 25C:
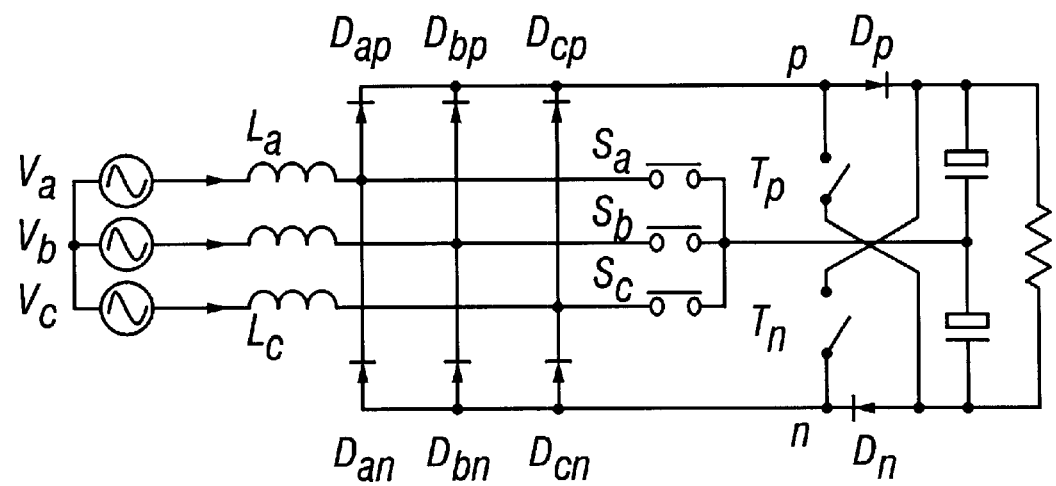
FIG. 25c is a schematic of a 3 phase boost rectifier with ac inductors and an asymmetric half bridge.

The control algorithm for three-phase boost rectifier in FIGS. 25b and 25c.

| Region | Degree | $Q_a$ | $Q_b$ | $Q_c$ | $Q_{Tp}$ | $Q_{Tn}$ |
|---|---|---|---|---|---|---|
| 1 | −30~30 | ON | OFF | OFF | $Q_p$ | $Q_n$ |
| 2 | 30~90 | OFF | OFF | ON | $Q_p$ | $Q_n$ |
| 3 | 90~150 | OFF | ON | OFF | $Q_p$ | $Q_n$ |
| 4 | 150~210 | ON | OFF | OFF | $Q_p$ | $Q_n$ |
| 5 | 210~270 | OFF | OFF | ON | $Q_p$ | $Q_n$ |
| 6 | 270~330 | OFF | ON | OFF | $Q_p$ | $Q_n$ |

Figure 37:
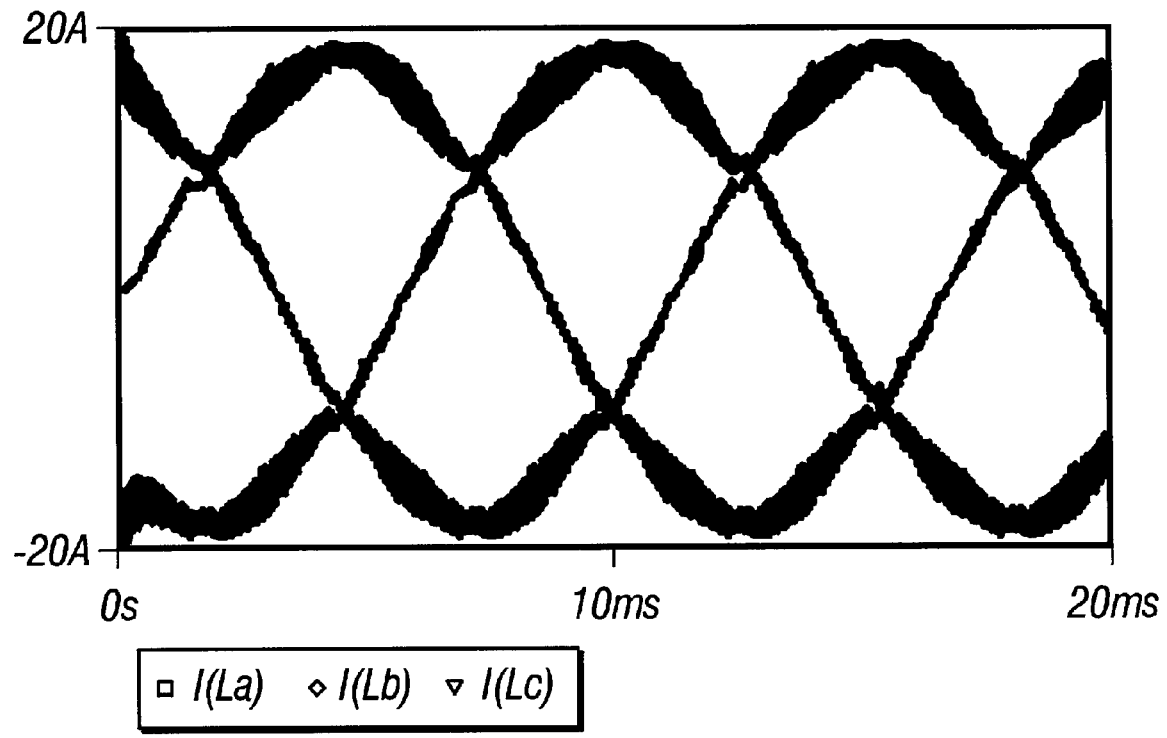
FIG. 37 is a graph of simulated current waveforms for three-phase boost rectifier in FIGS. 25b and 25c with controller of the invention. For the three-phase boost rectifier with dc inductors and a split-dc rail in FIG. 25(d), the series-connected dual-boost topology is shown in FIG. 28.
Figure 38:
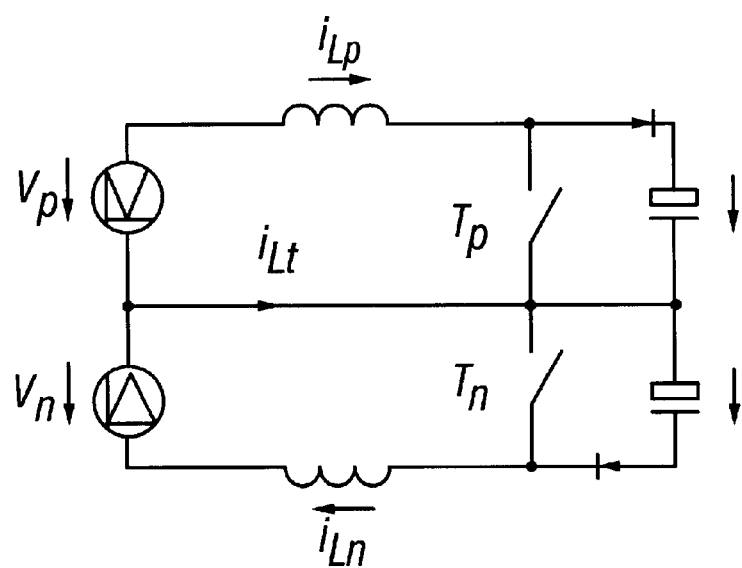
FIG. 38 is a schematic diagram of the series-connected dual-boost converter topology for the rectifier shown in FIG. 25(d).
Figure 39:
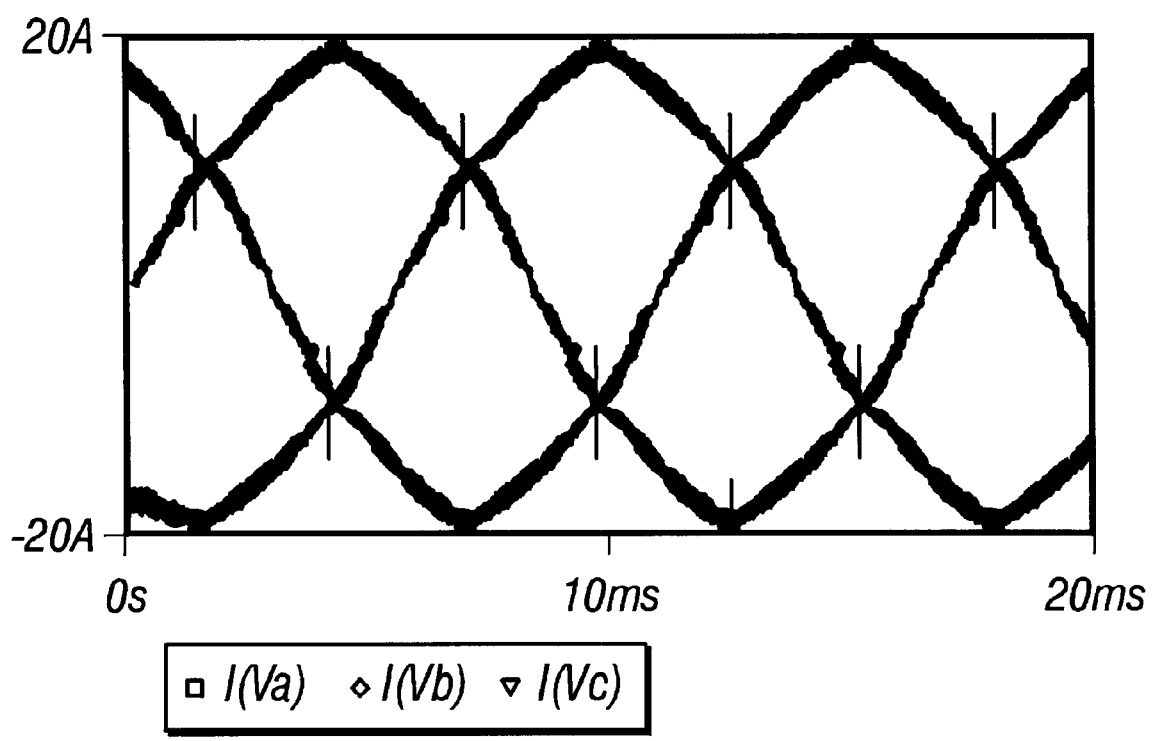
FIG. 39 is a graph of simulated waveforms for rectifiers in FIGS. 25(d) and (e) with proposed controller of the invention.

Simulated waveforms for the rectifier in FIG. 25b are shown in FIG. 37. The simulation results for the rectifier in FIG. 25c is similar to FIG. 37. The simulated THD is below 5%.

Applying the analytic approach above relating to PFC controllers based on series-connected dual boost topologies yields the control equation (20).

$$\begin{bmatrix} V_m \cdot (1-D_p) \\ V_m \cdot (1-D_n) \end{bmatrix} = R_s \cdot \begin{bmatrix} 2 & -1 \\ -1 & 2 \end{bmatrix} \cdot \begin{bmatrix} \langle i_{Lp} \rangle \\ \langle i_{Ln} \rangle \end{bmatrix} \quad (20)$$

Equation (20) is exactly the same as the equation (19). Therefore, the proposed controller is also applicable for the topologies shown in FIG. 25(d). However, since dc inductors are the same as the equivalent inductors $L_p$ and $L_n$, the input multiplexer circuit is eliminated. The algorithm for these two topologies is shown in Table XI below.

Figure 25D:
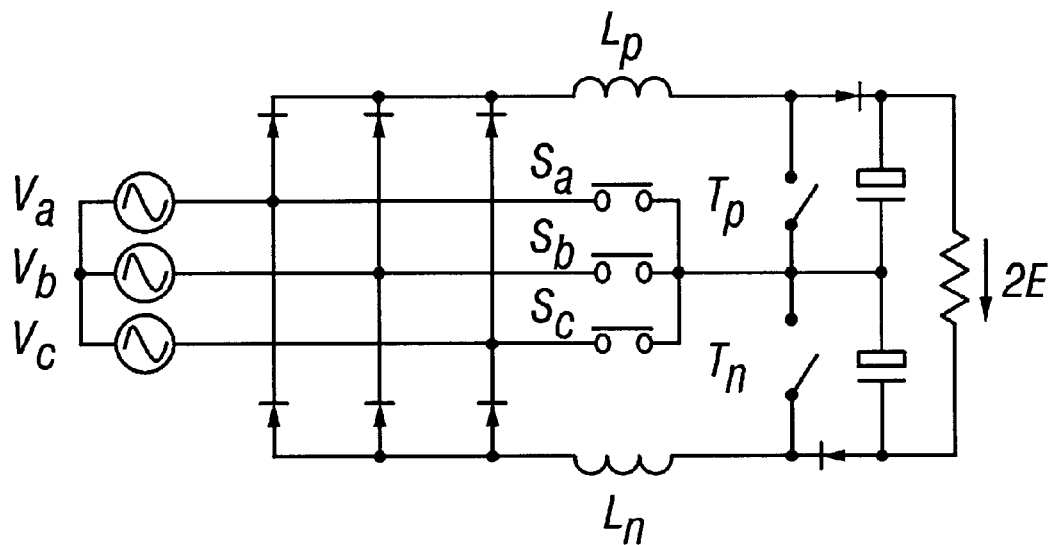
FIG. 25d is a schematic of a (d). 3-phase boost rectifier with dc inductors and a split dc-rail.
Figure 25E:
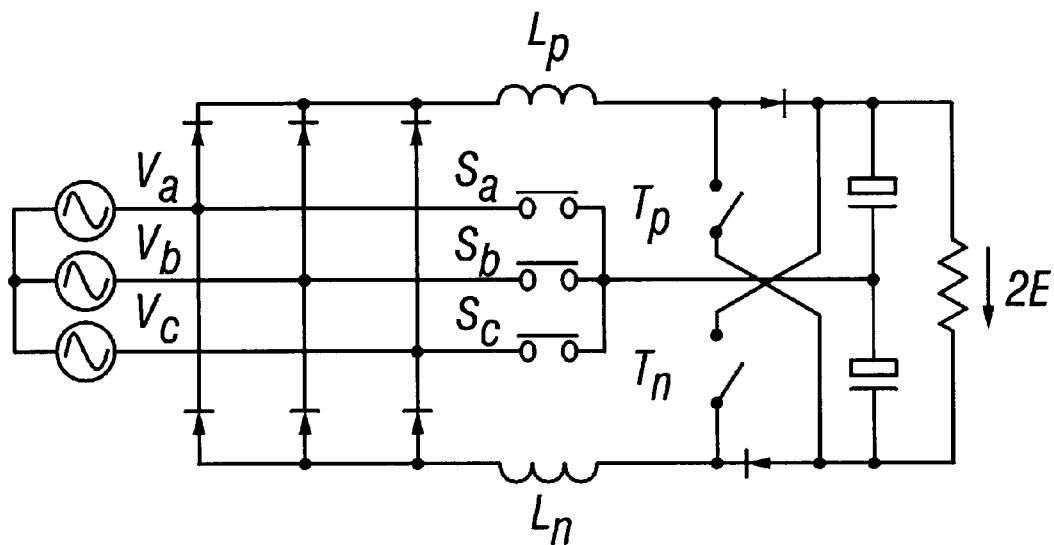
FIG. 25e is a schematic of a three-phase boost rectifier with dc inductors and an asymmetric half bridge.

The duty-ratio calculation equation for the asymmetrical rectifier in FIG. 25(e) is the same as that of FIG. 25(d), except that the time constant of integrator equals one half of the switching period, i.e. $\tau=T_s/2$. Simulated current waveforms for the rectifier of FIG. 25(d) is shown in FIG. 37. The simulated inductor waveforms of FIG. 25(e) are similar to that of FIG. 37. The simulation condition is as follows: the input voltage $V_g$ (rms)=120 V; the output voltage $V_o$=600 V; the output power is 5 KW, the input inductor L=5 mH, the switching frequency is 10 KHz. The simulated THD is below 5%.

TABLE XI

The control algorithm for three-phase boost rectifier in FIG. 25(d) and FIG. 25(e).

| Region | $i_{L,p}$ | $i_{L,n}$ | $Q_a$ | $Q_b$ | $Q_c$ | $Q_{Tp}$ | $Q_{Tn}$ |
|---|---|---|---|---|---|---|---|
| −30~30 | $i_{L,p}$ | $i_{L,n}$ | ON | OFF | OFF | $Q_p$ | $Q_n$ |
| 30~90 | $i_{L,p}$ | $i_{L,n}$ | OFF | OFF | ON | $Q_p$ | $Q_n$ |
| 90~150 | $i_{L,p}$ | $i_{L,n}$ | OFF | ON | OFF | $Q_p$ | $Q_n$ |
| 150~210 | $i_{L,p}$ | $i_{L,n}$ | ON | OFF | OFF | $Q_p$ | $Q_n$ |
| 210~270 | $i_{L,p}$ | $i_{L,n}$ | OFF | OFF | ON | $Q_p$ | $Q_n$ |
| 270~330 | $i_{L,p}$ | $i_{L,n}$ | OFF | ON | OFF | $Q_p$ | $Q_n$ |

Bipolar operated UCI controller for 3-phase PFC

Figure 40A:
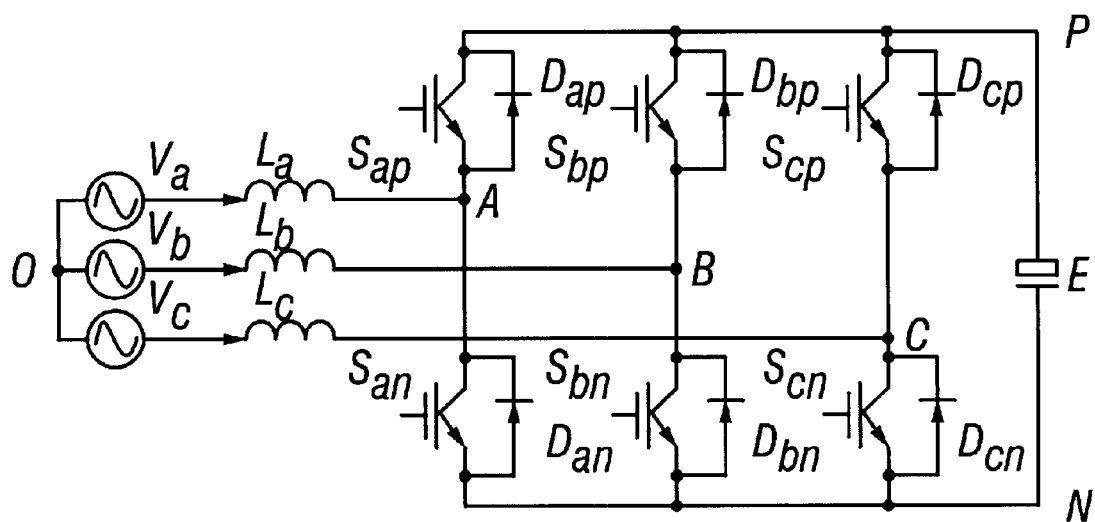
FIG. 40a is a schematic of a three-phase 6-switch bridge boost rectifier.

Standard three-phase six-switch bridge rectifier with Bipolar operated UCI control General relationship between duty ratios of switches and input phase voltage A six-switch standard bridge boost rectifier is shown in FIG. 40(a). If the converter operates in continuous conduction mode (CCM), the average voltages at the node A, B, C refer to node N are given by:

$$\begin{cases} V_{AN} = (1 - D_{an}) \cdot E \\ V_{BN} = (1 - D_{bn}) \cdot E \\ V_{CN} = (1 - D_{cn}) \cdot E \end{cases} \quad (21)$$

where $D_{an}$, $D_{bn}$, $D_{cn}$ are the duty ratios for switches $S_{an}$, $S_{bn}$, $S_{cn}$. The switch in each bridge arm is controlled complementary; i.e. the duty ratios for switch $S_{ap}$, $S_{bp}$, $S_{cp}$ are $1-D_{an}$; $1-D_{bn}$; $1-D_{cn}$ respectively.

Figure 40B:
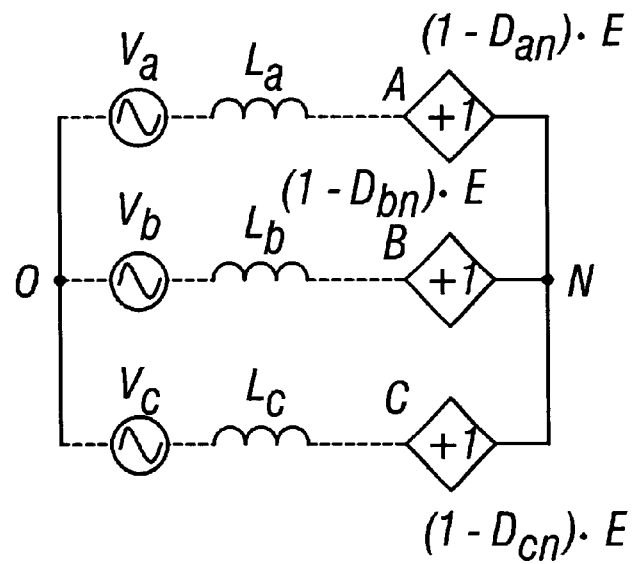
FIG. 40b is a schematic of an average model

The equivalent average model for rectifier in FIG. 40 (a) is shown in FIG. 40 (b). The average vector voltages at nodes A, B, C refer to the neutral point "O" equal the phase vector voltages minus the voltage across the inductors $L_a$, $L_b$, $L_c$ which is given by $$\begin{cases} \vec{V}_{AO} = \vec{V}_a - jwL \cdot \vec{i}_{La} \\ \vec{V}_{BO} = \vec{V}_b - jwL \cdot \vec{i}_{Lb} \\ \vec{V}_{CO} = \vec{V}_c - jwL \cdot \vec{i}_{Lc} \end{cases} \quad (22)$$

where L is inductance of input inductor and w is line angular frequency. The items $\vec{i}_{La}$, $\vec{i}_{Lb}$, $\vec{i}_{Lc}$ are inductor current vectors. The inductances $L_a$, $L_b$, $L_c$ are very small, since they are switching frequency inductors. For a 60 Hz utility system, the voltages across the inductances $jwL \cdot \vec{i}_{La}$ are very small comparing with the phase voltages, thus can be neglected. Therefore, the equation (22) can be approximately simplified as $$\begin{cases} \vec{V}_{AO} \approx \vec{V}_a \\ \vec{V}_{BO} \approx \vec{V}_b \\ \vec{V}_{CO} \approx \vec{V}_c \end{cases} \Rightarrow \begin{cases} V_{AO} \approx V_a \\ V_{BO} \approx V_b \\ V_{CO} \approx V_c \end{cases} \quad (23)$$

For three-phase system, we have $$V_a + V_b + V_c = 0 \quad (24)$$

Then we get $$V_{AO} + V_{BO} + V_{CO} = 0 \quad (25)$$

The voltages at nodes A, B, C refer to neutral point are given by $$\begin{cases} V_{AO} = V_{AN} + V_{NO} \\ V_{BO} = V_{BN} + V_{NO} \\ V_{CO} = V_{CN} + V_{NO} \end{cases} \quad (26)$$

Combination of equation (25) and (26) yields $$V_{NO} = -\frac{1}{3} \cdot (V_{AN} + V_{BN} + V_{CN}) \quad (27)$$

Substituting equation (27) and (23) into (26) results in $$\begin{cases} V_{AO} = V_{AN} + V_{NO} = V_{AN} - \frac{1}{3} \cdot (V_{AN} + V_{BN} + V_{CN}) \approx V_a \\ V_{BO} = V_{BN} + V_{NO} = V_{BN} - \frac{1}{3} \cdot (V_{AN} + V_{BN} + V_{CN}) \approx V_b \\ V_{CO} = V_{CN} + V_{NO} = V_{CN} - \frac{1}{3} \cdot (V_{AN} + V_{BN} + V_{CN}) \approx V_c \end{cases} \quad (28)$$

Combination of equation (21) and (28) yields the relationship between duty ratio $D_{an}$, $D_{bn}$, $D_{cn}$ and voltage $V_a$, $V_b$, $V_c$ which is as follows:

$$\begin{bmatrix} -\frac{2}{3} & \frac{1}{3} & \frac{1}{3} \\ \frac{1}{3} & -\frac{2}{3} & \frac{1}{3} \\ \frac{1}{3} & \frac{1}{3} & -\frac{2}{3} \end{bmatrix} \cdot \begin{bmatrix} d_{an} \\ d_{bn} \\ d_{cn} \end{bmatrix} = \frac{1}{E} \cdot \begin{bmatrix} V_a \\ V_b \\ V_c \end{bmatrix} \quad (29)$$

The equation illustrates the inherent relationship between average duty ratio of switches and the line voltage under CCM condition.

Proposed Bipolar UCI controller

Since the matrix of equation (29) is singular, equation (29) has no unique solution. With constrain of unity power-factor correction, many solutions are available. One possible solution for equation (29) is as follows:

$$\begin{cases} d_{an} = K_1 + K_2 \cdot \frac{V_a}{E} \\ d_{bn} = K_1 + K_2 \cdot \frac{V_b}{E} \\ d_{cn} = K_1 + K_2 \cdot \frac{V_c}{E} \end{cases} \quad (30)$$

Substituting above equation into (29) results in:

Parameter $K_2 = -1$ and $K_1$ can be any number. Because duty ratio should be less than unity and greater than zero, we have the following limitation:

$$0 \le d_{an} = K_1 - \frac{V_a}{E} \le 1 \quad (31)$$

Define $$M = \frac{E}{\sqrt{2} \cdot V_i}. \quad (32)$$

The range of $K_1$ is limited by $$\frac{1}{M} \le K_1 \le 1 - \frac{1}{M} \quad (33)$$

The equation (30) can be rewritten as $$\begin{cases} \dfrac{V_a}{E \cdot K_1} = 1 - \dfrac{d_{an}}{K_1} \\ \dfrac{V_b}{E \cdot K_1} = 1 - \dfrac{d_{bn}}{K_1} \\ \dfrac{V_c}{E \cdot K_1} = 1 - \dfrac{d_{cn}}{K_1} \end{cases} \quad (34)$$

For three-phase rectifier with unity-power-factor, we assume $$\begin{cases} V_a = R_e \cdot i_a \\ V_a = R_e \cdot i_a \\ V_a = R_e \cdot i_a \end{cases} \quad (35)$$

where $R_e$ is emulated resistance.

Combination of above equation and (34) yields:

$$\begin{cases} \dfrac{R_e}{E \cdot K_1 \cdot R_S} \cdot R_S \cdot i_a = 1 - \dfrac{d_{an}}{K_1} \\ \dfrac{R_e}{E \cdot K_1 \cdot R_S} \cdot R_S \cdot i_b = 1 - \dfrac{d_{bn}}{K_1} \\ \dfrac{R_e}{E \cdot K_1 \cdot R_S} \cdot R_S \cdot i_c = 1 - \dfrac{d_{cn}}{K_1} \end{cases} \quad (36)$$

where parameter $R_s$ is the equivalent current sensing resistor.

Define $$V_m = \dfrac{E \cdot R_s \cdot K_1}{R_e} \quad (37)$$

where $V_m$ is the output of voltage compensator.

The equation (36) can be simplified as $$\begin{cases} R_s \cdot i_a = V_m - V_m \dfrac{D_{an}}{K_1} \\ R_s \cdot i_b = V_m - V_m \dfrac{D_{bn}}{K_1} \\ R_s \cdot i_c = V_m - V_m \dfrac{D_{cn}}{K_1} \end{cases} \quad (38)$$

Replacing the $i_a$, $i_b$, $i_c$ with peak, average inductor current or switching current results in two different control approaches.

Proposed UCI PWM controller by sensing inductor currents (a). Schematic.

Replacing the $i_a$, $i_b$, $i_c$ in equation (38) with peak or average inductor current, we get the control key equation.

$$\begin{cases} R_s \cdot i_{Lapk} = V_m - V_m \dfrac{D_{an}}{K_1} \\ R_s \cdot i_{Lbpk} = V_m - V_m \dfrac{D_{bn}}{K_1} \\ R_s \cdot i_{Lcpk} = V_m - V_m \dfrac{D_{cn}}{K_1} \end{cases} \text{ or } \begin{cases} R_s \cdot \langle i_{La} \rangle = V_m - V_m \dfrac{D_{an}}{K_1} \\ R_s \cdot \langle i_{Lb} \rangle = V_m - V_m \dfrac{D_{bn}}{K_1} \\ R_s \cdot \langle i_{Lc} \rangle = V_m - V_m \dfrac{D_{cn}}{K_1} \end{cases} \quad (39)$$

Figure 41A:
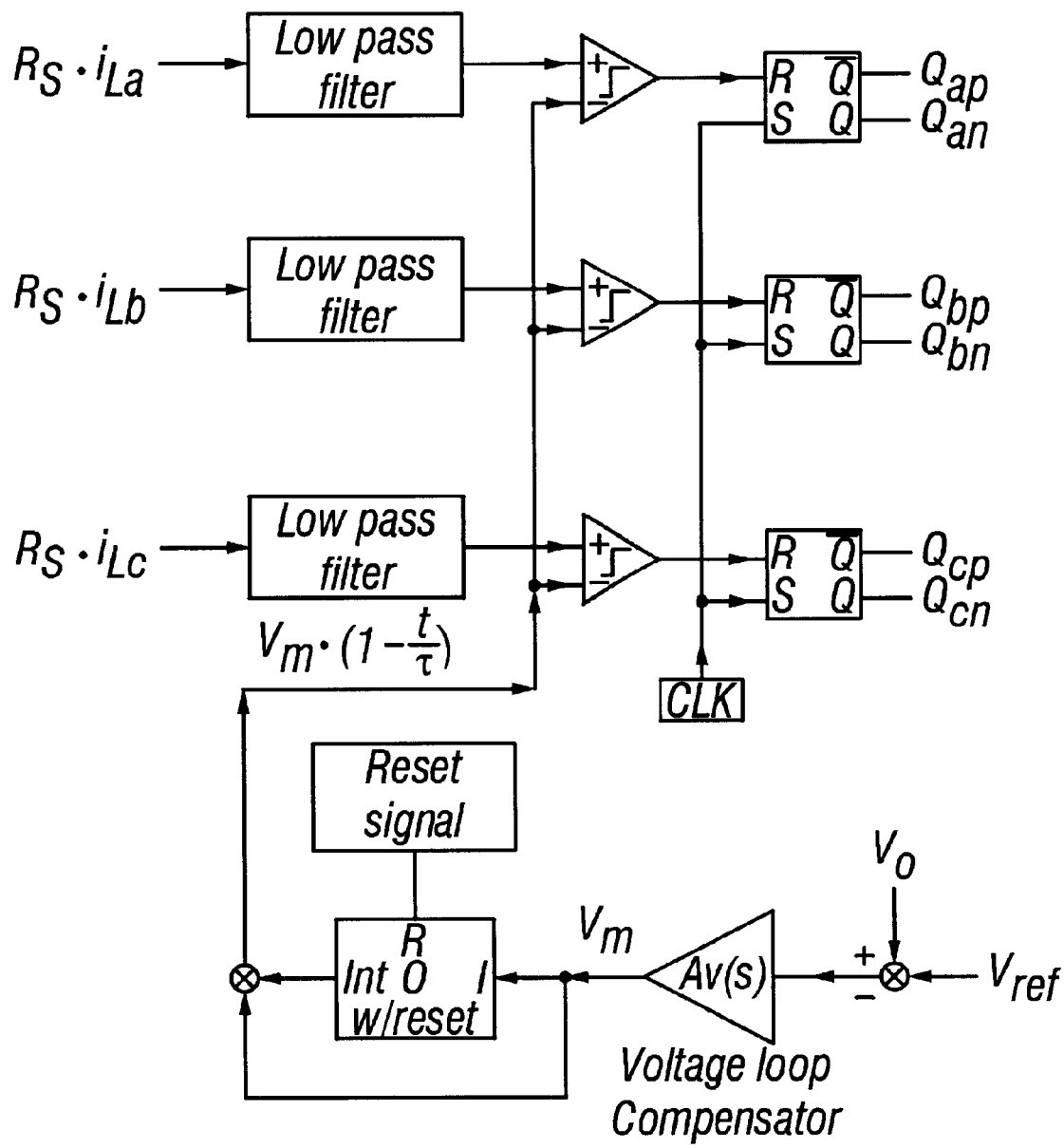
FIG. 41a is a schematic of proposed 3-phase boost PFC controller.
Figure 41B:
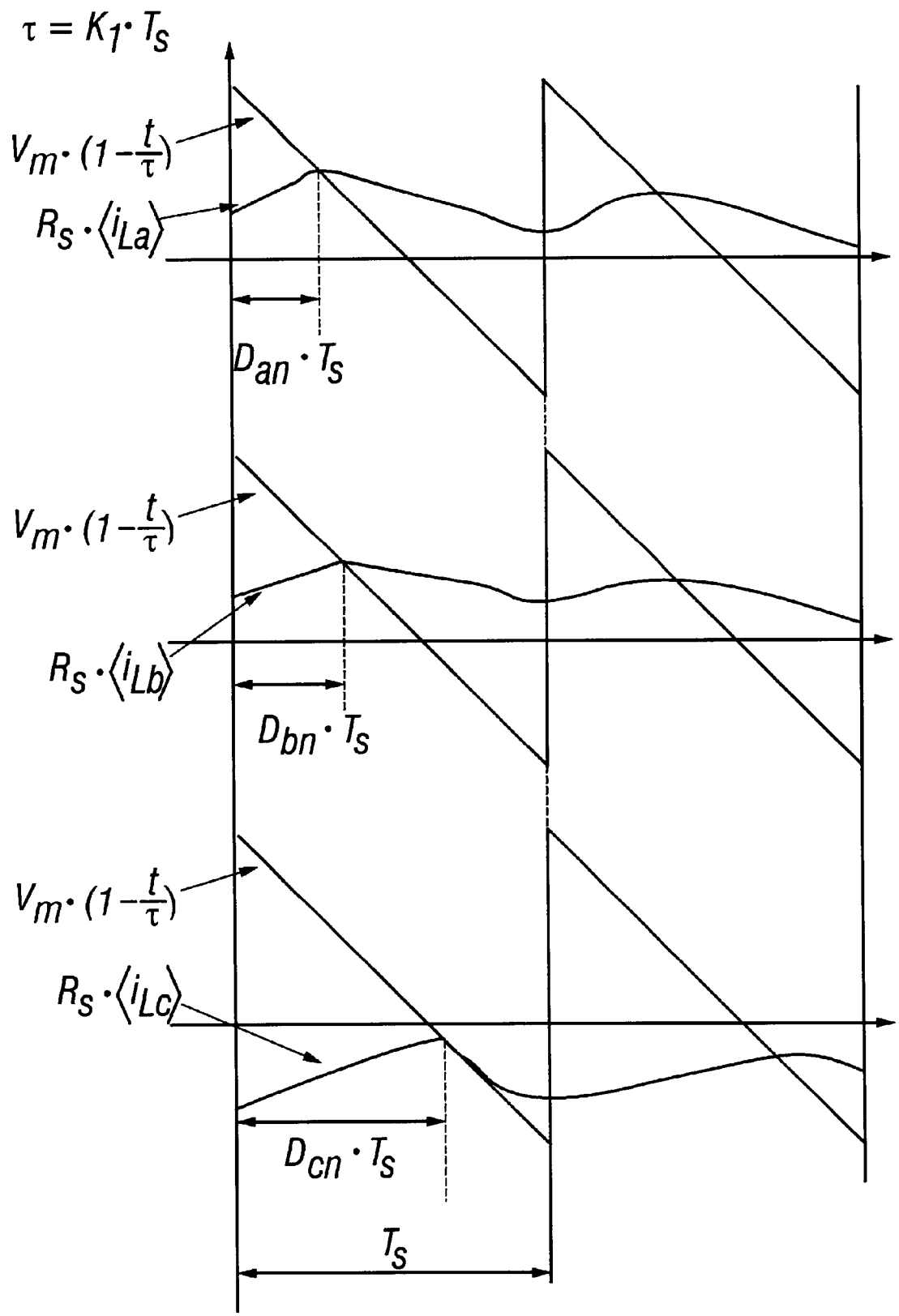

The above equation can be implemented with an integrator with reset as shown in FIG. 41(a). The operation waveforms are shown in FIG. 41(b); where $Q_{ap}$, $Q_{an}$ ... $Q_{cn}$ are drive signal for switches $S_{ap}$, $S_{an}$ ... $S_{cn}$ respectively. The time constant of the integrator is set to be $\tau = K_1 \cdot T_S$; where $T_s$ is switching period. For instance, $K_1$ may be chosen as 0.5. In that case, the carrier $$V_m - V_m \cdot \dfrac{t}{K_1 \cdot T_S} = V_m \cdot \left(1 - 2 \cdot \dfrac{t}{T_S}\right)$$

is symmetric to the x axis.

The schematic for the proposed 3-phase PFC controller is shown in FIG. 41(a). By controlling the duty ratio to follow the relationship shown in (39), three-phase PFC can be implemented. The 3-phase PFC controller in FIG. 41a is composed of 3 flip-flops and one integrator with reset as well as some linear components. No voltage sensors and multipliers are required. In order to prevent the short circuit, dead time for complementary switches such as $S_{an}$, $S_{ap}$ need to be considered.

(b) PSPICE simulation verification.

In order to verify the idea, a PSPICE simulation was conducted. The simulation conditions are as follows: Input phase voltage 120 Vrms, Output voltage E=500 v; L=3 mH, f=10 KHz, P=5 KW. The conversion ration $$M = \dfrac{V_o}{\sqrt{2} \cdot V_{grms}} = 2.946.$$

Figure 42:
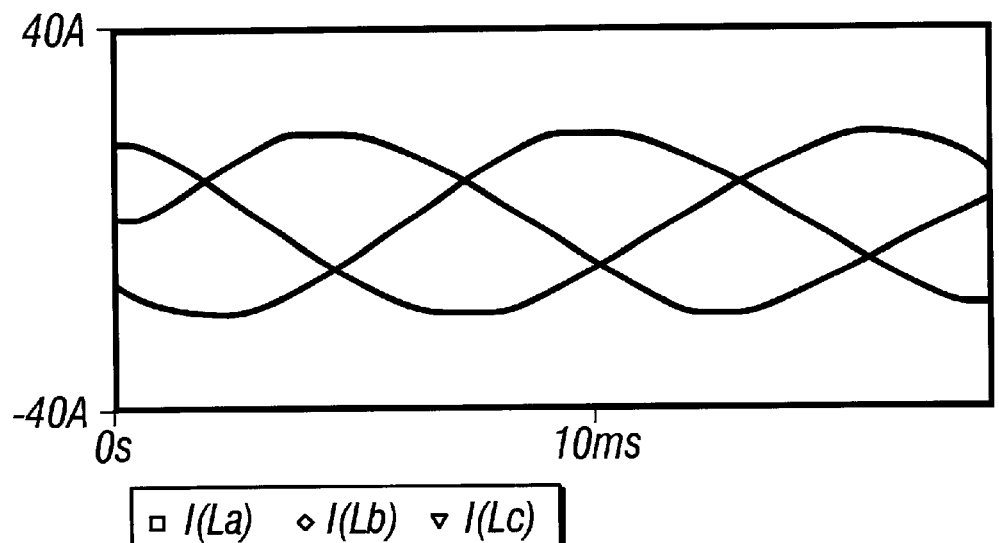

The parameter $K_1$ is limited in the range of (0.339, 0.660) according to equation (33). In this simulation, parameter $K_1$=0.4. The simulation results for the 3-phase bridge rectifier in FIG. 41(a) with proposed controller are given in FIG. 42. The measured total harmonic distortion (THD) is below 5%. Simulation results verified the theoretical analysis.

Proposed UCI PWM controller for 6-switch bridge rectifier by sensing switching current Recall the equation (39) and considering the phase A, we have $$V_m \cdot \left(1 - \dfrac{D_{an}}{K_1}\right) = R_s \cdot \langle i_{La} \rangle$$

For 3-phase rectifier with unity power-factor, we assume the input inductor current follows the input phase voltage. By setting $K_1$=0.5, the above equation can be rewritten as $$\begin{cases} V_m \cdot (1 - 2 \cdot D_{an}) = R_s \cdot \langle i_{La} \rangle; \quad D_{ap} = 1 - D_{an} \quad V_a > 0; \quad \langle i_{La} \rangle > 0 \\ V_m \cdot (2 \cdot D_{an} - 1) = V_m \cdot (1 - 2 \cdot D_{ap}) = R_s \cdot (-\langle i_{La} \rangle); \\ D_{ap} = 1 - D_{an} \quad V_a \leq 0; \quad \langle i_{La} \rangle \leq 0 \end{cases}$$

The above equation can be simplified as $$\begin{cases} V_m \cdot (1 - 2 \cdot D_a) = R_s \cdot |\langle i_{La} \rangle| \\ D_{an} = \begin{cases} D_a; & V_a > 0 \\ 1 - D_a; & V_a \leq 0 \end{cases} \quad D_{ap} = \begin{cases} 1 - D_a; & V_a > 0 \\ D_a; & V_a \leq 0 \end{cases} \end{cases} \quad (40)$$

Assuming input current is positive, i.e, $V_a$>0; $i_a$>0, when switch $S_{an}$ is on, the inductor current flows into switch $S_{an}$. When switch $S_{an}$ is off, the inductor current flows through diode $D_{ap}$. In this case, switch $S_{ap}$ can be turned on at zero voltage condition. Therefore, $S_{an}$ is "active" switch and $S_{ap}$ is inactive switch. Likewise, under the condition $V_a \leq 0$; $i_a \leq 0$, $S_{an}$ is "inactive" switch and $S_{ap}$ is "active" switch. In each switching cycle, there is only one "active" switch is controller in each bridge arm. The loss for "inactive" switch is very small due to the zero-voltage turn-on condition.

If the converter operates in CCM, the inductor current can be expressed with duty ratio and switching current. The relationship between the switching current and is inductor current for phase A is illustrated in FIG. 43; where $<i_{Sapn}>$ is equivalent average switching current for switches $S_{ap}$ and $S_{an}$.

The inductor current is a function of switching current and duty ratio, which is given by $$\begin{cases} V_a > 0; & \langle i_{La} \rangle \cdot D_{an} = \langle i_{San} \rangle \\ V_a \leq 0; & (-\langle i_{La} \rangle) \cdot D_{ap} = \langle i_{Sap} \rangle \end{cases} \quad (41)$$

Figure 43:
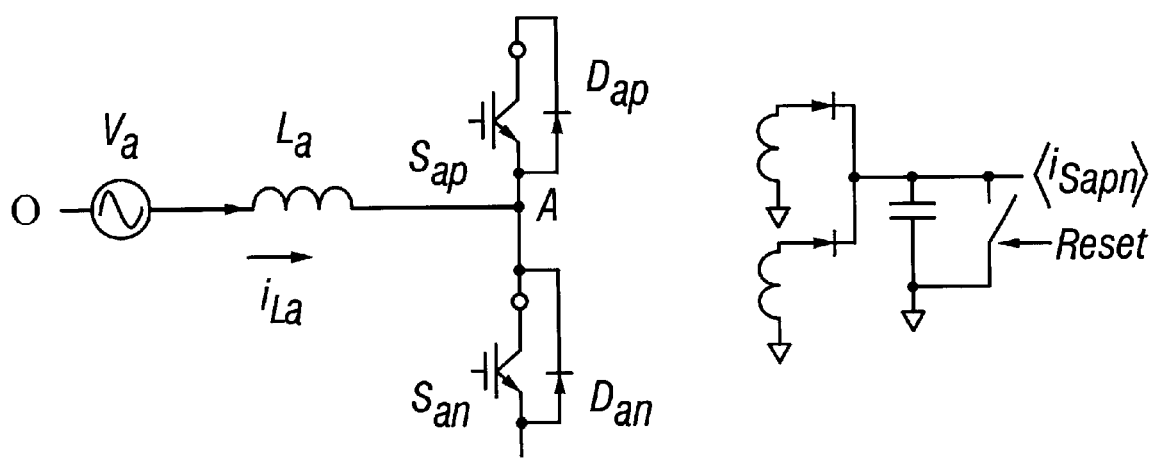
FIG. 43 is an illustration of sensing switching current for phase A

Combination of the above equation and equation (40) yields $$|\langle i_{La} \rangle| \cdot D_a = \langle i_{Sapn} \rangle \quad (42)$$

where $\langle i_{sapn} \rangle$ is equivalent average switching current as shown in FIG. 43

Combination of equation (42); (40) and equation (39) yields $$\begin{cases} R_s \cdot \langle i_{Sapn} \rangle = V_m \cdot (1 - 2 \cdot D_a) \cdot D_a \\ R_s \cdot \langle i_{Sbpn} \rangle = V_m \cdot (1 - 2 \cdot D_b) \cdot D_b \\ R_s \cdot \langle i_{Scpn} \rangle = V_m \cdot (1 - 2 \cdot D_c) \cdot D_c \end{cases} \quad (43)$$

Figure 44:
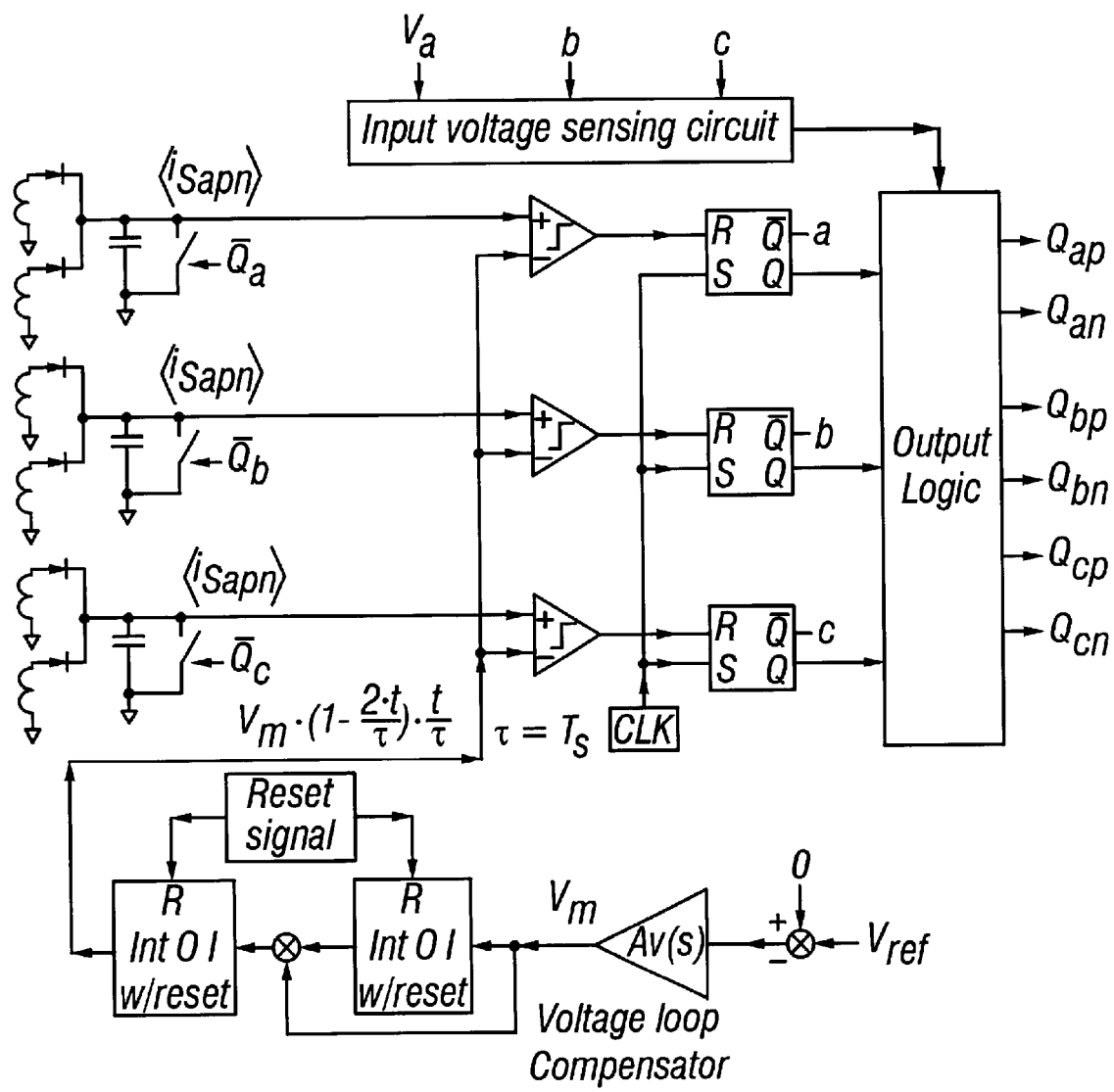
FIG. 44 is a schematic for the control block for six-switch boost bridge rectifier with average switching current control.
Figure 45A:
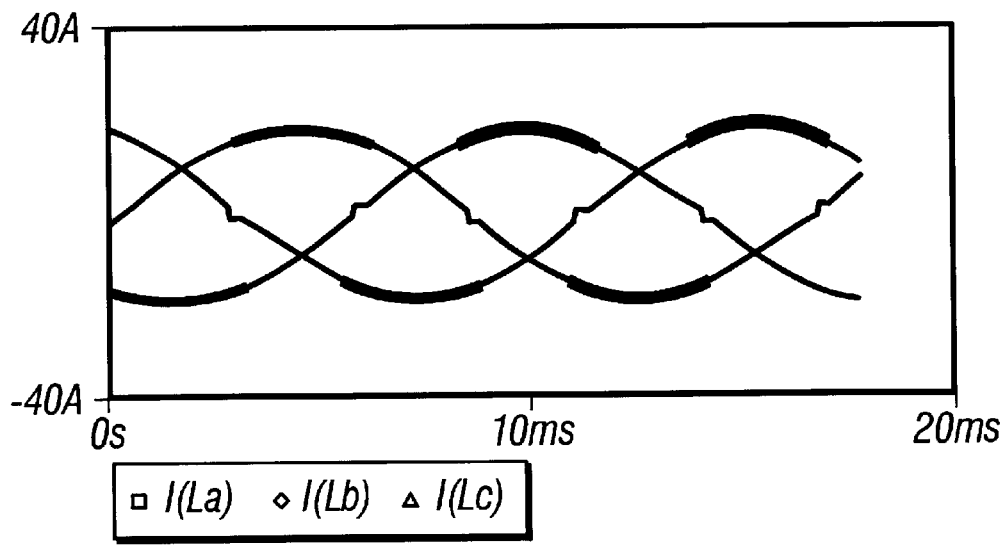
FIGS. 45a and 45b show the simulation results for six-switch boost bridge rectifier with average switching current mode control.
Figure 45B:
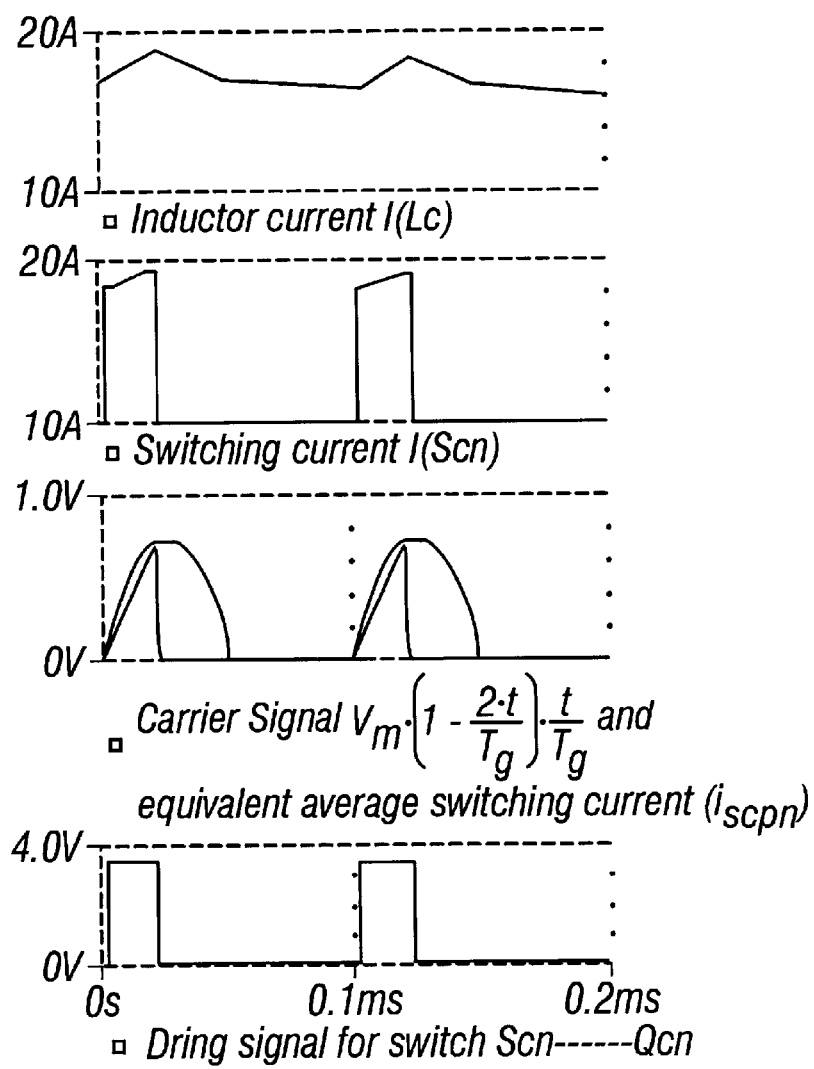

This equation shows that the three-phase PFC for the 6-switch boost bridge rectifier can be implemented by sensing switching current. The schematic of control block is shown in FIG. 44; where $Q_a$ has the duty ratio $D_a$. The simulation results are shown in FIG. 45. The simulation condition is same as that described above. The measured THD is below 5%.

Other variations of bridge boost rectifier with proposed controller

Figure 46A:
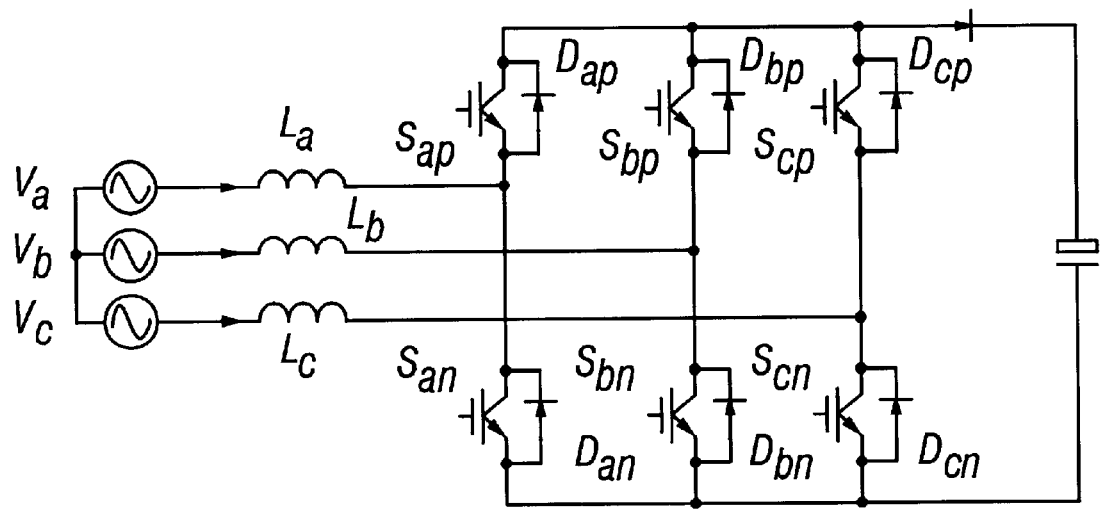
FIGS. 46a and 46b are two examples of bridge boost rectifier.
Figure 46B:
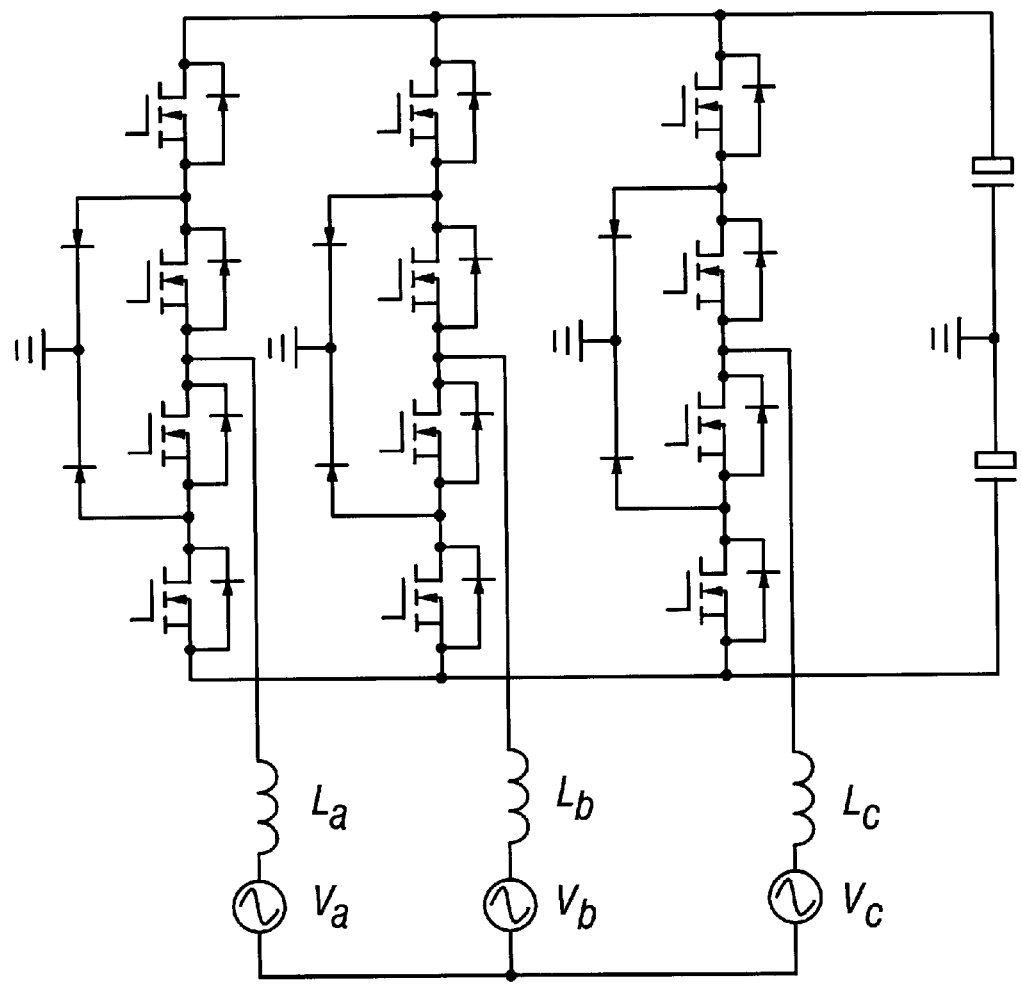
Figure 47:
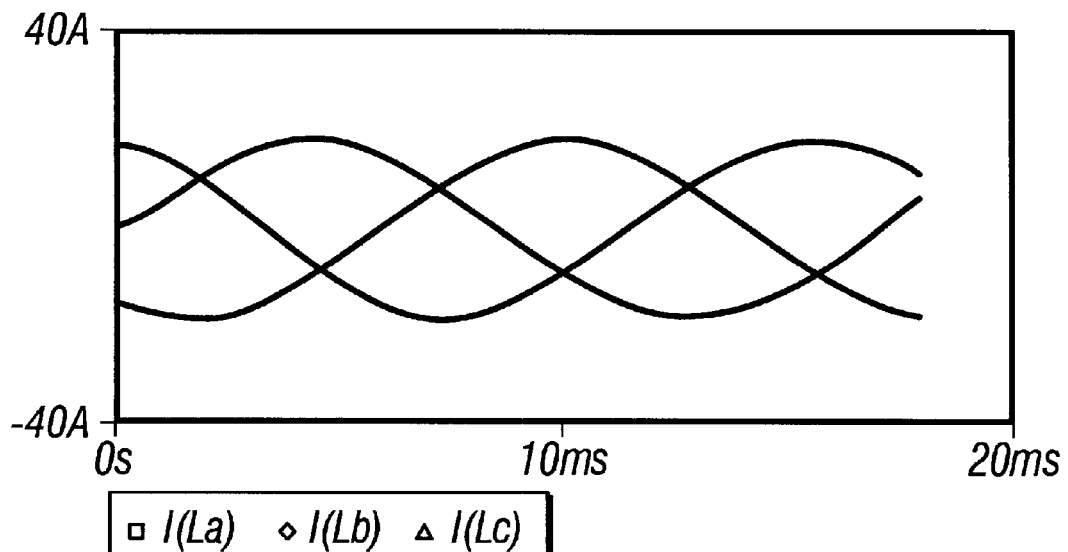
FIG. 47 is a graph of simulated three-phase inductor current waveforms for 6-switch bridge rectifier with dc diode and inductor current control.

The proposed controller is applicable to other variations of the bridge topology. Two examples are shown in FIGS. 46*a* and 46*b*. One is 6-switch bridge rectifier with dc-diode; the other is three-level boost rectifier. The proposed controller can be applied to these two topologies without any changes. Although the relationship between the duty ratio and input voltage in equation (29) is not completely satisfied in FIG. 46(*a*), the proposed controller still can guarantee good input current waveforms. The simulation results for the rectifier in FIG. 46(*a*) with proposed controller by sensing inductor current is given in FIG. 47. The measured THD at 4 KW output is 1.3% and 15% at the 300 W. Although THD is slight higher comparing with the topology in FIG. 44, the performance can still meet the IEC 1000-3-2 standard. Further more, because the dc diode prevents the short through in bridge, the reliability is higher. The three-level bridge rectifier in FIG. 46(*b*) is suitable for high power and high voltage applications because the voltage stress of each switch is half of the output voltage. The simulation results for three-level rectifier is similar to that of the 6-switch rectifier in FIG. 44 and simulation results are not included here.

Figure 48:
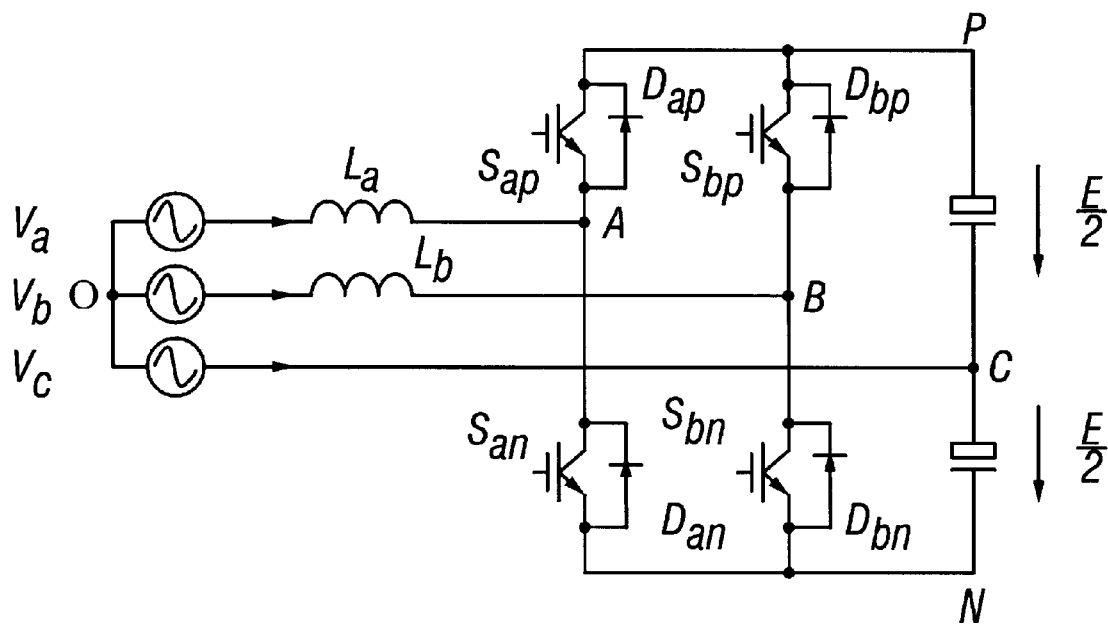
FIG. 48 is a schematic of a 3-phase rectifier with reduced switch count.

3-phase bridge rectifier with reduced switch count and Bipolar operated UCI control The 3-phase rectifier topology with reduced switch count is shown in FIG. 48. With similar approximation in 0, the relationship shown in equation (28) still exists for the topology in Fig. Rewritten equation (28) yields:

$$\begin{cases} V_a \approx V_{AN} - \frac{1}{3} \cdot (V_{AN} + V_{BN} + V_{CN}) \\ V_b \approx V_{BN} - \frac{1}{3} \cdot (V_{AN} + V_{BN} + V_{CN}) \\ V_c \approx V_{CN} + V_{NO} = V_{CN} - \frac{1}{3} \cdot (V_{AN} + V_{BN} + V_{CN}) \end{cases} \quad (44)$$

For three-phase system, we have $V_a + V_b + V_c = 0$; therefore, the above equation can be simplified as $$\begin{bmatrix} V_a \\ V_b \end{bmatrix} = \begin{bmatrix} \frac{2}{3} & -\frac{1}{3} & -\frac{1}{3} \\ -\frac{1}{3} & \frac{2}{3} & -\frac{1}{3} \end{bmatrix} \cdot \begin{bmatrix} V_{AN} \\ V_{BN} \\ V_{CN} \end{bmatrix} \quad (45)$$

For the rectifier in Fig., the average voltage at node A, B, C referring node N are given by $$\begin{cases} V_{AN} = (1 - D_{an}) \cdot E \\ V_{BN} = (1 - D_{bn}) \cdot E \\ V_{CN} = \frac{E}{2} \end{cases} \quad (46)$$

Where $D_{an}$, $D_{bn}$ are duty ratios for switches $S_{an}$, $S_{bn}$ respectively; the duty ratios of switches $S_{ap}$, $S_{bp}$ are the complementary of duty ratio $D_{an}$, $D_{bn}$, i.e. $D_{ap} = 1 - D_{an}$; $D_{bp} = 1 - D_{bn}$.

Substitution of the equation (46) into equation (45) yields $$\begin{bmatrix} 1 - 2 \cdot D_{an} \\ 1 - 2 \cdot D_{bn} \end{bmatrix} = \frac{2}{E} \cdot \begin{bmatrix} 2 \cdot V_a + V_b \\ V_a + 2 \cdot V_b \end{bmatrix} \quad (47)$$

For 3-phase PFC with unity power factor, we have $$\begin{cases} V_a = R_e \cdot i_a \\ V_b = R_e \cdot i_b \end{cases} \quad (48)$$

where $R_e$ is the emulated resistance.

The equation (47) can be simplified as:

$$V_m \cdot \begin{bmatrix} 1 - 2 \cdot D_{an} \\ 1 - 2 \cdot D_{bn} \end{bmatrix} = R_s \cdot \begin{bmatrix} 2 & 1 \\ 1 & 2 \end{bmatrix} \cdot \begin{bmatrix} i_a \\ i_b \end{bmatrix} \quad (49)$$

where $$V_m = \frac{E \cdot R_s}{2 \cdot R_e} \quad (50)$$

The parameter $V_m$ is the output of the voltage error compensator.

Replace the $i_a$, $i_b$ with peak or average inductor current results in the control key equation $$V_m \cdot \begin{bmatrix} 1 - 2 \cdot D_{an} \\ 1 - 2 \cdot D_{bn} \end{bmatrix} = R_s \cdot \begin{bmatrix} 2 & 1 \\ 1 & 2 \end{bmatrix} \cdot \begin{bmatrix} \langle i_{La} \rangle \\ \langle i_{Lb} \rangle \end{bmatrix} \quad (51)$$

or $$V_m \cdot \begin{bmatrix} 1 - 2 \cdot D_{an} \\ 1 - 2 \cdot D_{bn} \end{bmatrix} = R_s \cdot \begin{bmatrix} 2 & 1 \\ 1 & 2 \end{bmatrix} \cdot \begin{bmatrix} i_{Lapk} \\ i_{Lbpk} \end{bmatrix}$$

Figure 49:
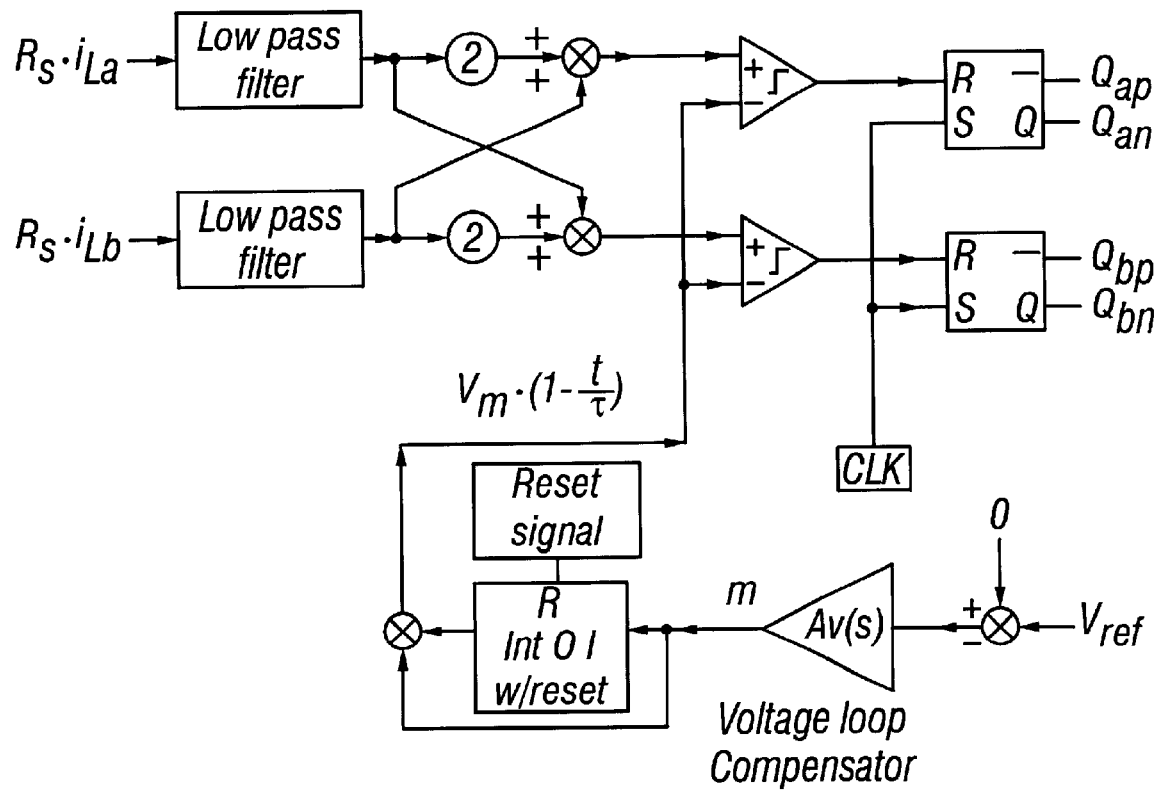
FIG. 49 The schematic of control block for the 3-phase rectifier in FIG. 48.
Figure 50:
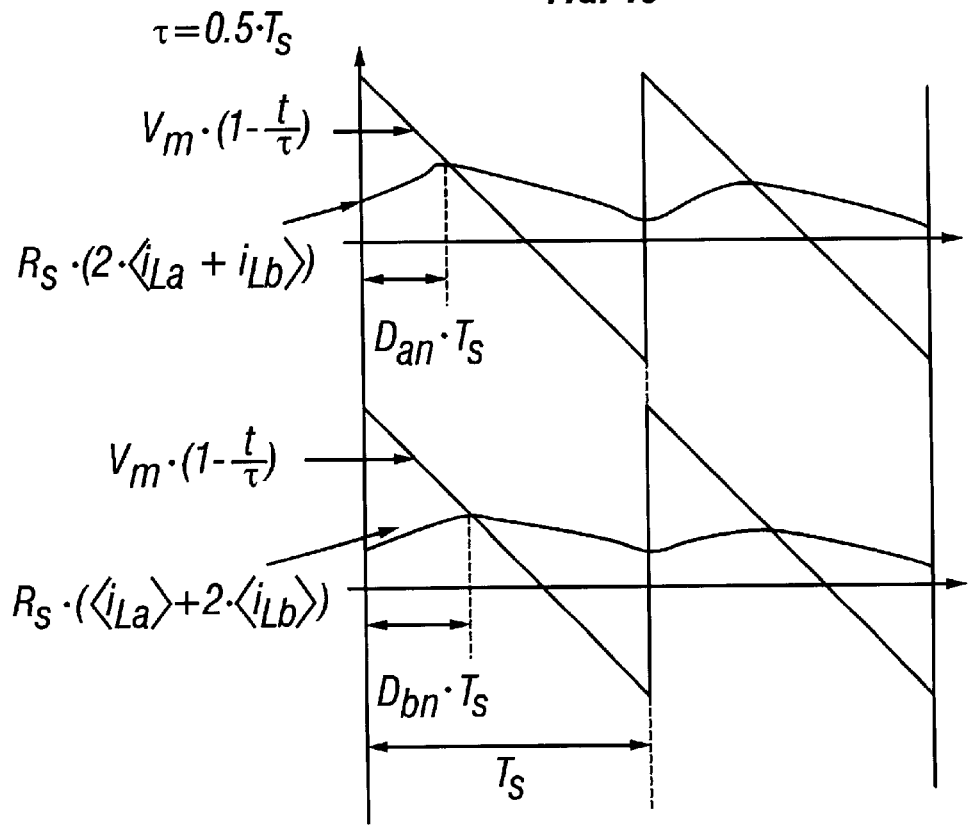
FIG. 50 is a garph of the operation waveforms for the controller in FIG. 49.

The duty ratio of above equation can be solved with integrator with resets. The schematic is shown in FIG. 49 and operation waveforms are shown in FIG. 50.

Figure 51:
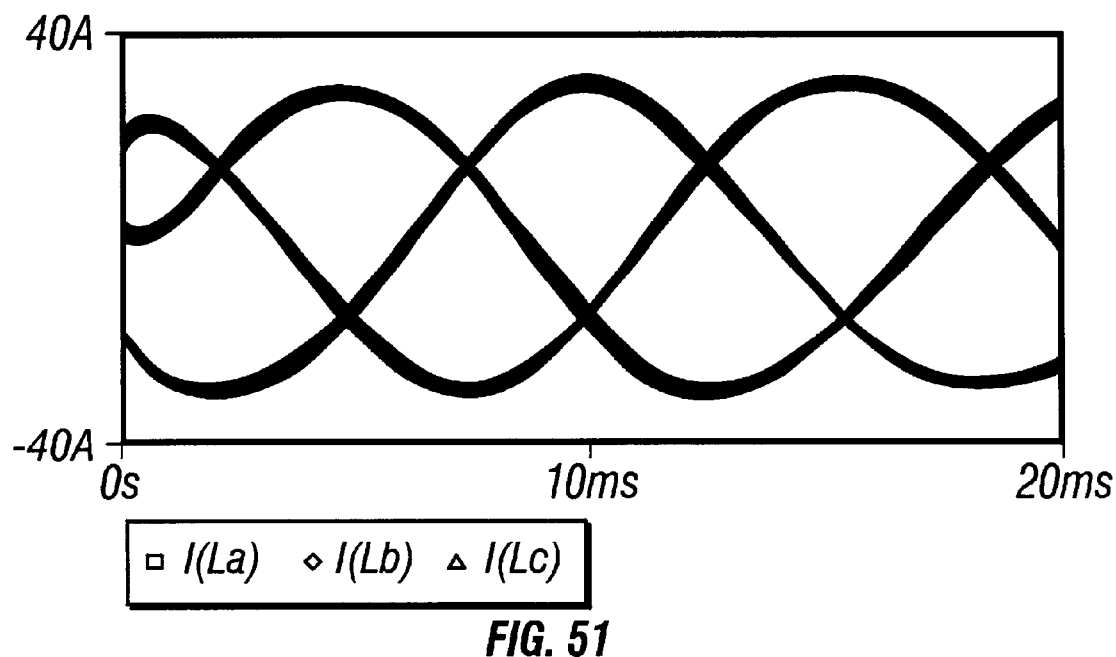
FIG. 51 is a graph of simulated inductor current waveforms for the 3-phase rectifier in FIG. 49 with proposed UCI PWM controller.

Simulated inductor current waveforms are shown in FIG. 51. The simulation conditions are as follows: Input phase voltage 120 Vrms, Output voltage E=600 v; L=3 mH, f=10 KHz, P=6 KW. The measured total harmonic distortion (THD) is 3.2%.

Figure 52A:
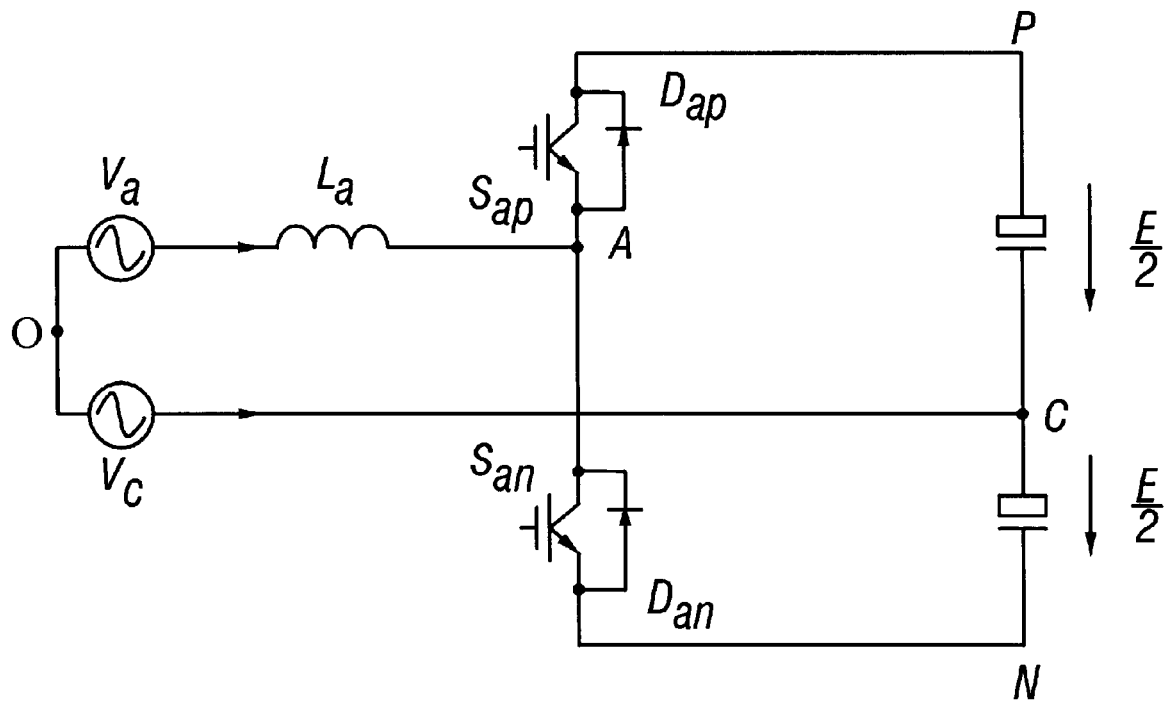
FIGS. 52a and 52b are schematics for an equivalent circuit for the 3-phase rectifier with reduced switch count in FIG. 48.
Figure 52B:
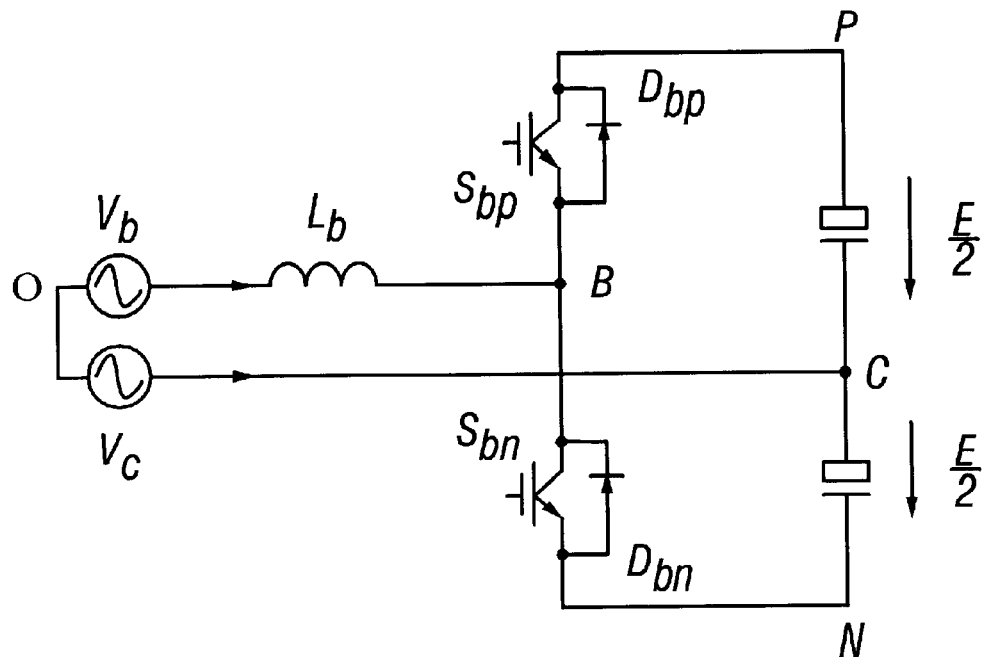

The topology shown in FIG. 48 can be seen as a combination of two single-phase rectifiers with half bridge as shown in FIGS. 52*a* and 52*b*. The input voltage for single-phase PFC is line—line voltage such as $V_{ab}$, $V_{bc}$. The input inductor currents follow the phase voltage $V_a$ or $V_b$. By applying inductor voltage-second balance method, we can get the same control key equation as shown in (51). The advantage of this rectifier is less switches and inductor counts. The disadvantage is that the high voltage stress of the switch. The output voltage is more than twice of the line—line voltage, i.e $$\frac{E}{2} \geq V_{ab} = \sqrt{3} \cdot \sqrt{2} \cdot V_{grms} \cdot \sin(wt).$$

The voltage stress of the switch that equals E is higher comparing with the 6-switch bridge rectifier. Furthermore, the current flowing into the output capacitor has twice line frequency ripple; which results in larger capacitance. Nevertheless, it is a low cost option for 3-phase PFC.

VIENNA rectifier with Bipolar operated UCI control.

Figure 53A:
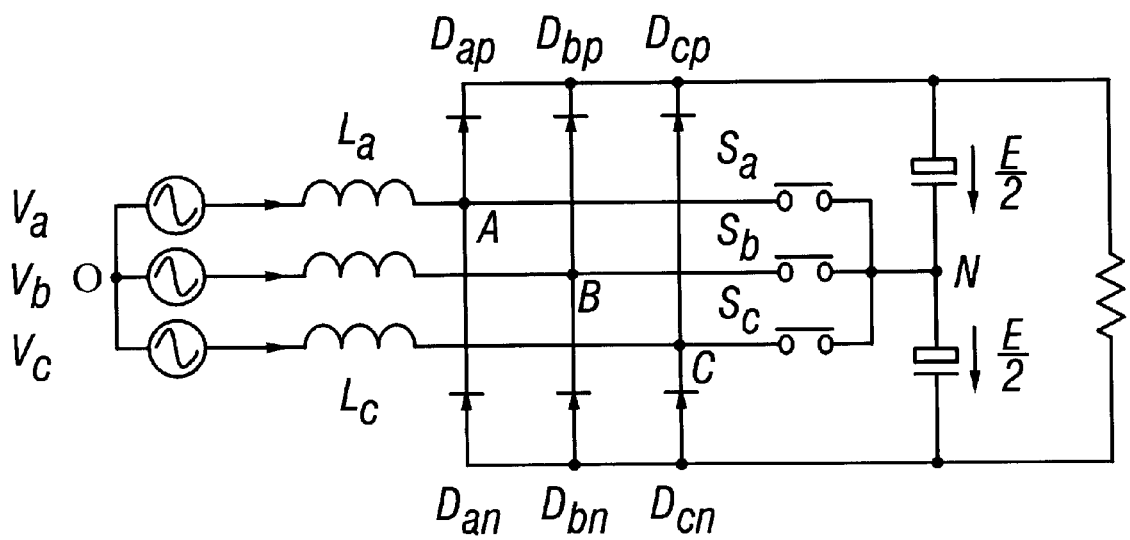
FIGS. 53a and 53b show a 3-phase VIENNA rectifier in FIG. 53a and its average model in FIG. 53b.
Figure 53B:
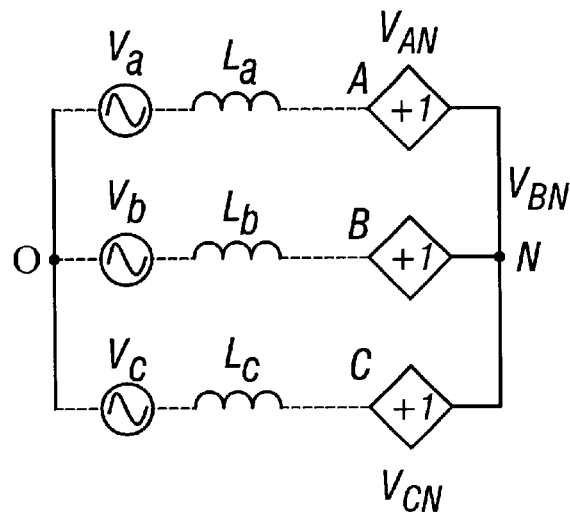
Figure 54A:
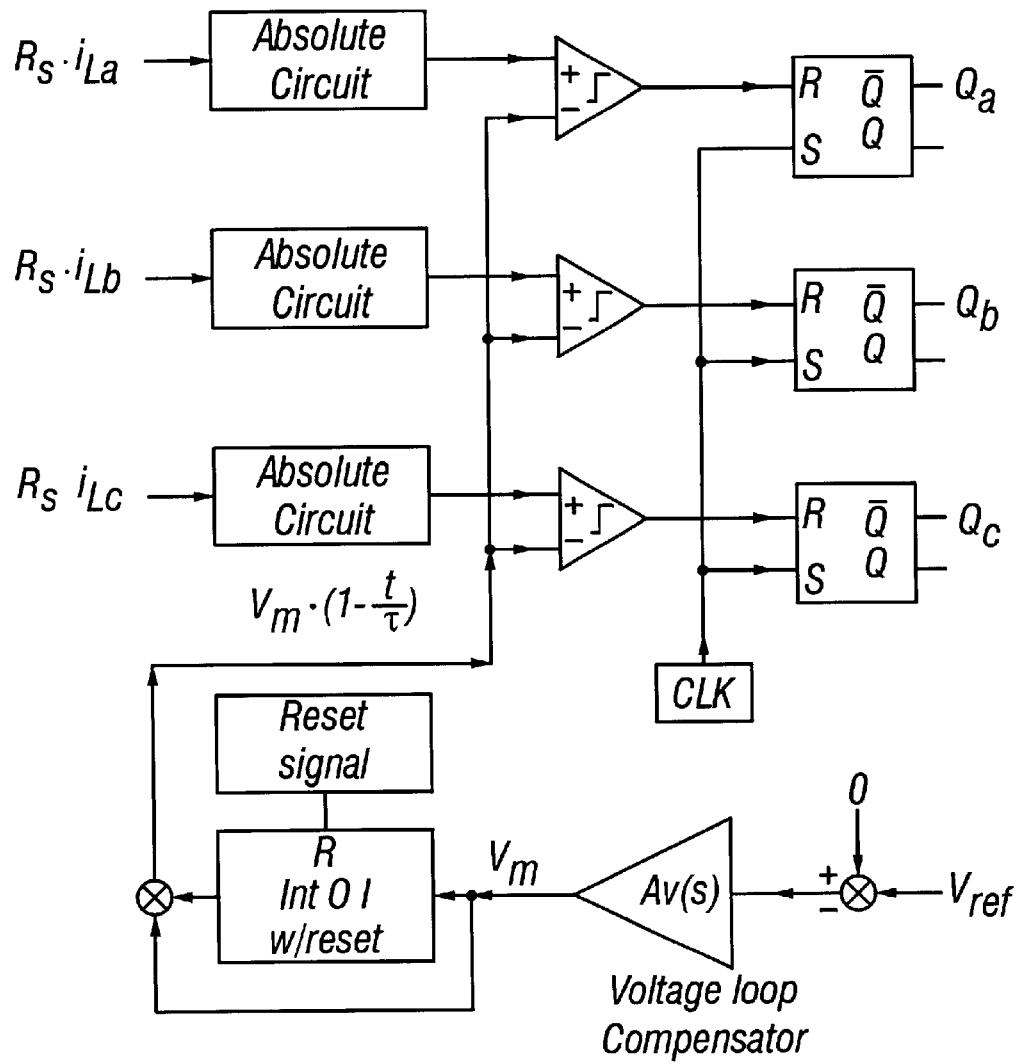
FIGS. 54a and 54b are schematics of proposed 3-phase PFC controller for VIENNA rectifier by sensing inductor current in FIG. 54a and its operation waveform FIG. 54b.
Figure 54B:
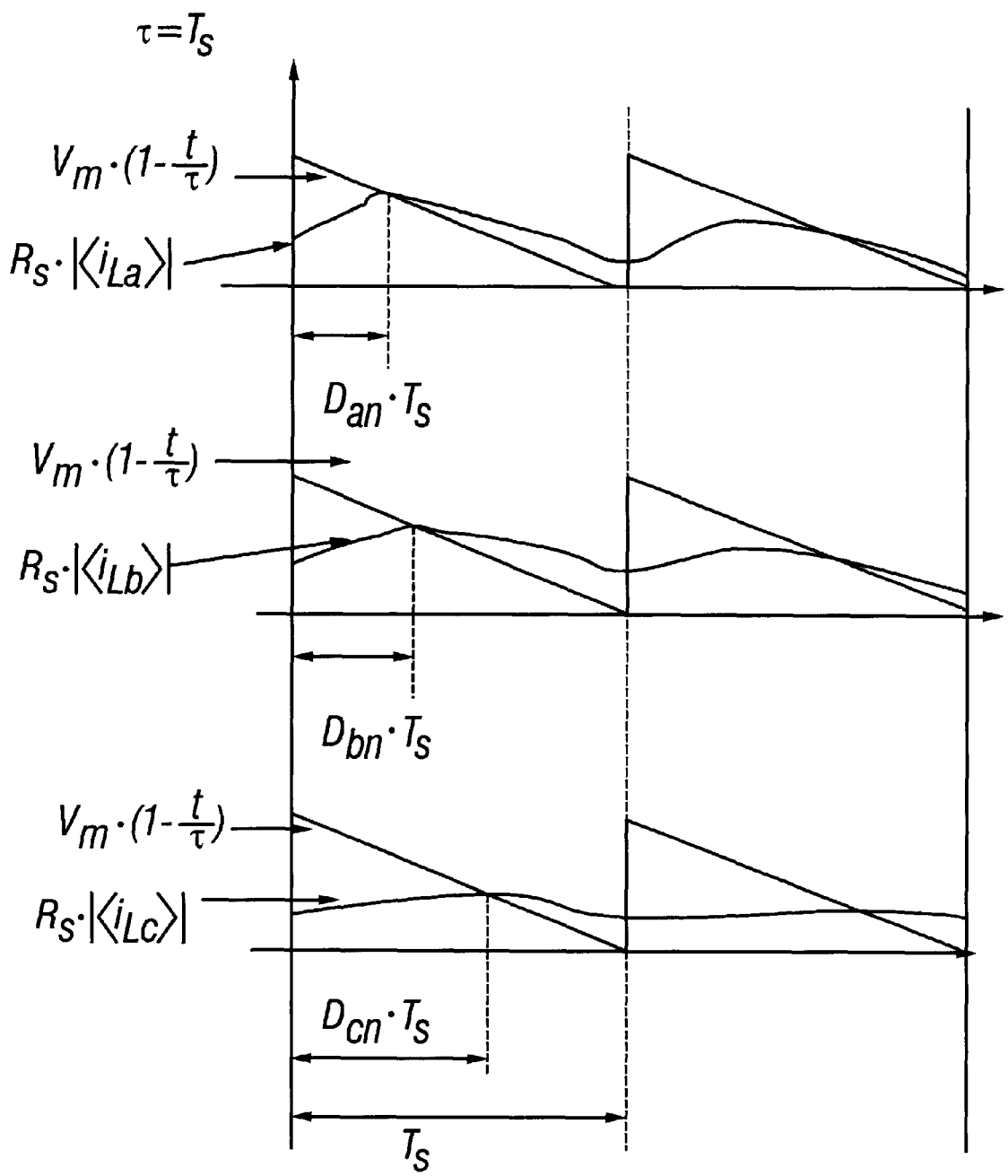
Figure 55:
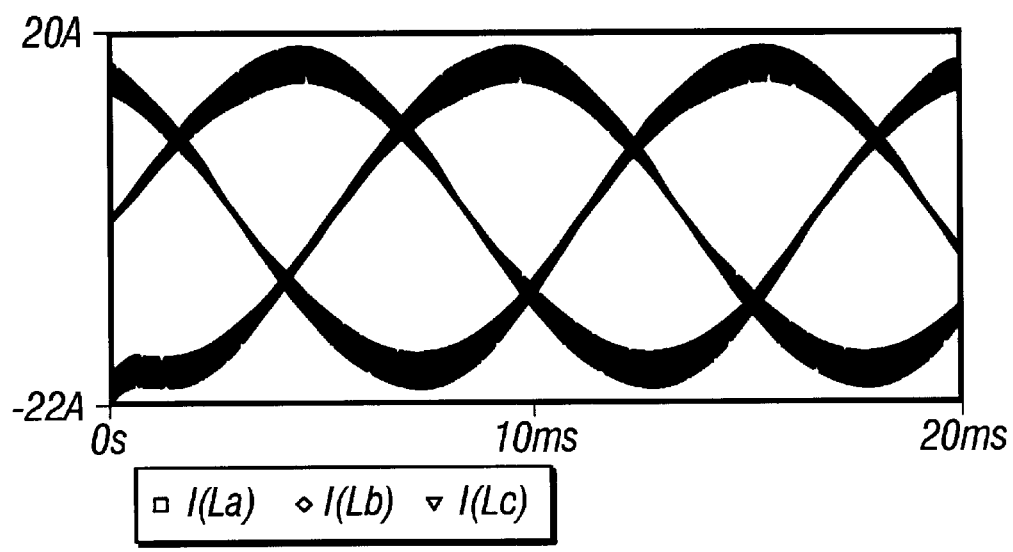
FIG. 55 is a graph of a simulated inductor current waveforms for VIENNA rectifier with proposed controller in FIGS. 54a and 54b

One of the promising 3-phase rectifiers is VIENNA rectifier. The schematic and its average model are shown in FIG. 53b. The average vector voltage at nodes A, B, C refer to the neutral point "O" equal the phase vector voltages minus the voltage across the inductors $L_a$, $L_b$, $L_c$ which is given by $$\begin{cases} \dot{V}_{AO} = \dot{V}_a - jwL \cdot \dot{i}_{La} \\ \dot{V}_{BO} = \dot{V}_b - jwL \cdot \dot{i}_{Lb} \\ \dot{V}_{CO} = \dot{V}_c - jwL \cdot \dot{i}_{Lc} \end{cases}$$

Following the similar procedure above, the following approximation still exists:

$$\begin{cases} V_a \approx V_{AN} - \frac{1}{3} \cdot (V_{AN} + V_{BN} + V_{CN}) \\ V_b \approx V_{BN} - \frac{1}{3} \cdot (V_{AN} + V_{BN} + V_{CN}) \\ V_c \approx V_{CN} + V_{NO} = V_{CN} - \frac{1}{3} \cdot (V_{AN} + V_{BN} + V_{CN}) \end{cases} \quad \text{i.e.} \tag{52}$$

$$\begin{bmatrix} \frac{2}{3} & -\frac{1}{3} & -\frac{1}{3} \\ -\frac{1}{3} & \frac{2}{3} & -\frac{1}{3} \\ -\frac{1}{3} & -\frac{1}{3} & \frac{2}{3} \end{bmatrix} \cdot \begin{bmatrix} V_{AN} \\ V_{BN} \\ V_{CN} \end{bmatrix} = \begin{bmatrix} V_a \\ V_b \\ V_c \end{bmatrix}$$

For the VIENNA rectifier, if the converter operates in CCM, the average node voltages $V_{AN}$, $V_{BN}$, $V_{CN}$ are given by $$\begin{cases} V_{AN} = (1-D_a) \cdot \frac{E}{2} \\ V_{BN} = (1-D_b) \cdot \frac{E}{2} \quad \text{when } i_a \geq 0 \\ V_{CN} = (1-D_c) \cdot \frac{E}{2} \end{cases}$$

$$\begin{cases} V_{AN} = (1-D_a) \cdot \left(-\frac{E}{2}\right) \\ V_{BN} = (1-D_b) \cdot \left(-\frac{E}{2}\right) \quad \text{when } i_a < 0 \\ V_{CN} = (1-D_c) \cdot \left(-\frac{E}{2}\right) \end{cases}$$

Simplification yields $$\begin{cases} V_{AN} = (1-D_a) \cdot \frac{E}{2} \cdot \text{sign}(i_a) \\ V_{BN} = (1-D_b) \cdot \frac{E}{2} \cdot \text{sign}(i_b) \\ V_{CN} = (1-D_c) \cdot \frac{E}{2} \cdot \text{sign}(i_c) \end{cases} \tag{53}$$

where $\text{sign}(i_a)$, $\text{sign}(i_b)$., etc depends on the polarity of inductor currents. For example, $$\text{sign}(i_a) = \begin{cases} 1 & i_a \geq 0 \\ -1 & i_a < 0 \end{cases} \tag{54}$$

Substitution equation (53) into equation (52) yields $$\begin{bmatrix} \frac{2}{3} & -\frac{1}{3} & -\frac{1}{3} \\ -\frac{1}{3} & \frac{2}{3} & -\frac{1}{3} \\ -\frac{1}{3} & -\frac{1}{3} & \frac{2}{3} \end{bmatrix} \cdot \begin{bmatrix} (1-D_a) \cdot \text{sign}(i_a) \\ (1-D_b) \cdot \text{sign}(i_b) \\ (1-D_c) \cdot \text{sign}(i_c) \end{bmatrix} = \frac{2}{E} \cdot \begin{bmatrix} V_a \\ V_b \\ V_c \end{bmatrix} \tag{55}$$

Equation (55) shows the inherent relationship between duty ratios and input phase voltage in CCM condition. Because the matrix is singular, there is no unique solution for equation (55).

For three-phase rectifier with unity-power-factor, we have $$\begin{cases} V_a = R_e \cdot i_a \\ V_b = R_e \cdot i_b \\ V_c = R_e \cdot i_c \end{cases} \tag{56}$$

where $R_e$ is the emulated resistance.

Substitution of the above equation into (55) and simplification yield $$\begin{bmatrix} \frac{2}{3} & -\frac{1}{3} & -\frac{1}{3} \\ -\frac{1}{3} & \frac{2}{3} & -\frac{1}{3} \\ -\frac{1}{3} & -\frac{1}{3} & \frac{2}{3} \end{bmatrix} \cdot \begin{bmatrix} (1-D_a) \cdot \text{sign}(i_a) \\ (1-D_b) \cdot \text{sign}(i_b) \\ (1-D_c) \cdot \text{sign}(i_c) \end{bmatrix} = \frac{R_s}{V_m} \cdot \begin{bmatrix} i_a \\ i_b \\ i_c \end{bmatrix} \tag{57}$$

where $R_s$ is the equivalent current sensing resistor and $V_m$ is the output of the voltage error compensator.

$$V_m = \frac{E \cdot R_s}{2 \cdot R_e} \tag{58}$$

There are infinite solutions for equation (57). One simple solution is $$\begin{cases} V_m \cdot (1-D_a) \cdot \text{sign}(i_a) = K_1 + K_2 \cdot i_a \\ V_m \cdot (1-D_b) \cdot \text{sign}(i_b) = K_1 + K_2 \cdot i_b \\ V_m \cdot (1-D_c) \cdot \text{sign}(i_c) = K_1 + K_2 \cdot i_c \end{cases} \tag{59}$$

where $K_1$, $K_2$ are constant.

The $K_1$, $K_2$ can be solved by substituting the above equation in equation (57) which results in $K_1$ can be any real number. The parameter $K_2$ satisfies the following $$\begin{bmatrix} \frac{2}{3} & -\frac{1}{3} & -\frac{1}{3} \\ -\frac{1}{3} & \frac{2}{3} & -\frac{1}{3} \\ -\frac{1}{3} & -\frac{1}{3} & \frac{2}{3} \end{bmatrix} \cdot K_2 \cdot \begin{bmatrix} i_a \\ i_b \\ i_c \end{bmatrix} = R_s \cdot \begin{bmatrix} i_a \\ i_b \\ i_c \end{bmatrix} \quad (60)$$

For 3-phase system, we have $i_a+i_b+i_c=0$.
Combination of the above two equations yields
Select $K_1=0$; $K_2=R_s$. The equation (59) can be rewritten by $$\begin{cases} V_m \cdot (1-D_a) \cdot \text{sign}(i_a) = R_s \cdot i_a \\ V_m \cdot (1-D_b) \cdot \text{sign}(i_b) = R_s \cdot i_b \\ V_m \cdot (1-D_c) \cdot \text{sign}(i_c) = R_s \cdot i_c \end{cases} \Rightarrow \begin{cases} V_m \cdot (1-D_a) = R_s \cdot |i_a| \\ V_m \cdot (1-D_b) = R_s \cdot |i_b| \\ V_m \cdot (1-D_c) = R_s \cdot |i_c| \end{cases} \quad (61)$$

This is control key equation for VIENNA rectifier. The 3-phase rectifier with unity-power-factor can be achieved by realizing the equation (61). The implementation can be achieved by sensing inductor current and switching current.

Proposed UCI controller for VIENNA rectifier by sensing inductor current

Replacement of the $i_a$, $i_b$, $i_c$ with peak or average inductor current results in the control key equation:

$$\begin{cases} V_m \cdot (1-D_a) = R_s \cdot |i_{Lapk}| \\ V_m \cdot (1-D_b) = R_s \cdot |i_{Lbpk}| \\ V_m \cdot (1-D_c) = R_s \cdot |i_{Lcpk}| \end{cases} \text{ or } \begin{cases} V_m \cdot (1-D_a) = R_s \cdot |\langle i_{La} \rangle| \\ V_m \cdot (1-D_b) = R_s \cdot |\langle i_{La} \rangle| \\ V_m \cdot (1-D_c) = R_s \cdot |\langle i_{La} \rangle| \end{cases} \quad (62)$$

The above equation can be realized with integrator with reset. The proposed controller as well as its operation waveforms are shown in Figs.; where the integration time constant equals the switching period, i.e. $\tau=T_s$.

PSPICE simulation results for the VIENNA rectifier with proposed controller in Figs. (a) are shown in Fig. Simulation conditions are as follows: Input phase voltage 120 Vrms, Output voltage E=600 v; L=3 mH, f=10 KHz, P=4.2 KW. The measured THD is 1.2%.

Proposed UCI controller for VIENNA rectifier by sensing switching currents.

Figure 56:
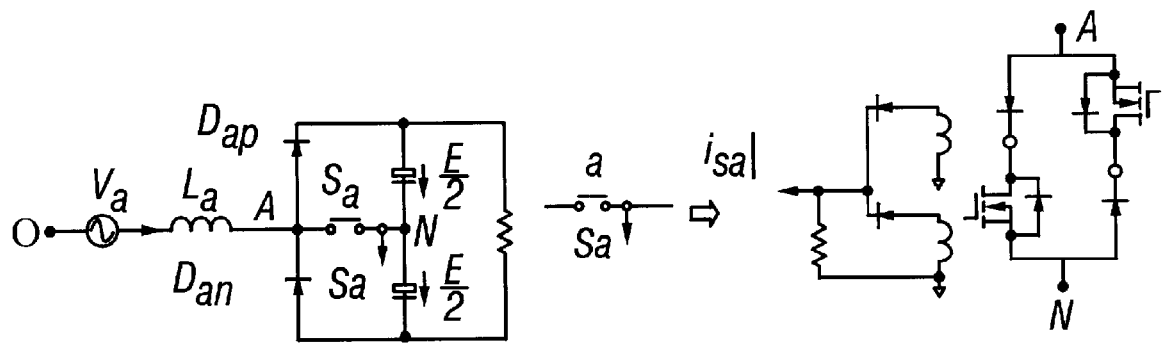
FIG. 56 is a schematic illustration of switching current sensing for VIENNA rectifier.

The VIENNA rectifier with unity-power-factor can also be implemented by sensing switching current which is easier and more cost effective comparing with the one that sensing the inductor currents. The relationship between switching current and inductor current is illustrated in FIG. 56.

When the inductor $L_a$ operates in CCM, the relationship between the inductor current and switching current is given by $$i_{Sapk} = i_{Lapk} \quad (63)$$

$$\langle i_{Sa} \rangle = D_a \cdot \langle i_{La} \rangle \quad (64)$$

Replace the inductor peak current with switching current in equation (62) yields $$\begin{cases} V_m \cdot (1-D_a) = R_s \cdot |i_{Sapk}| \\ V_m \cdot (1-D_b) = R_s \cdot |i_{Sbpk}| \\ V_m \cdot (1-D_c) = R_s \cdot |i_{Scpk}| \end{cases} \quad (65)$$

Figure 57:
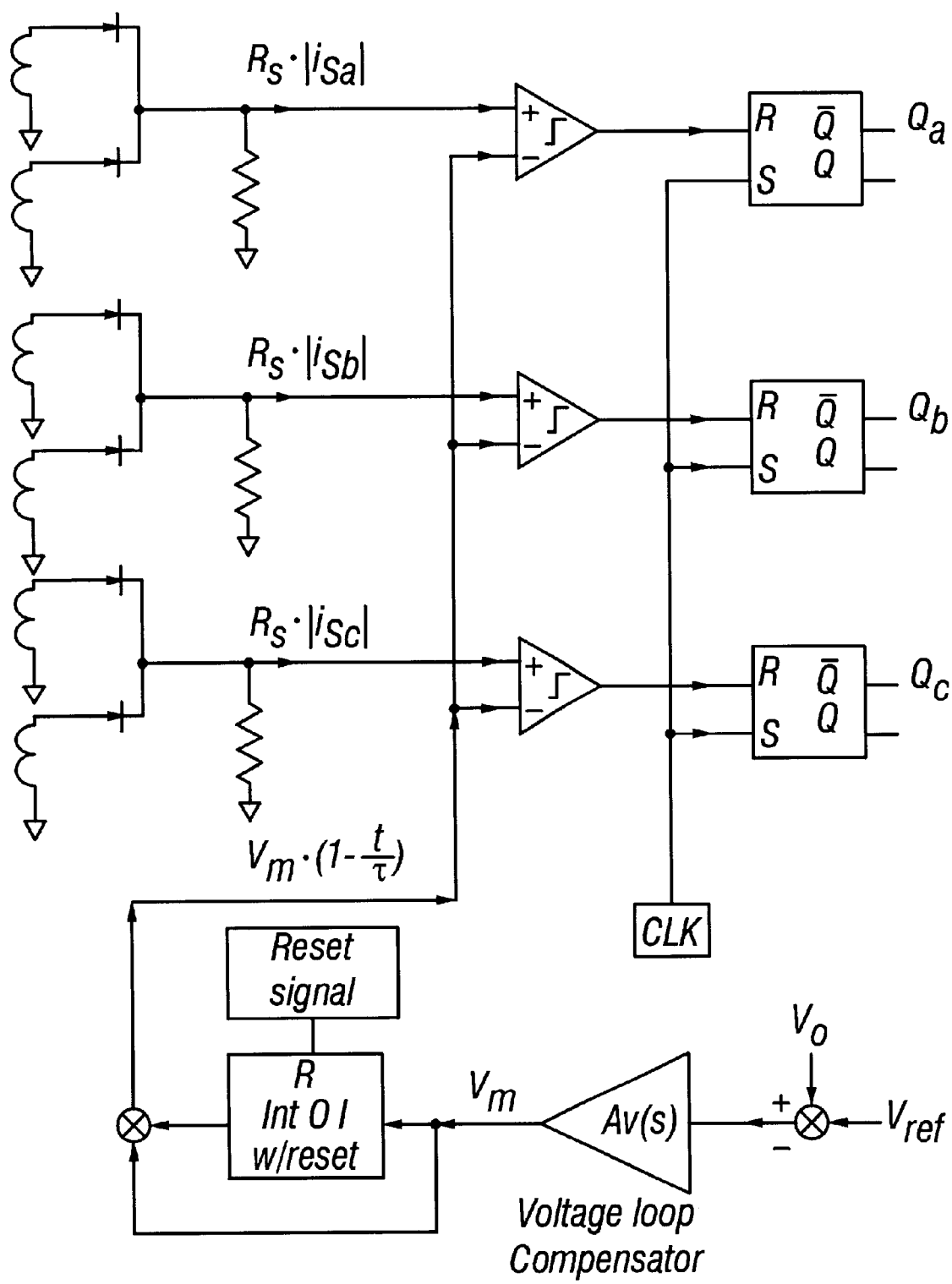
FIG. 57 is a schematic of 3-PFC controller for VIENNA rectifier with peak switching current mode control.
Figure 58A:
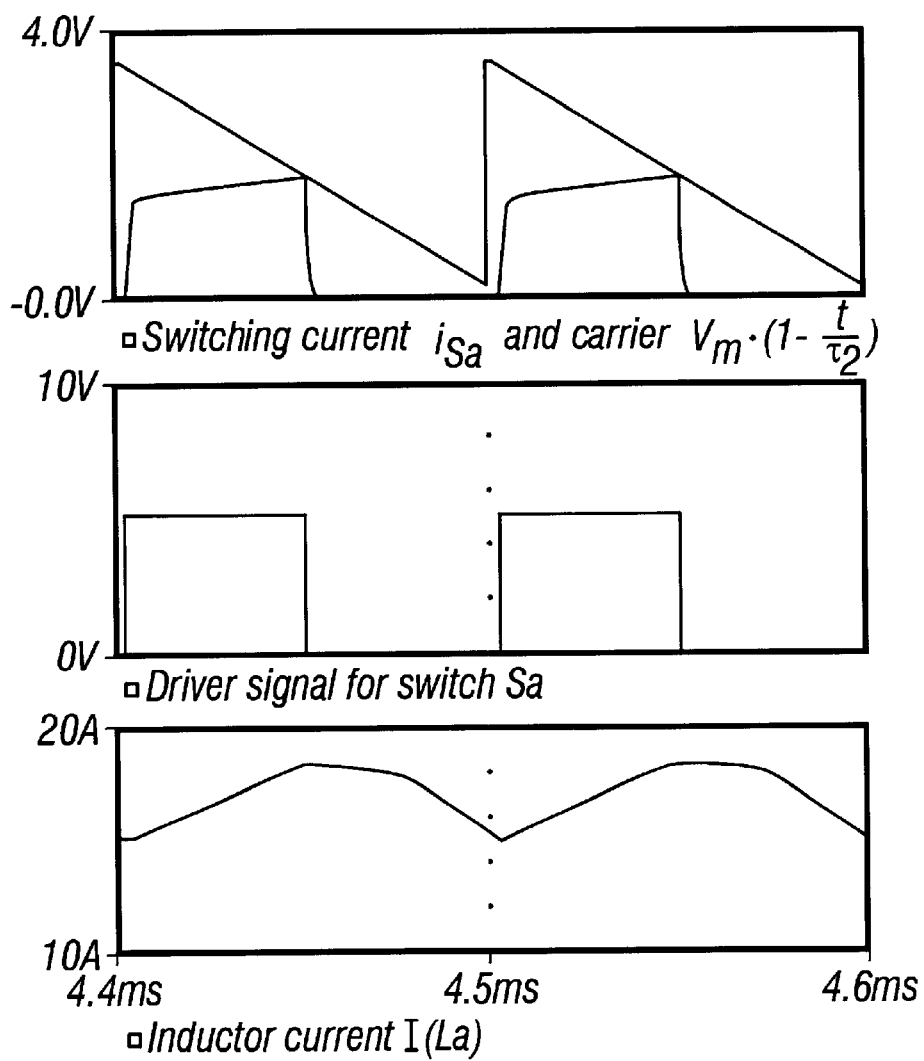
FIGS. 58a and 58b show the simulation results for 3-PFC for VIENNA rectifier with switching peak current control.
Figure 58B:
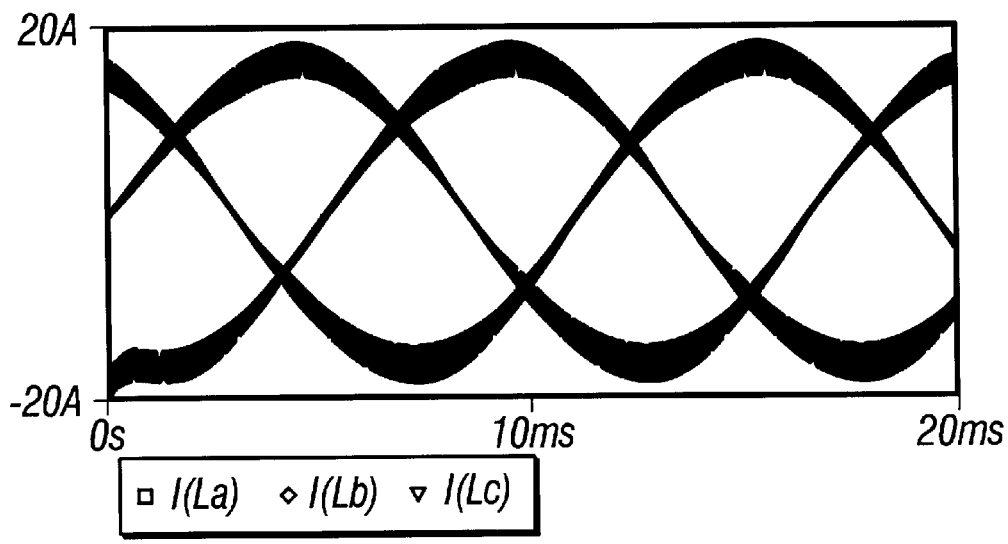

Equation (65) shows that 3-PFC for VIENNA rectifier can be realized by sensing switching current. The schematic is shown in FIG. 57. Simulation results are shown in FIGS. 58a and 58b. The simulation condition is the same as that discussed above. The measured THD is 2%.

The control based on switching peak current is sensitive to noise. Therefore, sensing average switching current is more desirable. Replace the average inductor current in equation (62) with average switching current in equation (64) yields $$\begin{cases} V_m \cdot (1-D_a) \cdot D_a = R_s \cdot |\langle i_{Sa} \rangle| \\ V_m \cdot (1-D_b) \cdot D_b = R_s \cdot |\langle i_{Sb} \rangle| \\ V_m \cdot (1-D_c) \cdot D_c = R_s \cdot |\langle i_{Sc} \rangle| \end{cases} \quad (66)$$

Figure 59:
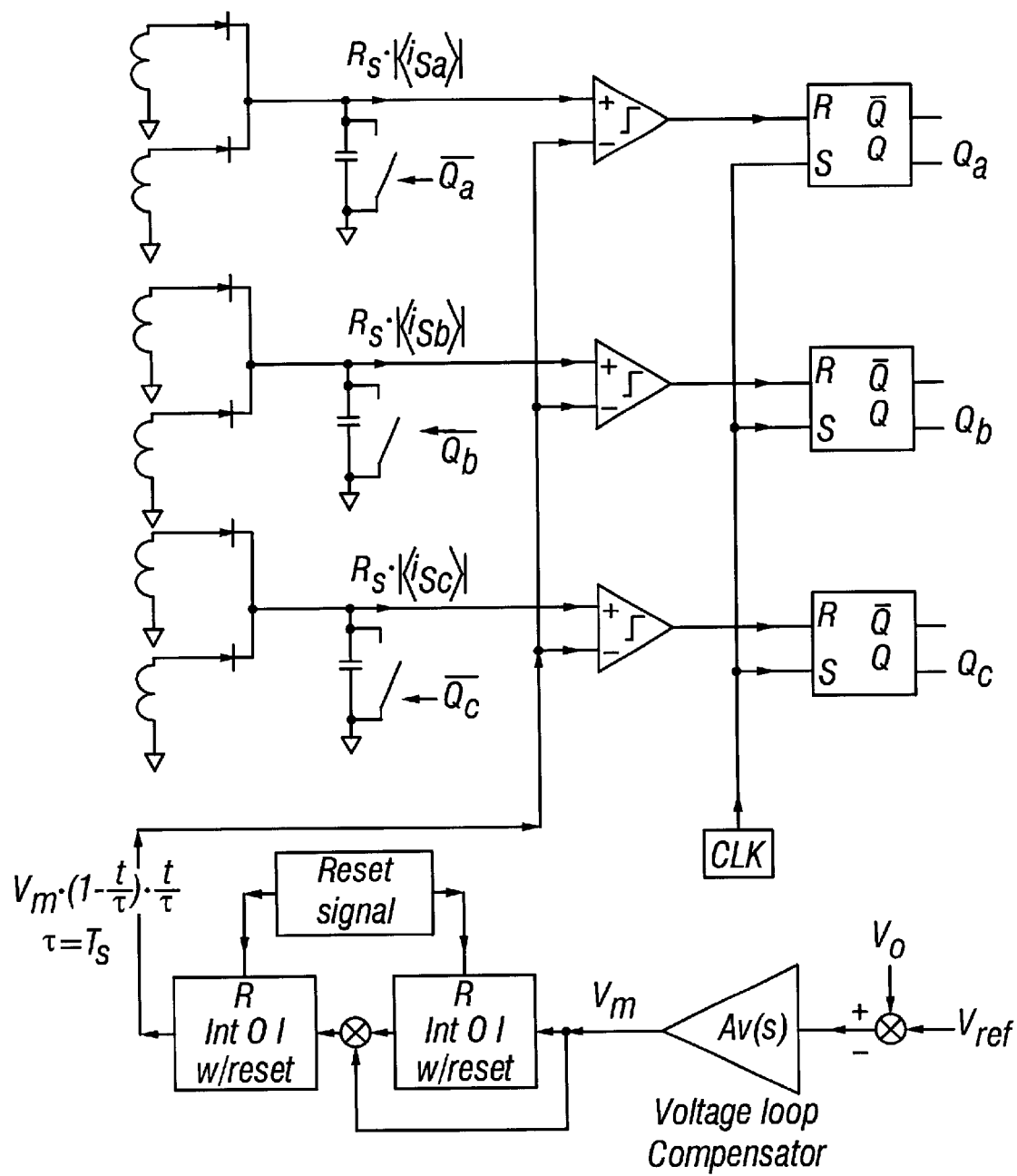
FIG. 59 is a schematic of control block for 3-PFC VIENNA rectifier with average switching current mode control.
Figure 60A:
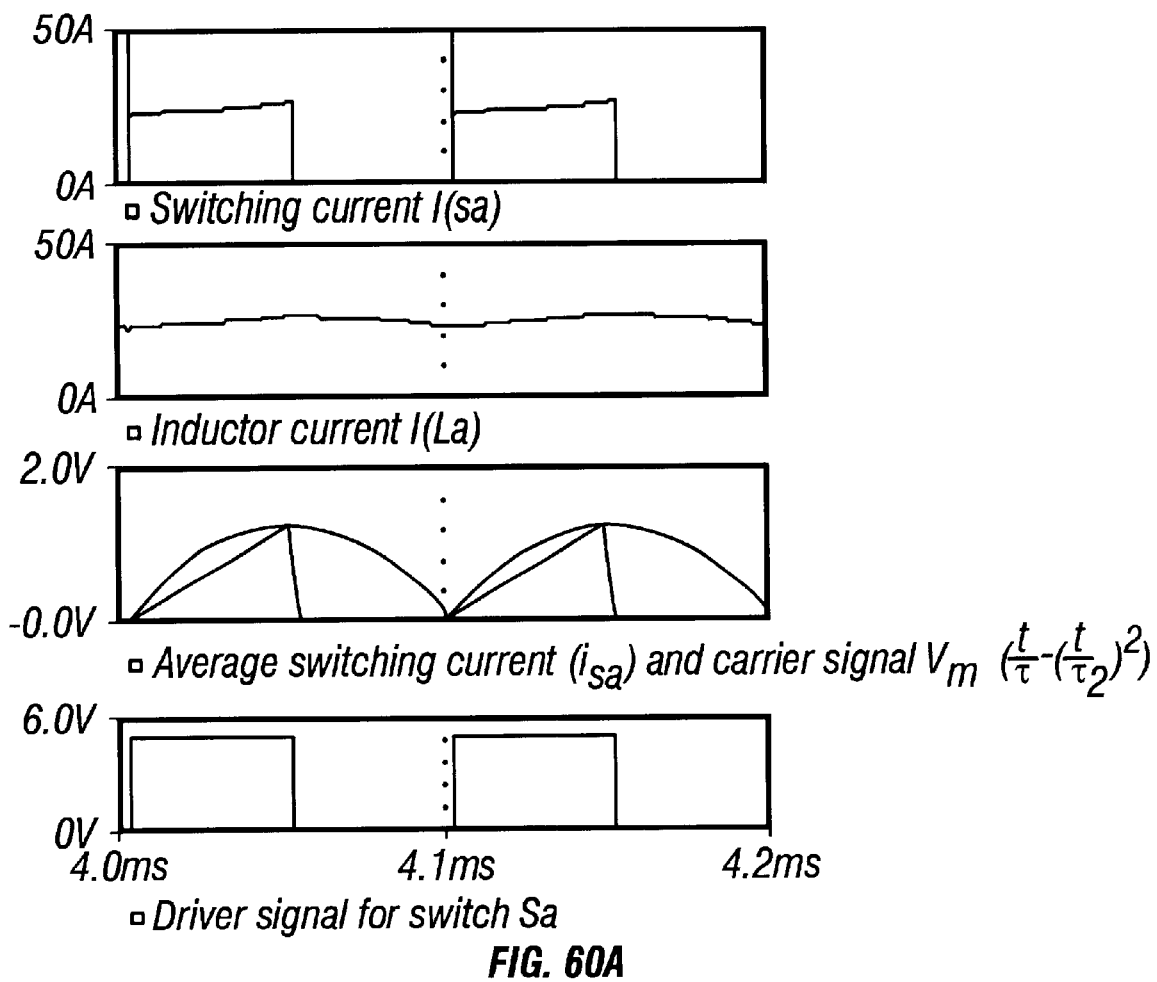
FIGS. 60a and 60b are graphs of simulated waveforms for 3-phase VIENNA rectifier with average switching current mode control.
Figure 60B:
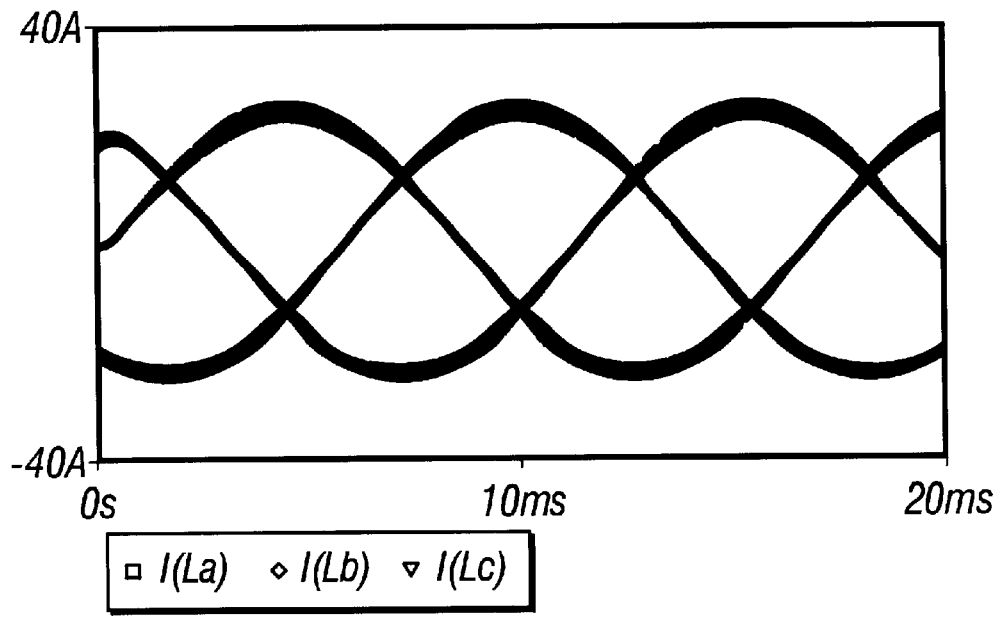

The item $V_{ml} \cdot (1-D_a) \cdot D_a$ can be realized with two integrators with reset. The schematic of control block for VIENNA rectifier based on average switching current mode control is shown in FIG. 59 and simulation results are shown in FIG. 60.

The simulation conditions are: the input voltage is 120 Vrms, the output voltage is 600 V; the switching frequency is 10 KHz, the power is 6 KW; and the measured THD is 0.3%.

Observation

A three-phase UCI PFC controller is developed based on one-cycle control in this document. It can be implemented with vector or bipolar operation. Vector operated UCI controller is suitable for rectifiers with parallel-connected dual-boost topologies and with series-connected dual-boost topologies. The proposed UCI controller contains an integrator with reset, a linear combinator, a clock, two comparators, two flip/flops, along with a few logic circuit to realize constant-frequency PFC control in all three phases. The control cores for parallel connected dual boost and series connected dual boost are identical except for a sign in the linear combinator. No multipliers are necessary. The circuit is simple and general that is applicable for most boost-derived rectifiers. With this control strategy, only two switches in a three-phase rectifier are operating at high switching frequency during each 60° of line cycle, thus low switching losses are resulted. For three-phase rectifiers based on parallel-connected dual boost topologies, the conduction losses are minimized and the switch current rating is reduced since only a small portion of input current flows into the switches $T_p$ and $T_n$. All findings are supported by simulation and/or experiments.

For the bipolar operated UCI controller, three topologies of rectifiers are investigated. For all the three topologies, the general equations to describe the inherent relationship between input phase voltage and switch duty ratios are derived. Based on one of the solutions for this equation, the Bipolar operated 3-phase UCI PFC controller is proposed. The proposed controller employs constant frequency modulation that is very desirable for industrial applications. It is composed of one or two integrators with reset along with several comparators and flip/flops. No multipliers are required. In most case, the bipolar operated UCI controller can be implemented by sensing inductor currents or switching currents. The theoretical analysis is verified by simulation.

The proposed UCI controller provides a high performance and low cost solution for realizing three-phase power factor correction. The logic circuit may be implemented by a programmable logic circuit. This controller provides a cost-effective integrated circuit solution to realize PFC for most boost-derived rectifiers.

Active Power Filters:

In its simplest terms the control method of the invention is based on one cycle control to realize an APF function given by:

$$I_s = \frac{1}{R_e} \cdot V_s$$

where $I_s$ is the source current matrix, $V_s$ is the source voltage matrix and $R_e$ the equivalent resistance by which the source is loaded. Since $$I_s = I_L + I_P$$

where the current $I_P$ is current matrix generated by the APF will automatically cancel the reactive component of the nonlinear load current $I_L$.

Every converter can be described by:

$$V_s = V_o \cdot M(D)$$

where M(D) is a function of the duty cycle D, and is called the conversion matrix. $V_o$ is the dc rail voltage. Again according to the invention the two equations above are combined so that the circuit realizes the performance described by:

$$I_s = \frac{V_o}{R_e} \cdot M(D)$$

If an equivalent current sensing resistor, $R_s$, is used to measure the source current, $I_s$, then the circuit performance can also be described by a control key equation:

$$R_s \cdot I_s = R_s \cdot (I_L + I_P) = \frac{R_s \cdot V_o}{R_e} \cdot M(D)$$

Where $$\frac{R_s \cdot V_o}{R_e}$$

can be expressed as $V_m$. Compared to the switching frequency, $V_m$ varies at much lower frequency, therefore it may be approximated by the output of the feedback compensator which is automatically adjusted whenever $$\frac{R_s \cdot V_o}{R_e}$$

has a discrepancy comparing to a reference value. The key control equation can be used with any boost-derived converter. For each solution, a control implementation is available based on one-cycle control. Those implementations can be roughly classified into two categories: (1) vector control as shown in FIG. 7 and (2) bipolar control as shown in FIG. 8.

Figure 7:
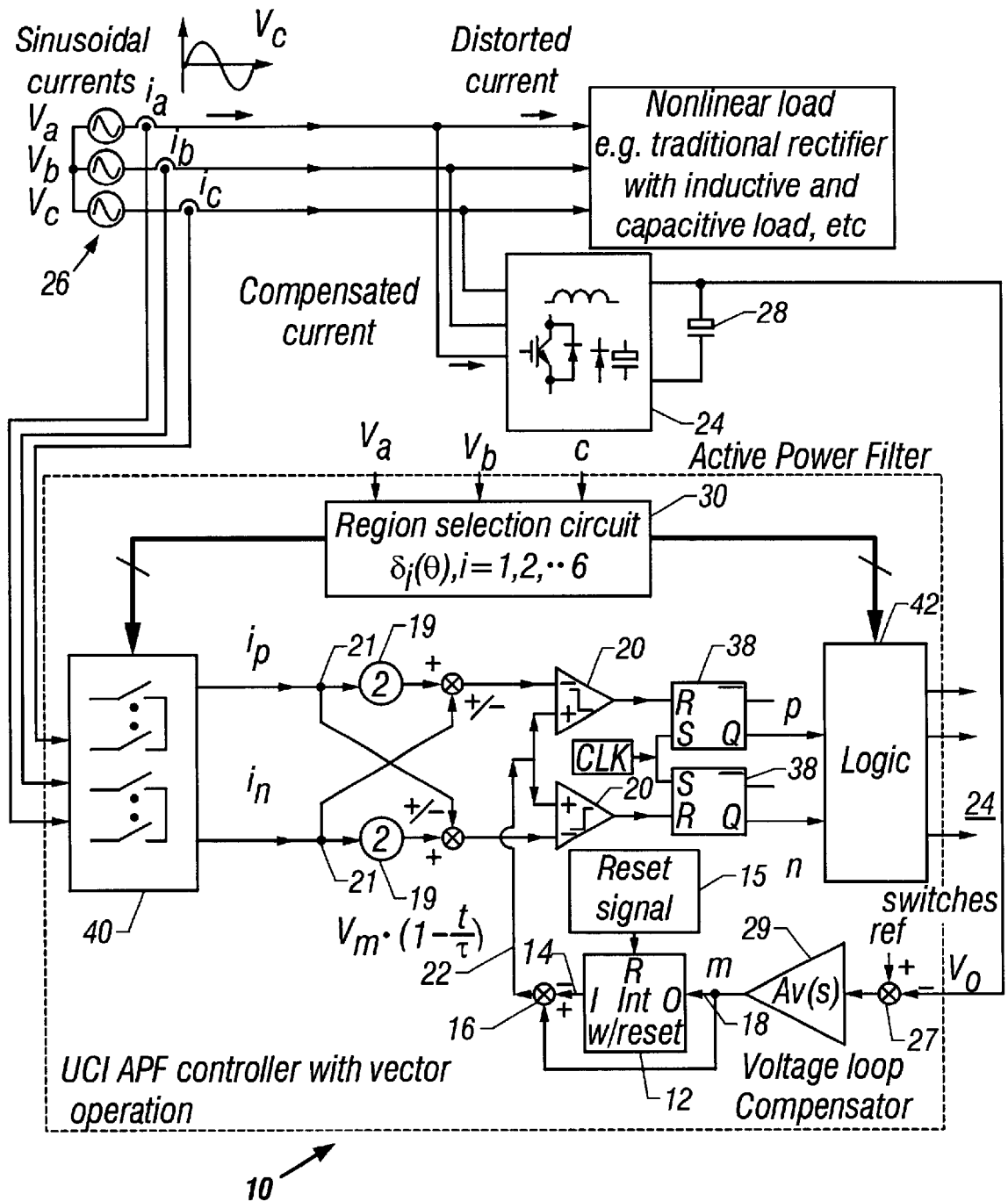
FIG. 7 is a schematic diagram of an active power filter (APF) with UCI control in vector mode according to the invention.

The control circuit 10 for vector control in FIG. 7 is comprised of an integrator 12 having an input with a reset circuit having its output 14 coupled to the input of an adder 16. The adder 16 has another input that is coupled to the input 18 of the integrator 12. The output 22 of the adder 16 is coupled to two comparators 20.

Figure 8:
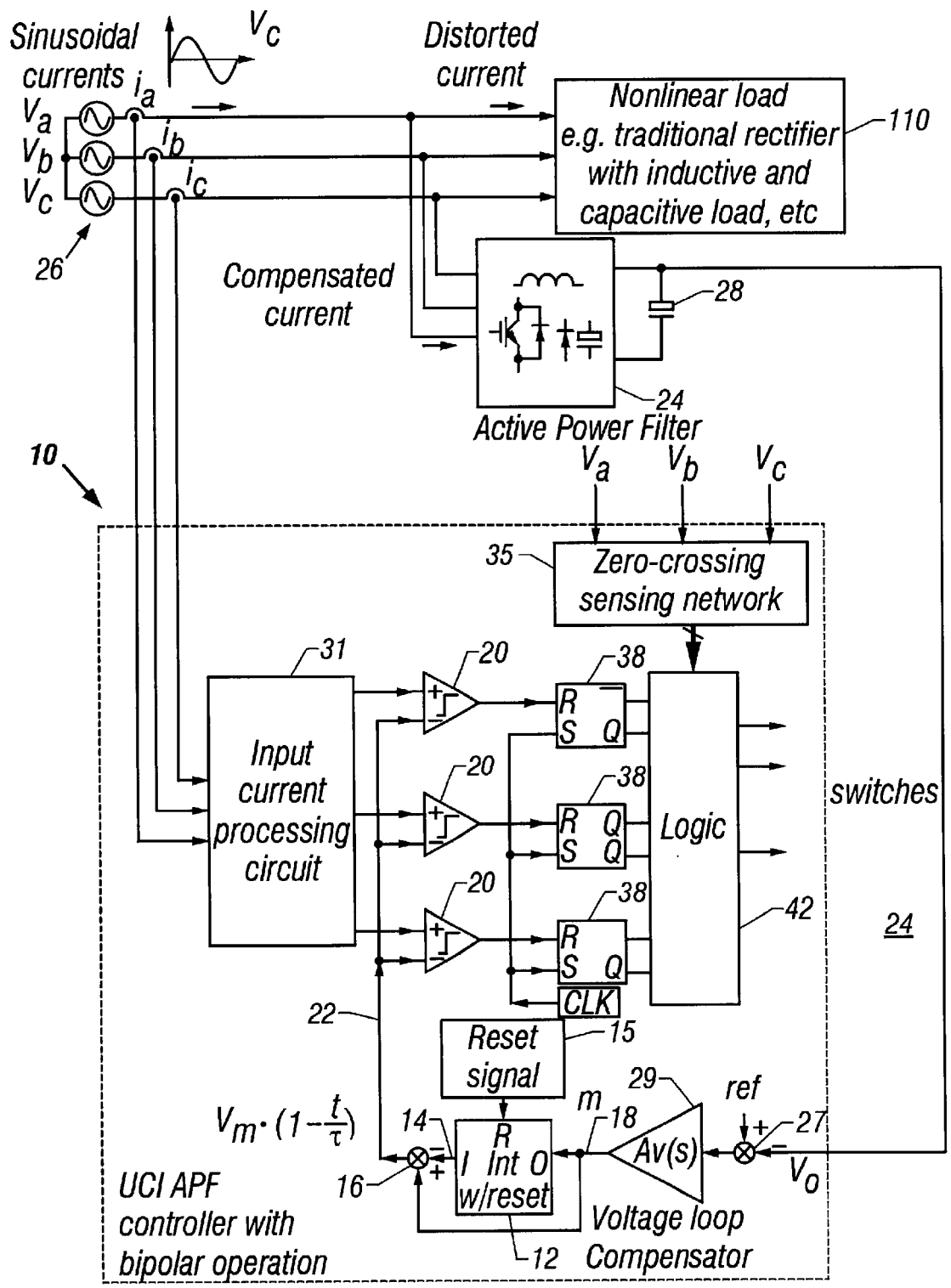
FIG. 8 is a schematic diagram of an active power filter (APF) with UCI control in bipolar mode according to the invention.

The control circuit 10 for bipolar control in FIG. 8 is comprised of an integrator 12 having an input with a reset circuit having its output 14 coupled to the input of an adder 16. The adder 16 has another input that is coupled to the input 18 of the integrator 12. The output 22 of the adder 16 is coupled to three comparators 20.

For vector control in FIG. 7, the control variable rotates in each 60° of line cycle, therefore, the input voltages are sensed that is used to decouple the sensed current signals and direct the trigger signals to the correct switches. For bipolar control in FIG. 8, the control variables do not rotates, therefore no decoupling circuitry is required. In this case, voltage sensing may or may not be necessary.

An unified constant-frequency integration (UCI) control of the active power filter is thus described above based on one-cycle control. This control method employs an integrator 12 with reset as the core component to control the duty ratio of an active power filter to realize net sinusoidal current draw from the ac source 26. Compared to previously proposed control methods, the UCI controller 10 features simpler circuitry, no need for multipliers, no need for generating current references that reflect the reactive and harmonic portion of the load current, and no need to sense the load current. Since the input current compensation is performed cycle by cycle, the compensated net current matches the input voltage closely, thus a unity power factor and low total harmonic distortion are achieved. Furthermore, since voltage across the energy storage capacitor 28 is kept constant in the steady state, minimum current is generated by the APF to realize harmonic current cancellation.

Active power filters with UCI control can also damp the transient due to sudden changes in the load current. Experimental and simulation result shows that the APF has excellent harmonic filtering capability demonstrated using many different nonlinear loads 110. This control method is applicable to most other APF topologies which are parallel connected in the AC side. Active power filters with UCI controller provide a cost-effective, highly reliable, and flexible solution for power quality control. Since the active power filter only processes the reactive and harmonic current, power losses and component rating should be lower compared to active power factor correcting methods. Due to the simplicity of the circuitry, it is very suitable for industrial production. For many existing nonlinear loads 110, unity power factor can be achieved by plugging an active filter to the AC inlet.

Digital implementation of UCI control method can be realized by programming the control key equation and the supporting logic and linear functions into a DSP chip. Since control key equation and the supporting logic and linear functions are very simple, a low cost DSP can be employed.

Besides Power Factor Correction (PFC), another solution to reduce the current harmonics in a traditional rectifier is to using Active Power Filters (APF). Shunt APF is a frequently used topology, which connects a three-phase converter in parallel to nonlinear load and cancels the reactive and harmonic currents from a group of nonlinear loads so that the resulting total current drawn from the ac main is sinusoidal. Because APF needs to generate just enough reactive and harmonic current to compensate the nonlinear loads in the line, only a fraction of the total power is processed by APF, which results in overall higher efficiency and power process capability. For high power applications, three-phase active power filter is preferred because nonlinear load draws large current from three-phase ac mains. In this part, the application of UCI controller for three-phase APF is discussed. It is found that the UCI controller for three-phase APF is similar to that in three-phase PFC applications. One of major differences is that in APF, the three-phase power stage need to be four-quadrant operated for proper operation. The other difference between PFC and APF applications is that the UCI controller for APF senses the ac main currents that are the sum of nonlinear load current and APF current. With the proposed UCI controller, the load current does not needed to be sensed or evaluated. No special and complicated computations are required for generating harmonic current reference. Furthermore, no multiplier and input voltage sensors are required. The controller is comprised of one integrator with reset, some comparators and flip-flops. Therefore, a simple analog solution is provided. The proposed controller for APF can be realized with vector or bipolar operation.

General diagram for UCI controlled three-phase APF

Figure 61A:
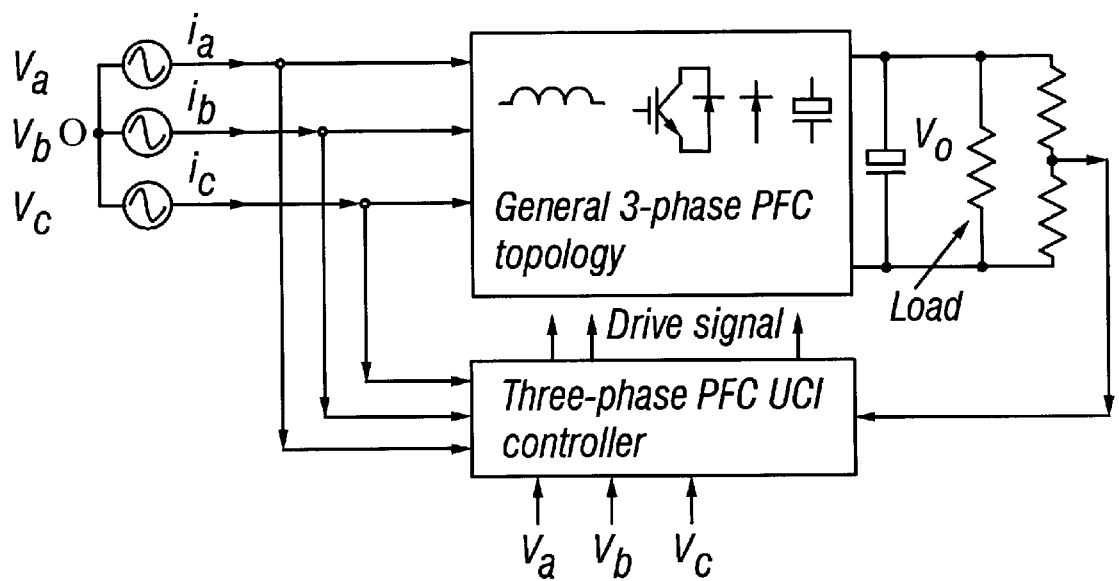
FIGS. 61a and 61b show a comparison between the general topology for UCI controlled 3-phase PFC and APF.
Figure 61B:
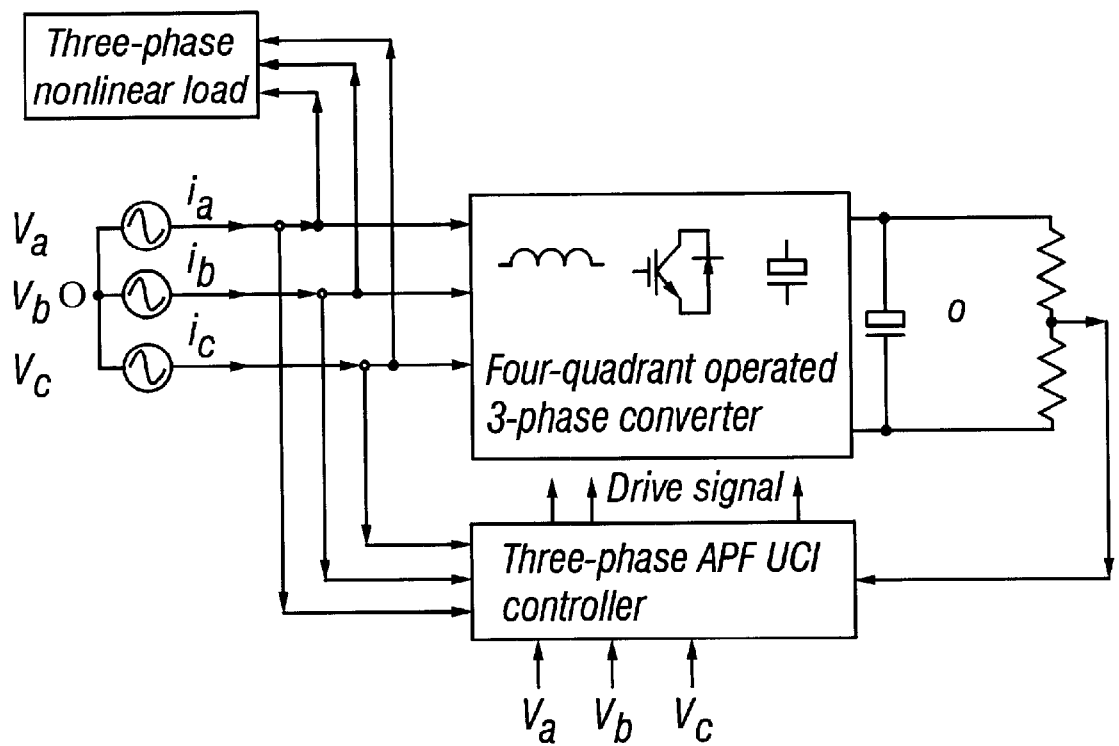

FIGS. 61a and 61b show the general diagram for 3-phase PFC and APF with UCI control. For 3-phase PFC, the controller senses the input phase current or input inductor current and force the input current follow input phase voltage. The topology in power stage transfers the input power to load and this topology doesn't need to process bi-direction power flow. Therefore, the input current may go to Discontinuous Conduction Mode (DCM). In contrast, in three-phase APF circuits, the controller senses the input phase currents that are the sum of load current and APF input current. The APF power stage only deals with the reactive power, so there is no load at the output of APF. At the unity-power-factor condition, the output voltage of APF $v_o$ is constant. Because the converters in power stage of APF have to process reactive power, four-quadrant operated converter is required. In other words, the three-phase converter should handle bi-direction energy flow and it is operated in Continuous Conduction Mode (CCM) in any load condition. Except that, the APF controller will be similar to that of three-phase PFC.

Three-phase APF with bipolar operated UCI controller

Three-phase APF with standard bridge converter

Figure 62:
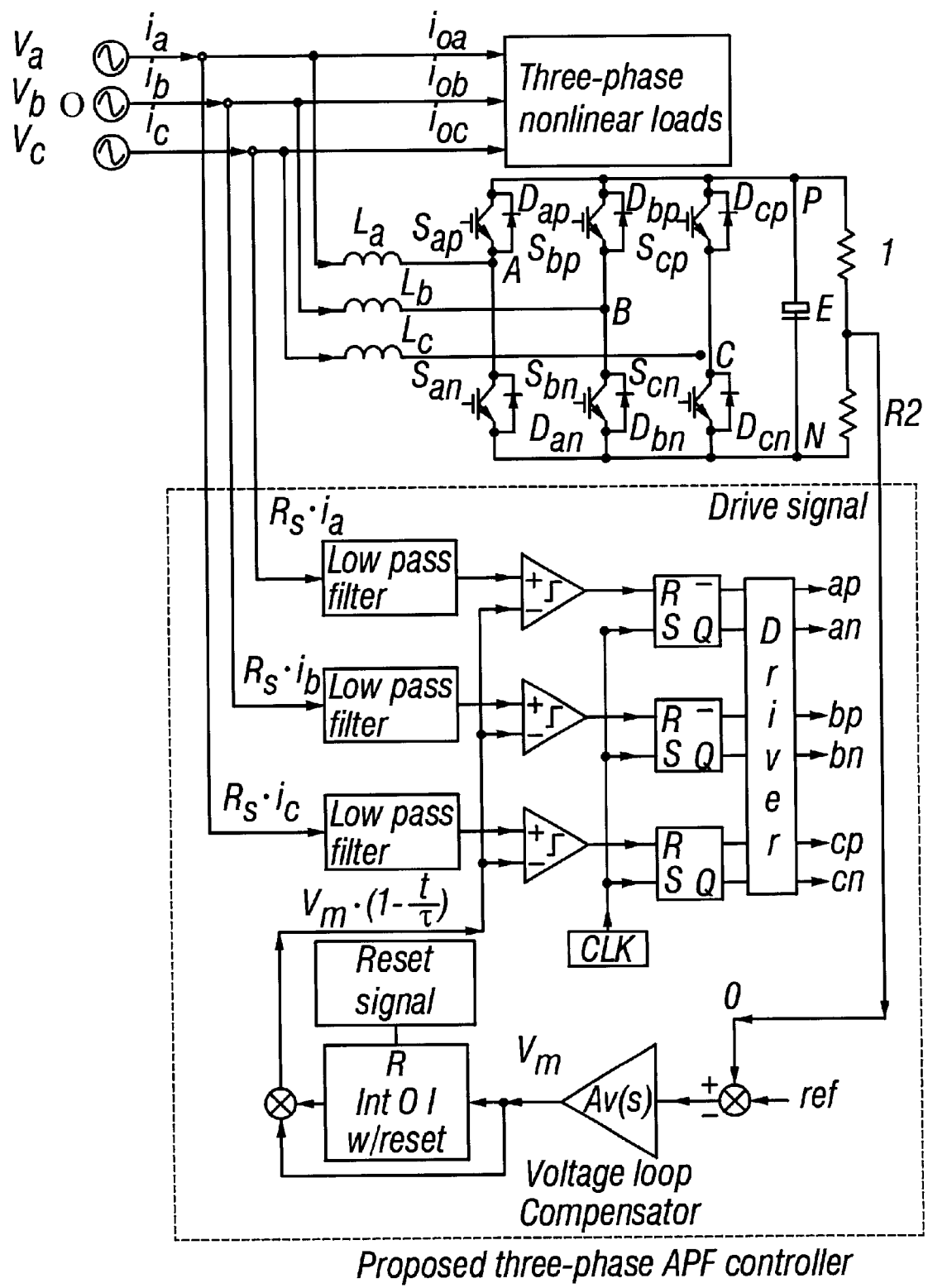
FIG. 62 is a schematic of three-phase APF with standard six-switch bridge converter and bipolar operated UCI controller.

FIG. 62 shows a schematic of typical three-phase APF employing a three-phase standard 6-switch bridge converter, where $i_c$ is phase C input current; $i_{Lc}$ is APF inductor current and $i_{oc}$ is nonlinear load current.

The analysis in this section is based on following assumption:

Constant frequency modulation is performed.

Because the APF requires energy can flow bi-direction between input and output DC capacitor, the driver signals to switches in each arm are set to be complementary. For example, the duty ratios for switches $S_{an}$, $S_{ap}$ are $D_{an}$ and $1-D_{an}$ respectively. In this case, the converter always operates in Continuous Conduction Mode (CCM).

Three-phase system is symmetrical.

Switching frequency is much higher than line frequency.

The converter is operated in Continuous Conduction Mode (CCM).

Since switching frequency is much higher than line frequency (50 or 60 Hz), the average node voltage for node A, B, C in FIG. 62 refer to the most negative rail of bridge "N" can be written as $$\begin{cases} V_{AN} \cdot (1-D_{an}) \cdot E \\ V_{BN} \cdot (1-D_{bn}) \cdot E \\ V_{CN} \cdot (1-D_{cn}) \cdot E \end{cases} \quad (67)$$

where $D_{an}$, $D_{bn}$, $D_{cn}$ are the duty ratios for switches $S_{an}$, $S_{bn}$, $S_{cn}$ and the duty ratios of $S_{ap}$, $S_{bp}$, $S_{bp}$ are $1-D_{an}$, $1-D_{bn}$, $1-D_{cn}$ respectively.

The average vector voltage at nodes A, B, C refer to the neutral point "O" equal the phase vector voltages minus the voltage across the inductors $L_a$, $L_b$, $L_c$ which is given by $$\begin{cases} \vec{V}_{AO} = \vec{V}_a - jwL \cdot \vec{i}_{La} \\ \vec{V}_{BO} = \vec{V}_b - jwL \cdot \vec{i}_{Lb} \\ \vec{V}_{CO} = \vec{V}_c - jwL \cdot \vec{i}_{Lc} \end{cases} \quad (68)$$

where L is inductance of APF and w is line angular frequency. $\vec{i}_{La}$, $\vec{i}_{Lb}$, $\vec{i}_{Lc}$ are vector inductor currents flowing through the inductor $L_a$, $L_b$, $L_c$. Because these inductors are operating in high frequency and the inductance $L_a$, $L_b$, $L_c$ are very small. For 60 Hz utility system, the voltages across the inductors $L_a$, $L_b$, $L_c$ such as $jwL \cdot \vec{i}_{La}$ can be neglected comparing with line phase voltage. Therefore, the equation (68) can be approximately equal to $$\begin{cases} \vec{V}_{AO} \approx \vec{V}_a \\ \vec{V}_{BO} \approx \vec{V}_b \\ \vec{V}_{CO} \approx \vec{V}_c \end{cases} \quad (69)$$

Follow the similar derivation shown in above, the inherent relationship between duty ratios and three-phase voltages is given by $$\begin{bmatrix} -\frac{2}{3} & \frac{1}{3} & \frac{1}{3} \\ \frac{1}{3} & -\frac{2}{3} & \frac{1}{3} \\ \frac{1}{3} & \frac{1}{3} & -\frac{2}{3} \end{bmatrix} \cdot \begin{bmatrix} d_{an} \\ d_{bn} \\ d_{cn} \end{bmatrix} = \frac{1}{E} \cdot \begin{bmatrix} V_a \\ V_b \\ V_c \end{bmatrix} \quad (70)$$

Comparing with 3-phase PFC with standard six-switch bridge rectifier, the relationships between duty ratios and phase voltage are identical. Therefore, by following the similar derivation shown above, the control key equation of APF can be derived as $$\begin{cases} R_s \cdot i_a = V_m - V_m \cdot \dfrac{D_{an}}{K_1} \\ R_s \cdot i_b = V_m - V_m \cdot \dfrac{D_{bn}}{K_1} \\ R_s \cdot i_c = V_m - V_m \cdot \dfrac{D_{cn}}{K_1} \end{cases} \quad (71)$$

where $V_m$ is the output of the APF voltage compensator, $K_1$ is a selected constant.

$$\frac{1}{M} \leq K_1 \leq 1 - \frac{1}{M} \quad (72)$$

where M is conversion ratio $$M = \frac{E}{\sqrt{2} \cdot V_i}. \quad (13)$$

Currents $i_a$, $i_b$, $i_c$ are input phase current. For three-phase nonlinear load 110 with 3 phase APF, the input phase currents are sum of input nonlinear load current and three-phase inductor current of APF as shown in FIG. 62. Therefore, the equation (71) can be rewritten as:

$$\begin{cases} R_S \cdot i_a = R_S \cdot (i_{La} + i_{oa}) = V_m - V_m \dfrac{D_{an}}{K_1} \\ R_S \cdot i_b = R_S \cdot (i_{Lb} + i_{ob}) = V_m - V_m \dfrac{D_{bn}}{K_1} \\ R_S \cdot i_c = R_S \cdot (i_{Lc} + i_{oc}) = V_m - V_m \dfrac{D_{cn}}{K_1} \end{cases} \quad (74)$$

Figure 63:
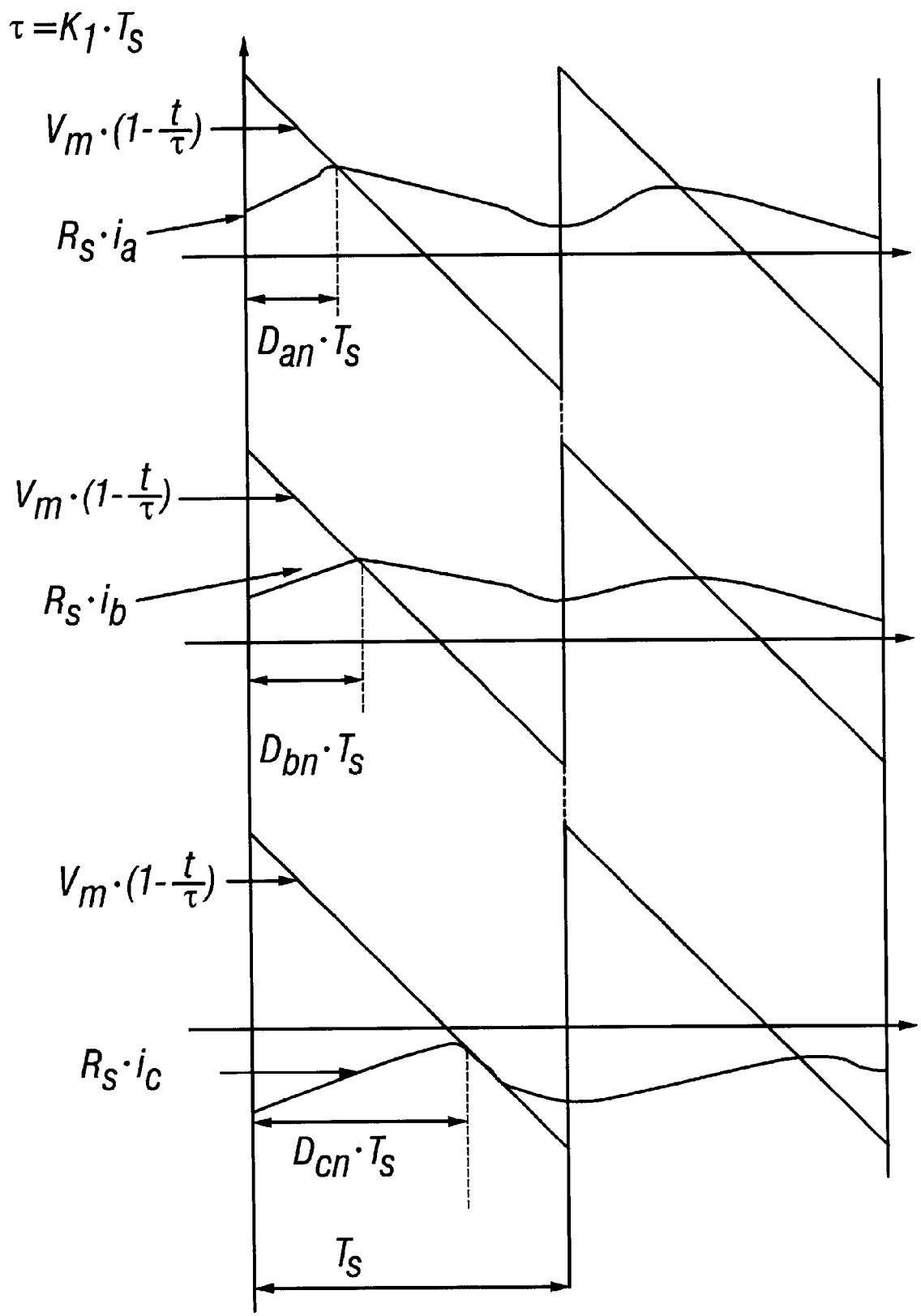
FIG. 63 is an implementation of equation 38 with integrator with reset.

The above equation indicates the inherent relationship between the input phase current, duty ratios of switches and voltage compensator output under unity-power-factor condition. This control key equation is similar to that of three-phase PFC with UCI controller. The only difference lies that the APF sense the sum of the load current and converter input current. The UCI controller for PFC senses the converter input current only. Similar to UCI controlled PFC with standard six-switch boost rectifier, the APF can also be be implemented with an integrator with reset as shown in the control box of FIG. 62. The overall schematic of three-phase APF with proposed control approach is shown in FIG. 62; where $Q_{ap}$, $Q_{an}$ ... $Q_{cn}$ are controller signal for switches $s_{ap}$, $S_{an}$ ... $S_{cn}$ respectively. In FIG. 62, the time constant of the integrator is set to be $\tau=K_1 \cdot T_s$; where $T_s$ is switching period. The operation waveforms are illustrated in FIG. 63. By controlling the duty ratio to follow the relationship shown in equation 74, three-phase APF can be achieved.

FIG. 62 shows that three-phase APF can be achieved with three flip-flops and one integrator with reset as well as some linear components. No voltage sensors and multipliers are required. In order to prevent the short circuit, dead time for complementary switches such as $S_{an}$, $S_{ap}$ need to be considered.

Figure 64:
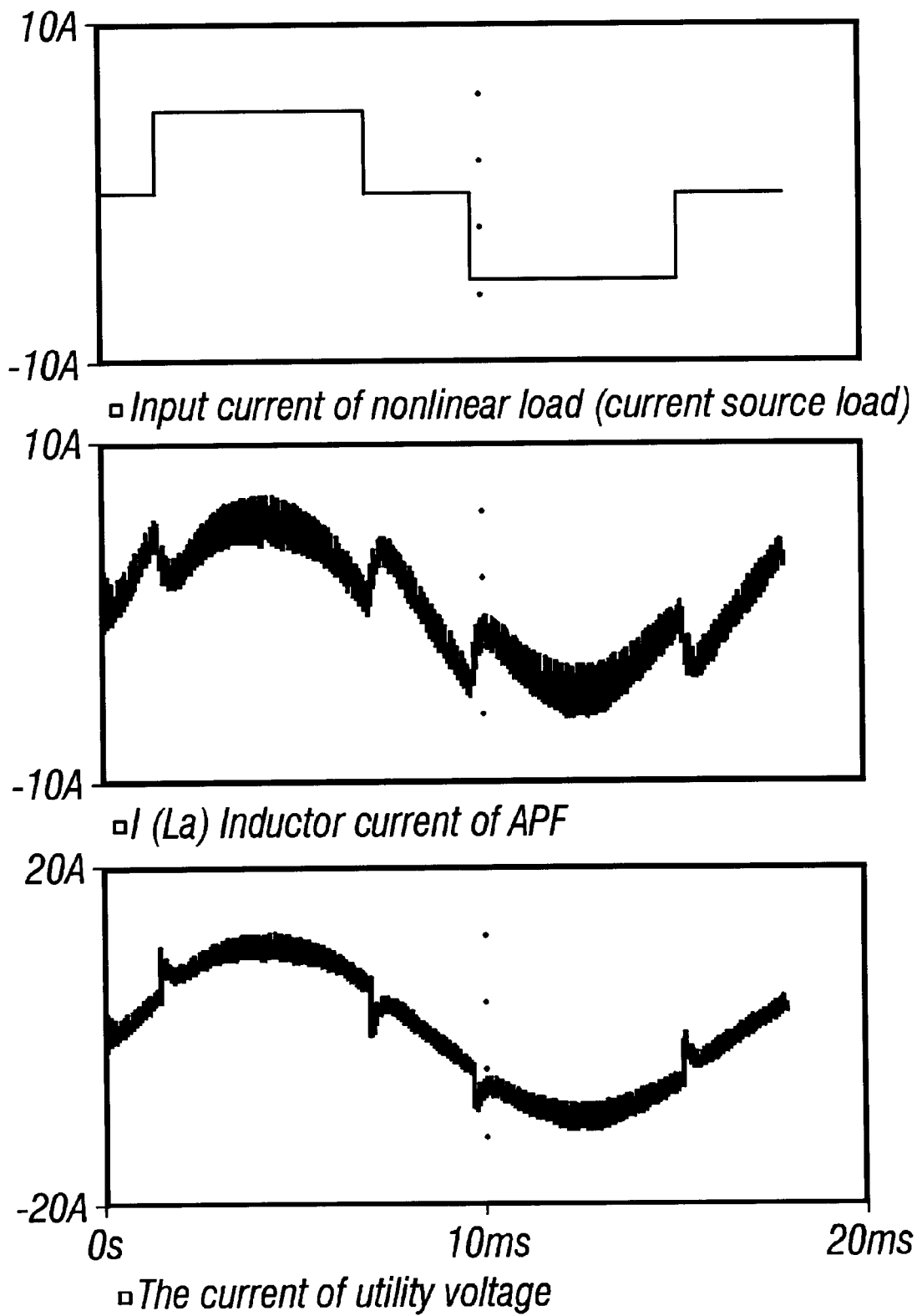
FIG. 64 is a graph of the simulation results for active power filter with proposed controller in FIG. 62.

In order to verify the idea, PSPICE simulation results are given in FIG. 64. The PSPICE simulation conditions are as follows: Input voltage 120 Vrms, Output voltage E=500 v; L=3 mH, f=10 KHz, P=1.5 KW. The conversion ration $$M = \dfrac{V_o}{\sqrt{2} \cdot V_{grms}} = 2946.$$

The parameter $K_1$ is limited in the range of (0.339, 0.660) according to the equation (72). In this simulation, parameter $K_1$=0.4.

Other variation of three-phase APF with bipolar operated UCI controller

Figure 65:
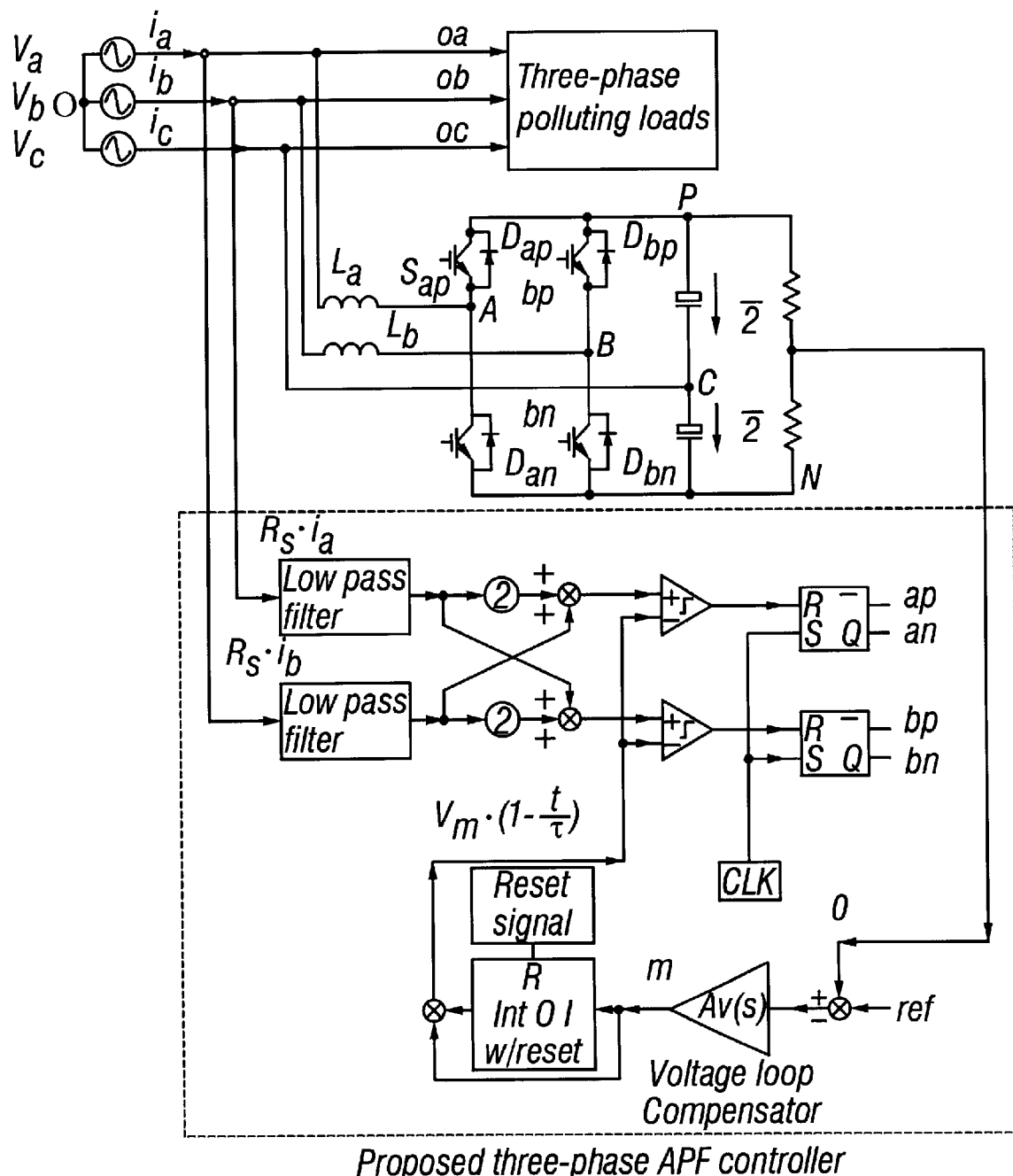
FIG. 65 is a schematic of three-phase APF diagram based on 3-phase bridge with reduced switch count.
Figure 66:
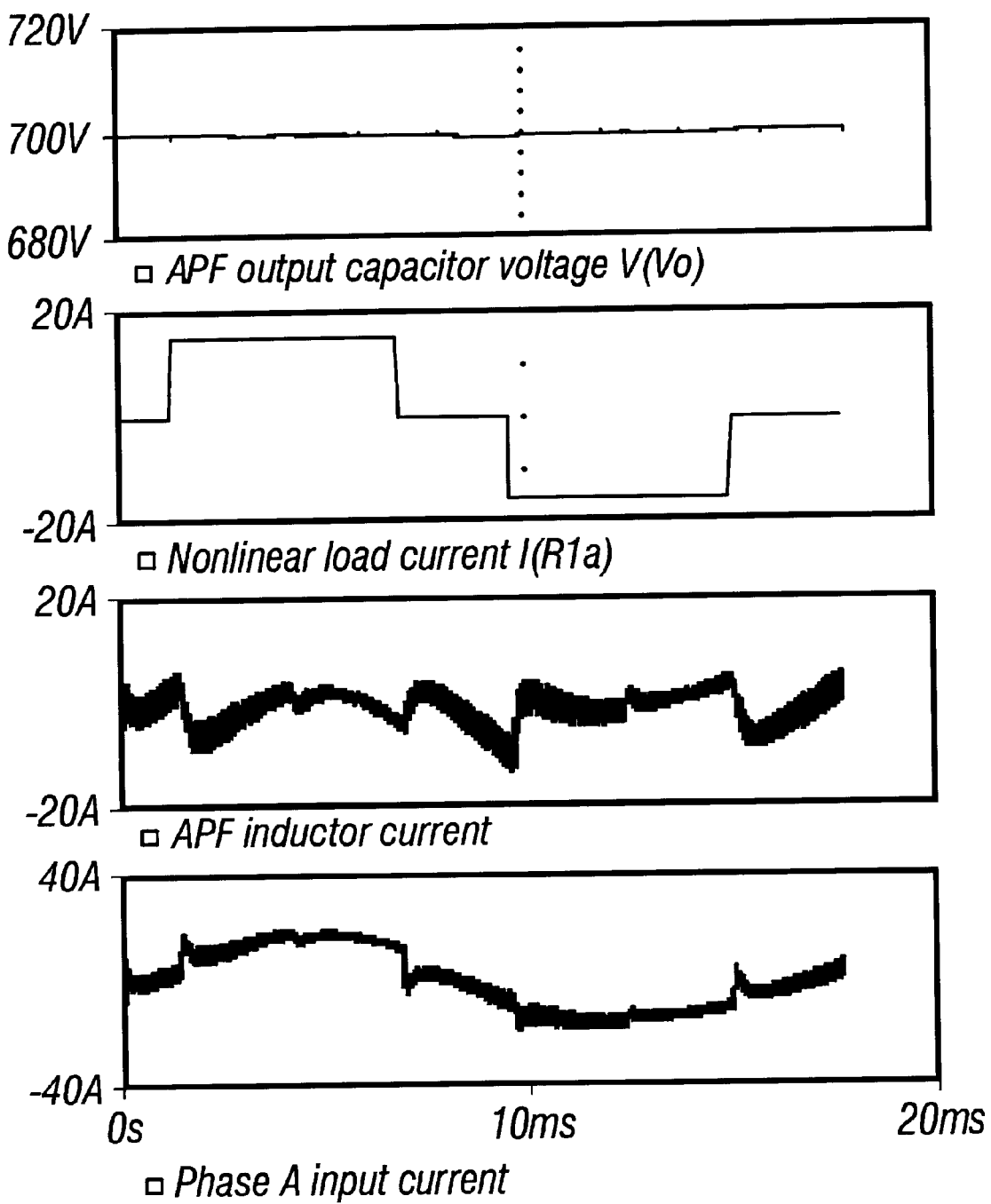
FIG. 66 is a graph of the simulation results for three-phase APF in FIG. 65.

The above discussion shows that the APF with unity-power-factor can be implemented with a standard bride. Several variations of three-phase APF are possible and are listed here. FIG. 65 shows a three-phase APF with reduced switch count and center tapped output capacitor.

The control key equation for APF in FIG. 65 is as follows:

$$V_m \cdot \begin{bmatrix} 1-2 \cdot D_{an} \\ 1-2 \cdot D_{bn} \end{bmatrix} = R_s \cdot \begin{bmatrix} 2 & 1 \\ 1 & 2 \end{bmatrix} \cdot \begin{bmatrix} i_a \\ i_b \end{bmatrix} = R_s \cdot \begin{bmatrix} 2 & 1 \\ 1 & 2 \end{bmatrix} \cdot \begin{bmatrix} i_{La}+i_{oa} \\ i_{Lb}+i_{ob} \end{bmatrix} \quad (75)$$

where the control key equation and control block is similar to that of UCI controller for PFC applications except the sum of the load currents $i_{oa}$, $i_{ob}$ and inductor currents $i_{La}$, $i_{Lb}$ are sensed.

The simulation results are shown in FIG. 65. Simulation condition is as follows: Input voltage 120 Vrms, Output voltage E=700 v; L=3 mH, f=10 KHz, P=5 KW. Although this topology saves two switches comparing with the APF in FIG. 62, the switching voltage stress is increased.

Figure 67:
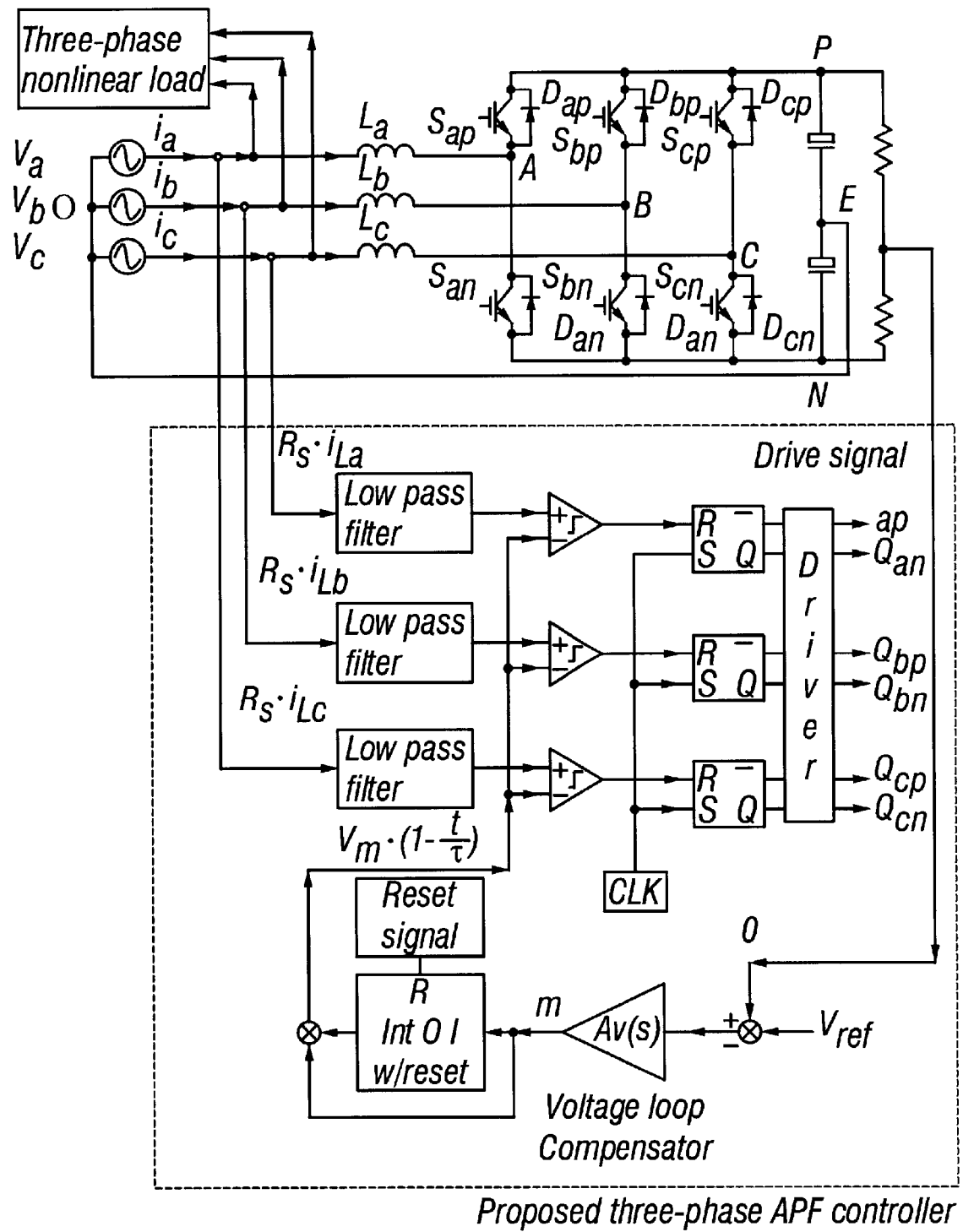
FIG. 67 is a schematic of three-phase APF with half-bridge configuration

Another example is three-phase half bridge topology as shown in FIG. 67. Comparing with the schematic in FIG. 62, there are two differences.

A neutral line is required with three-phase half-bridge APF configuration.

The integrator time constant τ must be set to be half of switching period.

One advantage of this topology lies in that the switch voltage stress is one half of the total output voltage, which is lower than that of standard bridge rectifier configuration. Because three-phase is symmetric system, the average current flows into the center of output capacitor during each line cycle is zero. The neutral line can be eliminated. This will result in the same configuration as FIG. 62.

Three-phase APF with vector operated UCI controller

One of the advantages for bipolar operated UCI controller is that no voltage reference is sensed. The controller is simple and robust. However, during each switching cycle, all the six switches are controlled. In fact, three duty ratios are generated. Only three switches will suffer high switching losses. The complementary switches are usually turned on under zero-voltage condition. Therefore, three switches are hard-switch turned on and switching losses is expected to be higher. Employing vector operated UCI controller can reduce the switching losses.

As shown in last section, equation (75) displays the inherent relationship between duty ratio and voltage sources. There are infinite solutions for equation (29). Different solution will result in different control approach. If we set one duty ratio of switch to be zero or one, the other two duty ratios can be solved through equation (29). The resulted solution will generate one control approach with less switching losses because less high switching frequency switches will be controlled during each switching cycle. Therefore, switching losses can be reduced. This is the basic concept of the vector operated UCI controller for APF applications.

Figure 68:
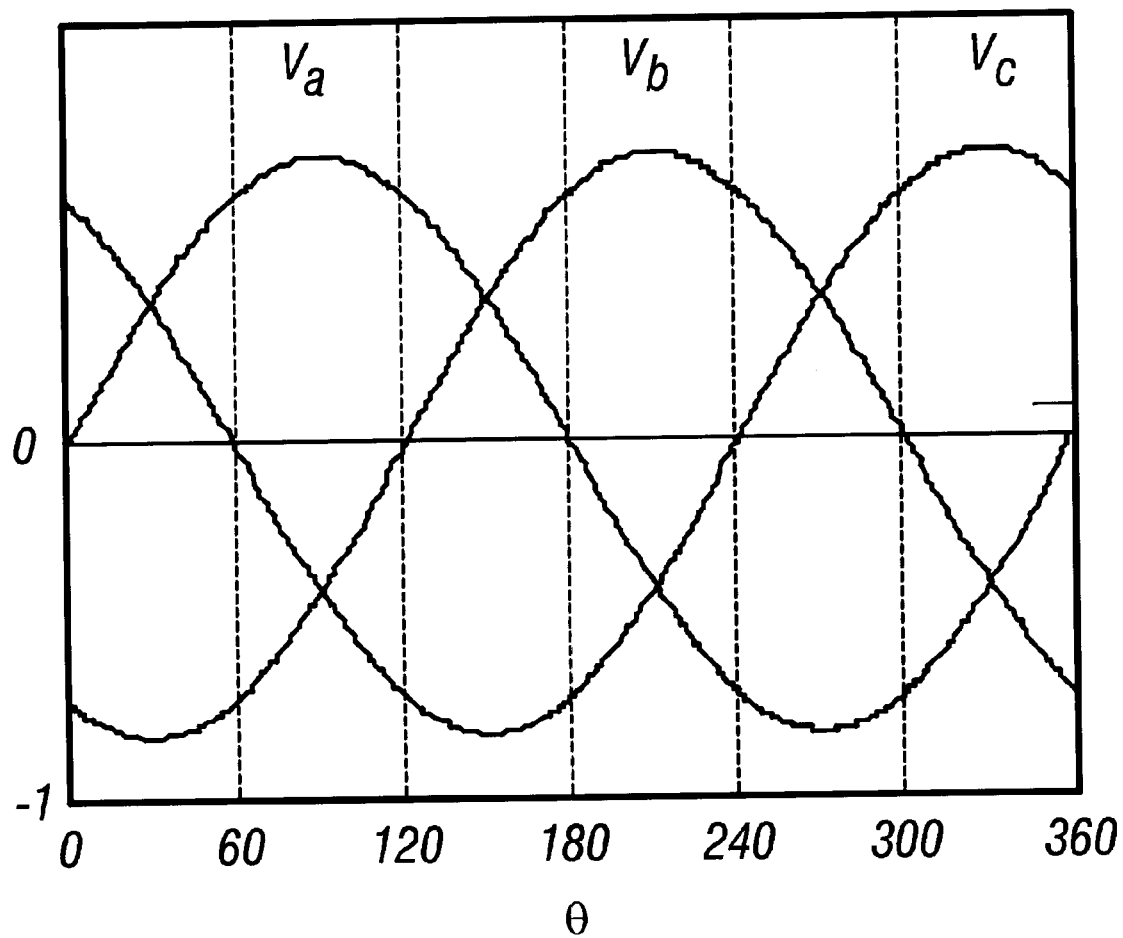
FIG. 68 is a graph of three-phase voltage waveforms.

Three-phase voltage waveforms are shown in FIG. 68. Consider the 0~60° of three-phase system shown in FIG. 68, by setting $D_{bn}$=1, i.e. switch $S_{bn}$ are turned on during the whole 60° region. Substituting $D_{bn}$=1 into general equation (75), the following relationship is obtained.

$$\begin{cases} 1-D_{an} = \dfrac{V_c}{E} + \dfrac{2 \cdot V_a}{E} \\ D_{bn} = 1 \\ 1-D_{cn} = \dfrac{2 \cdot V_c}{E} + \dfrac{V_a}{E} \end{cases} \quad (76)$$

We assume unity-power-factor can be achieved with active power filter, i.e.

$$\begin{cases} V_a = R_e \cdot i_a \\ V_b = R_e \cdot i_b \\ V_c = R_e \cdot i_c. \end{cases} \quad (77)$$

Substituting equation (77) into (76) yields:

$$\begin{cases} 1-D_{an} = \dfrac{R_e}{E \cdot R_S} \cdot (2 \cdot R_S \cdot i_a + R_S \cdot i_c) \\ 1-D_{cn} = \dfrac{R_e}{E \cdot R_S} \cdot (2 \cdot R_S \cdot i_c + R_S \cdot i_a) \end{cases} \quad (78)$$

Again, by setting $$V_m = \frac{E \cdot R_S}{R_e},$$

the above equation can be simplified as $$\begin{bmatrix} V_m - V_m \cdot D_{an} \\ V_m - V_m \cdot D_{cn} \end{bmatrix} = R_S \cdot \begin{bmatrix} 2 & 1 \\ 1 & 2 \end{bmatrix} \cdot \begin{bmatrix} i_a \\ i_c \end{bmatrix} \quad (79)$$

By controlling the duty ratio $D_{an}$, $D_{cn}$ to satisfy the above equation, we can control the current $i_a$, $i_c$ to follow the phase voltage $V_a$, $V_c$ respectively. Unity-power-factor can be achieved.

With this approach, during each switching cycle, only four switches (two hard switches and two soft-switches) are controlled. Switching losses are expected to be one-third lower than the previous proposed 3-phase active power filter. During the next 60°, we set $D_{an}=0$ and switch $S_{ap}$ is ON instead. Input current $i_b$, $i_c$ are needed to sense and controlled. Overall, the equation (79) can be rewritten as $$V_m \cdot \begin{bmatrix} 1 - d_p \\ 1 - d_n \end{bmatrix} = R_s \cdot \begin{bmatrix} 2 & 1 \\ 1 & 2 \end{bmatrix} \cdot \begin{bmatrix} \langle i_{Lp} \rangle \\ \langle i_{Ln} \rangle \end{bmatrix} \quad (80)$$

where $d_p$, $d_n$, $\langle i_{Lp} \rangle$, $\langle i_{Ln} \rangle$ are varied from one 60° region to another. For example, during 0~60°, $d_p=d_{an}$; $d_n=d_{cn}$, $\langle i_{Lp} \rangle = i_a$; $\langle i_{Ln} \rangle = i_c$.

Based on equation (80), a vector operated UCI controller for APF is resulted. The above equation can also be solved with an integrator with reset. The diagram is shown in the core section of FIG. 69. Overall, the control block for three-phase APF with this method is shown in FIG. 69.

Figure 69:
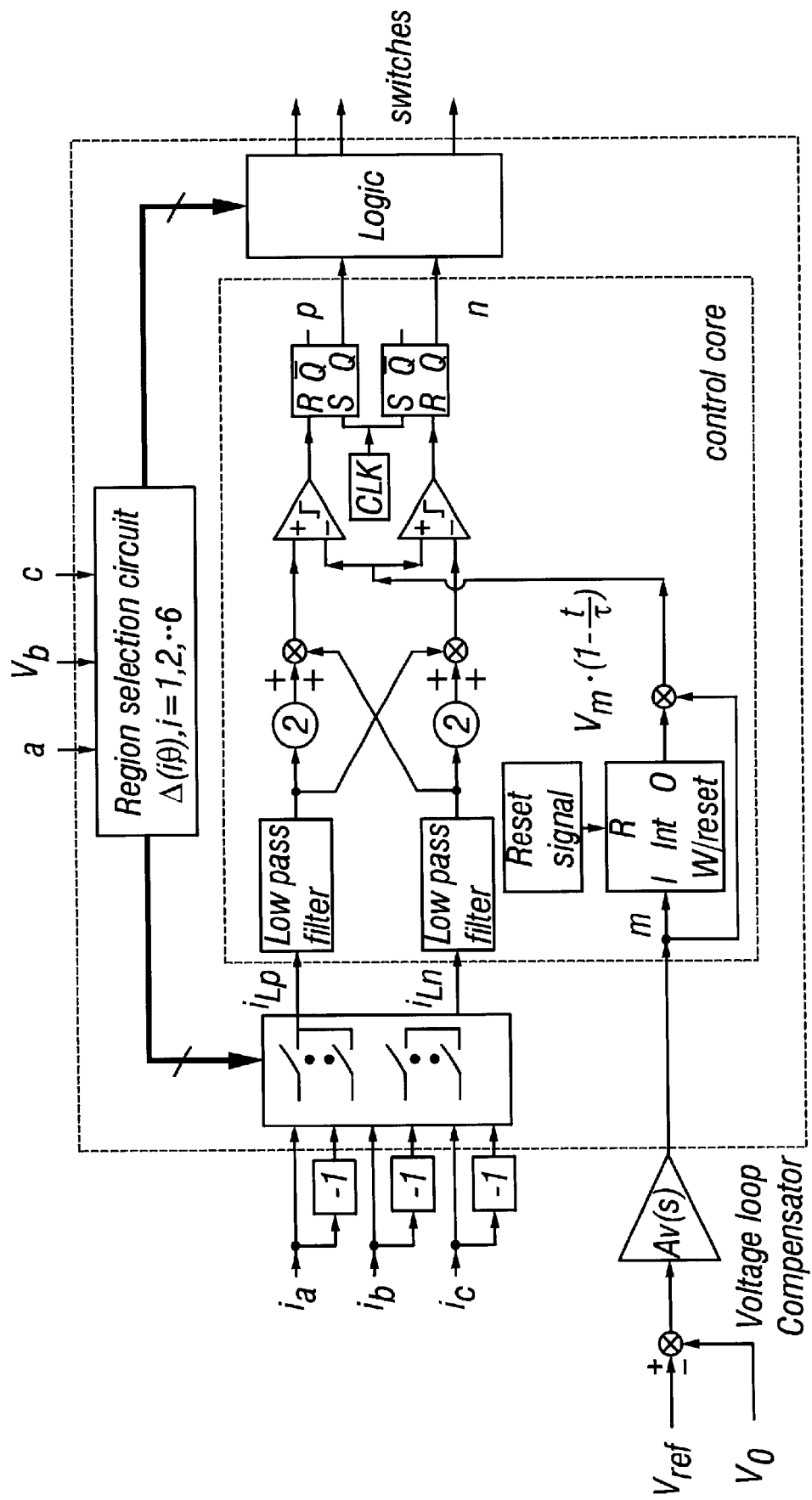
FIG. 69 is a diagram of vector operated UCI controller for 3-phase APF.

This control block includes four sections:

The control block in FIG. 69 contains four sections:

(1) Region selection circuit that is same as that of 3-phase PFC with vector operated UCI control.

Input multiplex circuit which is used to select the input inductor current in order to configure the $\langle i_{Lp} \rangle$ and $\langle i_{Ln} \rangle$. The input current is the sum of APF input inductor current and load current. In addition, the $\langle i_{Lp} \rangle$ and $\langle i_{Ln} \rangle$ are functions of input currents and selection function $\Delta(i,\theta)$. The equivalent currents $\langle i_{Lp} \rangle$ and $\langle i_{Ln} \rangle$ during each 60° are listed in Table XII.

(2) Control core-duty cycle calculator: including an adder, two comparators and an integrator with reset as well as two flip-flops. It is used to realize the equation (80). The integration time constant of integrator is set to be exactly equal the switching period.

Figure 70:
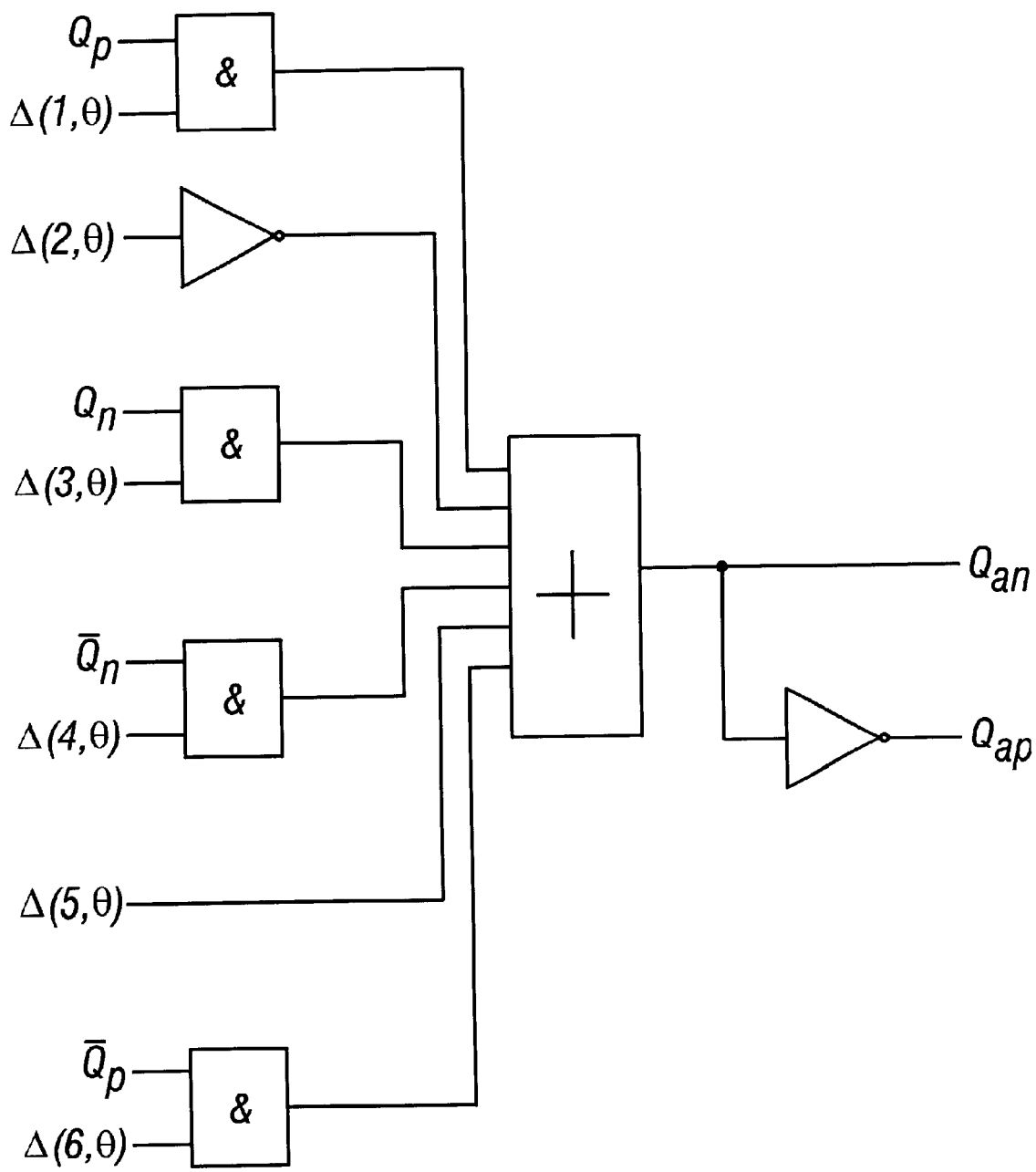
FIG. 70 is a schematic of logic circuit for switching drive signal $Q_{an}$ and $Q_{ap}$.

(3) Output logic circuit, which applies the equivalent switching control signal $Q_p$ and $Q_n$ to switches. The control signals are listed in Table XII. The circuit implementation for switching driving signal is shown in FIG. 70, where $Q_{an}$ and $Q_{ap}$ are driving signal for switches $S_{an}$ and $S_{ap}$ respectively. The switches in each bridge arm such as $S_{an}$, $S_{ap}$ are controlled complementarily. Therefore, there is always a path for inductor current to flow either into the output or input. Comparing with 3-phase PFC, the output logic circuit guarantee that the converter can handle bi-direction power flow.

TABLE XII

The algorithm for vector operated UCI controller for 3-phase APF.

| Region i = 1,2,6 | Degree | $i_{L,p}$ | $I_{L,n}$ | $Q_{ap}$ | $Q_{an}$ | $Q_{bp}$ | $Q_{bn}$ | $Q_{cp}$ | $Q_{cn}$ |
|---|---|---|---|---|---|---|---|---|---|
| 1 | 0~60 | $i_a$ | $i_c$ | $\overline{Q}_p$ | $Q_p$ | OFF | ON | $\overline{Q}_n$ | $Q_n$ |
| 2 | 60~120 | $-i_b$ | $-i_c$ | ON | OFF | $Q_p$ | $\overline{Q}_p$ | $Q_n$ | $\overline{Q}_n$ |
| 3 | 120~180 | $i_b$ | $i_a$ | $\overline{Q}_n$ | $Q_n$ | $\overline{Q}_p$ | $Q_p$ | OFF | ON |
| 4 | 180~240 | $-i_c$ | $-i_a$ | $Q_n$ | $\overline{Q}_n$ | ON | OFF | $Q_p$ | $\overline{Q}_p$ |
| 5 | 240~300 | $i_c$ | $i_b$ | OFF | ON | $\overline{Q}_n$ | $Q_n$ | $\overline{Q}_p$ | $Q_p$ |
| 6 | 300~360 | $-i_a$ | $-i_b$ | $Q_p$ | $\overline{Q}_p$ | $Q_n$ | $\overline{Q}_n$ | ON | OFF |

Table XII indicates that the proposed control approach rotates its parameters such as input current $i_{Lp}$ at each 60° of line cycle, which is similar to vector control. Because only two duty ratios are required to generate, the APF with vector operated UCI control will have lower switching losses. However, it is gained by the increase of the complexity. For example, three-voltage are sensed to generate the region selection function.

Figure 71:
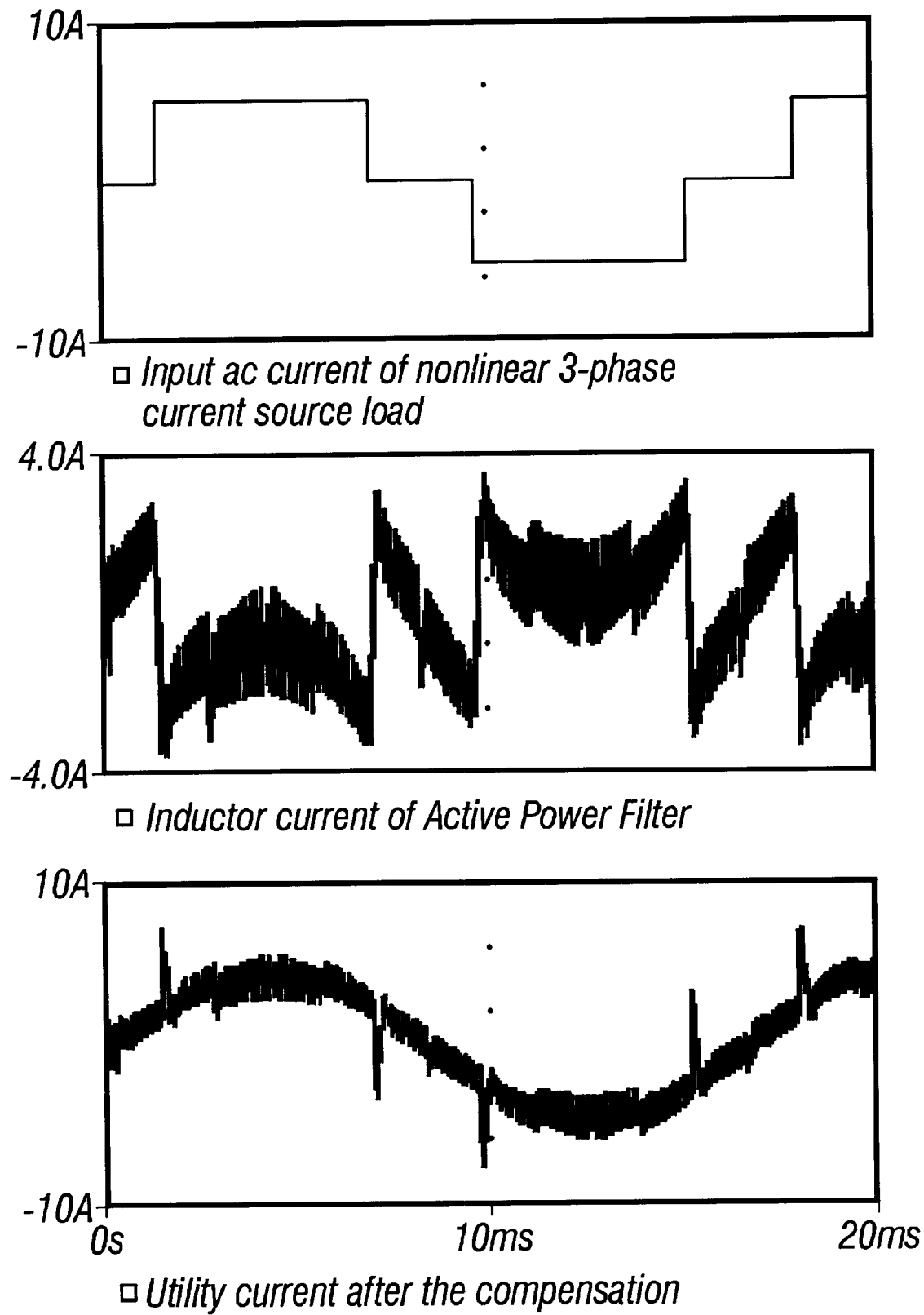
FIG. 71 is a graph of a simulation waveform for three-phase APF with proposed controller based on vector control.

The PSPICE simulation waveforms for the APF with this method are shown in FIG. 71. Simulation conditions are as follows: Input voltage 120 Vrms, Output voltage E=500 v; L=3 mH, f=10 KHz, P=1.5 KW. The conversion ration $$M = \frac{V_o}{\sqrt{2} \cdot V_{grms}} = 2.946.$$

The nonlinear load 110 is three-phase current source load.
Observation

The APF converter connects with the nonlinear load in parallel and cancels the harmonics and reactive power so that the ac main currents are sinusoidal. In general, the APF converters are four-quadrant operated. In this part, several topologies are investigated. The UCI controller for three-phase APF applications is discussed in detail. The APF with UCI controller features the following.

No need to sense the load current waveforms.
No special and complicated computations are required for generating harmonic current reference.
Constant frequency modulation.
No multipliers are required. The controller is comprised of one integrator with reset, some comparators and flip-flops. Therefore, a complete analog solution is provided.
PSPICE simulation results verify the theoretical analysis.
Grid-connected Inverters:

In its simplest terms the control method of the invention is based on one cycle control to realize an APF function given by:

$$I_s = \frac{1}{R_e} \cdot V_s$$

where $I_s$ is the three-phase ouput currents, $V_s$ the three-phase voltages and $R_e$ the equivalent resistance by which the output is loaded.

Every buck-derived converter can be described by:

$$V_s = V_o \cdot M(D)$$

where M(D) is a function of the duty cycle D, and which is called the conversion matrix and $V_o$ is the input dc voltage.

If an equivalent current sensing resistor, $R_s$, is used to measure the source current, $I_s$, then the circuit performance can also be described by a key control equation:

$R_s \cdot I_s = (D \cdot V_s - V_m \cdot M(D))$

Combining the two equations above, we have $$R_s \cdot I_s = \left(K - \frac{V_m}{V_o}\right) \cdot V_s$$

So the emulated resistance $R_e$ is given by $$R_e = \frac{1}{R_s} \cdot \left(K - \frac{V_m}{V_0}\right)$$

where K is a constant. Therefore, the current follows the input phase voltage.

Compared to the switching frequency, $V_m$ varies at much lower frequency, therefore it may be approximated by the output of the feedback compensator which is automatically adjusted whenever it has a discrepancy comparing to a reference value. The key control equation can be used with buck-derived converters. For each solution, a control implementation is available based on one-cycle control. Those implementations can be roughly classified into two categories: (1) vector control as shown in FIG. 9 and (2) bipolar control as shown in FIG. 10.

Figure 9:
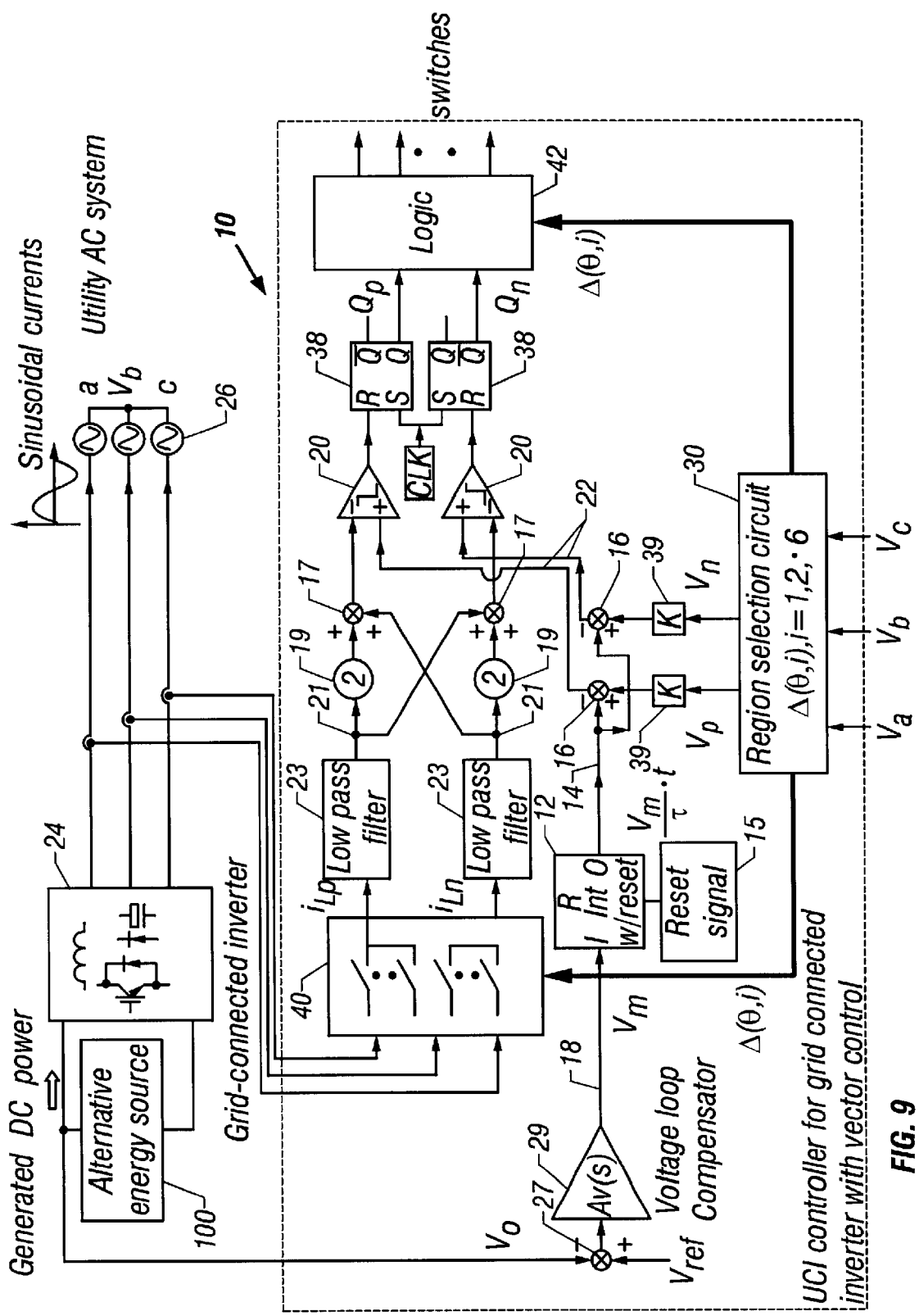
FIG. 9 is a schematic diagram of a grid-connected inverter with UCI control in vector operation according to the invention.

The control circuit 10 in FIG. 9 for vector control is comprised of an integrator 12 having an input 18 with a reset circuit having its output 14 coupled to the input of two adders 16. The adders 16 have another input that is coupled to the output of constant K multipliers 39, which in turn are coupled to the region selection circuitry 30. The output 22 of the adders 16 are coupled to two comparators 20.

Figure 10A:
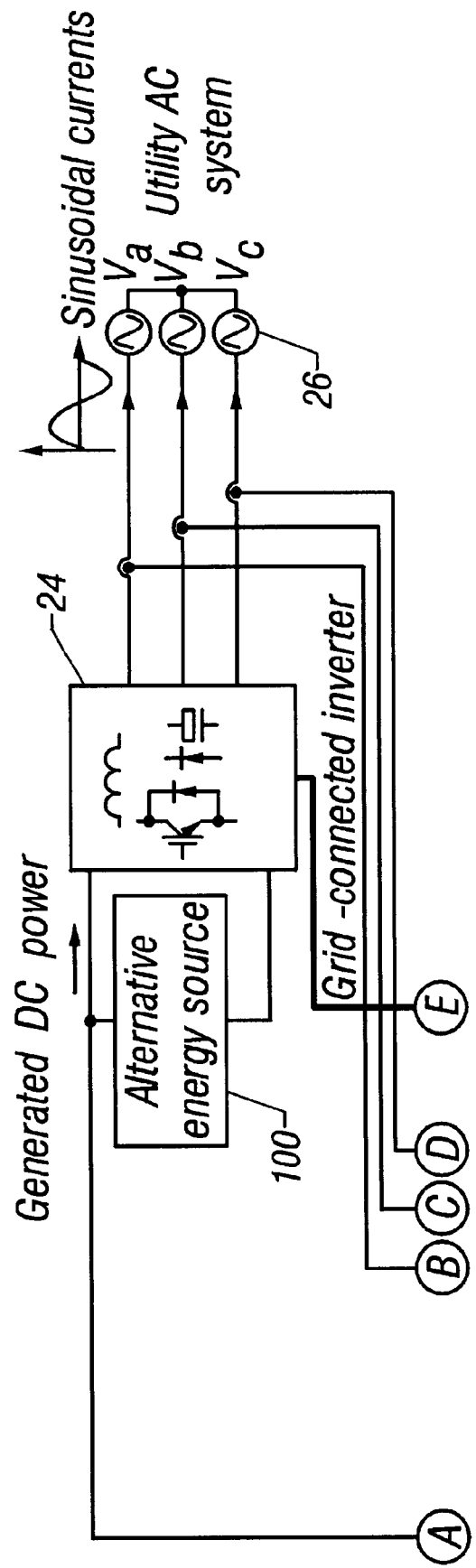
FIG. 10 is a schematic diagram of a grid-connected inverter with UCI control in bipolar operation according to the invention.
Figure 10B:
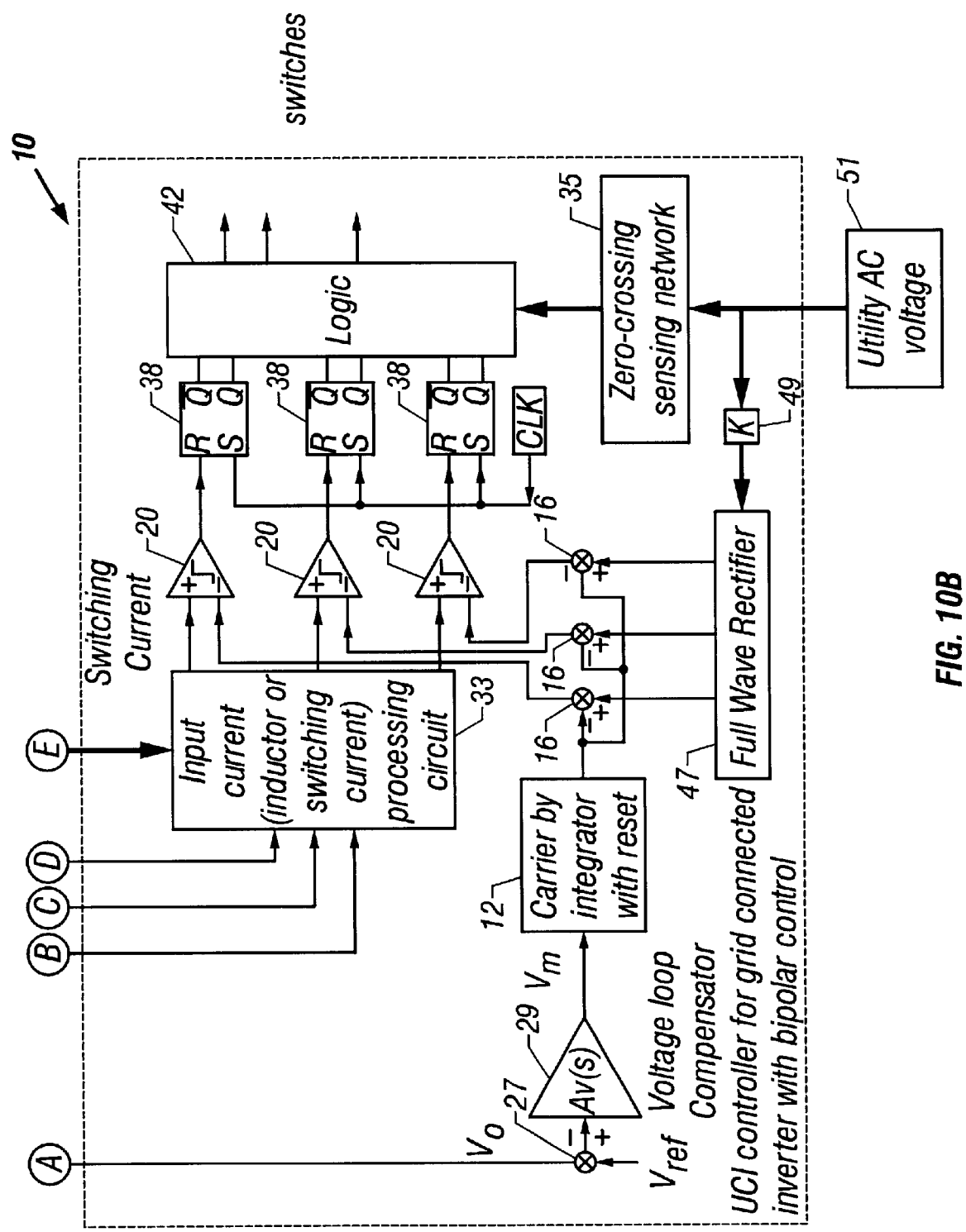

The control circuit 10 for bipolar control shown in FIG. 10 is comprised of an integrator 12 having an input with a reset circuit, which integrator 12 having its output 14 coupled to the input of three adders 16. The adders 16 have another input that is coupled to full wave rectifier 47, which in turn takes its input from K multipler 49. Both K multiplier 49 and zero-crossing network 35 have as their input the utility AC voltage 51. The outputs 22 of adders 16 are coupled to three comparators 20.

An unified constant-frequency integration (UCI) control of the grid-connected inverters is thus described above based on one-cycle control. This control method employs an integrator 12 with reset as the core component to control the duty ratio of a grid-connected 24 inverter to realize net sinusoidal current output to the AC source 26. Compared to previously proposed control methods, the UCI controller features simpler circuitry, and no need for multipliers. Since the output current compensation is performed cycle by cycle, the compensated output currents match the three-phase AC voltages closely, thus a unity power factor and low total harmonic distortion are achieved.

Simulation result shows that the grid-connected inverter has excellent output using many different nonlinear loads. This control method is applicable to most other inverter. Grid-connected inverters with UCI controller provide a cost-effective, highly reliable, and flexible solution for alternative energy source power generation. Due to the simplicity and generality of the circuitry, it is very suitable for industrial production.

Digital implementation of the UCI control method can be realized by programming the control key equation and the supporting logic and linear functions into a DSP chip. Since control key equation and the supporting logic and linear functions are very simple, a low cost DSP can be employed.

Three-phase Power Factor Corrected Grid-connected Inverters for Alternative Energy Sources with UCI control In this part, Unified Constant-frequency Integration (UCI) control is extended to control grid-connected inverters. Distributed power generation is a trend for the future power system, because it delivers power with less loss and it facilitates the use of distributed alternative energy sources 100 such as fuel cells, winder power, solar energy, etc. In order to make use of the existing power distribution grid, many distributed power generators will be connected to the grid. Therefore, grid-connected inverters are the key elements of the power system that transfer the dc current from alternative energy sources to the grid with sinusoidal current injection. The grid-connected inverter should have the following desired features:

Low line current distortion. The inverter should inject as low harmonic as possible into utility.

High power factor. It reduces the component power rating and improves the power delivery capacity of the power generation systems.

High efficiency.

Switching frequency is desired to be higher than other kind of inverters such as inverters in motor driven system because the output filter inductors can be smaller.

Figure 72:
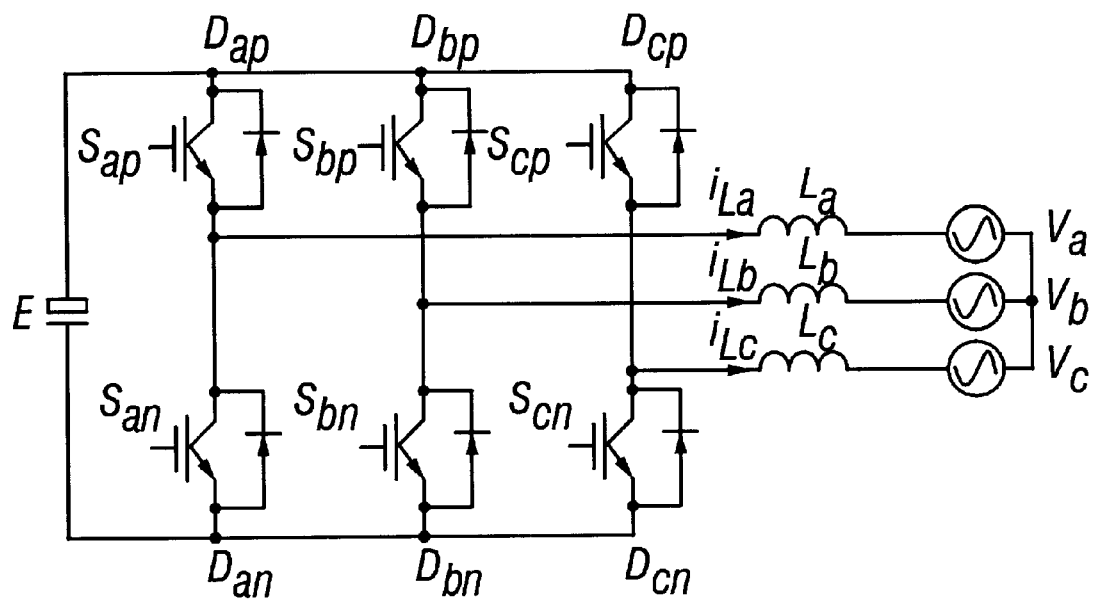
FIG. 72 is a schematic of a three-phase grid-connected circuit with a standard six-switch bridge inverter.

A standard six-switch bridge inverter is often used as a grid-connected inverter as shown in FIG. 72. For this inverter, d-q transformation modulation based on digital implementation is often employed, which results in a complicated system. In addition, short-through hazard exists in most of the previously reported inverter systems. In this part, an investigation is conducted which shows that this inverter can be de-coupled into parallel-connected dual buck topology during each 60° of line cycle. Based on the parallel-connected dual buck topology, a UCI controller is proposed. This controller is comprised of a linear network, an integrator with reset and some logic circuit. The multiplier is eliminated in the control loop. With UCI control, the grid-connected inverter will feature unity-power-factor, low current distortion. Switching losses is also reduced because only two high frequency switches are controlled in each 60° of line cycle. Furthermore, short-through hazard is eliminated because only one of switches in each bridge arm is controlled during each 60° of line cycle.

Parallel-connected dual buck topology for standard six-switch bridge inverter

Figure 73:
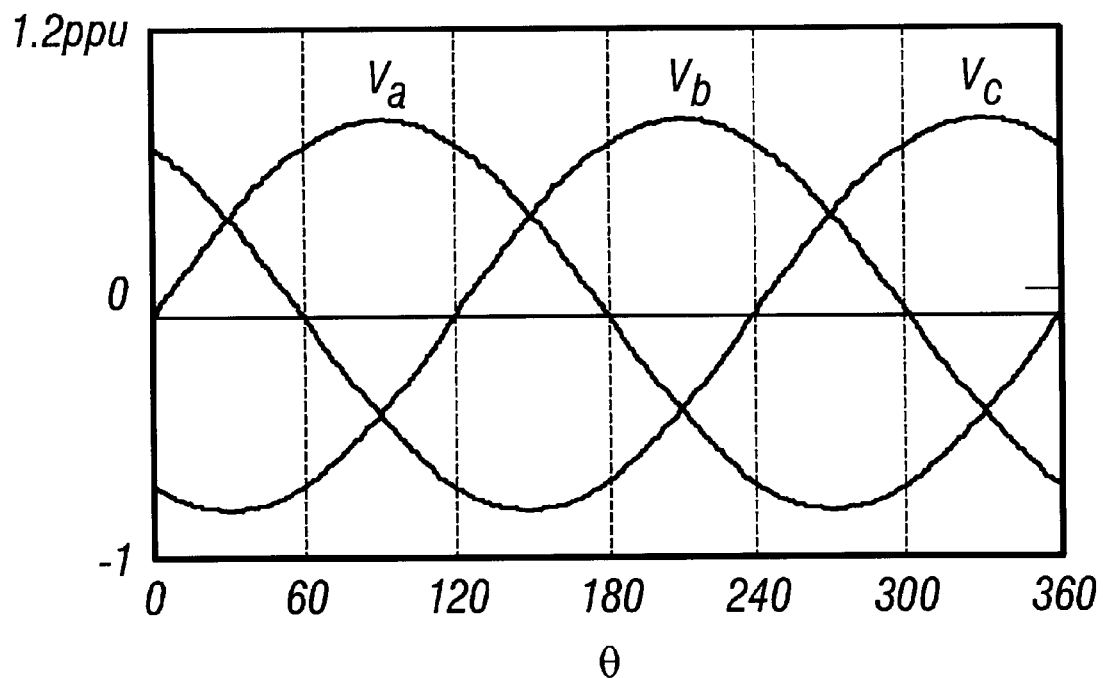
FIG. 73 is a graph of a three-phase utility voltage waveforms.
Figure 74A:
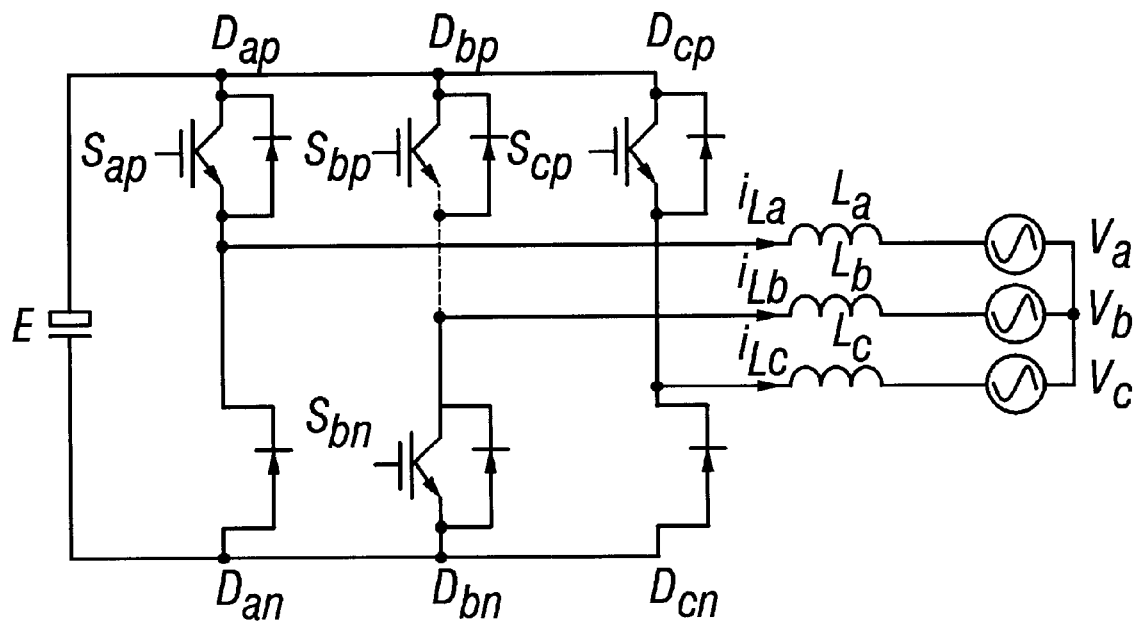
FIG. 74a is a schematic of an equivalent circuit for inverter in FIG. 72 during 0~60°.
Figure 74B:
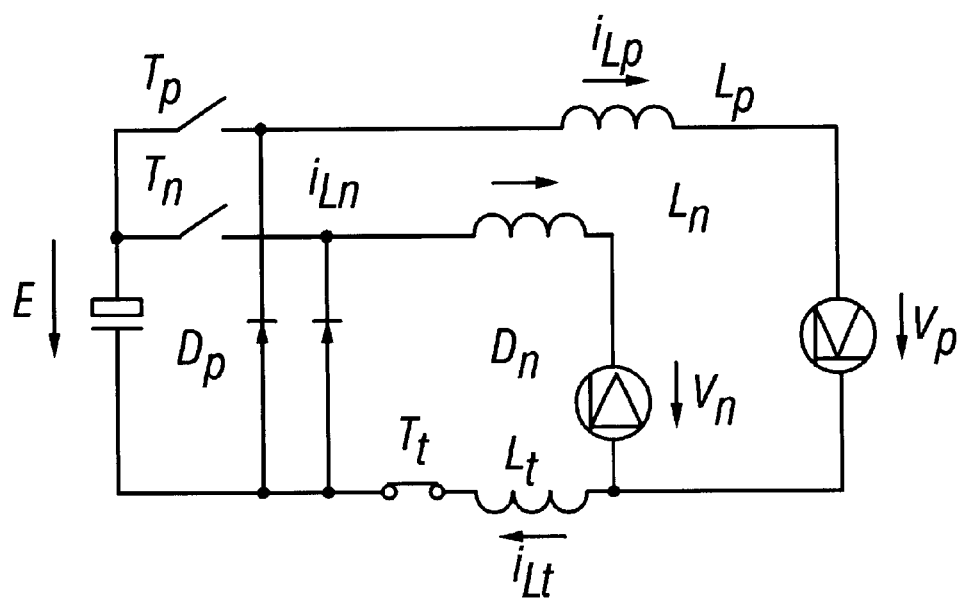
FIG. 74b is a schematic of parallel-connected dual buck topology.

Three-phase voltage waveforms are shown in FIG. 73. During (0~60°) region, supposing the inductor current in FIG. 72 follows the utility phase voltage so unity-power-factor is achieved. The average current is satisfied $<i_{Lb}><0$ and $<i_{La}>>0$; $<i_{Lc}>>0$. The switches $S_{bn}$ is turned on during this region and other two switches $S_{ap}$ and $S_{cp}$ are controlled so that the average currents $<i_{La}>$ and $<i_{Lc}>$ follows the output utility phase voltage $V_a$ and $V_c$ respectively. Assuming the three-phase system is symmetric, the average current $<i_{Lb}>$ automatically follows the phase voltage $V_b$. Therefore, unity-power-factor is achieved. The equivalent circuit and parallel-connected dual buck topology in this 60° is shown in FIG. 74. The cross-reference of the circuit parameters between the three-phase bridge inverter and parallel-connected dual buck topology are listed in Table XIII.

TABLE XIII

The cross-reference of the circuit parameters between the three-phase bridge inverter and parallel-connected dual buck topology.*

| Region | $V_p$ | $V_n$ | $L_p$ | $L_n$ | $L_t$ | $T_p$ | $T_n$ | $T_t$ | $D_p$ | $D_n$ |
|---|---|---|---|---|---|---|---|---|---|---|
| 0~60 | $V_{ab}$ | $V_{cb}$ | $L_a$ | $L_c$ | $L_b$ | $S_{ap}$ | $S_{cp}$ | $S_{bn}$ | $D_{an}$ | $D_{cn}$ |
| 60~120 | $V_{ab}$ | $V_{ac}$ | $L_b$ | $L_c$ | $L_a$ | $S_{bn}$ | $S_{cn}$ | $S_{ap}$ | $D_{bp}$ | $D_{cp}$ |
| 120~180 | $V_{bc}$ | $V_{ac}$ | $L_b$ | $L_a$ | $L_c$ | $S_{bp}$ | $S_{ap}$ | $S_{cn}$ | $D_{bn}$ | $D_{an}$ |
| 180~240 | $V_{bc}$ | $V_{ba}$ | $L_c$ | $L_a$ | $L_b$ | $S_{cn}$ | $S_{an}$ | $S_{bp}$ | $D_{cp}$ | $D_{ap}$ |
| 240~300 | $V_{ca}$ | $V_{ba}$ | $L_c$ | $L_b$ | $L_a$ | $S_{cp}$ | $S_{bp}$ | $S_{an}$ | $D_{cn}$ | $D_{bn}$ |
| 300~360 | $V_{ca}$ | $V_{cb}$ | $L_a$ | $L_b$ | $L_c$ | $S_{an}$ | $S_{bn}$ | $S_{cp}$ | $D_{ap}$ | $D_{bp}$ |

UCI Control of inverters based on parallel-connected dual buck topology

Assuming the parallel-connected dual buck converter operates in constant switching frequency and Continuous Conduction Mode (CCM) is performed, there are only four possible states for switches $T_p$ and $T_n$. The equivalent circuits for the four switching states are shown in FIGS. 75a–75d and the inductor voltage waveforms are listed in Table XIV.

TABLE XIV

Switching states and inductor voltages for parallel-connected dual buck sub-topology.

| State | $T_p$ | $T_n$ | $V_{Lp}$ | $V_{Ln}$ | $V_{Lt}$ |
|---|---|---|---|---|---|
| I | ON | ON | $\frac{1}{3} \cdot E - V_p^*$ | $\frac{1}{3} \cdot E - V_n^*$ | $\frac{2}{3} \cdot E - V_t^*$ |
| II | ON | OFF | $\frac{2}{3} \cdot E - V_p^*$ | $-V_n^* - \frac{1}{3} \cdot E$ | $\frac{1}{3} \cdot E - V_t^*$ |
| III | OFF | ON | $-\frac{1}{3} \cdot E - V_p^*$ | $\frac{2}{3} \cdot E - V_n^*$ | $\frac{1}{3} \cdot E - V_t^*$ |
| IV | OFF | OFF | $-V_p^*$ | $-V_n^*$ | $-V_t^*$ |

Where $$\begin{bmatrix} V_p^* \\ V_n^* \\ V_t^* \end{bmatrix} = \begin{bmatrix} \frac{2}{3} & -\frac{1}{3} \\ -\frac{1}{3} & \frac{2}{3} \\ \frac{1}{3} & \frac{1}{3} \end{bmatrix} \cdot \begin{bmatrix} V_p \\ V_n \end{bmatrix} \quad (81)$$

Figure 76:
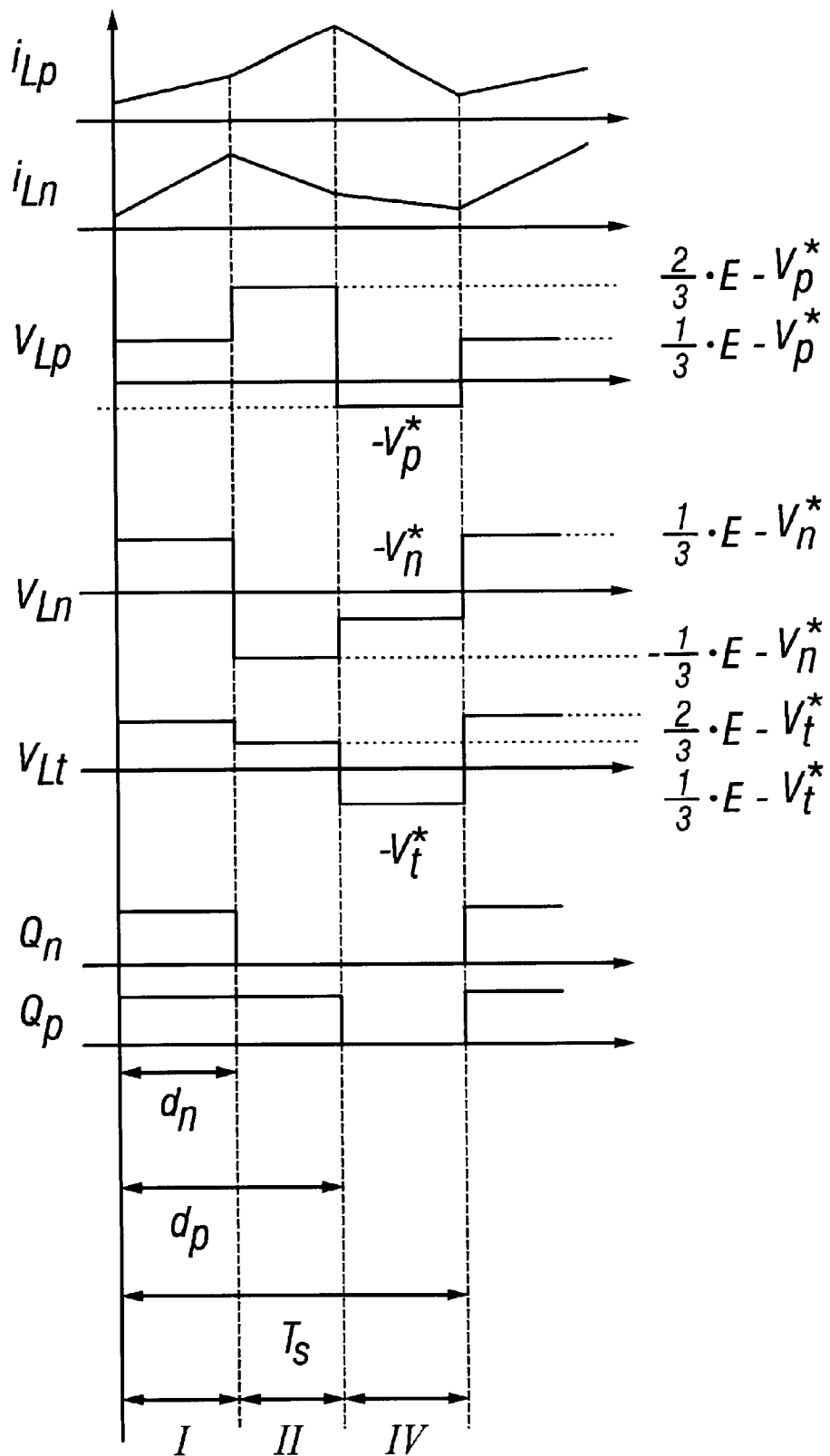
FIG. 76 are the inductor current and voltage waveforms.

During each switching cycle, only two switching sequences are possible—I, II, IV or I, III, IV. Assuming the switching sequence is I, II or IV. In other words, $d_p > d_n$, where $d_p$ and $d_n$ are duty cycles for switches $T_p$ and $T_n$. The inductor current and voltage waveforms are shown in FIG. 76.

Supposing switching frequency is much higher than line frequency, inductor voltage-second balance method can be applied during each switching cycle, yields:

$$\begin{cases} \left(\frac{1}{3} \cdot E - V_p^*\right) \cdot d_n + \left(\frac{2}{3} \cdot E - V_p^*\right) \cdot (d_p - d_n) - V_p^* \cdot (1 - d_p) = 0 \\ \left(\frac{1}{3} \cdot E - V_n^*\right) \cdot d_n + \left(-\frac{1}{3} \cdot E - V_n^*\right) \cdot (d_p - d_n) - V_n^* \cdot (1 - d_p) = 0 \\ \left(\frac{2}{3} \cdot E - V_t^*\right) \cdot d_n + \left(\frac{1}{3} \cdot E - V_t^*\right) \cdot (d_p - d_n) - V_t^* \cdot (1 - d_p) = 0 \end{cases} \quad (82)$$

For three-phase system, $V_p^* + V_n^* - V_t^* = 0$, therefore, (82) can be simplified as $$\begin{bmatrix} d_p \\ d_n \end{bmatrix} = \frac{1}{E} \cdot \begin{bmatrix} 2 & 1 \\ 1 & 2 \end{bmatrix} \cdot \begin{bmatrix} V_p^* \\ V_n^* \end{bmatrix} \quad (38)$$

The goal of three-phase inverter with unity-power-factor is to force the average inductor current in phase with the output utility line voltage, i.e.

$$\begin{cases} V_a = R_e \cdot i_a = R_e \cdot \langle i_{La} \rangle \\ V_b = R_e \cdot i_b = R_e \cdot \langle i_{Lb} \rangle \\ V_c = R_e \cdot i_c = R_e \cdot \langle i_{Lc} \rangle \end{cases} \quad (84)$$

where $R_e$ is emulated resistance

Comparing with UCI controlled rectifier, the direction of inductor in grid-connected inverter is in such a way that the inductor energy is transferred into the AC utility.

It can be demonstrated that the grid-connected inverter with unity-power-factor can be realized by controlling the inductor current $i_{Lp}$ and $i_{Ln}$ follows the input voltage $V_p^*$ and $V_n^*$ respectively, i.e $$\begin{cases} \langle i_{Lp} \rangle = R_e \cdot V_p^* \\ \langle i_{Ln} \rangle = R_e \cdot V_n^* \end{cases} \quad (85)$$

For example, during the region 0~60°, we have $$\begin{cases} i_{Lp} = i_{La} \\ V_p^* = \frac{2}{3} \cdot V_p - \frac{1}{3} \cdot V_n = \left(\frac{2}{3} \cdot V_{ab}\right) - \frac{1}{3} \cdot V_{cb} = V_a \\ i_{Ln} = i_{La} \\ V_n^* = -\frac{1}{3} \cdot V_p + \frac{2}{3} \cdot V_n = -\frac{1}{3} \cdot V_{ab} + \frac{2}{3} \cdot V_{cb} = V_c \end{cases} \quad (86)$$

The proposed control key equation for the inverter with UCI control is shown in equation 87

$$R_s \cdot \begin{bmatrix} 2 & 1 \\ 1 & 2 \end{bmatrix} \cdot \begin{bmatrix} \langle i_{Lp} \rangle \\ \langle i_{Ln} \rangle \end{bmatrix} = \begin{bmatrix} K \cdot V_p - V_m \cdot d_p \\ K \cdot V_n - V_m \cdot d_n \end{bmatrix} \quad (87)$$

where $V_m$ is related to the emulated resistance $R_e$; $R_s$ is equivalent current sensing resistance, and K is an introduced constant. The parameter $V_m$ is almost constant during each line cycle and it is used to control the output power.

Substitution of equation (81) and (83) into equation (87), the inductor currents $\langle i_{Lp} \rangle$, $\langle i_{Ln} \rangle$ are solved by:

$$\begin{bmatrix} \langle i_{Lp} \rangle \\ \langle i_{Ln} \rangle \end{bmatrix} = \frac{K - \frac{V_m}{E}}{R_s} \cdot \begin{bmatrix} V_p^* \\ V_n^* \end{bmatrix} \quad (88)$$

Comparing equation 88 and 85 we have $$R_e = \frac{1}{R_s} \cdot \left(K - \frac{V_m}{E}\right) \quad (89)$$

The above two equations show that currents $i_{Lp}$ and $i_{Ln}$ are proportional to voltage $V_p^*$ and $V_n^*$ respectively. The maximum output current is limited by parameter K and the output power or current is adjusted by $V_m$.

Figure 77:
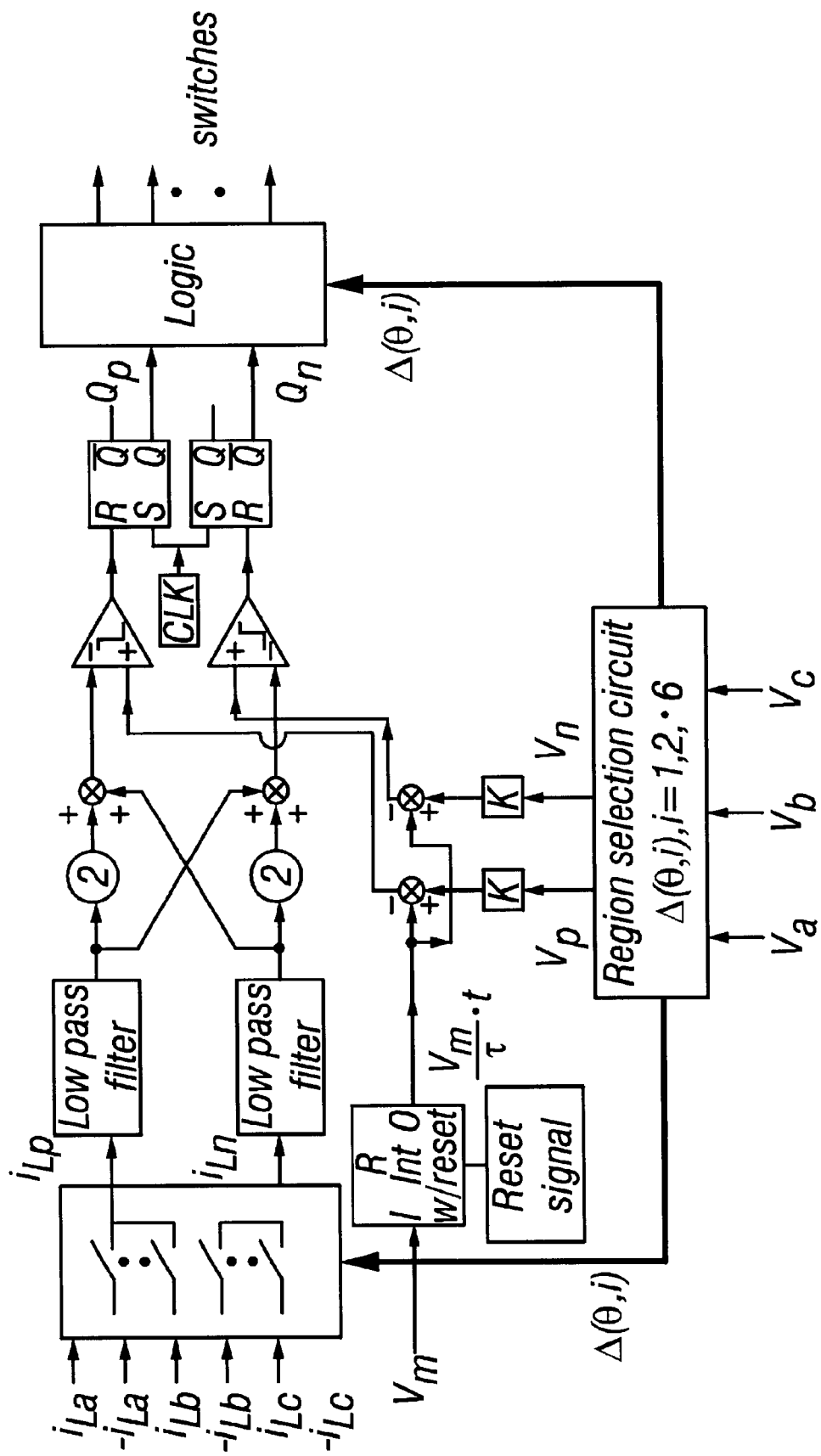
FIG. 77 is a diagram for proposed UCI controller for three-phase grid-connected inverter.

The grid-connected inverter with unity-power-factor is achieved by realizing the equation 87 which can b easily implemented by one-cycle control with an integration with reset, two flip-flops and several logic circuit. The overall the control block is shown in FIG. 77, where the time constant of integrator equals switching period, i.e. $\tau=T_s$.

This control block includes four sections:

1) The region selection circuit. Because the parallel-connected dual buck topology rotates its parameters every 60° as shown in Table XIV, a region selection circuit is required to determine the operation region as well as the corresponding equivalent circuit. The region selection function $\Delta(\theta,i)$ is defined as $\Delta(\theta,i)=u(\theta-(i-1)\cdot 60)-u(\theta-i\cdot 60)$. The selection function I can be realized by sensing input voltage. The schematic and operation waveforms are the same as that of the UCI controller three-phase rectifiers for parallel-connected dual boost topology.

Figure 78A:
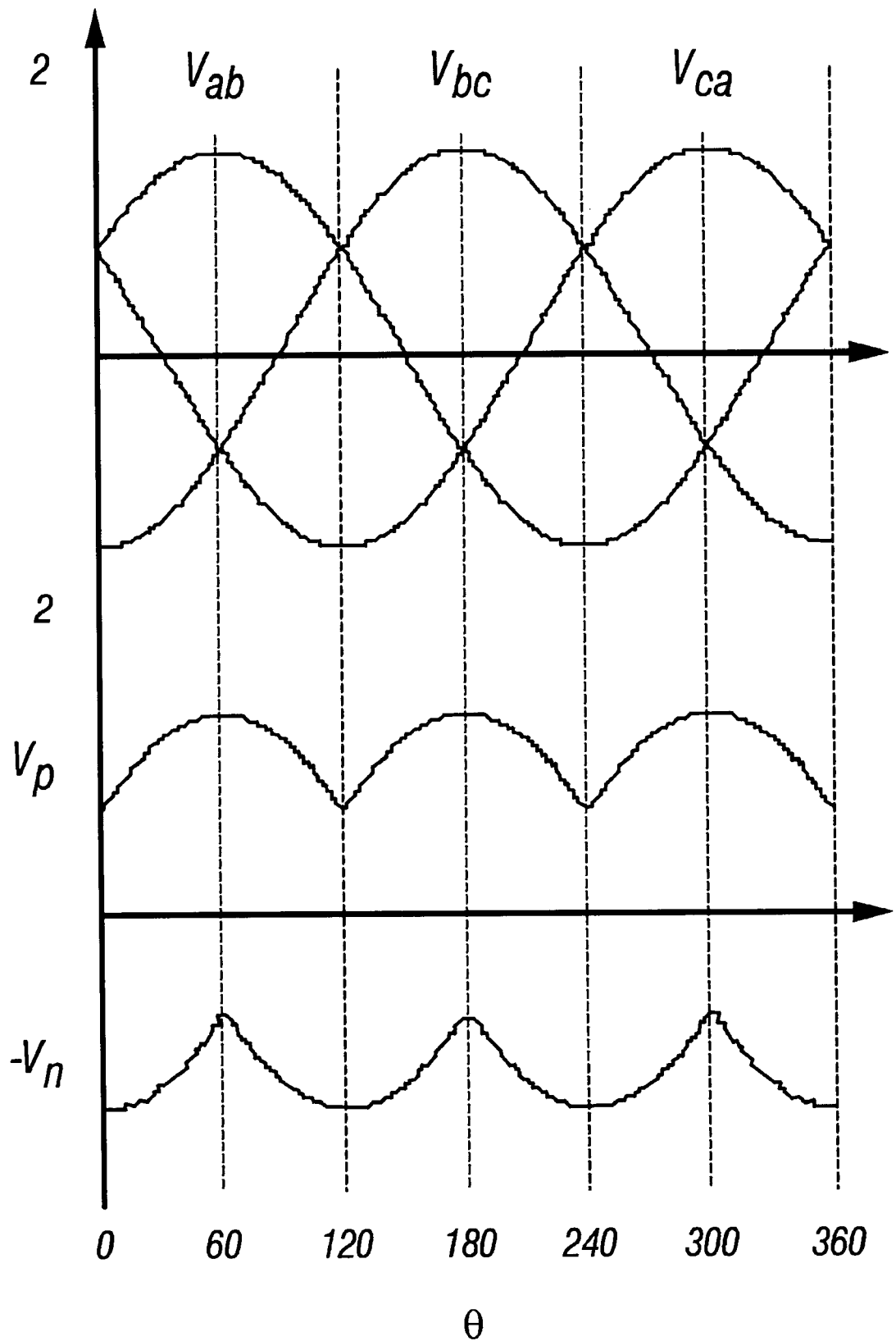
FIGS. 78a and 78b show the waveforms for equivalent circuit model during one line cycle.
Figure 78B:
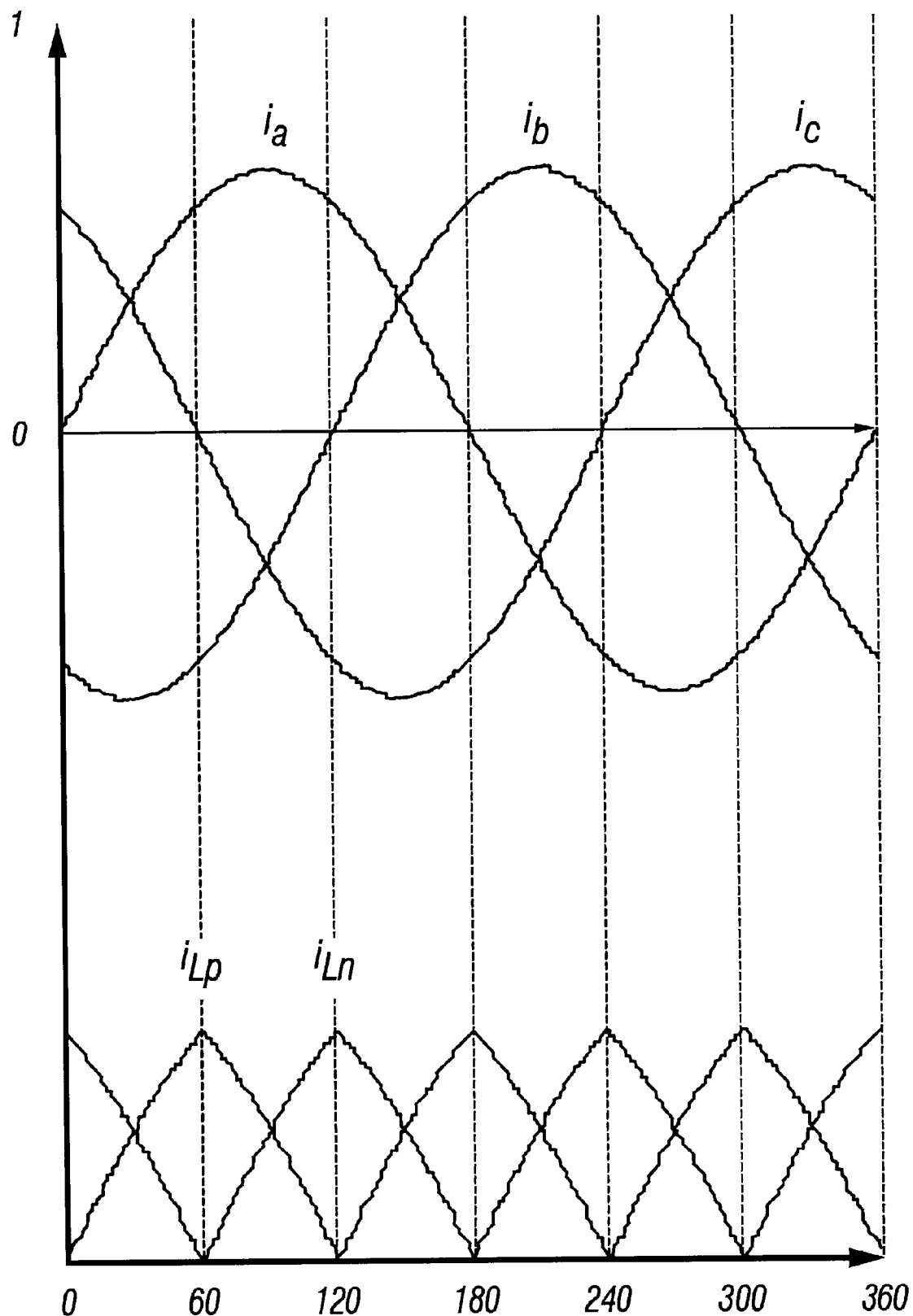

2) Input multiplex circuit which is used to select the input inductor current in order to configure the $<i_{Lp}>$ and $<i_{Ln}>$ as well as the reference voltage $V_p$ and $V_n$. The calculated waveforms of $<i_{Lp}>$, $<i_{Ln}>$, $V_p$, $V_n$ are shown in FIGS. 78*a* and 78*b*.

Figure 79:
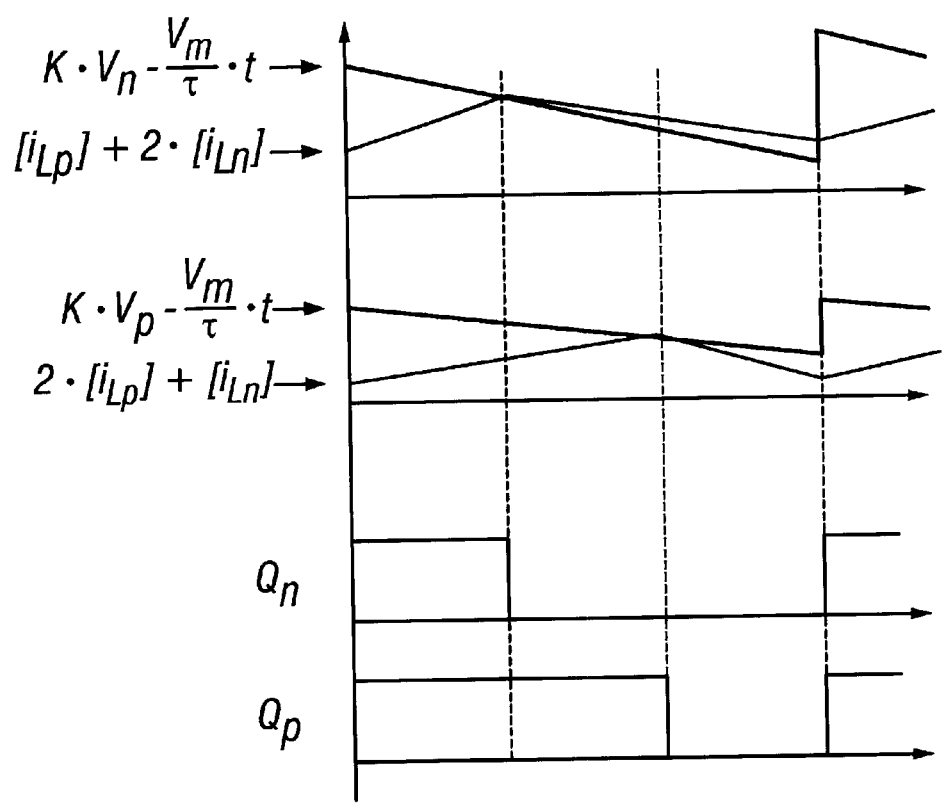
FIG. 79 is a graph of the operation waveforms of the core section of the proposed UCI controller

3) Core section: including an adder, a comparator and an integrator with reset. It is used to realize the equation 87. The integration time constant of integrator is set to equal the switching period. The operation waveforms are shown in FIG. 79.

4) Output logic circuit, which applies the equivalent switching control signal $Q_p$ and $Q_n$ to switches. The control algorithm is shown in Table XV.

Observation:

In this part, a three-phase grid-connected inverter with UCI control is presented. During each 60° of line cycle, a three-phase six-switch standard bridge inverter can be de-coupled into dual buck topology. Based on these topologies, a UCI controller is proposed. With UCI control, low current distortion and unity-power-factor are achieved without using multipliers in the control loop. In addition, switching losses are reduced since only two high frequency switches are controlled during each 60°. Its simplicity and performance make it a great candidate for grid-connection inverter for distributed power generation.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this

TABLE XV

The control algorithm for standard six-switch bridge inverter with unity-power-factor

| Region | Degree | $V_p$ | $V_n$ | $i_{Lp}$ | $i_{Ln}$ | $Q_{ap}$ | $Q_{an}$ | $Q_{bp}$ | $Q_{bn}$ | $Q_{cp}$ | $Q_{cn}$ |
|---|---|---|---|---|---|---|---|---|---|---|---|
| 1 | 0~60 | $V_a - V_b$ | $V_c - V_b$ | $i_{La}$ | $i_{Lc}$ | $Q_p$ | | | ON | $Q_n$ | |
| 2 | 60~120 | $V_a - V_b$ | $V_a - V_c$ | $-i_{Lb}$ | $-i_{Lc}$ | ON | | | $Q_p$ | | $Q_n$ |
| 3 | 120~180 | $V_b - V_c$ | $V_a - V_c$ | $i_{Lb}$ | $i_{La}$ | $Q_n$ | | $Q_p$ | | | ON |
| 4 | 180~240 | $V_b - V_c$ | $V_b - V_a$ | $-i_{Lc}$ | $-i_{La}$ | | $Q_n$ | ON | | | $Q_p$ |
| 5 | 240~300 | $V_c - V_a$ | $V_b - V_a$ | $i_{Lc}$ | $i_{Lb}$ | | ON | | $Q_n$ | $Q_p$ | |
| 6 | 300~360 | $V_c - V_a$ | $V_c - V_b$ | $-i_{La}$ | $-i_{Lb}$ | | $Q_p$ | | | $Q_n$ | ON |

Figure 80:
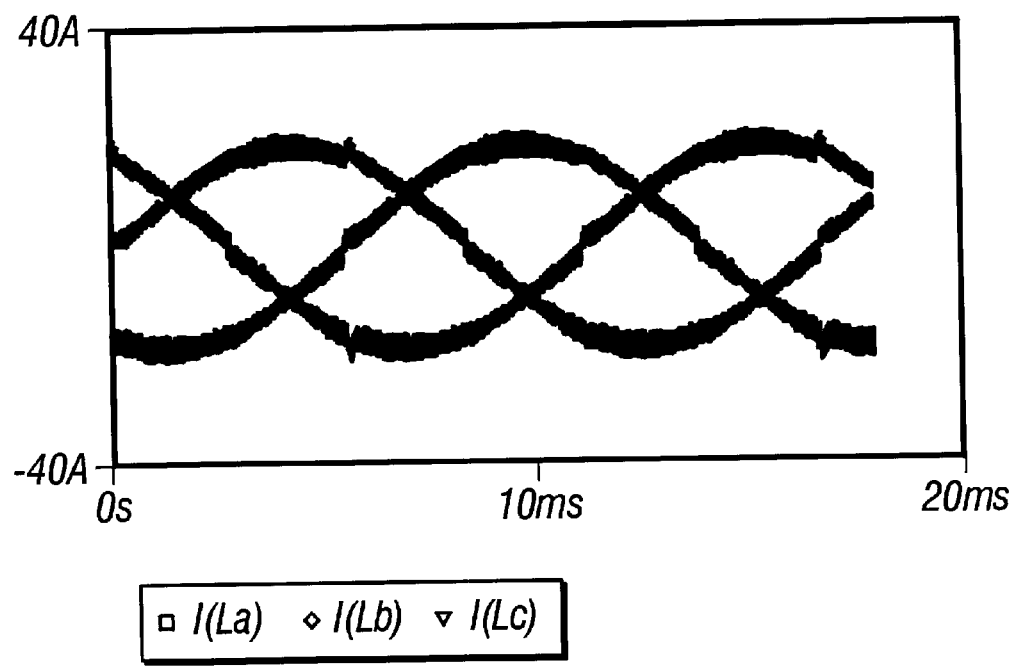
FIG. 80 is a graph of the simulated inductor current waveforms for inverter in Fig. with proposed UCI controller.

The simulated current waveforms for inverter in FIG. 72 with proposed UCI controller are shown in FIG. 80. Simulation conditions are: DC supply voltage E=500 v; utility voltage 120 Vrms; inductance $L_a=L_b=L_c=2$ mH, switching frequency 10 KHz; Output power 5 KW.

The proposed UCI controller is based on CCM operated inverter. If the inverter operates in Discontinuous Conduction Mode (DCM), the assumption is not satisfied and the current distortion will occur. This can be improved by setting the switches in each bridge arm to operate in complementary mode. For example, the driving signal for switches $S_{ap}$, $S_{an}$ during region 0~60° is $Q_p$, $\overline{Q}_p$ respectively.

sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for drawing or injecting sinusoidal current from or to a three phase power source by controlling an object circuit according to a control key equation comprising:

deriving said control key equation by combining a characteristic equation of said object circuit, which characteristic equation defines the electrical characteristics of the object circuit, and a control goal equation, which defines the desired electrical performance which is the goal of controlling the object circuit;

sensing the currents of said three phase power source or at least two switching currents of said object circuit, which switching currents are related to said currents of said three phase power source; and processing said sensed currents or at least two switching currents according to said control key equation to control said object circuit characterized by the characteristic equation to result in drawing or injecting sinusoidal current from or to said three phase power source to realize the performance defined by the control goal equation.

2. The method of claim 1 wherein processing said sensed currents or at least two switching currents comprises digitally processing said sensed currents or at least two switching currents according to said control key equation to result in drawing or injecting sinusoidal current from or to said three phase power source.

3. The method of claim 1 wherein processing said sensed currents or at least two switching currents comprises analog processing said sensed currents or at least two switching currents according to said control key equation to result in drawing or injecting sinusoidal current from or to said three phase power source.

4. The method of claim 3 wherein analog processing said sensed currents or at least two switching currents comprises:

implementing said control key equation using an analog processing circuit comprised of an integrator, a reset circuit component, a clock, at least two flip-flops, and at least two comparators with at least one logic circuit component or at least one linear circuit component; and controlling said analog processing circuit with one cycle control by:
setting said flip-flps with said clock at a beginning of a switching cycle;
compensating an error between a reference voltage and a feedback voltage from said object circuit with an opamp compensator;
integrating said compensated error output from said opamp compensator;
coupling said integrated compensated error and compensated error to an input of said comparators;
comparing said input with said linear combination of signals derived from said sensed current or at least two switching currents;
resetting said flip-flops to generate trigger pulse signals, which when coupled to said plurality of switches in said object circuit determine duty ratios of each of said plurality of switches in said object circuit.

5. The method of claim 1 where processing said sensed currents or at least two switching currents according to said control key equation to control said object circuit comprises processing said sensed currents or at least two switching currents to control a power-factor-corrected rectifier.

6. The method of claim 1 where processing said sensed currents or at least two switching currents according to said control key equation to control said object circuit comprises processing said sensed currents or at least two switching currents to control an active power filter.

7. The method of claim 1 where processing said sensed currents or at least two switching currents according to said control key equation to control said object circuit comprises processing said sensed currents or at least two switching currents to control a grid-connected inverter.

8. The method of claim 3 where processing said sensed currents or at least two switching currents according to said control key equation to control said object circuit comprises processing said sensed currents or at least two switching currents to control a power-factor-corrected rectifier, and where sensing the currents of said three phase power source or at least two switching currents of said object circuit comprises sensing average current for each of said three phases of sinusoidal power or for said at least two switching currents.

9. The method of claim 3 where processing said sensed currents or at least two switching currents according to said control key equation to control said object circuit comprises processing said sensed currents or at least two switching currents to control a power-factor-corrected rectifier, and where sensing the currents of said three phase power source or at least two switching currents of said object circuit comprises sensing peak inductor current for each of said three phases of sinusoidal power or for said at least two switching currents.

10. The method of claim 3 where processing said sensed currents or at least two switching currents according to said control key equation to control said object circuit comprises processing said sensed currents or at least two switching currents to control a power-factor-corrected rectifier having a plurality of switches, and to operate said plurality of switches in a vector mode.

11. The method of claim 3 where processing said sensed currents or at least two switching currents according to said control key equation to control said object circuit comprises processing said sensed currents or at least two switching currents to control a power-factor-corrected rectifier having a plurality of switches, and to operate said plurality of switches in a bipolar mode.

12. The method of claim 10 where processing said sensed currents or at least two switching currents to operate said power-factor-corrected rectifier in a vector mode comprises:

determining an operational region of said three phase power source as a function of time;
selectively switching inductor currents from said power-factor-corrected rectifier according to said operational region of said three phase power source;
generating a plurality of logic output switching signals, which when applied to said plurality of switches in said power-factor-corrected rectifier, will control inductor currents in said power-factor-corrected rectifier such that $R_s\ I_s = V_m\ M(D)$, where $I_s$ is a matrix vector comprised of said three source currents, Rs is an equivalent sensing resistance used to measure the source currents, Vm is a modulating voltage, M(D) is a conversion matrix and D is duty cycle of said source currents; and coupling said logic output switching signals to said plurality of switches according to said operational region of said three phase power source as a function of time to operate said plurality of switches in said vector mode.

13. The method of claim 12 where coupling said logic output switching signals to said plurality of switches according to said operational region of said three phase power source as a function of time to operate said plurality of switches in said vector mode comprises operating said plurality of switches in a series dual boost topology.

14. The method of claim 12 where coupling said logic output switching signals to said plurality of switches according to said operational region of said three phase power source as a function of time to operate said plurality of switches in said vector mode comprises operating said plurality of switches in a parallel dual boost topology.

15. The method of claim 13 where operating said plurality of switches in a series dual boost topology comprises operating said plurality of switches in a three phase, three switch, three level boost rectifier (VIENNA) topology.

16. The method of claim 13 where operating said plurality of switches in a series dual boost topology comprises operating said plurality of switches in a three phase boost rectifier with AC inductors and a split DC rail topology.

17. The method of claim 13 where operating said plurality of switches in a series dual boost topology comprises operating said plurality of switches in a three phase boost rectifier with AC inductors and an asymetric half bridge topology.

18. The method of claim 13 where operating said plurality of switches in a series dual boost topology comprises operating said plurality of switches in a three phase boost rectifier with DC inductors and a split DC-rail topology.

19. The method of claim 13 where operating said plurality of switches in a series dual boost topology comprises operating said plurality of switches in a three phase boost rectifier with DC inductors and an asymmetric bridge topology.

20. The method of claim 14 where operating said plurality of switches in a parallel dual boost topology comprises operating said plurality of switches in a three phase boost rectifier topology with delta-connected three phase switches.

21. The method of claim 14 where operating said plurality of switches in a parallel dual boost topology comprises operating said plurality of switches in a three phase boost rectifier topology with star-connected three phase switches.

22. The method of claim 14 where operating said plurality of switches in a parallel dual boost topology comprises operating said plurality of switches in a three phase H-bridge boost rectifier topology.

23. The method of claim 14 where operating said plurality of switches in a parallel dual boost topology comprises operating said plurality of switches in a three phase H-bridge boost rectifier topology with a diode.

24. The method of claim 14 where operating said plurality of switches in a parallel dual boost topology comprises operating said plurality of switches in a three phase boost rectifier topology with an inverter network.

25. The method of claim 3 where processing said sensed currents or at least two switching currents according to said control key equation to control said object circuit comprises processing said sensed currents or at least two switching currents to control an active power filter, and where sensing the currents of said three phase power source or at least two switching currents of said object circuit comprises sensing average current for each of said three phases of sinusoidal power or for said at least two switching currents.

26. The method of claim 3 where processing said sensed currents or at least two switching currents according to said control key equation to control said object circuit comprises processing said sensed currents or at least two switching currents to control an active power filter, and where sensing the currents of said three phase power source or at least two switching currents of said object circuit comprises sensing peak inductor current for each of said three phases of sinusoidal power or for said at least two switching currents.

27. The method of claim 3 where processing said sensed currents or at least two switching currents according to said control key equation to control said object circuit comprises processing said sensed currents or at least two switching currents to control an active power filter having a plurality of switches, and to operate said plurality of switches in a vector mode.

28. The method of claim 3 where processing said sensed currents or at least two switching currents according to said control key equation to control said object circuit comprises processing said sensed currents or at least two switching currents to control an active power filter having a plurality of switches, and to operate said plurality of switches in a bipolar mode.

29. The method of claim 27 where processing said sensed currents or at least two switching currents to operate said active power filter in a vector mode comprises:

determining an operational region of said three phase power source as a function of time;

selectively switching inductor currents from said active power filter according to said operational region of said three phase power source;

generating a plurality of logic output switching signals, which when applied to said plurality of switches in said active power filter, will control inductor currents in said active power filter such that $R_s I_s = V_m M(D)$, where $I_s$ is a matrix vector comprised of said three source currents, Rs is an equivalent sensing resistance used to measure the source currents, Vm is a modulating voltage, M(D) is a conversion matrix and D is duty cycle of said source currents; and coupling said logic output switching signals to said plurality of switches according to said operational region of said three phase power source as a function of time to operate said plurality of switches in said vector mode.

30. The method of claim 29 where coupling said logic output switching signals to said plurality of switches according to said operational region of said three phase power source as a function of time to operate said plurality of switches in said vector mode comprises operating said plurality of switches in a series dual boost topology.

31. The method of claim 29 where coupling said logic output switching signals to said plurality of switches according to said operational region of said three phase power source as a function of time to operate said plurality of switches in said vector mode comprises operating said plurality of switches in a parallel dual boost topology.

32. The method of claim 30 where operating said plurality of switches in a series dual boost topology comprises operating said plurality of switches in a three phase, three switch, three level boost rectifier (VIENNA) topology.

33. The method of claim 30 where operating said plurality of switches in a series dual boost topology comprises operating said plurality of switches in a three phase boost with AC inductors and a split DC rail topology.

34. The method of claim 30 where operating said plurality of switches in a series dual boost topology comprises operating said plurality of switches in a three phase boost with AC inductors and an asymetric half bridge topology.

35. The method of claim 30 where operating said plurality of switches in a series dual boost topology comprises operating said plurality of switches in a three phase boost with DC inductors and a split DC-rail topology.

36. The method of claim 30 where operating said plurality of switches in a series dual boost topology comprises operating said plurality of switches in a three phase boost with DC inductors and an asymmetric bridge topology.

37. The method of claim 31 where operating said plurality of switches in a parallel dual boost topology comprises operating said plurality of switches in a three phase boost topology with delta-connected three phase switches.

38. The method of claim 31 where operating said plurality of switches in a parallel dual boost topology comprises operating said plurality of switches in a three phase boost topology with star-connected three phase switches.

39. The method of claim 31 where operating said plurality of switches in a parallel dual boost topology comprises operating said plurality of switches in a three phase H-bridge boost topology.

40. The method of claim 31 where operating said plurality of switches in a parallel dual boost topology comprises operating said plurality of switches in a three phase H-bridge boost topology with a diode.

41. The method of claim 31 where operating said plurality of switches in a parallel dual boost topology comprises operating said plurality of switches in a three phase boost topology with an inverter network.

42. The method of claim 3 where processing said sensed currents or at least two switching currents according to said control key equation to control said object circuit comprises processing said sensed currents or at least two switching currents to control a grid-connecter inverter, and where sensing the currents of said three phase power source or at least two switching currents of said object circuit comprises sensing average current for each of said three phases of sinusoidal power or for said at least two switching currents.

43. The method of claim 3 where processing said sensed currents or at least two switching currents according to said control key equation to control said object circuit comprises processing said sensed currents or at least two switching currents to control a grid-connecter inverter, and where sensing the currents of said three phase power source or at least two switching currents of said object circuit comprises sensing peak inductor current for each of said three phases of sinusoidal power or for said at least two switching currents.

44. The method of claim 3 where processing said sensed currents or at least two switching currents according to said control key equation to control said object circuit comprises processing said sensed currents or at least two switching currents to control a grid-connecter inverter having a plurality of switches, and to operate said plurality of switches in a vector mode.

45. The method of claim 3 where processing said sensed currents or at least two switching currents according to said control key equation to control said object circuit comprises processing said sensed currents or at least two switching currents to control a grid-connecter inverter having a plurality of switches, and to operate said plurality of switches in a bipolar mode.

46. The method of claim 44 where processing said sensed currents or at least two switching currents to operate said grid-connecter inverter in a vector mode comprises:
determining an operational region of said three phase power source as a function of time;
selectively switching inductor currents from said grid-connecter inverter according to said operational region of said three phase power source;
generating a plurality of logic output switching signals, which when applied to said plurality of switches in said grid-connecter inverter, will control inductor currents in said grid-connecter inverter such that $R_s\ I_s = V_m\ M(D)$, where $I_s$ is a matrix vector comprised of said three source currents, Rs is an equivalent sensing resistance used to measure the source currents, Vm is a modulating voltage, M(D) is a conversion matrix and D is duty cycle of said source currents; and
coupling said logic output switching signals to said plurality of switches according to said operational region of said three phase power source as a function of time to operate said plurality of switches in said vector mode.

47. The method of claim 46 where coupling said logic output switching signals to said plurality of switches according to said operational region of said three phase power source as a function of time to operate said plurality of switches in said vector mode comprises operating said plurality of switches in a series dual boost topology.

48. The method of claim 46 where coupling said logic output switching signals to said plurality of switches according to said operational region of said three phase power source as a function of time to operate said plurality of switches in said vector mode comprises operating said plurality of switches in a parallel dual boost topology.

49. The method of claim 47 where operating said plurality of switches in a series dual boost topology comprises operating said plurality of switches in a three phase, three switch, three level boost (VIENNA) topology.

50. The method of claim 47 where operating said plurality of switches in a series dual boost topology comprises operating said plurality of switches in a three phase boost with AC inductors and a split DC rail topology.

51. The method of claim 47 where operating said plurality of switches in a series dual boost topology comprises operating said plurality of switches in a three phase boost with AC inductors and an asymetric half bridge topology.

52. The method of claim 47 where operating said plurality of switches in a series dual boost topology comprises operating said plurality of switches in a three phase boost with DC inductors and a split DC-rail topology.

53. The method of claim 47 where operating said plurality of switches in a series dual boost topology comprises operating said plurality of switches in a three phase boost with DC inductors and an asymmetric bridge topology.

54. The method of claim 48 where operating said plurality of switches in a parallel dual boost topology comprises operating said plurality of switches in a three phase boost topology with delta-connected three phase switches.

55. The method of claim 48 where operating said plurality of switches in a parallel dual boost topology comprises operating said plurality of switches in a three phase boost topology with star-connected three phase switches.

56. The method of claim 48 where operating said plurality of switches in a parallel dual boost topology comprises operating said plurality of switches in a three phase H-bridge boost topology.

57. The method of claim 48 where operating said plurality of switches in a parallel dual boost topology comprises operating said plurality of switches in a three phase H-bridge boost topology with a diode.

58. The method of claim 48 where operating said plurality of switches in a parallel dual boost topology comprises operating said plurality of switches in a three phase boost topology with an inverter network.

59. The method of claim 5 where processing said sensed currents or at least two switching currents to control a power-factor-corrected rectifier comprises controlling said power-factor-corrected rectifier using constant switching frequency.

60. The method of claim 5 where processing said sensed currents or at least two switching currents to control a power-factor-corrected rectifier comprises controlling said power-factor-corrected rectifier without the use of a multiplier.

61. The method of claim 5 where processing said sensed currents or at least two switching currents to control a power-factor-corrected rectifier comprises controlling said power-factor-corrected rectifier with the use of simple logic circuitry, including an integrator, a reset circuit component, a clock, at least two flip-flops, and at least two comparators with at least one logic circuit component or at least one linear circuit component.

62. The method of claim 6 where processing said sensed currents or at least two switching currents to control an active power filter comprises controlling said active power filter without the use of a multiplier.

63. The method of claim 6 where processing said sensed currents or at least two switching currents to control an active power filter comprises controlling said active power filter without generating current references which relate to a reactive and/or harmonic portion of a load current.

64. The method of claim 6 where processing said sensed currents or at least two switching currents to control an active power filter comprises controlling said active power filter without sensing a load current.

65. The method of claim 6 where processing said sensed currents or at least two switching currents to control an active power filter comprises controlling said active power filter with the use of simple logic circuitry, including an integrator, a reset circuit component, a clock, at least two flip-flops, and at least two comparators with at least one logic circuit component or at least one linear circuit component.

66. The method of claim 7 where processing said sensed currents or at least two switching currents to control a grid-connected inverter comprises controlling said grid-connected inverter with the use of simple logic circuitry, including an integrator, a reset circuit component, a clock, at least two flip-flops, and at least two comparators with at least one logic circuit component or at least one linear circuit component.

67. The method of claim 7 where processing said sensed currents or at least two switching currents to control a grid-connected inverter comprises controlling said grid-connected inverter without the use of a multiplier.

68. The method of claim 3 where analog processing said sensed currents or at least two switching currents according to said control key equation to result in drawing or injecting sinusoidal current from or to said three phase power source comprises sensing zero crossing of said sensed currents or at, least two switching currents and controlling said object circuit in a bipolar mode.

69. The method of claim 3 where analog processing said sensed currents or at least two switching currents in a vector mode according to said control key equation to result in drawing or injecting sinusoidal current from or to said three phase power source comprises:

determining an operational region of said three phase power source as a function of time by determining vector location and routing said sensed current or at least two switching currents to a comparator; and generating a plurality of logic output switching signals, which when applied to said plurality of switches in said object circuit, will control inductor currents in said object circuit such that $R_s\ I_s = V_m\ M(D)$, where $I_s$ is a matrix vector comprised of said three source currents, Rs is an equivalent sensing resistance used to measure the source currents, Vm is a modulating voltage, M(D) is a conversion matrix and D is duty cycle of said source currents; and coupling said logic output switching signals to said plurality of switches in said object circuit according to said operational region of said three phase power source as a function of time to operate said plurality of switches in a vector mode by routing a trigger pulse signals from corresponding flip-flops to selected switches in said object circuit.

\* \* \* \* \*